Dec. 2, 1947. P. BAKKER Re. 22,943
TELEPHONE SYSTEM
Original Filed Dec. 15, 1941 30 Sheets-Sheet 1
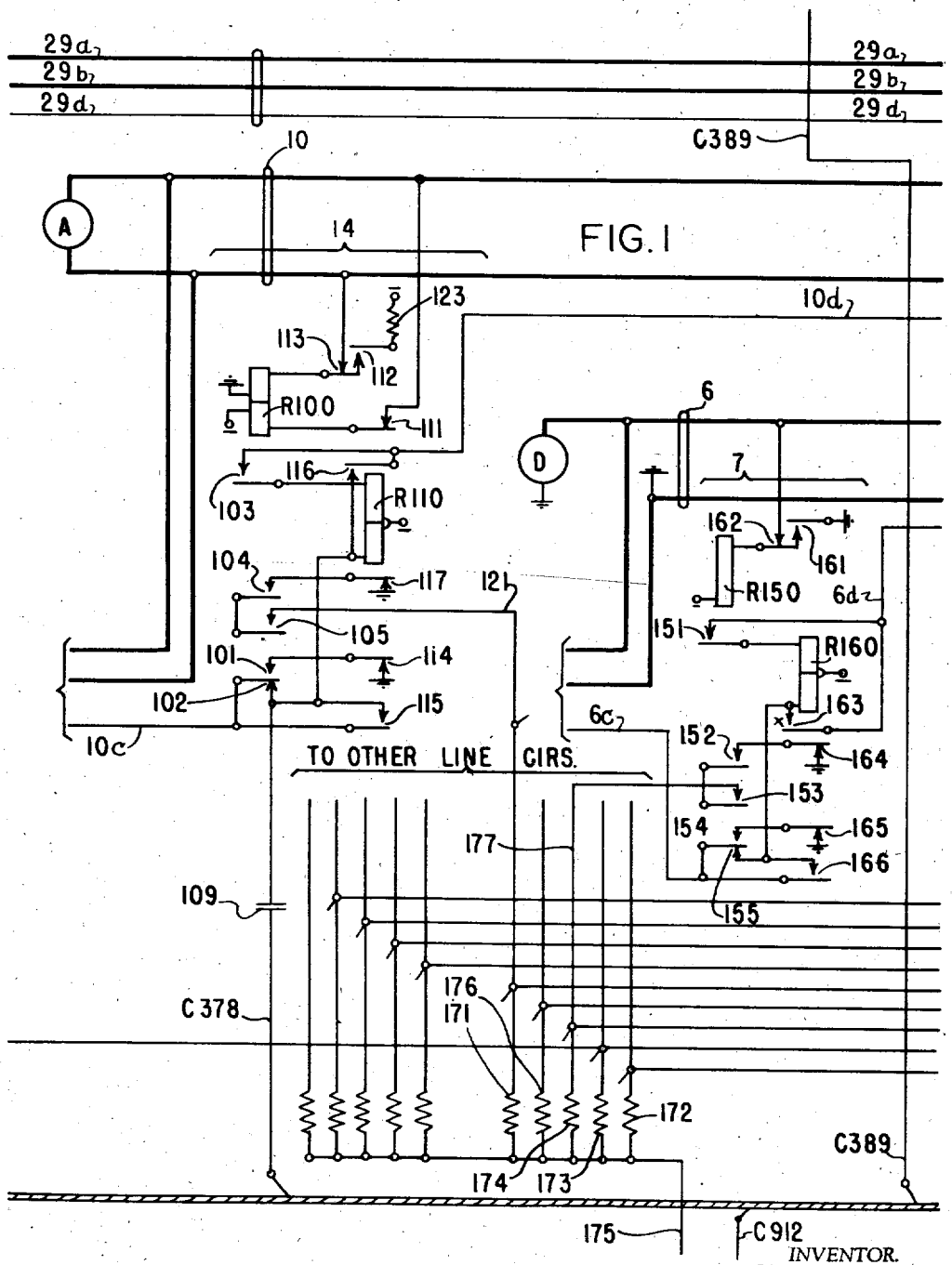
INVENTOR.
PIER BAKKER
BY Davis, Lindsey, Smith & Shonts
ATTONEYS Dec. 2, 1947. P. BAKKER Re. 22,943

TELEPHONE SYSTEM

Original Filed Dec. 15, 1941 30 Sheets-Sheet 2

INVENTOR.
PIER BAKKER
BY Davis, Lindsey, Smith & Shonts
ATTORNEYS

Dec. 2, 1947. P. BAKKER Re. 22,943
TELEPHONE SYSTEM
Original Filed Dec. 15, 1941 30 Sheets-Sheet 3
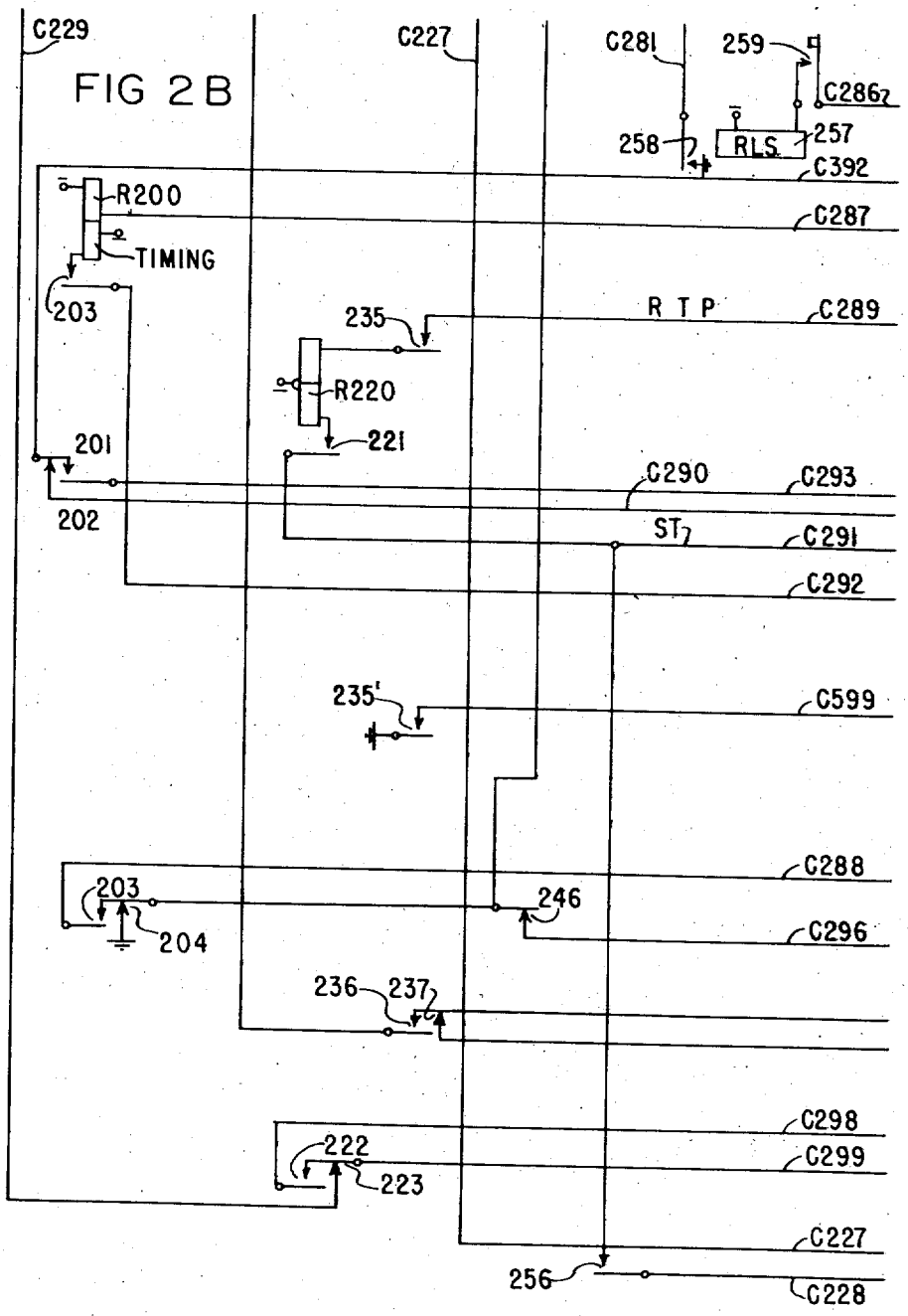
INVENTOR.
PIER BAKKER
BY Davis, Lindsey, Smith & Shontz
ATTORNEYS Dec. 2, 1947. P. BAKKER Re. 22,943
TELEPHONE SYSTEM
Original Filed Dec. 15, 1941 30 Sheets-Sheet 4
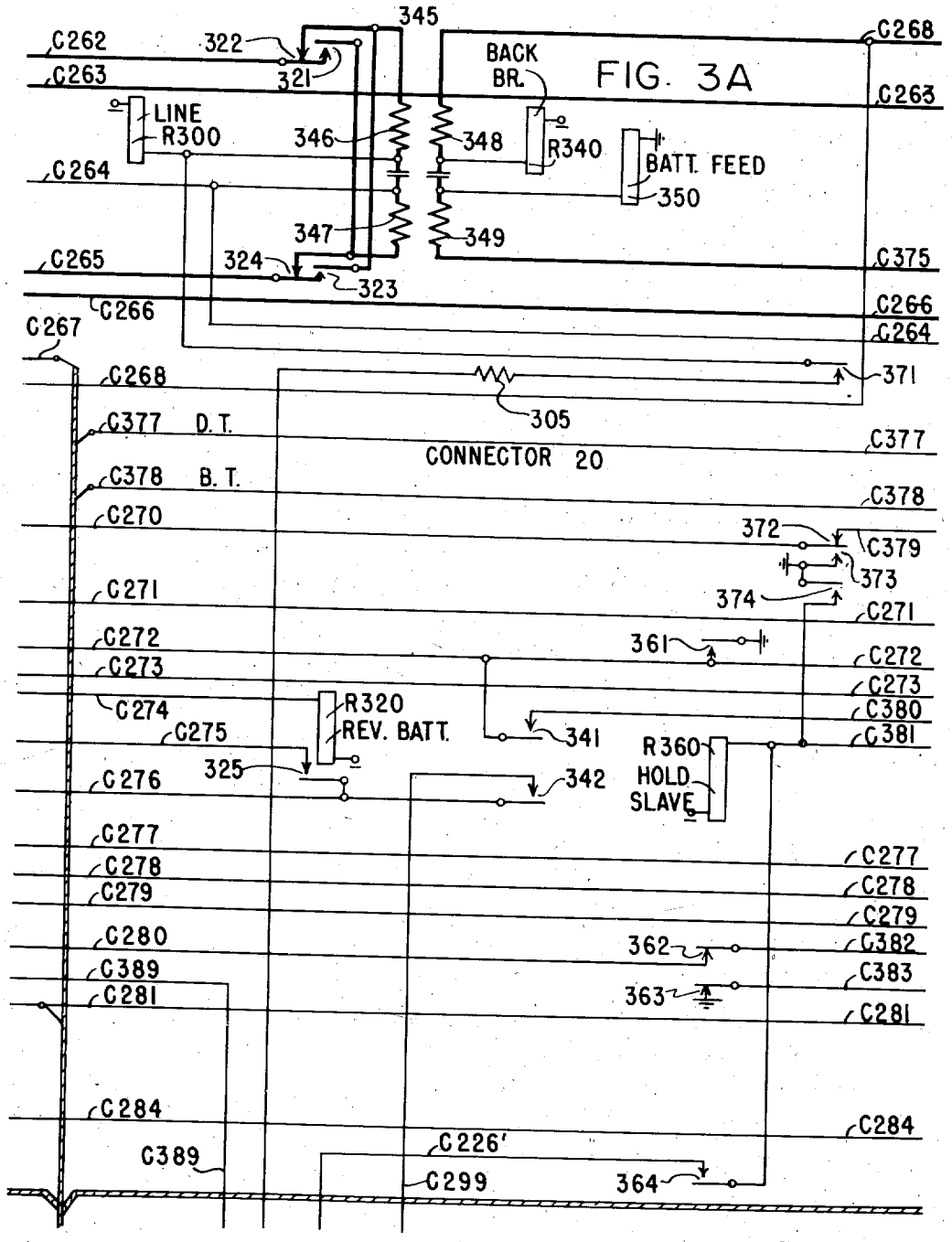
INVENTOR.
PIER BAKKER
BY Davis, Lindsey, Smith & Shontz
ATTORNEYS TELEPHONE SYSTEM
Original Filed Dec. 15, 1941 30 Sheets-Sheet 5
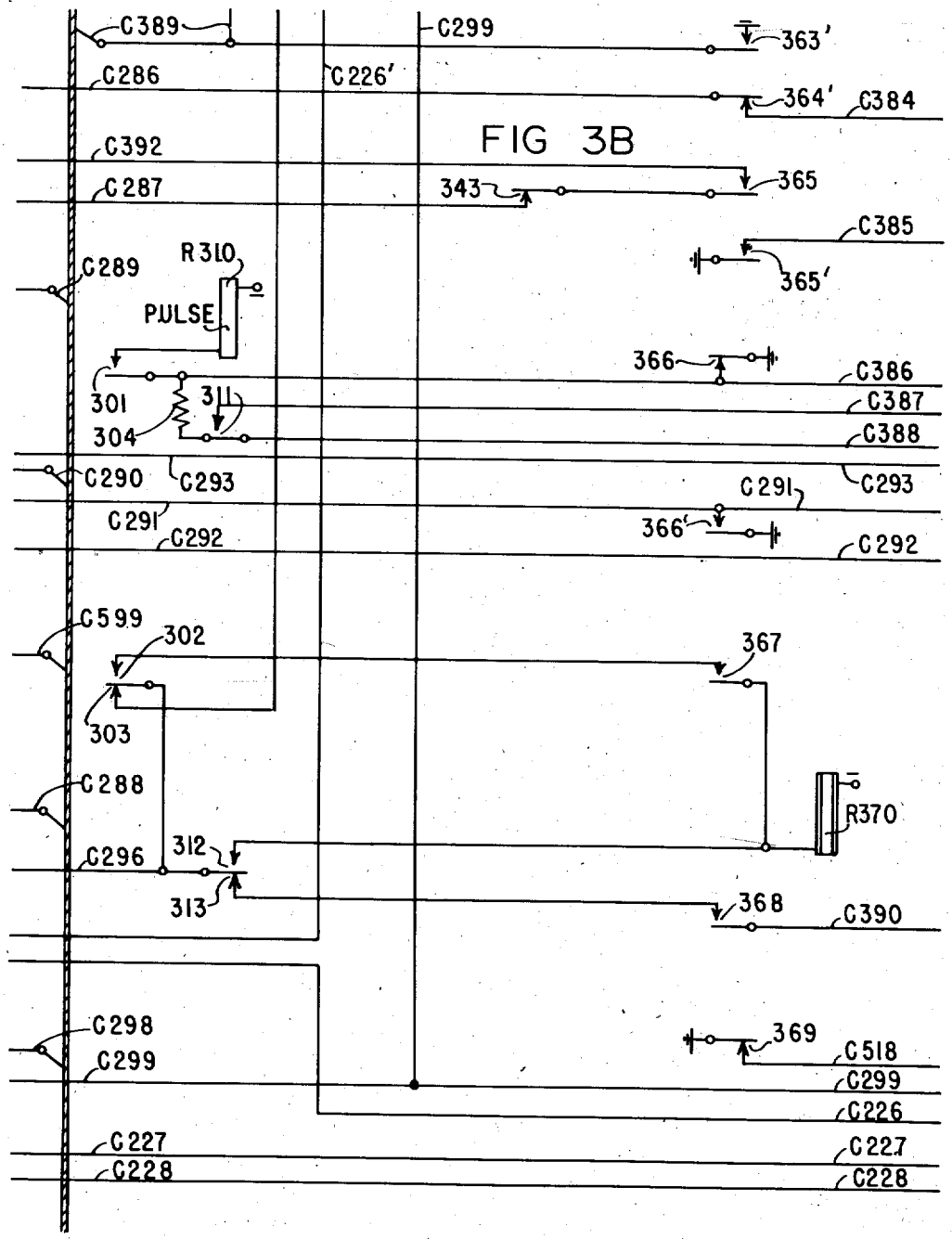
INVENTOR.
PIER BAKKER
BY Davis, Lindsey, Smith & Shorts
ATTORNEYS Dec. 2, 1947. P. BAKKER Re. 22,943
TELEPHONE SYSTEM
Original Filed Dec. 15, 1941 30 Sheets-Sheet 6
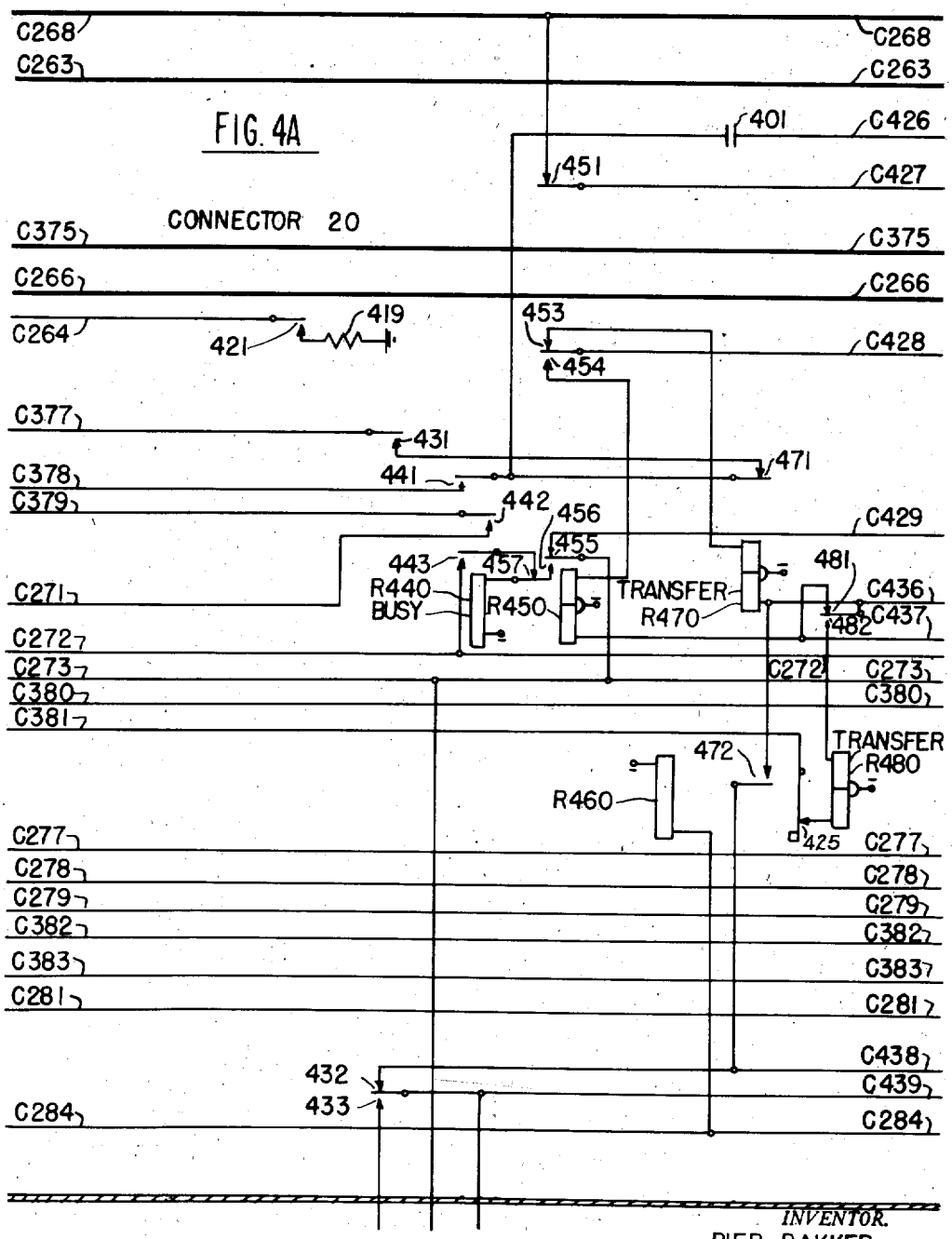
INVENTOR.
PIER BAKKER
BY
Davis, Lindsey, Smith & Shonts
ATTORNEYS

TELEPHONE SYSTEM

Original Filed Dec. 15, 1941 30 Sheets-Sheet 7

INVENTOR.
PIER BAKKER

BY
Davis, Lindsey, Smith & Shonts
ATTORNEYS

TELEPHONE SYSTEM

Original Filed Dec. 15, 1941 30 Sheets-Sheet 8

INVENTOR.
PIER BAKKER

BY
Davis, Lindsey, Smith & Shonts
ATTORNEYS

Dec. 2, 1947. P. BAKKER Re. 22,943
TELEPHONE SYSTEM
Original Filed Dec. 15, 1941 30 Sheets-Sheet 9
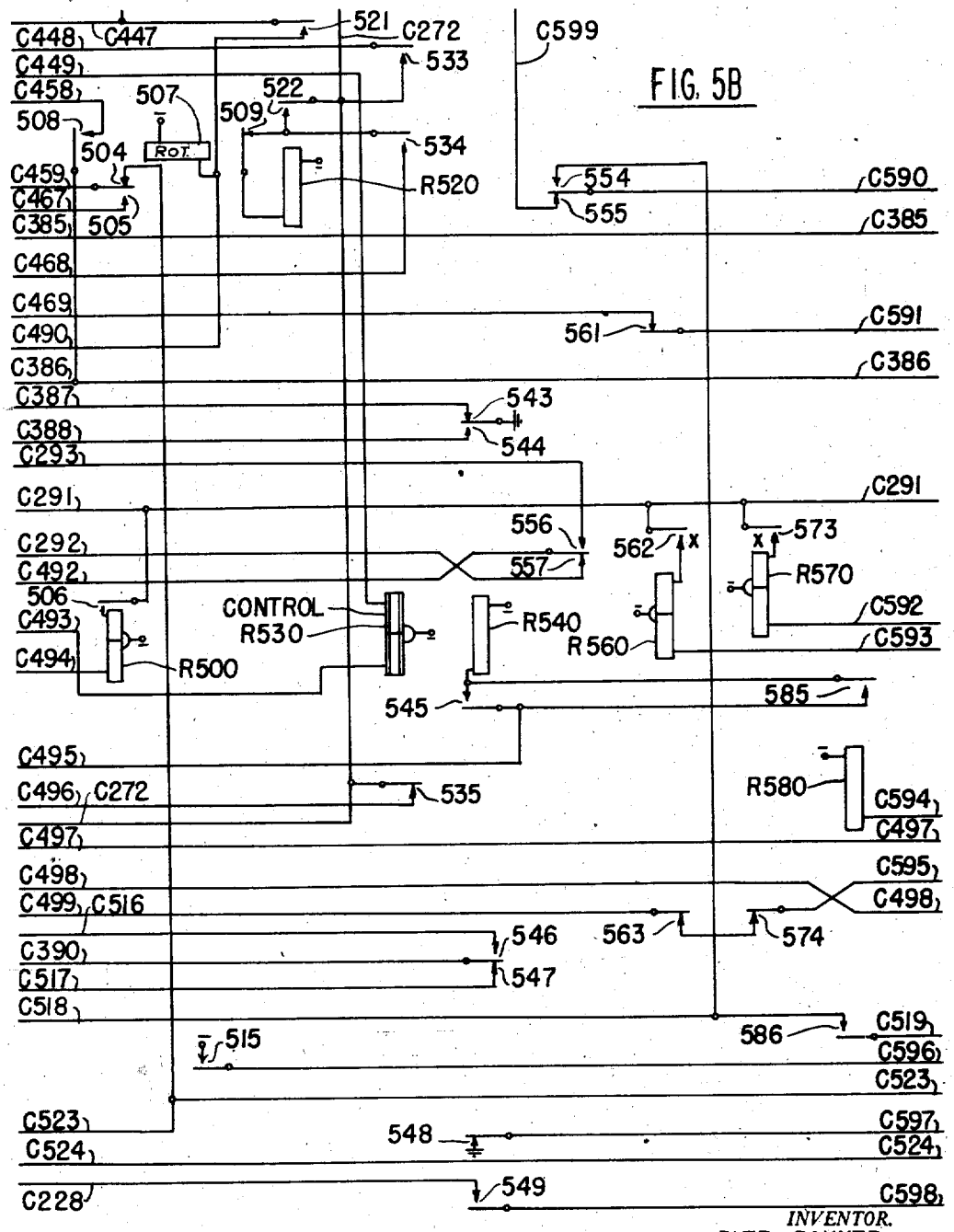
INVENTOR.
PIER BAKKER
BY
Davis, Lindsey, Smith & Shonts
ATTORNEYS

TELEPHONE SYSTEM

Original Filed Dec. 15, 1941 30 Sheets-Sheet 10

INVENTOR.
PIER BAKKER

BY
Davis, Lindsey, Smith & Shoutz

ATTORNEYS

TELEPHONE SYSTEM

Original Filed Dec. 15, 1941 30 Sheets-Sheet 11

INVENTOR.
PIER BAKKER
BY
Davis, Lindsey, Smith & Shonts
ATTORNEYS

INVENTOR.
PIER BAKKER
BY Davis, Lindsey, Smith & Shorts
ATTORNEYS

TELEPHONE SYSTEM

Original Filed Dec. 15, 1941 30 Sheets-Sheet 13

INVENTOR.
PIER BAKKER

BY Davis, Lindsey, Smith & Shonts
ATTORNEYS

TELEPHONE SYSTEM

Original Filed Dec. 15, 1941 30 Sheets-Sheet 14

INVENTOR.
PIER BAKKER

BY
Davis, Lindsey, Smith & Shoots
ATTORNEYS

TELEPHONE SYSTEM

Original Filed Dec. 15, 1941 30 Sheets-Sheet 15

INVENTOR.
PIER BAKKER

BY
Davis, Lindsey, Smith & Shonts
ATTORNEYS

SERVICE RESTRICTING NETWORK
40

INVENTOR.
PIER BAKKER
BY Davis, Lindsey, Smith & Shorts
ATTORNEYS

TELEPHONE SYSTEM

Original Filed Dec. 15, 1941 30 Sheets-Sheet 17

INVENTOR.
PIER BAKKER
BY Davis, Lindsey, Smith & Shonto
ATTORNEYS

TELEPHONE SYSTEM

Original Filed Dec. 15, 1941 30 Sheets-Sheet 18

INVENTOR.
PIER BAKKER
BY
Davis, Lindsey, Smith & Shoots
ATTORNEYS.

TELEPHONE SYSTEM

Original Filed Dec. 15, 1941 30 Sheets-Sheet 19

INVENTOR.
PIER BAKKER

BY Davis, Lindsey, Smith & Shonts
ATTORNEYS

INVENTOR.
PIER BAKKER
BY
Davis, Lindsey, Smith & Shonts
ATTORNEYS

TELEPHONE SYSTEM

Original Filed Dec. 15, 1941 30 Sheets-Sheet 21

INVENTOR.
PIER BAKKER

BY
Davis, Lindsey, Smith & Shorts
ATTORNEYS

TELEPHONE SYSTEM

Original Filed Dec. 15, 1941 30 Sheets-Sheet 22

INVENTOR.
PIER BAKKER

BY
Davis, Lindsey, Smith & Shorts

ATTORNEYS

TELEPHONE SYSTEM

Original Filed Dec. 15, 1941 30 Sheets-Sheet 23

INVENTOR.
PIER BAKKER

BY
Davis, Lindsey, Smith & Shoots
ATTORNEYS

TELEPHONE SYSTEM

Original Filed Dec. 15, 1941 30 Sheets-Sheet 24

INVENTOR.
PIER BAKKER
BY
Davis, Lindsey, Smith & Shonts
ATTORNEYS

TELEPHONE SYSTEM

Original Filed Dec. 15, 1941 30 Sheets-Sheet 25

INVENTOR.
PIER BAKKER
BY Davis, Lindsey, Smith & Shonts
ATTORNEYS

TELEPHONE SYSTEM

Original Filed Dec. 15, 1941 30 Sheets-Sheet 26

INVENTOR.
PIER BAKKER
BY Davis, Lindsey, Smith & Shoots
ATTORNEYS

TELEPHONE SYSTEM

Original Filed Dec. 15, 1941 30 Sheets-Sheet 27

REPEATER 45

INVENTOR.
PIER BAKKER
BY Davis, Lindsey, Smith & Shonts
ATTORNEYS

TELEPHONE SYSTEM

Original Filed Dec. 15, 1941 30 Sheets-Sheet 28

INVENTOR.
PIER BAKKER
BY Davis, Lindsey, Smith & Shonts
ATTORNEYS

INVENTOR.
PIER BAKKER
BY Davis, Lindsey, Smith & Shontz
ATTORNEYS

INVENTOR.
PIER BAKKER
BY Davis, Lindsey, Smith & Shorts
ATTORNEYS

Reissued Dec. 2, 1947

Re. 22,943

UNITED STATES PATENT OFFICE 22,943

TELEPHONE SYSTEM

Pier Bakker, Chicago, Ill., assignor to Automatic Electric Laboratories, Inc., a corporation of Delaware Original No. 2,332,885, dated October 26, 1943, Serial No. 423,062, December 15, 1941. Application for reissue September 19, 1945, Serial No. 617,401

62 Claims. (Cl. 179—27)

Figure 2A:
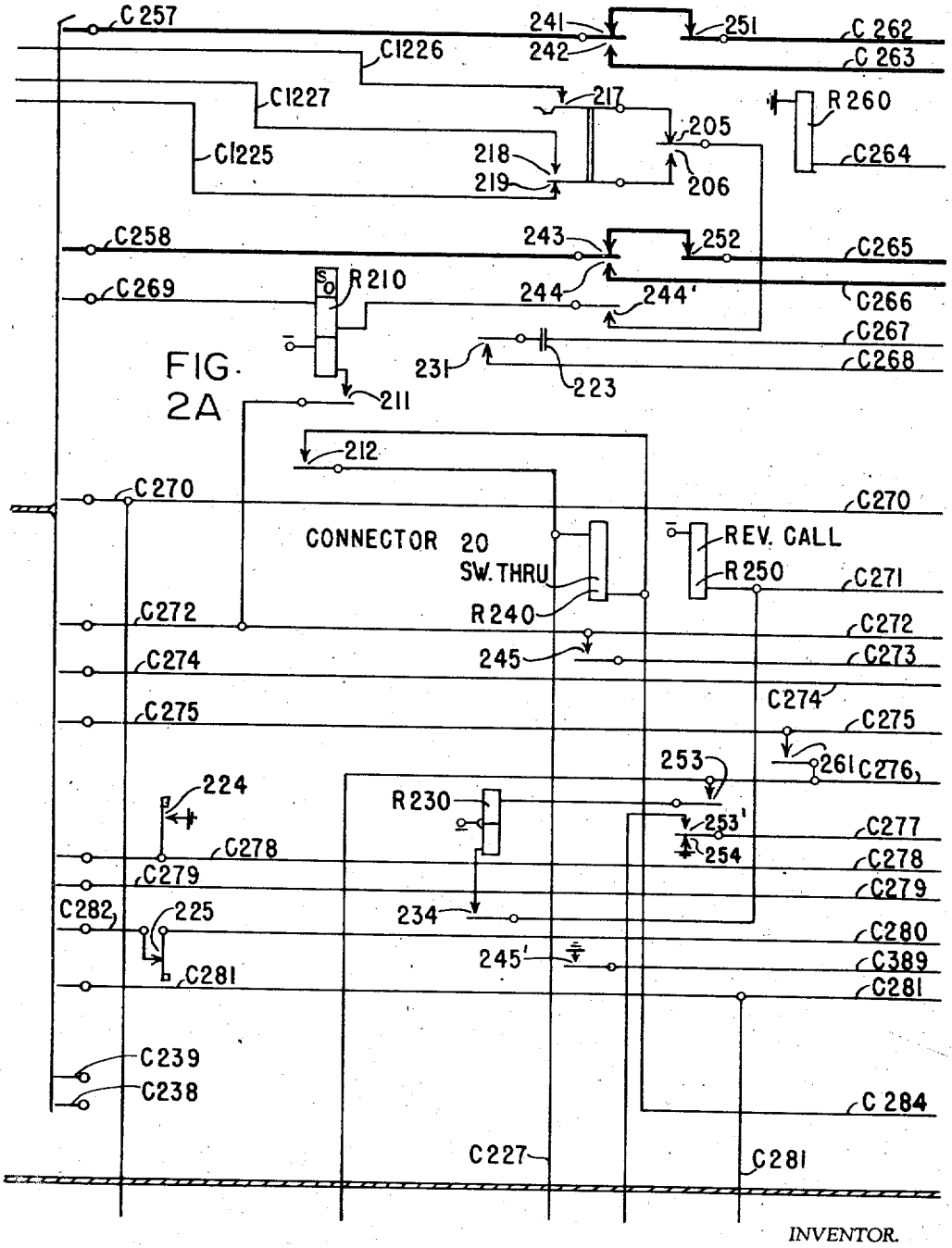

The present invention relates to telephone systems and more particularly to improvements in automatic switching equipment of the character used in relatively small automatic exchanges which are trunk connected to larger central offices.

It is an object of the present invention to provide in a system of the character described, an improved arrangement for assigning automatic switch links to the use of calling lines.

According to another object of the invention improved apparatus is provided in a link distributor of the all relay type for automatically releasing a link which is first assigned to the use of a calling line and for assigning a second link to the calling line in the event the first assigned link fails to find the calling line within a predetermined time interval.

It is another object of the invention to provide in a system of the character described, improved service restricting equipment which is controlled on an individual line-individual trunk basis to prevent certain subscribers from extending connections over certain restricted inter-office trunks.

According to another object of the invention the service restrictions are imposed on the various restricted subscriber lines through the operation of service restricting relays which are individual to the repeaters terminating the restricted trunks.

In accordance with still another object of the invention the restrictions which are imposed on the restricted subscriber lines are all effected on a matched signal basis over control paths which are individual to the lines and service restricting paths which are individual to the repeaters, by signal generating equipment which is common to the lines and to the repeaters.

It is another object of the invention to provide in a system of the character described, an improved and exceedingly reliable arrangement for transmitting supervisory signals between two central office operator positions over a connection which includes two inter-office trunk repeaters in tandem.

According to another object of the invention provisions are made for transmitting a plurality of signals back and forth between the calling and called repeaters of the connection, when the call extended over the connection is answered at the called operator position, and one of the signals transmitted to the calling repeater effects the transmission of an answer supervisory signal to the calling operator position.

In accordance with still another object of the invention one of the signals transmitted to the called repeater is utilized to condition this repeater to repeat succeeding supervisory signals received over the called end of the connection directly to the calling repeater.

It is another object of the invention to provide in an inter-office trunk repeater which is equipped with conversation timing facilities, improved apparatus for rendering the timing facilities inactive when the repeater is included in a toll connection which extends between two operator positions.

According to a further object of the invention, the called repeater of such a connection is equipped with the normally active conversation timing facilities and one of the signals transmitted from the calling repeater to the called repeater incident to the answering of the call at the called operator position is used to render these facilities inactive.

It is a still further object of the invention to provide for use in a system of the character described, an improved two motion selector which includes an improved circuit arrangement designed to permit a more workable distribution of the contact spring load of the various relays embodied therein.

According to another object of the invention the selector is provided with a control relay which functions as a slave to the release relay of the selector when the selector is seized and as an off-normal relay after directed movement of the selector is started.

Figure 24:
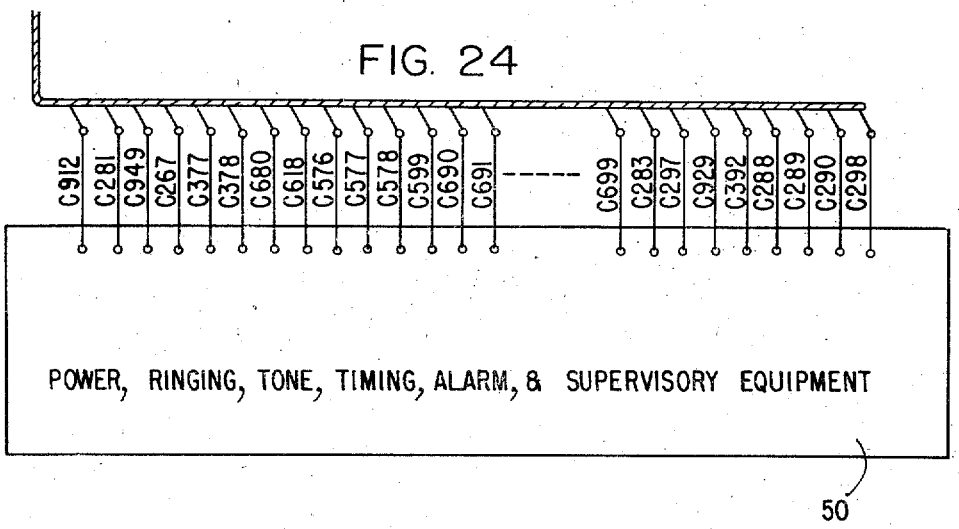
Figure 25:
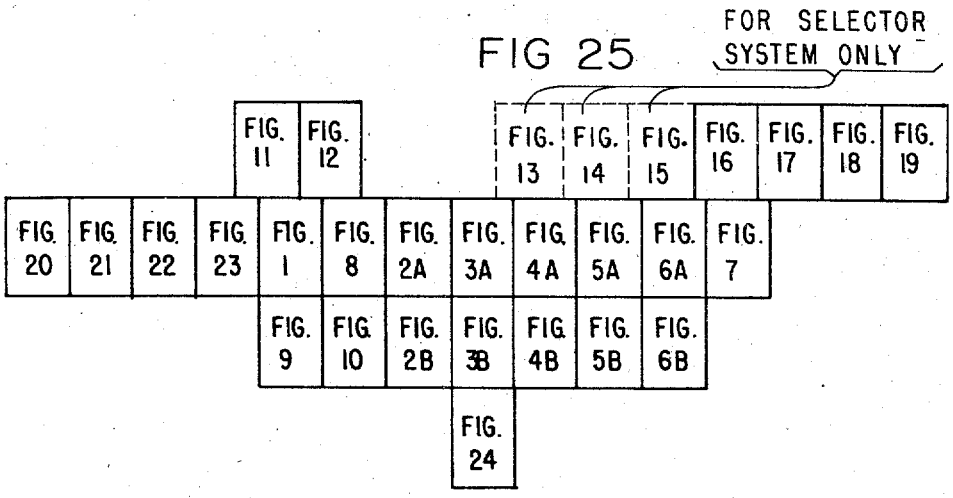
Figure 26:
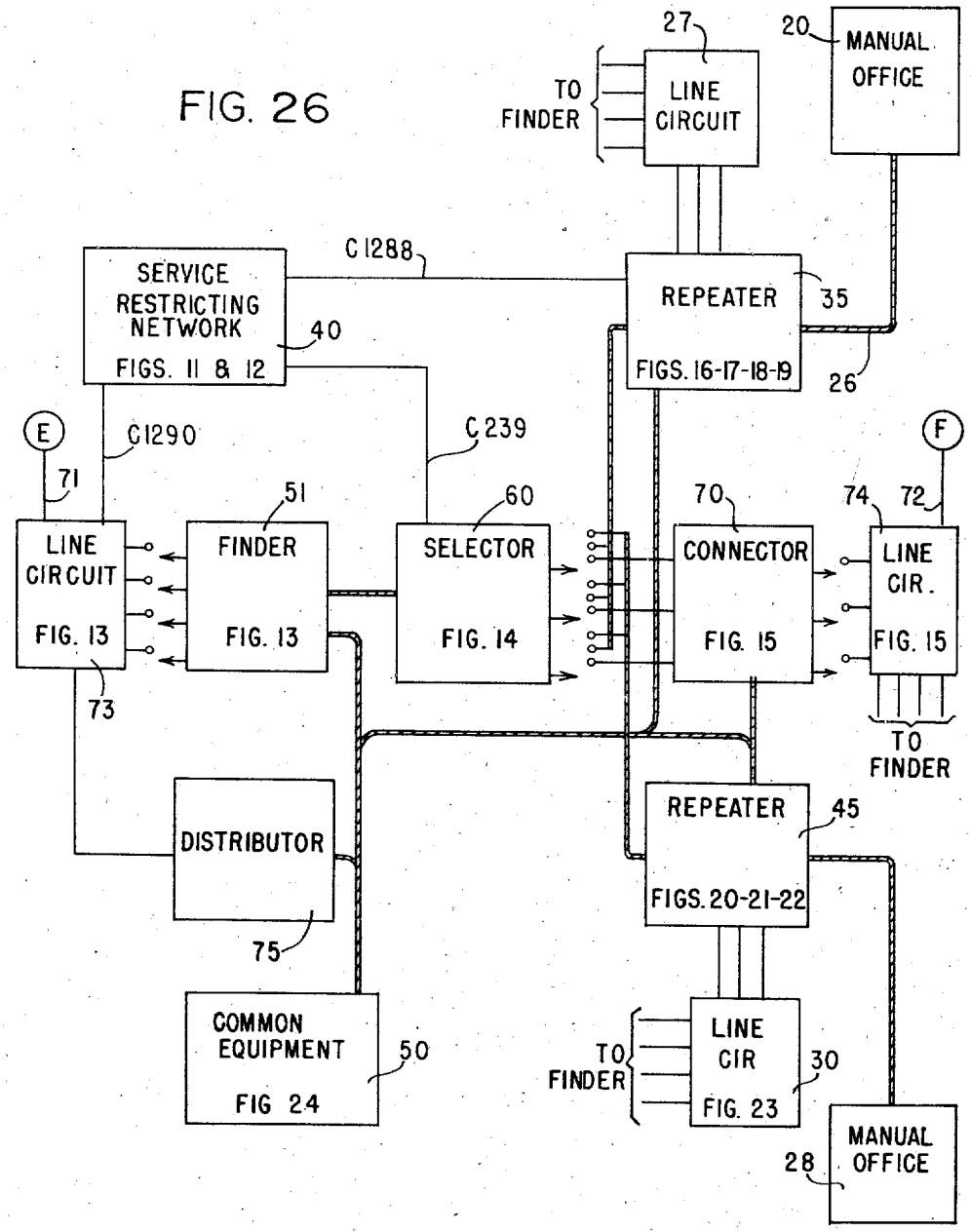

The invention, both as to its organization and method of operation, together with further objects and advantages thereof, will best be understood by reference to the specification taken in connection with the accompanying drawings in which Figs. 1, 2A, 2B, 3A, 3B, 4A, 4B, 5A, 5B, 6A, 6B, 7, 8, 9, 10, 11, 12, 16, 17, 18, 19, 20, 21, 22, 23 and 24, when combined in the manner shown in Fig. 25 of the drawings illustrate one embodiment of a small automatic telephone system having incorporated therein certain of the features of the invention briefly referred to above; and Figs. 11, 12, 13, 14, 15, 16, 17, 18, 19, 20, 21, 22, 23 and 24 when combined in the manner shown in Fig. 26, illustrate in partly schematic form an automatic telephone system of larger capacity, also characterized by certain of the features of the invention briefly referred to above.

As indicated by the above reference to the drawings, two different exchanges are disclosed. Both of these exchanges are trunk connected to distant central offices. In the first or smaller exchange, one hundred point finder-connector links are used so that the capacity of the exchange is limited to one hundred lines. In the second or larger exchange, a selector switching stage is interposed between the finders and connectors to provide an exchange capacity of one thousand lines.

To first consider the small exchange arrangement, and more particularly Figs. 1, 2A, 2B, 3A, 3B, 4A, 4B, 5A, 5B, 6A, 6B, 7, 8, 9, 10, 11, 12, 16, 17, 18, 19, 20, 21, 22, 23 and 24 of the drawings, the telephone lines, automatic switching apparatus, repeaters, and power supply and supervisory signaling equipment there illustrated may comprise, for example, a small, unattended automatic exchange designed to serve a suburban area of limited population which is geographically adjacent several large cities or towns, each of which is served by a central office. Inter-office trunks are used to provide communication facilities between the small community exchange and the offices provided in the adjacent larger cities. For example, the automatic switching equipment of the community exchange is illustrated as having access to the manual office 25 over a group of trunks which includes the trunk 26. This trunk terminates in the community exchange in a repeater 35 which is rendered accessible to the links on calls incoming from the manual office 25 through the provision of an associated line circuit 27. The automatic switching equipment of the illustrated community exchange also has access to the manual office 28 over a group of trunks which includes the trunk 29. This trunk terminates in the community exchange in the repeater 45, which is rendered accessible to the links of the community exchange on calls incoming from the manual office 28 through a line circuit 30.

Figure 7:
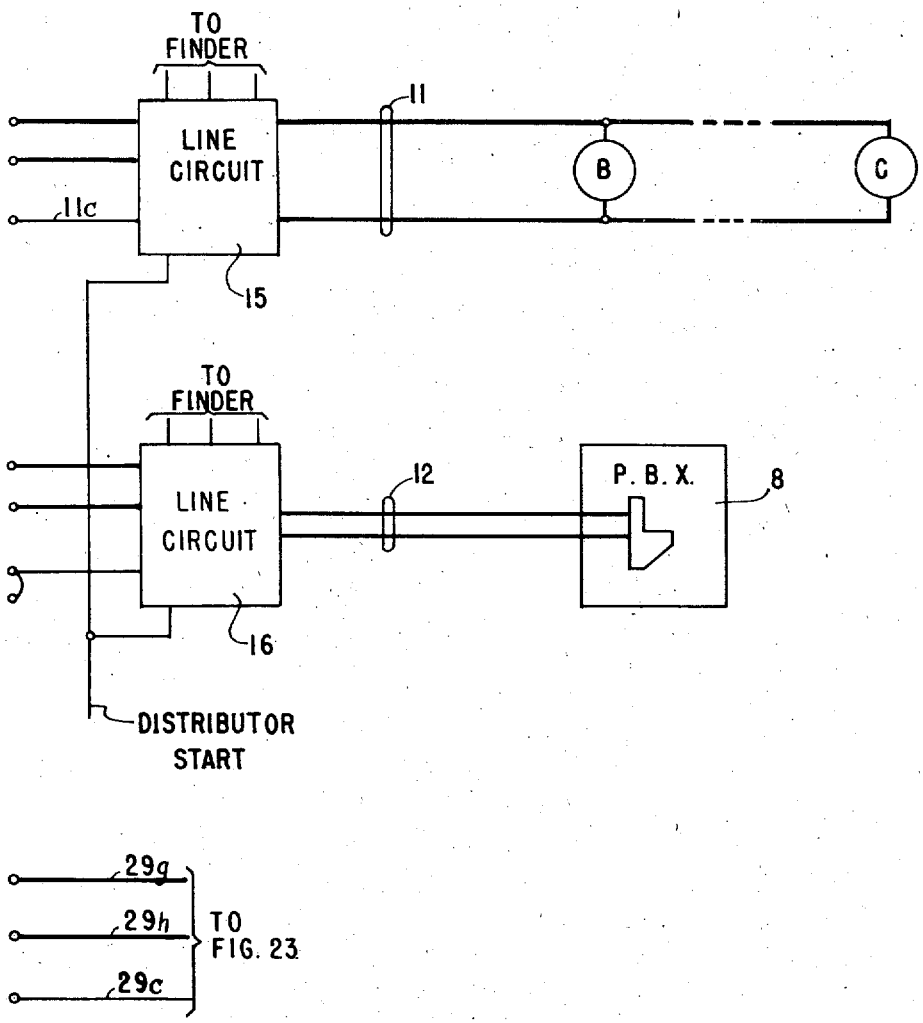

The subscriber lines terminating at the community exchange may comprise single party or private lines, full metallic multiparty lines arranged for bridged ringing, full metallic lines arranged for divided ringing, and ground return lines. The illustrated line 10 is shown as being of the single party type and is arranged to serve only the substation A which may be either a private substation or a paystation. This line terminates in the community exchange in a line circuit 14 which is of the form disclosed and claimed in Patent No. 2,199,534, granted May 7, 1940, Pier Bakker, and includes a line relay R100 which is mechanically interlocked with a cut-off relay R110. A second subscriber line 6, of the ground return type, is illustrated as terminating in the community exchange in a line circuit 7 and may be arranged to serve any desired number of substations in addition to the illustrated substation D. A third line 11 is illustrated in Fig. 7 of the drawings as being of the multiparty type arranged to serve the two substations D and C. This line terminates in the community exchange in a line circuit 15. The lines extending to the line terminals of the links in the community exchange may also include one or more groups of branch exchange trunks. One such trunk 12 is illustrated as terminating in the community exchange in the line circuit 16, and as extending to the switchboard of a private branch exchange 8. This line circuit, the line circuit 7, the line circuit 15, the line circuit 27, the line circuit 30 and the line circuits terminating the other lines extending to the community exchange are each identical with the line circuit 14 described above. Thus the line circuit 7 is illustrated as comprising mechanically interlocked line and cut-off relays R150 and R160. Similarly, the line circuit 30 associated with the inter-office trunk 29 is illustrated as comprising mechanically interlocked line and cut-off relays R2310 and R2320. It is noted at this point, however, that the character of the wiring used in these line circuits may differ slightly, depending upon the types of lines which are respectively terminated thereby.

The repeaters individually associated with the trunks which interconnect the community exchange with the manual office 25 are identical in wiring arrangement. Briefly considered, the repeater 35 is illustrated in Figs. 16, 17, 18 and 19 of the drawings as comprising three line relays R1760, R1770 and R1860, two slow-acting hold relays R1750 and R1850, a hold slave relay R1740, three signal transmitting relays R1910, R1920 and R1930, two battery reversing relays R1900 and R1610, a switching relay R1800, a pair of supervisory relays R1810 and R1840, an electropolarized back-bridge relay R1820, a slow-acting digit relay R1830, a slow-to-operate restricted service relay R1600, a pair of timing relays R1620 and R1630, a fuse relay R1650, a tone repeating relay R1700, a tone sending relay R1710, a tone cut-off relay R1720, a timing relay R1730, and a pair of control relays R1640 and R1660. These relays, together with the repeating coil 1865, are wired in a manner which will be fully apparent from the following detailed explanation of the operation of this repeater.

Figure 20:
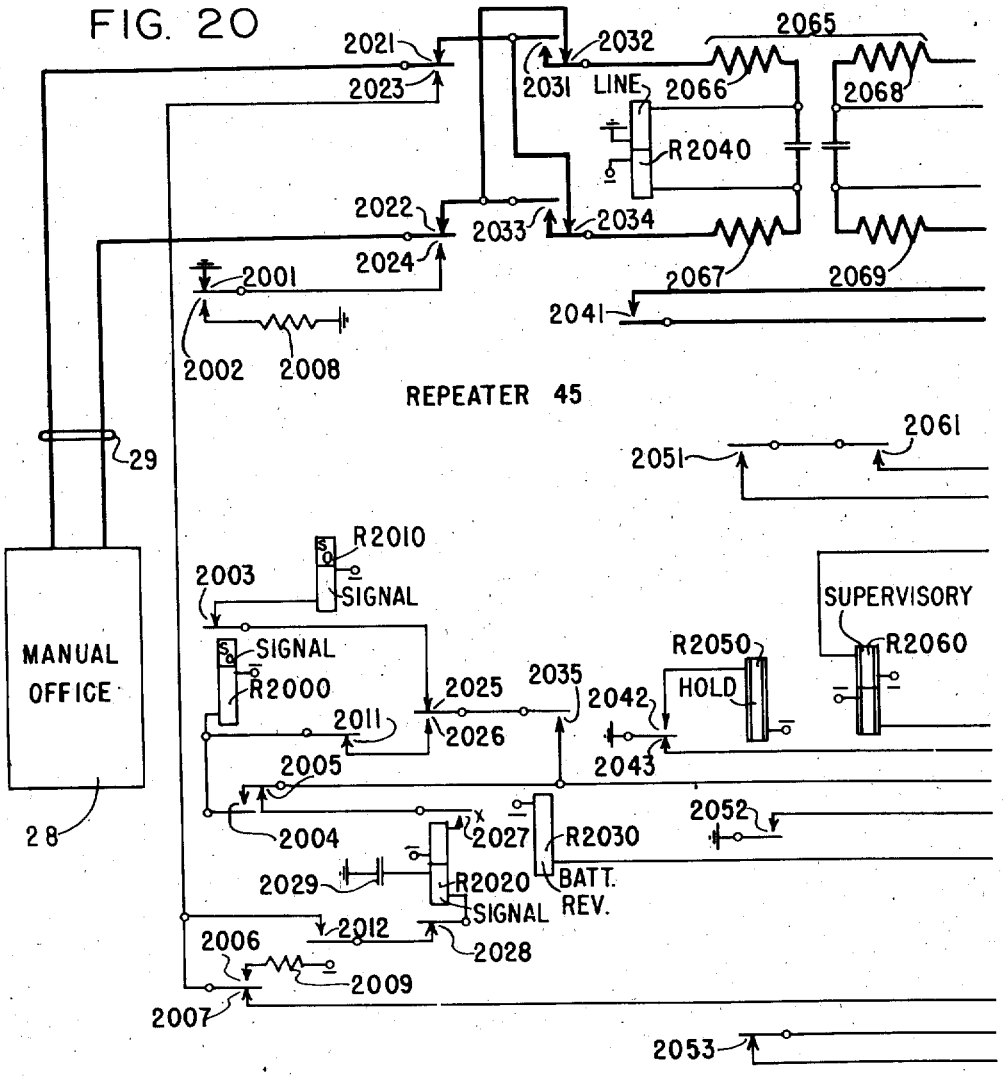
Figure 21:
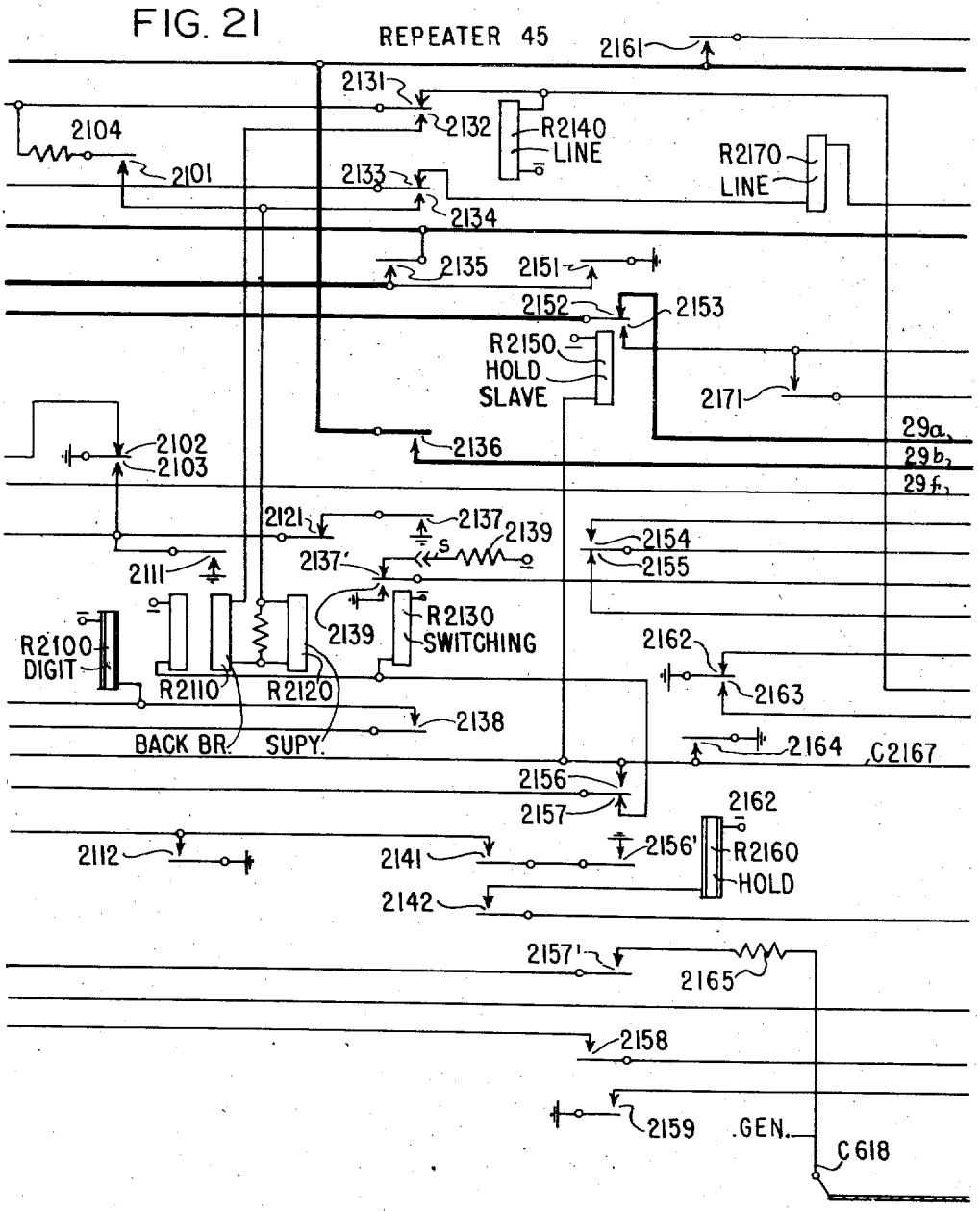
Figure 22:
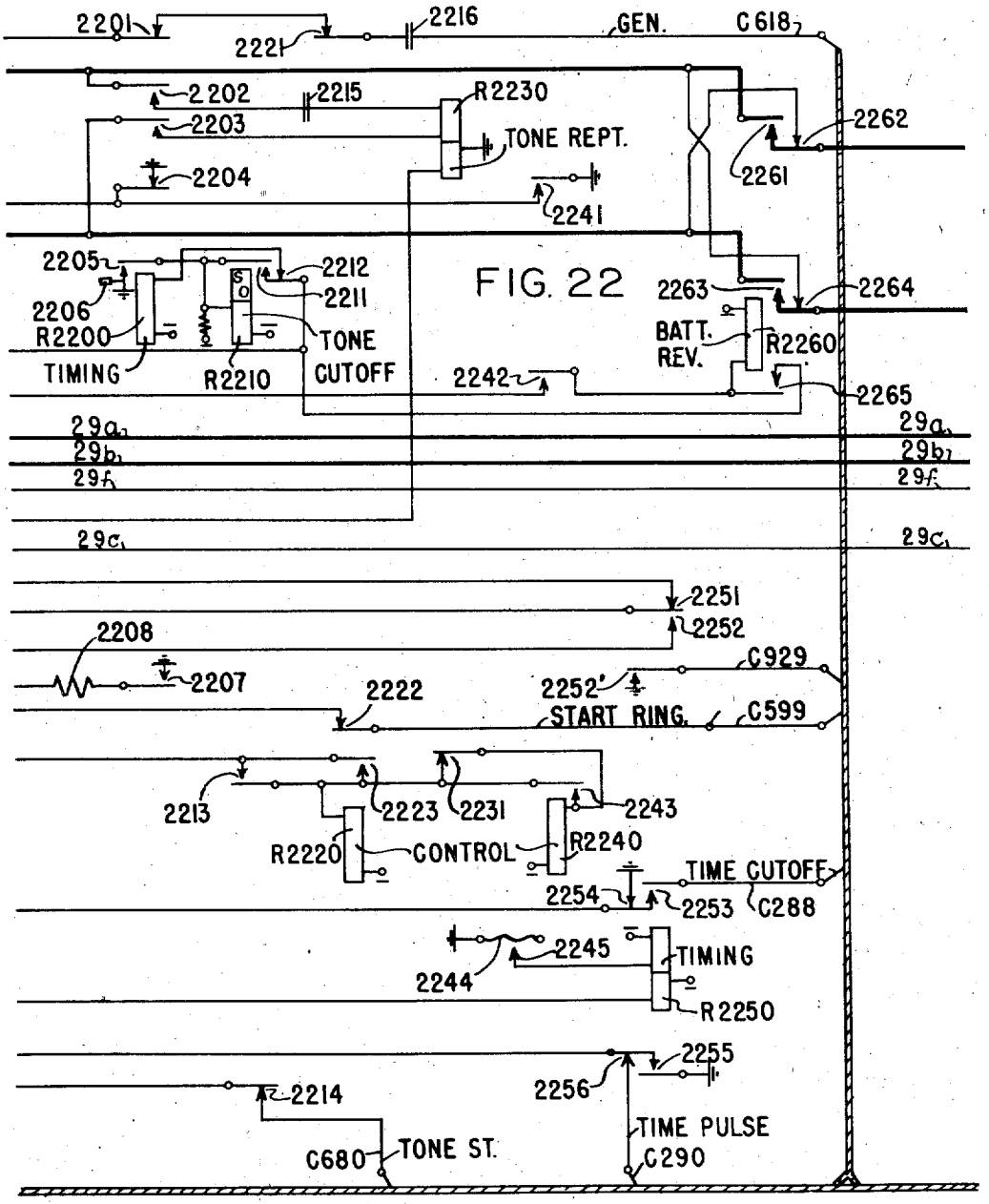
Figure 23:
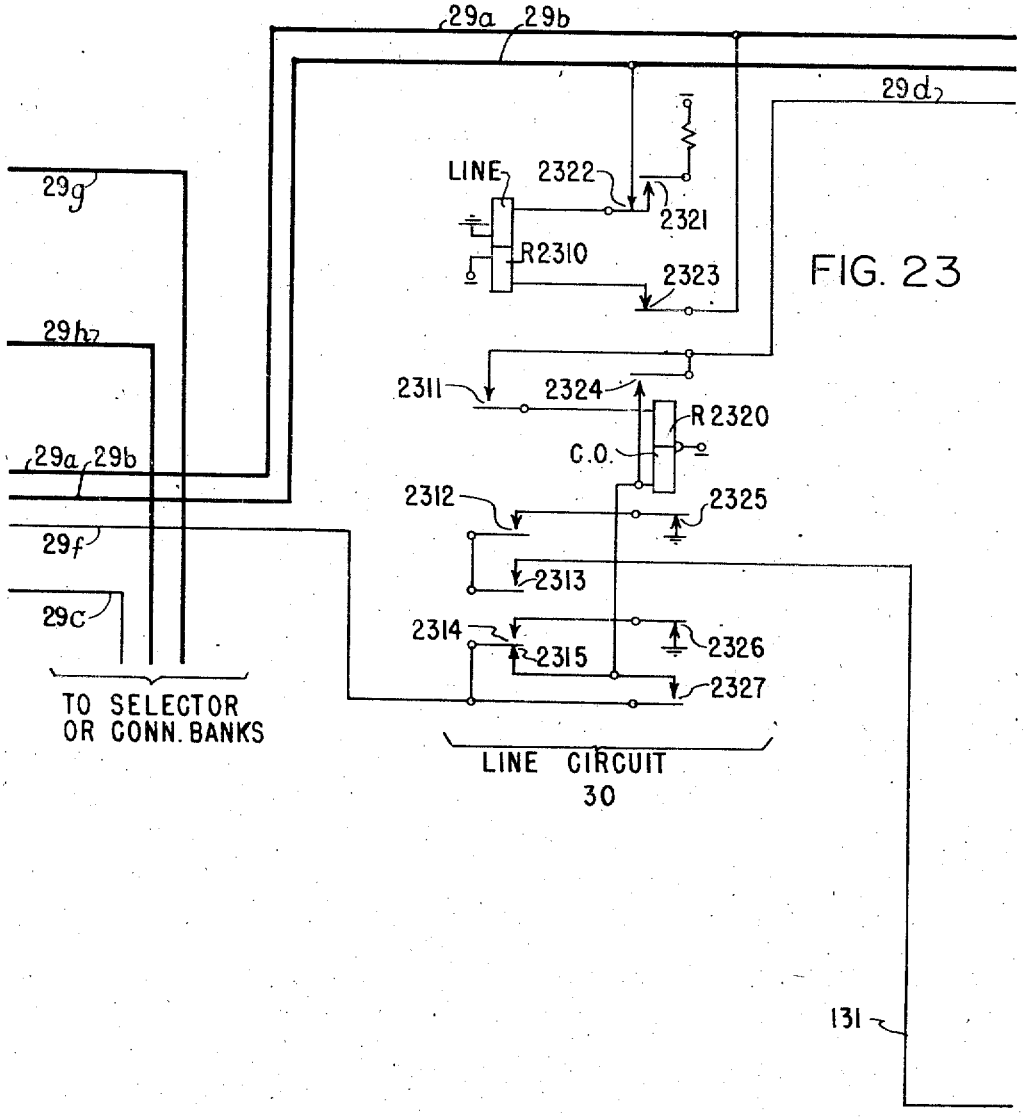

The repeaters individual to the trunks connecting the illustrated community exchange with the distant manual office 28, and terminating these trunks in the community exchange, are also identical in arrangement. As shown in Figs. 20, 21 and 22 of the drawings, the repeater 45 which terminates the trunk 29 in the community exchange, comprises a repeating coil 2065, and a group of relays which are wired in the manner pointed out with particularity in the following detailed explanation of the operation of the system. Briefly considered, the relay equipment of this repeater comprises three line relays R2040, R2140 and R2170, two slow-acting hold relays R2050 and R2160, a hold slave relay R2150, a set of signal transmitting relays R2000, R2010 and R2020, a pair of battery reversing relays R2030 and R2260, an electropolarized back-bridge relay R2110, a pair of supervisory relays R2080 and R2120, a digit relay R2100, a line switching relay R2130, a timing relay R2200, a tone repeating relay R2230, a tone cut-off relay R2210, a timing relay R2250, and a pair of control relays R2220 and R2240.

Figure 9:
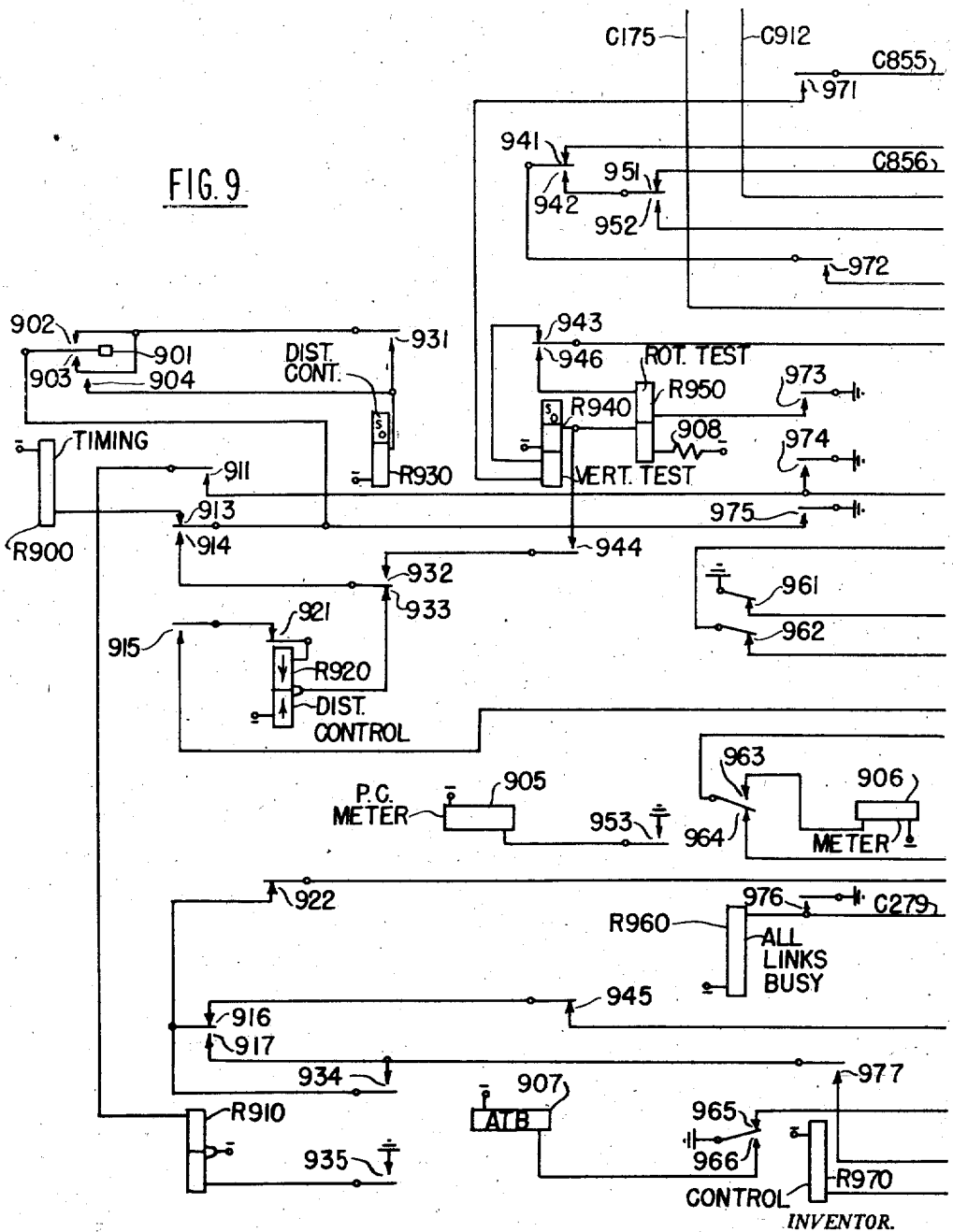
Figure 10:
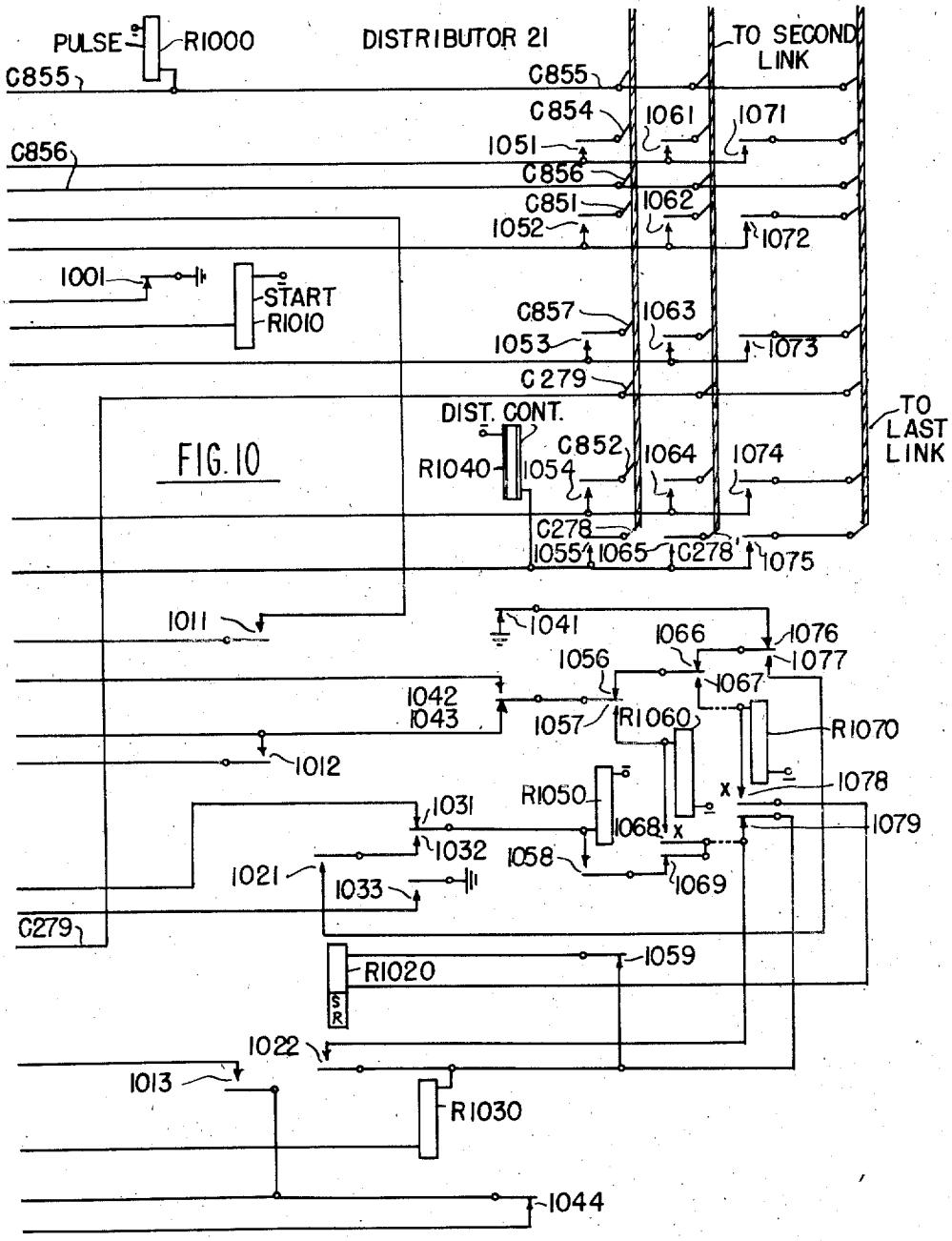

The automatic switching equipment provided in the community exchange for setting up connections between the various lines and trunks terminating thereat, comprises a plurality of finder-connector links each having a capacity of one hundred lines. One such link is illustrated in Figs. 1, 2, 3, 4, 5, 6 and 8 of the drawings as comprising a finder 19 and a connector 20. For the purpose of assigning these links to the use of calling lines and trunks in a definite order a distributor 21 is provided, the details of which are illustrated in Figs. 9 and 10 of the drawings.

Figure 8:
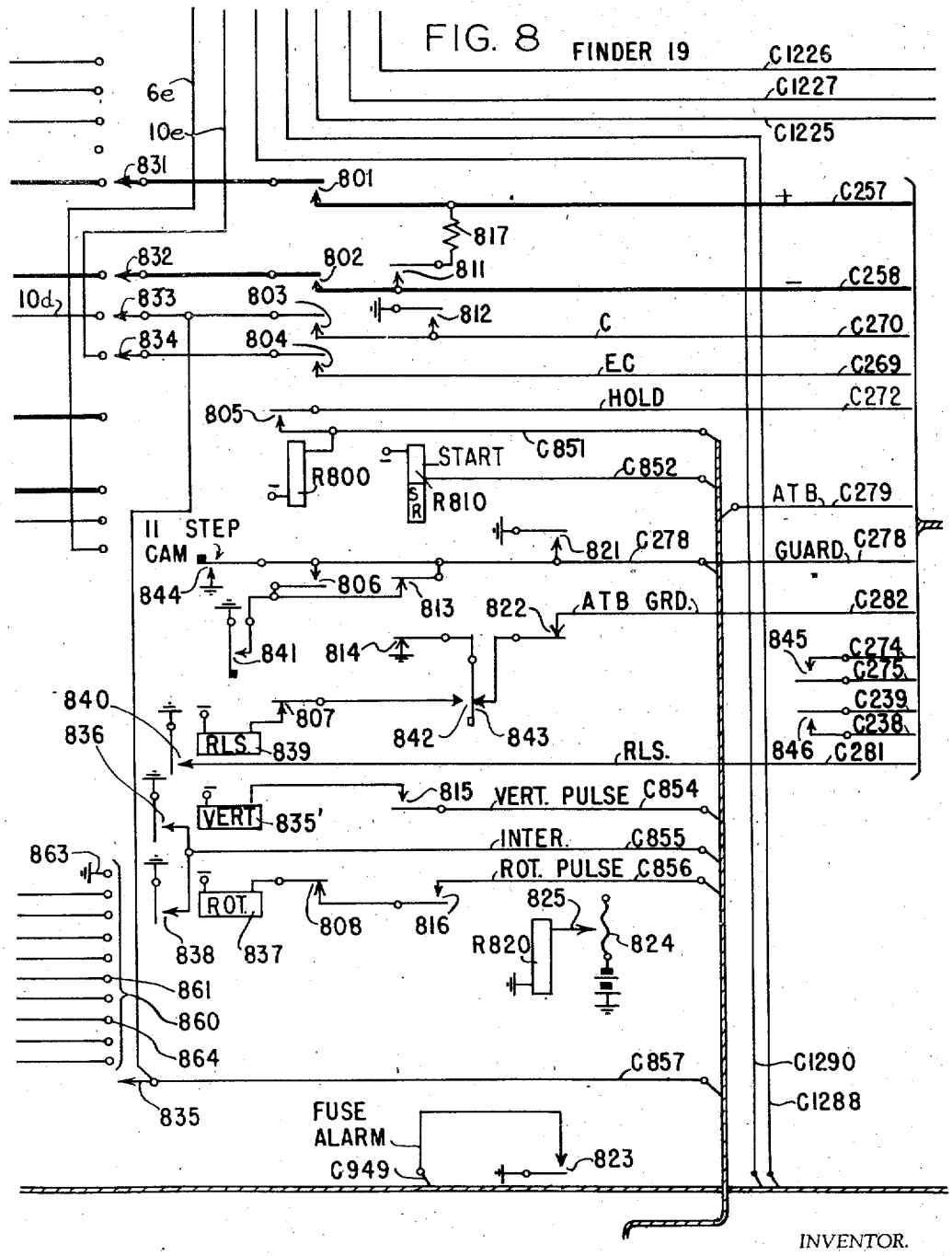

As shown in Fig. 8 of the drawings, the finder 19 is of the well-known Strowger type employing a Strowger switching mechanism having its contact field divided into ten levels of bank contacts which have the wipers 831, 832, 833 and 834 associated therewith. A vertical test contact set 860 which is adapted to be traversed by the level test wiper 835 only during vertical movement of the wiper carriage structure, is also provided in the switch. The mechanism further comprises the usual vertical and rotary magnets 835' and 837 which are respectively operative in conjunction with their associated ratchet and pawl mechanism, not shown, to impart vertical and rotary movement to the wipers 831 to 835, inclusive. The mechanism is also equipped with a release magnet 839 which, when energized, permits the wipers 831 to 835, inclusive, to be returned to rotary and vertical normal; off-normal springs 841, 842 and 843; a set of cam springs 844 which is actuated when the wipers 831 to 835, inclusive, are rotated to the eleventh rotary off-normal positions thereof; and two sets of off-normal springs 845 and 846 which are respectively operated when the wipers 831 to 835, inclusive, are vertically positioned opposite predetermined contact levels of the associated contact field. In addition to the Strowger switching mechanism just described, the finder 19 comprises a slow-to-release start relay R810, a switch-through relay R800, and a fuse stud relay R820. The last-mentioned relay is associated with a fuse stud 825 which is disposed adjacent the fuse link 824 through which current is supplied to all of the magnets and relays of the finder 19 and the connector 20 from the exchange battery or current supply system of the exchange. The arrangement of this fuse and its associated stud 825 is such that when the fuse is disrupted a circuit is completed through the stud 825 for energizing the relay R820. The distributor 21 is of the all-relay, link-preselecting type. This distributor is shown in Figs. 9 and 10 of the drawings as comprising a set of link assign relays R1050, R1060, R1070, etc., individual to the various finder-connector links and each operative to allot the associated link for use. The selective operation of the link relays is under the control of a group of distributor control relays R910, R920, R930, R970, R1020, R1030 and R1040. The distributor further comprises a timing relay R900 of the well-known pendulum type, a slow-to-operate vertical test relay R940, a rotary test relay R950, an all-links-busy relay R960, a pulsing relay R1000 and a distributor start relay R1010, these and the other enumerated relays being wired to operate in the manner fully described hereinafter.

The connector 20 is illustrated in Figs. 2, 3, 4, 5 and 6 of the drawings as being of the well-known Strowger type, having its contact field divided into ten levels of bank contacts. The four lowermost levels of this field are utilized to terminate the different groups of inter-office trunks extending to the community exchange, while the ninth and tenth levels are utilized to terminate the branch exchange trunks. As will be explained more fully hereinafter, these six levels may also be entirely or partially utilized for the termination of subscriber lines, depending upon the trunk requirements of the exchange. The fifth to eight levels, inclusive, of the contact field are used for subscriber line termination exclusively.

Referring now more particularly to the connector 20, the Strowger switching mechanism thereof comprises four wipers 621, 622, 623 and 627, and the usual vertical and rotary magnets 417 and 507, which are respectively operative in conjunction with their associated ratchet and pawl mechanisms, not shown, to impart vertical and rotary movement to the numerated wipers. This mechanism is also equipped with a release magnet 257 which, when energized, permits the wipers 621, 622, 623 and 627 to be returned to rotary and vertical normal, and four sets of vertical off-normal springs 224, 225, 259 and 425 which perform various circuit control operations described with particularity hereinafter. In order to provide the above-mentioned facilities for restricting the trunk service rendered certain of the subscribers served by the community exchange, the Strowger switching mechanism is also equipped with two sets of normal post springs 205, 206 and 217, 218, 219. These two sets of normal post springs are respectively operated when the wipers of the Strowger switching mechanism are vertically positioned opposite the contact levels in which are terminated three different groups of restricted inter-office trunks.

Figure 4B:
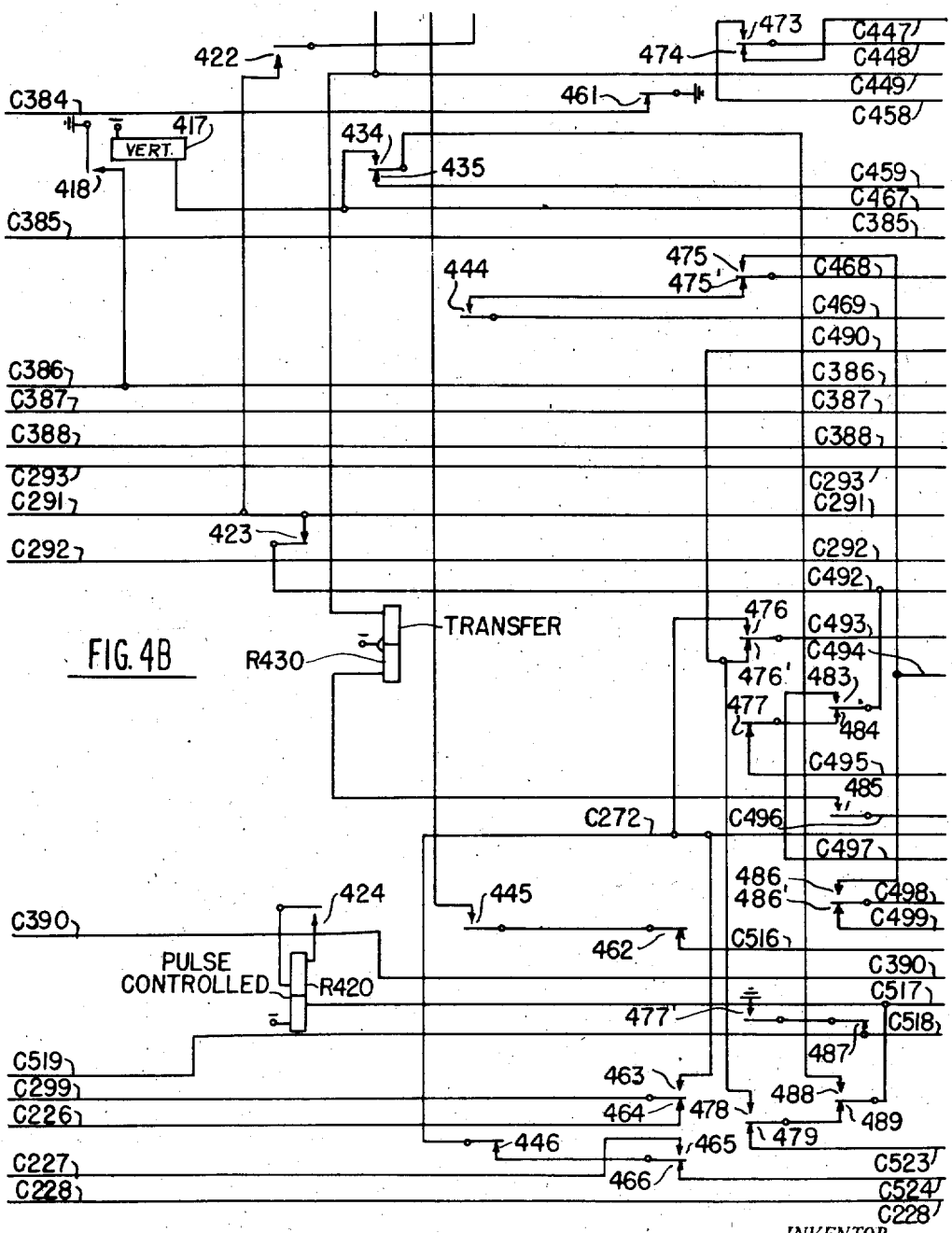
Figure 5A:
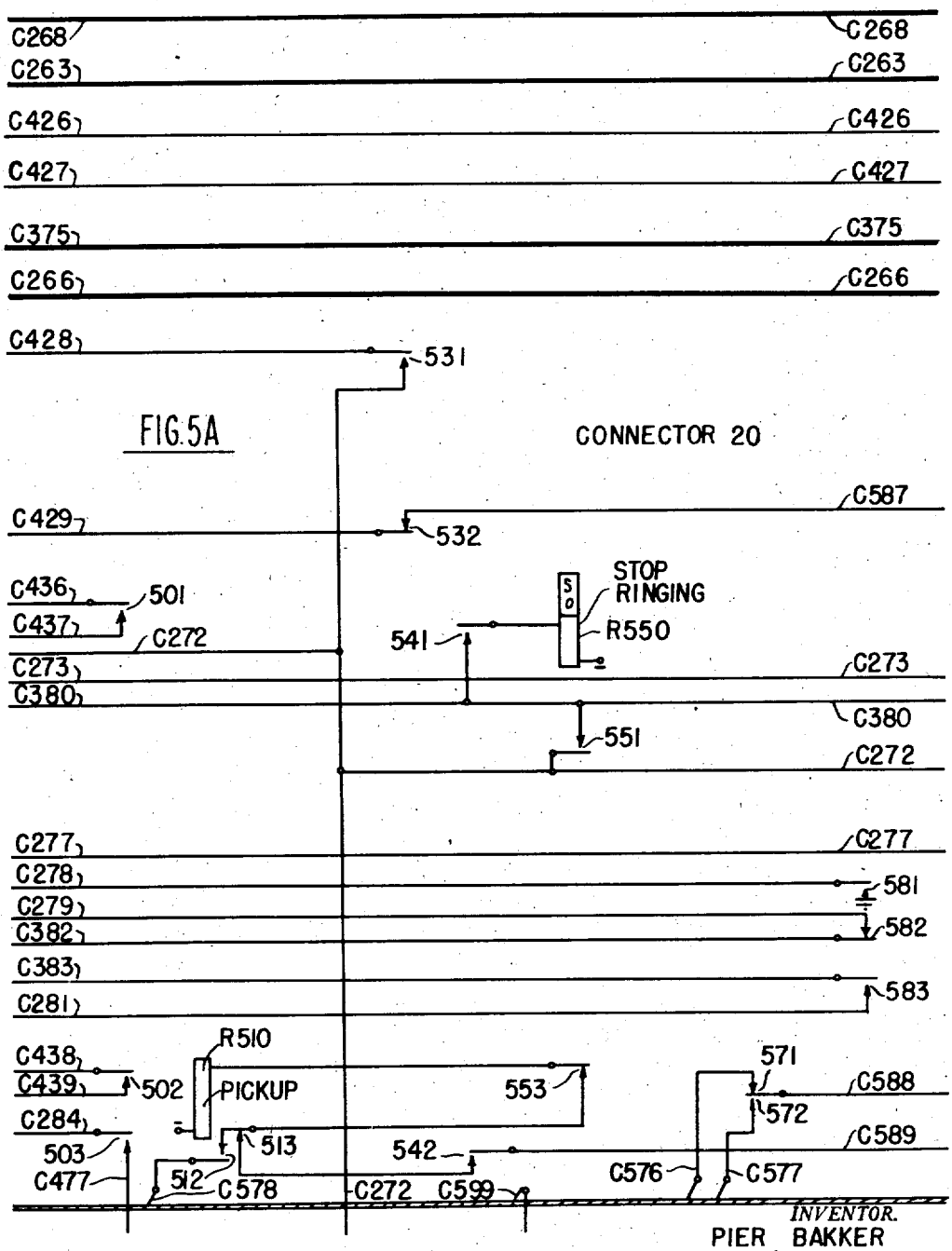
Figure 6A:
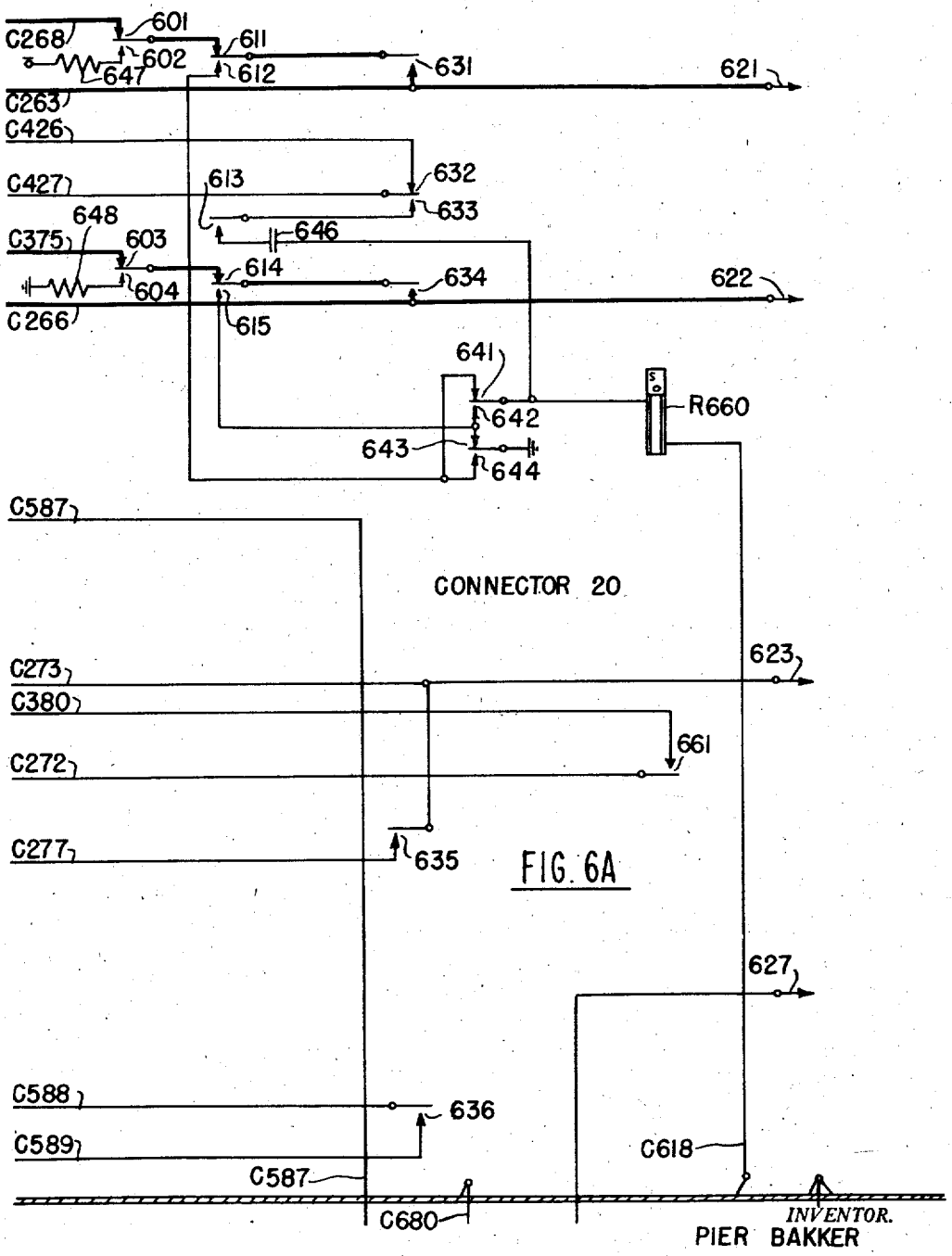
Figure 6B:
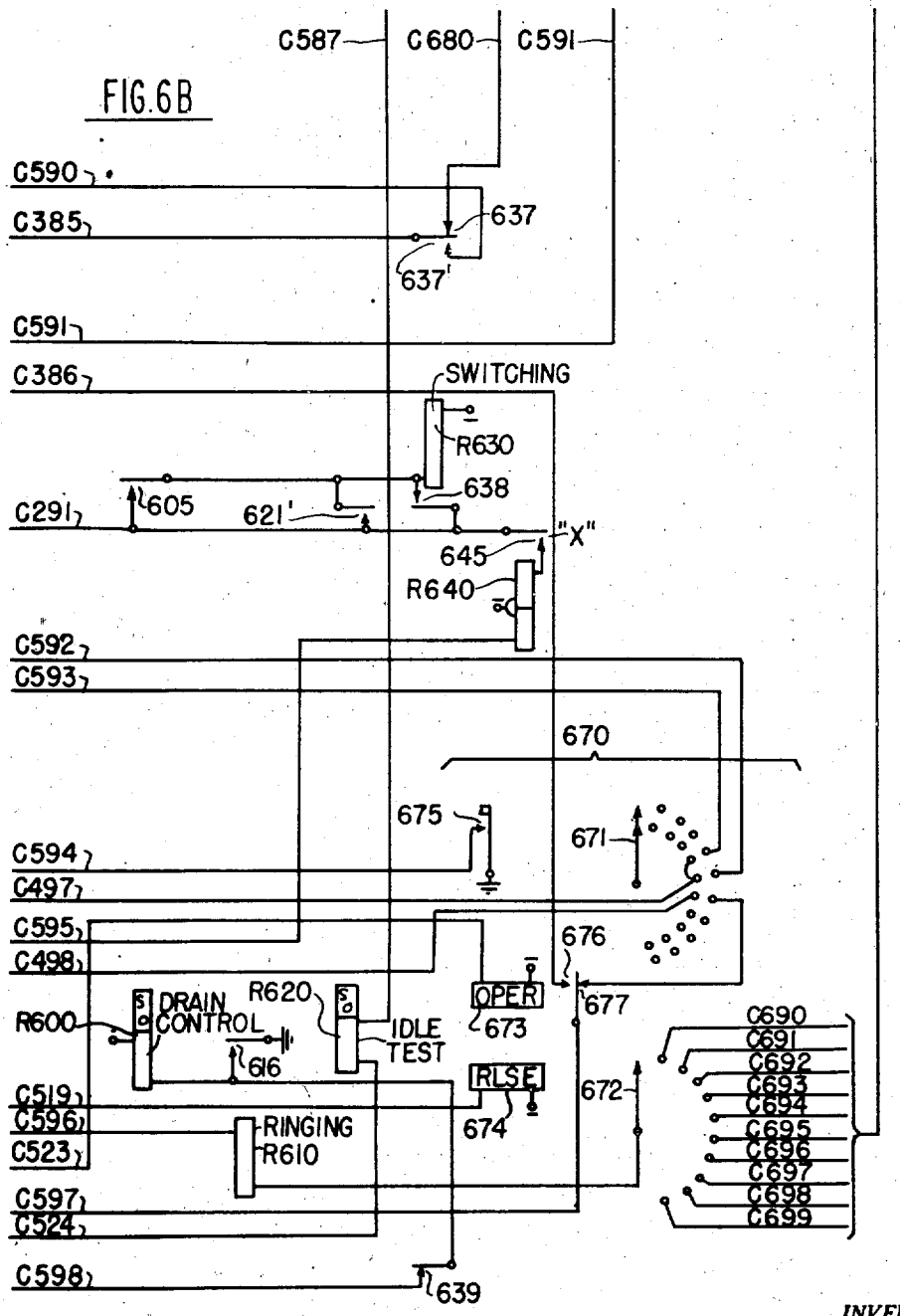

The equipment for controlling the vertical, rotary and release magnets of the Strowger switching mechanism embodied in the connector 20, and for performing the auxiliary control operations required incident to the setting up of the various types of connections, includes a pair of line relays R260 and R300 which are arranged to be energized in series over the two link talking conductors C257 and C258, a slow-acting hold relay R370, a hold slave relay R360, a pulsing relay R310, a battery reversing relay R320, a back-bridge relay R340, a battery feed coil 350, a switch-through relay R240, a reverting call relay R250, three timing relays R200, R220 and R230, and a restricted service relay R210. Additional relays embodied in the connector 20 are shown in Figs. 4A and 4B of the drawings as including an impulse-controlled relay R420, a busy test relay R440, a trunk call relay R460, and four transfer relays R430, R450, R470 and R480. The relay equipment illustrated in Figs. 5A and 5B of the drawings comprises a first digit pulse transfer relay R500, a ring pickup relay R510, a trunk hunting relay R520, a slow-acting control relay R530, a control relay R540, a stop ringing relay R550, a pair of ringing control relays R560 and R570, and an additional control relay R580. Additional relays embodied in the connector 20 are illustrated in Figs. 6A and 6B of the drawings as including a slow-to-operate drain control relay R600, a ringing relay R610, a slow-to-operate idle test relay R620, a line switching relay R630, a ring transfer relay R640, and a slow-acting ring cut-off relay R660.

The control equipment of the connector 20 also includes a minor switch 670 which functions to provide a variety of circuit control operations, all of which are described with particularity hereinafter. This switch, which is of the front-stepping type, is provided with an eleven point contact field having three sets of contacts, the first two of which are arranged to be traversed by the wiper 671 and the last of which is arranged to be traversed by the wiper 672. These wipers are operated away from the illustrated normal positions thereof under the control of an operating magnet 673, and are spring-biased to return to normal when the release magnet 674 is energized. The operating mechanism of this switch also includes a set of off-normal springs 675 which is arranged to control the relay R580. The service restricting facilities provided in the community exchange include a network 40 which is common to all of the finder-connector links and all of the lines upon which service restrictions are to be imposed. The function of this network is to produce at spaced intervals matched signal or control pulses which respectively represent or designate three different trunk restrictions. In brief, this network comprises a start relay R1100, six pulsing relays R1200, R1210, R1220, R1230, R1240 and R1250, three slow-to-operate timing relays R1110, R1120 and R1130, and four sequence relays R1140, R1150, R1160 and R1170. The four last-mentioned relays are of the well-known differentially wound type. Cross connections between the contacts of the six pulsing relays and the line terminals of the lines upon which restrictions are to be imposed are made at a terminal frame 1260. On the left side of this frame pulsing terminals are provided which connect with the contacts of the pulsing relays. On the right side of this frame, terminals are provided which may be connected to the line terminals of the line switching equipment. An adequate number of terminals is provided on the frame 1260 to permit the restricting circuits of each line requiring a service restriction to be independently controlled.

The power supply and supervisory signaling equipment 50 provided in the community exchange is only schematically illustrated in Fig. 24 of the drawings. This equipment is identical with that disclosed in copending application Serial No. 414,252, Pier Bakker and Clarence E. Lomax, filed October 9, 1941.

In brief this equipment includes the usual dial, busy and special tone generators, ringing current generating equipment, an exchange battery, and a current supply and battery charging system. This equipment further includes a set of alarm sending relays and supervisory signaling equipment which is arranged in a novel manner to produce supervisory signals indicative of a large number of faults which may occur in the system. For the purpose of providing the various ringing codes and timed ground and battery pulses required for the control of the finder-connector links, the repeaters and the battery charging equipment, and the additional purposes of producing interrupted signal voltages and the supervisory signals of different character, a single motor-driven, cam-operated interrupter of improved construction and arrangement is also included in the common equipment 50 schematically shown in Fig. 24. The mode of operation of this equipment, in so far as it relates to the operation of the line switching equipment shown in the remaining figures of the drawings, will be clearly apparent from the following portion of the specification. It is pointed out, however, that corresponding reference characters are used in Fig. 13 of the drawings and in the above-referred to copending application to identify the same circuit conductors, in order that the mode of connecting the power supply and supervisory equipment of this copending application to the illustrated switching equipment will be readily understood.

Directory Numbering Arrangement

In order to facilitate an understanding of the following detailed description of the operation of the system, it is in order to first consider the directory numbering scheme which is utilized in designating the various lines terminated in the bank contacts of the several connectors. In this regard it may be arbitrarily assumed that each inter-office trunk group and each P.B.X trunk group includes four trunks. Based on this assumption, the following directory numbers may be assigned to the lines of different types, it being noted that the indefinite character "X" may be any number from 1 to 9 or 0:

Single digit 7—
Inter-office trunks terminated in the first contact levels of the connectors.

Single digit 8—
Inter-office trunks terminated in the second contact levels of the connectors.

Single digit 9—
Inter-office trunks terminated in the third contact levels of the connectors.

Single digit 0—
Inter-office trunks terminated in the fourth contact levels of the connectors.

191X, 291X or 391X—
Private branch exchange trunks terminated in the ninth contact levels of the connectors and arranged for selection through an automatic trunk hunting operation.

101X, 201X or 301X—
Private branch exchange trunks terminated in the tenth contact levels of the connectors and arranged for selection through an automatic trunk hunting operation.

105X, 205X, 305X, 405X or 505X, to 100X, 200X, 300X, 400X or 500X—
Subscriber lines terminated in the tenth contact levels of the connectors.

195X, 295X, 395X, 495X or 595X to 190X, 290X, 390X, 490X or 590X—
Subscriber lines terminated in the ninth contact levels of the connectors.

115X, 215X, 315X, 415X or 515X to 110X, 210X, 310X, 410X or 510X—
Subscriber lines terminated in the first contact levels of the connectors.

125X, 225X, 325X, 425X or 525X to 120X, 220X, 320X, 420X or 520X—
Subscriber lines terminated in the second contact levels of the connectors.

135X, 235X, 335X, 435X or 535X to 130X, 230X, 330X, 430X or 530X—
Subscriber lines terminated in the third contact levels of the connectors.

145X, 245X, 345X, 445X or 545X to 140X, 240X, 340X, 440X or 540X—
Subscriber lines terminated in the fourth contact levels of the connectors.

151X, 251X, 351X, 451X or 551X to 180X, 280X, 380X, 480X or 580X—
Subscriber lines terminated in the fifth sixth, seventh, and eighth contact levels of the connectors.

From the above outline of the directory numbering scheme it will be noted that directory numbers differing only in the first digit thereof may be utilized to designate the same subscriber line. The purpose of this arrangement is to utilize the first digit as a vehicle for partially setting the ringing circuits which are used in signaling over a line of the multiparty type. More specifically, the first digits "1," "2" and "3" all designate bridged ringing, and one group of ten ringing codes. These first digits also indicate to the connector that P.B.X trunk hunting is required when P.B.X directory numbers are dialed. The first digit "4," when dialed into a connector, causes the P.B.X trunk hunting facilities to be disabled and indicates to the connector that a ringing code included in the first group of ten codes is to be utilized in ringing over the negative side of a line to be selected. The first digit "5," when dialed into a connector, indicates that a code in the second group of ten codes is to be utilized in ringing over the negative side of a line to be selected.

The second digit of any directory number dialed into one of the connectors is, in all cases, utilized to effect vertical movement of the Strowger switch wipers of the connector. Similarly, the third digit of any directory number dialed into one of the connectors is utilized to effect rotary operation of the Strowger switch wipers of the connector. The fourth digit is used to effect code selection and to indicate the side of the line over which ringing current is to be transmitted during the ringing operation. More specifically, a fourth digit of from one to five impulses, when dialed into a connector following a first digit of from one to three impulses, serves to effect the selection of the corresponding code in the first group of codes and to select the negative side of the selected line for ringing current transmission. On the other hand when a fourth digit of from six to ten impulses is dialed into a connector following a first digit of from one to three impulses, the correspondingly numbered codes of the first group are in each case selected and the positive side of the selected line is selected for ringing current transmission.

Local Calls

In considering the operation of the system to set up a connection through the illustrated finder-connector link between two subscriber lines terminating in the bank contacts thereof, it may be assumed that all of the equipment in the distributor 21 is normal and that a call originating at the substation A and intended for the substation B is initiated. When the handset provided at the calling substation A is removed from its supporting hook or cradle, a loop circuit is completed by way of the line 10 and the contacts 111 and 113 over which the two windings of the line relay R100 are energized in series. In operating, this relay closes its contacts 101 to impress ground potential upon the private conductor 10c of the line 10, whereby this line is marked as busy in the bank contacts of the various connectors. At its contacts 102, the relay R100 opens a point in one of the operating circuits for the cut-off relay R110. At its contacts 103, the relay R100 completes an obvious path for impressing negative battery potential upon the test conductor 10*d*, whereby the rotary position of the line 10 is marked in the bank contacts of the various finders. At its contacts 104 and 105, the relay R100 completes a path including the contacts 117 for impressing ground potential upon the fifth contact 861 of the vertical test contact set 860, thereby to make the vertical position of the line 10 in the bank contacts of the finders. At its contacts 104 and 105 the relay R100 also completes a circuit for energizing the distributor start relay R1010, this circuit extending from ground by way of the contacts 117, 104 and 105, the start lead 121, the resistor 171, C175 and the winding of R1010 to battery.

In operating, the relay R1010 closes its contacts 1011 to connect the delayed alarm conductor C912 to ground through the contacts 961. At its contacts 1013, the relay R1010 prepares an operating circuit for the relay R970. At its contacts 1012, the relay R1010 completes a circuit for energizing the link relay R1050 individual to the illustrated finder-connector link. This circuit extends from ground by way of the contacts 1041, 1076, 1066, 1056, 1043, 1012, 964 and 1031 and the winding of R1050 to battery. In operating, the relay R1050 first locks to ground in a circuit which includes its preliminary make contacts 1058, the contacts 1069 and 1079, the winding of R1030, and the contacts 965. In completing this locking circuit the relay R1050 obviously short-circuits the winding of the distributor control relay R1030. After completing this locking circuit the relay R1050 opens its contacts 1056 to interrupt its operating circuit and the path short-circuiting the winding of the relay R1030. At its contacts 1057, the relay R1050 prepares the operating circuit for the link relay R1060 individual to the second link. At its contacts 1051, 1052, 1053, 1054 and 1055, the relay R1050 connects the various control conductors individual to the illustrated link to the respective associated common control conductors in the distributor 21, so that operation of the finder 19 to search for the calling line 10 may be initiated.

When the above-mentioned path short-circuiting the winding of the distributor control relay R1030 is opened at the contacts 1056, this relay is energized in series with the link relay R1050 over a circuit which extends from ground by way of the contacts 965, the winding of R1030, the contacts 1079, 1069 and 1058, and the winding of R1050 to battery. The current traversing this circuit is sufficient to maintain the relay R1050 operated and to cause the operation of the relay R1030. In operating, the latter relay opens its contacts 1031 to interrupt the prepared operating circuit for the second link relay R1060 and the above-traced circuit for the first link relay R1050. At its contacts 1032, the relay R1030 prepares an alternative circuit for energizing the first link relay R1050. At its contacts 1033, the relay R1030 completes the prepared operating circuit for the relay R970, this circuit extending from ground by way of the contacts 1033, 922, 916, 945, 1013 and 1044, and the winding of R970 to battery.

In operating, the relay R970 closes its contacts 977 to prepare a locking circuit for itself, and closes its contacts 976 to complete an obvious multiple circuit for energizing the all-links-busy relay R960. At its contacts 972, the relay R970 prepares a circuit including the vertical pulse lead C854 for transmitting current pulses to the vertical magnet 835′ of the finder 19. At its contacts 973, the relay R970 prepares the operating circuit for the rotary test relay R950. At its contacts 971, the relay R970 prepares the operating circuit for the vertical test relay R940. At its contacts 974, the relay R970 prepares a locking circuit for the control relay R910, and completes the prepared operating circuit for the finder start relay R810, the latter circuit extending from ground by way of the contacts 974 and 1054, C852 and the winding of R810 to battery. At its contacts 975, the relay R970 completes a circuit through the contacts 913 for energizing the timing relay R900.

The timing relay R900, upon operating, moves its armature 901 and its contacts 903 and 904 into engagement to complete a circuit for energizing the slow-to-operate relay R930, this circuit extending from ground by way of the contacts 975, the armature 901, the contacts 903 and 904, and the winding of R930 to battery. The relay R930 now operates and locks to ground in a circuit which includes the contacts 931, 904 and 903, the armature 901 and the contacts 975. At its contacts 932, the relay R930 prepares a circuit for energizing the lower winding of the rotary test relay R950 and the upper winding of the vertical test relay R940 in parallel. At its contacts 933, the relay R930 opens a point in the circuit for energizing the relay R920. At its contacts 934, the relay R930 completes a locking circuit for the control relay R970, this circuit extending from ground by way of the contacts 1033, 922, 934, 977 and 1044, and the winding of R970 to battery. At its contacts 935, the relay R930 completes an obvious operating circuit for the control relay R910.

The relay R910, upon operating, locks to ground in a circuit which includes its upper winding and the contacts 911 and 974. At its contacts 916 and 917, the relay R910 opens the operating circuit for the relay R970 and shunts the contacts 934 which are included in the locking circuit for the relay R970. At its contacts 914, the relay R910 prepares the above-mentioned circuit for energizing the lower winding of the rotary test relay R950 in parallel with the upper winding of the vertical test relay R940. At its contacts 915, the relay R910 prepares a circuit for energizing the upper winding of the control relay R920. At its contacts 913, the relay R910 opens the above-traced operating circuit for the timing relay R900.

When the relay R900 is thus deenergized the weighted armature 901 is released and starts to vibrate through its neutral position between two extreme positions, wherein the contacts 902 and 903 are alternately engaged. Each time the contacts 902 and 903 are closed the locking circuit for the relay R930 is connected. Due to the slow-acting characteristic of this relay, it remains in its operated position until such time as the amplitude of vibration of the armature 901 is decreased sufficiently to prevent further engagement of the contacts 902 and 903. Thus a timing interval is measured through operation of the timing relay R900. During this interval the two relays R930 and R910 are held operated so that the operation of the finder 19 to seize the calling line 10 may proceed.

*Selecting the calling line*

When the finder start relay R810 is energized in the above-traced circuit, operation of the finder 19 to search for the calling line 10 is initiated. To this end the relay R810, in operating, closes its contacts 811 to bridge the resistor 817 across the link talking conductors C257 and C258, whereby the line relays R260 and R300 are energized and operate in the manner more fully explained below. When the connector portion of the link is thus seized, certain of the relays embodied therein operate to connect the hold conductor C272 and the control conductor C270 to ground. At its contacts 812, the relay R810 connects the control conductor C270 to ground in the finder 19 and thus prepares one of the operating circuits for the cut-off relay R110. At its contacts 813, the relay R810 opens a point in one of the available paths for impressing ground potential upon the guard conductor C278. This conductor is individual to the illustrated link and is included in one of the branch circuits over which the all-links-busy relay R960 is normally energized. At its contacts 814, the relay R810 also opens a point in the operating circuit for the release magnet 839. At its contacts 816, the relay R810 prepares the operating circuit for the rotary magnet 837. At its contacts 815, the relay R810 completes the prepared operating circuit for the vertical magnet 835' this circuit extending from ground by way of the contacts 1001, 972, 941 and 1051, C854, the contacts 815 and the winding of the magnet 835' to battery.

When energized in this circuit the magnet 835' elevates the wipers 831 to 835, inclusive, to a position opposite the first level of contacts in the associated contact field, and closes its contacts 836 to complete the prepared operating circuit for the pulsing relay R1000. This circuit extends from ground by way of the contacts 836, the interrupter lead C855, and the winding of R1000 to battery. Incident to the vertical off-normal movement of the wipers 831 to 835, inclusive, the off-normal springs 841 are closed to prepare a path for impressing ground potential upon the guard conductor C278; the off-normal springs 843 are disengaged to open another point in the all-links-busy circuit individual to the illustrated link; and the off-normal springs 842 are engaged to prepare the operating circuit for the release magnet 839.

In operating, the relay R1000 opens its contacts 1001 to deenergize the magnet 835'. This magnet, upon restoring, opens its contacts 836 to deenergize the pulsing relay R1000. The relay R1000, upon restoring, recloses its contacts 1001 to again energize the vertical magnet 835'. In reoperating, the vertical magnet elevates the wipers 831 to 835, inclusive, a second step wherein they are positioned opposite the second level of contacts in the associated contact field, and recloses its contacts 836 to again energize the pulsing relay R1000. The interaction between the vertical magnet 835' and the pulsing relay R1000 continues until the wipers of the finder 19 are elevated to a position opposite the marked fifth level of contacts in the associated contact field. More specifically, when the wiper 835 engages the marked contact 861, a circuit is immediately completed for energizing the lower winding of the vertical test relay R940 in series with the winding of the pulsing relay R1000. This circuit may be traced as extending from ground by way of the contacts 117, 104 and 105, the start lead 121, the contact 861, the wiper 835, the test lead C857, the contacts 1053 and 943, the lower winding of R940, the contacts 971, C855, and the winding of R1000 to battery. The current traversing this circuit is sufficient to maintain the pulsing relay R1000 in its operated position, whereby further operation of the vertical magnet 835' is prevented, and to cause the operation of the vertical test relay R940.

From the above explanation it will be noted that during the vertical movement of the finder wipers, a circuit including two of the resistors 171, 172, 173, 174, 176, etc., is repeatedly completed for energizing the relay R1000 and the lower winding of the relay R940 in series. This circuit is initially completed incident to the first vertical step of the finder wipers and extends from ground by way of the contacts 117, 104 and 105, the start lead 121, the resistors 171 and 172 in series, the wiper 835 and the engaged first contact of the contact set 860, C857, the contacts 1053 and 943, the lower winding of R940, the contacts 971, C855, and the winding of R1000 to battery. It is altered successively to include the resistors 173, 174 and 176 in series with the resistor 171 incident to the second, third and fourth vertical steps of the finder wipers, respectively. The current traversing this circuit is, however, insufficient to cause the operation of the vertical test relay R940 or to prevent the release of the pulsing relay R1000.

The vertical test relay R940, upon operating, first locks up in a circuit which includes its upper winding, its preliminary make contacts 944, and the contacts 932, 914 and 975. After this locking circuit is completed the relay R940 opens its contacts 941 to interrupt the above-traced operating circuit for the vertical magnet 835', and closes its contacts 942 to prepare the operating circuit for the rotary magnet 837. At its contacts 944, the relay R940 also completes a circuit for energizing the lower winding of the rotary test relay R950, this circuit extending from ground by way of the contacts 975, 914, 932 and 944, the lower winding of R950, and the resistor 908 to battery. The current traversing this circuit is insufficient to cause the operation of the rotary test relay R950 but renders this relay exceedingly fast to operate when its upper winding is subsequently energized. At its contacts 943, the relay R940 interrupts the above-traced circuit for energizing its own lower winding in series with the winding of the pulsing relay R1000, whereby the latter relay is deenergized. At its contacts 945, the relay R940 opens another point in the above-traced operating circuit for the relay R970. At its contacts 946, the relay R940 further prepares the operating circuit for the rotary test relay R950.

The pulsing relay R1000, upon restoring in response to the operation of the vertical test relay R940, closes its contacts 1001 to complete the prepared operating circuit for the rotary magnet 837, this circuit extending from ground by way of the contacts 1001, 972, 942 and 951, C856, the contacts 816 and 808 and the winding of the magnet 837 to battery. When energized in this circuit the magnet 837 operates to rotate the wipers 831 to 834, inclusive, into engagement with the contacts forming the first contact set of the selected level, and to rotate the wiper 835 out of engagement with the contact 861. Upon operating, the magnet 837 also closes its contacts 838 to complete the previously traced operating circuit for the pulsing relay R1000. This relay now operates and opens its contacts 1001 to deenergize the rotary magnet 837. The rotary magnet, in restoring, opens its contacts 838 to deenergize the pulsing relay R1000. The interrelated operation of the magnet 837 and the pulsing relay R1000 continues until the wipers 831 to 834, inclusive, are rotated to engage the contacts at which the conductors of the calling line 10 are terminated, or until all of the contact sets of the selected level have been tested and the wipers are rotated to the eleventh rotary off-normal positions thereof. In this regard it will be understood that the enumerated wipers are rotated one step each time the rotary magnet 837 is energized.

In the present case the rotary movement of the wipers 831 to 835, inclusive, is arrested when the test wiper 833 is operated to engage the test contact terminating the conductor 10*d*. At this time the above-mentioned circuit for energizing the upper winding of the rotary test relay R950 is completed, this circuit extending from ground by way of the contacts 973, the upper winding of R950, the contacts 946 and 1053, C857, the wiper 833 and the engaged test contact individual to the line 10, the test conductor 10*d*, the contacts 103, and the upper winding of R110 to battery. When energized in this circuit the relay R950 immediately operates and opens its contacts 951 to interrupt the above-traced operating circuit for the rotary magnet 837, whereby rotary movement of the wipers 831 to 835, inclusive, is arrested. At its contacts 953, the relay R950 completes an obvious circuit for energizing the operating magnet 905 of the peg count meter, whereby the call is registered by this meter in the usual manner. At its contacts 952, the relay R950 prepares the operating circuit for the switch-through relay R800. Shortly following the operation of the rotary test relay R950 to perform the functions described above, the pulsing relay R1000 restores and closes its contacts 1001 to complete the prepared operating circuit for the switch-through relay R800. This circuit extends from ground by way of the contacts 1001, 972, 942, 952 and 1052, C851, and the winding of R800 to battery.

In operating, the relay R800 locks to the grounded hold conductor C272 over a path including its contacts 805, it being noted above that the conductors C272 and C270 are connected to ground in the connector portion of the link before the calling line 10 is seized and in response to the operation of the line relay R300. At its contacts 801 and 802, the relay R800 extends the calling loop circuit to the connector portion of the link, in an obvious manner. At its contacts 804, the relay R800 connects the EC wiper 834 to the EC conductor C269 to prepare a point in the common portion of the circuits over which the restricted service relay R210 may be controlled. At its contacts 806, the relay R800 connects the guard conductor C278 to ground through the off-normal spring 841. At its contacts 807, the relay R800 opens a point in the operating circuit for the release magnet 839. At its contacts 808, the relay R800 opens another point in the operating circuit for the rotary magnet 837. At its contacts 803, the relay R800 completes a path including the control conductor C270 for impressing ground potential directly upon the test conductor 10*d*, and in so doing closes an obvious multiple circuit for energizing the upper winding of the cut-off relay R110. At its contacts 803, the relay R800 also completes a path for short-circuiting the upper winding of the relay R950, this path extending from the grounded control conductor C270 by way of the contacts 803, C857, the contacts 1053 and 946, the upper winding of R950 and the contacts 973 back to ground. The completion of this path serves to render the relay R950 slow to release.

As indicated above, when the test wiper 833 is connected to ground through the contacts 803, a circuit including this wiper, the conductor 10*d*, and the contacts 103, is completed for directly energizing the upper winding of the cut-off relay R110. In operating, this relay first locks up in a circuit including its lower winding, its preliminary make contacts 116, and the grounded test conductor 10*d*. After this locking circuit is completed the relay R110 opens its contacts 117 to disconnect the start lead 121 from ground. At its contacts 114, 115 and 116, the relay R110 disconnects the private conductor 10*c* of the line 10 from ground in the line circuit 14, and connects this conductor to the grounded conductor 10*d*. At its contacts 112, the relay R110 completes an obvious circuit for energizing the upper winding of the line relay in series with the resistor 123. At its contacts 111 and 113, the relay R110 disconnects the windings of the line relay R100 from the talking conductors of the line 10.

As explained in the previously cited Patent No. 2,199,534, Bakker, incident to the operation of the cut-off relay R110, the mechanical interlock between the armature of this relay and the armature of the line relay R100 functions to release the contact springs carrying the contacts 103 and 105. At the contacts 103, the initially completed circuit for energizing the upper winding of the cut-off relay R110 is broken. At the contacts 105, a second point is opened in the path over which the distributor start lead 121 was initially connected to ground.

*Selecting an idle link*

As indicated above, the distributor start lead 121 is disconnected from ground incident to the operation of the cut-off relay R110. If no other calling lines are awaiting assignment of a link at the time this operation occurs, the start relay R1010 of the distributor is deenergized and restores. On the other hand, if a second call is awaiting assignment of a link, the start relay R1010 is held energized over the distributor start lead extending to the line circuit associated with the other calling line and does not restore. Regardless of the position of the relay R910, however, a second link is selected in the distributor 21 immediately the switch-through relay R800 operates to connect the guard conductor C278 to ground. Thus when ground potential is impressed upon this guard conductor, the slow-acting relay R1040 is energized thereover in a circuit which includes the contacts 1055. In operating, the relay R1040 opens its contacts 1041 and 1043 further to interrupt the previously traced operating circuit for the first link relay R1050. At its contacts 1044, the relay R1040 opens the previously traced locking circuits for the relay R970. At its contacts 1042, the relay R1040 completes the prepared operating circuit for the link relay R1060 individual to the second link, this circuit extending by way of the grounded guard conductor C278 individual to the illustrated link, the contacts 1055, 962, 1042 and 1057, and the winding of R1060 to battery.

The relay R1060, upon operating, locks to ground in a circuit which includes its preliminary make contacts 1068, the contacts 1079, the winding of R1030, and the contacts 965. In completing this locking circuit the relay R1060 obviously short-circuits the relay R1030. After completing this locking circuit in the manner just explained, the relay R1060 opens its contacts 1069 to deenergize the first link relay R1050. At its contacts 1066, the relay R1060 opens another point in the above-traced operating circuit for the relay R1050. At its contacts 1067, the relay R1060 prepares the operating circuit for the link or assign relay individual to the third link. In this regard it will be noted that only three of the link relays are illustrated, the remaining relays being connected between the relay R1060 individual to the second link and the relay R1070 individual to the last link, in a manner which will be clearly apparent from the illustrated circuit wiring. In operating, the relay R1060 also closes its contacts 1061 to 1065, inclusive, to connect the control leads individual to the second link to the respective corresponding common control leads of the distributor 21. Thus the second link is selected for use in handling the call next initiated on one of the lines terminating at the community exchange.

The link relay R1050, upon restoring, opens its contacts 1051 to 1055, inclusive, to disconnect the control leads individual to the illustrated first link from the respective corresponding common leads of the distributor. At its contacts 1056, the relay R1050 further prepares the operating circuit for the link relay individual to the third link. In this regard it is noted that the contacts 1055 are opened before the contacts 1056 are closed in order to prevent the link relay individual to the third link from being energized over the grounded guard conductor C278. At its contacts 1057, the relay R1050 opens another point in the above-traced operating circuit for the link relay R1060 individual to the second link. At its contacts 1058, the relay R1050 opens another point in its own locking circuit. At its contacts 1055 and 1057, the relay R1050 also interrupts the above-mentioned path for short-circuiting the distributor control relay R1030, permitting the latter relay to be energized in series with the operated link relay R1060 over a circuit which extends from ground by way of the contacts 965, the winding of R1030, the contacts 1079 and 1068, and the winding of R1060 to battery. The current traversing this circuit is sufficient to cause the reoperation of the relay R1030 and to maintain the relay R1060 operated. At its contacts 1059, the relay R1050 upon restoring reprepares the operating circuit for the slow-to-release control relay R1020. At its contacts 1055, the relay R1050 also opens the previously tracted operating circuit for the slow-acting relay R1040. It is noted that the relay R1030 restores during the period which elapses between the operation of the relay R1060 and the release of the relay R1050, and immediately reoperates when the above-described short-circuiting path is opened to permit its energization in series with the relay R1060. The release and reoperation of the relay R1030 is without effect in the case under consideration.

The relay R970, upon restoring in response to the operation of the control relay R1040, opens its contacts 976 to interrupt the multiple circuit for energizing the all-links-busy relay R960, and opens its contacts 977 further to interrupt its own locking circuit. At its contacts 973, 974 and 975, the relay R970 opens the previously traced operating and locking circuits for the relays R900, R930, R940 and R950, causing all of these relays to restore. At its contacts 974, the relay R970 also opens the path for impressing ground potential upon the finder start lead individual to the second link, and opens a point in the previously traced locking circuit for the relay R910. At its contacts 972, the relay R970 opens a point in the common portion of the previously traced circuits over which the switch-through relay R800, the vertical and rotary magnets of the illustrated link, and the corresponding control devices of the other links may be energized in the manner explained above. At its contacts 971, the relay R970 opens a point in the previously traced circuit for energizing the lower winding of the vertical test relay R940 in series with the pulsing relay R1000. At its contacts 974, the relay R970 also interrupts the previously traced operating circuit for the start relay R810 of the finder 19.

In releasing, the relay R810 opens its contacts 811 to interrupt the path over which the resistor 817 is bridged across the talking conductors C257 and C258 of the link. At its contacts 812, the relay R810 disconnects the control conductor C270 from ground in the finder 19. At its contacts 813, the relay R910 completes an obvious multiple path for impressing ground potential upon the guard conductor C278. At its contacts 814, the relay R810 prepares the operating circuit for the release magnet 839. At its contacts 815, the relay R810 opens another point in the operating circuit for the vertical magnet 835'. At its contacts 816, the relay R810 opens another point in the operating circuit for the rotary magnet 837.

The relay R930, upon restoring, opens its contacts 935 to deenergize the relay R910, causing the latter relay to restore. The relay R950, upon restoring, closes its contacts 951 to prepare the common portion of the circuits for transmitting current pulses to the rotary magnets of the various finders. At its contacts 952, the relay R950 opens a point in the common portion of the operating circuits for the respective switch-through relays of the several finders. At its contacts 953, the relay R950 opens the circuit for energizing the operating magnet 905 of the peg count meter, thereby to complete the call registering operation. The vertical test relay R940, upon restoring, opens its contacts 943 further to interrupt the operating circuit for the rotary test relay R950, and recloses its contacts 943 to reprepare its own operating circuit. At its contacts 944, the relay R940 further interrupts the above-traced circuit for energizing its own upper winding in parallel with the lower winding of the rotary test relay R950. At its contacts 942, the relay R940 opens a point in the common portion of the operating circuits for the rotary magnets and switch-through relays of the several finders. At its contacts 941, the relay R940 prepares a circuit through the contacts 1061 for transmitting current pulses to the vertical magnet of the finder in the selected second link. At its contacts 945, the relay R940 reprepares the operating circuit for the relay R970.

The slow-acting relay R1040, upon restoring, closes its contacts 1041 and 1043 to reprepare the previously traced operating circuit for the link relay R1050. At its contacts 1042, the relay R1040 opens another point in the operating circuits for the second to last link relays. At its contacts 1044, the relay R1040 reprepares or recompletes the operating circuit for the control relay R970. In the event the start relay R1010 occupies its restored position at the time the relay R1040 restores, the control relay R970 is not energized. On the other hand, if the start relay R1010 occupies its operated position at the time the relay R1040 restores, the relay R970 is immediately reenergized over its operating circuit as traced above. In reoperating, this relay initiates the operation of the finder portion of the second link to seize the second calling line in a manner which will be clearly apparent from the above explanation. In this regard it will be noted that, following the relay operations just described, the distributor 21 is in readiness to handle another call and the second finder-connector link is preselected for use.

From the above explanation it will be understood that the link or assign relays individual to the various links are operated in sequence under the control of the relay R1040 over circuits which respectively include the guard leads individual to the various links, as successive calls are handled by the distributor 21. In this regard it is pointed out that if a link relay corresponding to a busy link is energized in response to the operation of the slow-acting relay R1040, this link relay in operating to release the preceding link relay will complete a circuit for energizing the next succeeding link relay. Thus in the case under consideration, if the second link is occupied with a call at the time the link relay R1060 corresponding thereto is energized over the guard lead C278, the guard lead C278' individual to the second link is also marked with ground potential. Under these circumstances the relay R1060, upon operating to deenergize the relay R1050, and the latter relay in releasing, complete the operating circuit for the link relay individual to the third link. This circuit may partially be traced as extending by way of the grounded guard lead C278' individual to the second link, the contacts 1065, 962, 1042, 1056 and 1067, and the winding of the third link relay, not shown, to battery. The third link relay, upon operating, releases the second link relay R1060 and connects the guard conductor individual to the third link through to the winding of the link relay individual to the fourth link. If the third link is also busy the fourth link relay operates to release the third link relay and to connect the guard conductor individual to the fourth link through to the winding of the link relay individual to the fifth link. The testing of the links in succession, occasioned by the sequential operation of the link relays as controlled over the guard conductors individual to the various links, continues until an idle link is found. In this regard it will be noted that each time a guard lead extending to a busy link is included in the link test circuit, the relay R1040 is energized thereover to prevent its release until an idle link is ultimately found.

From the above explanation it will be noted that normally the available idle links are assigned for use in sequence and not on a preferential basis. This insures a more even distribution of calls to the various links and, hence, decreases the likelihood of link failure due to excessive operation. In any case where the last link relay R1070 is energized to assign the last link for use, it closes its contacts 1077 to prepare the previously mentioned alternative operating circuit for the relay R1050. In operating, this relay also locks to ground through the windings of the relays R1020 and R1030 in series. More specifically, this locking circuit extends from ground by way of the contacts 965, the winding of R1030, the contacts 1059, the winding of R1020, the contacts 1078, and the winding of R1070 to battery. When this circuit is completed the series-connected relays R1020 and R1030 are short-circuited through the contacts of the link relay corresponding to the next to last link. In operating, the relay R1070 opens its contacts 1079 to deenergize the preceding operated link relay. The latter relay, upon restoring, opens the path short-circuiting the windings of the series-connected relays R1020 and 1030, permitting these two relays to be energized in series with the link relay R1070. The relay R1020 now operates and closes its contacts 1021 further to prepare the alternative operating circuit for the first link relay R1050. At its contacts 1022, the relay R1020 prepares an alternative locking circuit for the relay R1050. When the guard lead individual to the last link is subsequently connected to ground, the distributor control relay R1040 is energized, and the prepared alternative operating circuit for the first link relay R1050 is completed, this circuit extending by way of the grounded guard lead individual to the last link, the contacts 1075, 962, 1042, 1056, 1066 and 1077, and the chain-connected break contacts on the other link relays, the contacts 1021 and 1032 and the winding of R1050 to battery. In operating, the relay R1050 locks to ground over a circuit which includes the contacts 1058, 1069, etc., the contacts 1022, the winding of R1030, and the contacts 965. At its contacts 1059, the relay R1050 deenergizes the series-connected relays R1020 and R1070. The relay R1070 immediately restores and closes its contacts 1079 to complete the previously traced multiple locking circuit for the first link relay R1050. At its contacts 1077, the relay R1070 opens the alternative operating circuit for the relay R1050. At its contacts 1075, the relay R1070 opens another point in the alternative operating circuit for the first link relay R1050. Following the operation of the relay R1050 the first and successive links may be sequentially tested through the sequential operation of the link relays until an idle link is found. When an idle link is found the link relay corresponding thereto is operated and locked up in series with the distributor control relay R1030 in the manner explained above. Shortly following the release of the relay R1070, the relay R1020 restores and opens its contacts 1022 to interrupt the above-traced alternative locking circuit for the first link relay R1050. At its contacts 1021, the relay R1020 opens another point in the above-traced alternative operating circuit for the relay R1050. From this point on the idle links are successively assigned for use in a manner clearly apparent from the above explanation.

*All-links-busy*

As indicated above, the all-links-busy path or circuit individual to the illustrated link and comprising the conductors C279 and C282 is opened in the finder 19 incident to the operation of the start relay R810. This circuit, when completed, extends from ground by way of the contacts 814, the off-normal springs 843, the contacts 822, C282, the off-normal springs 225, C280, the contacts 362, C382, the contacts 582, C279, and the winding of R960 to battery. Similar circuits individual to the other links are connected in parallel with the circuit individual to the illustrated link, and the all-links-busy relay R960 is held energized so long as any one of these circuits is completed. When, however, all of these circuits are opened to indicate that all of the links are occupied with calls, the all-links-busy relay R960 is deenergized and restores. In releasing this relay opens its contacts 961 to interrupt the path for impressing ground potential upon the delayed alarm conductor C912. At its contacts 962, the relay R960 opens a point in the common portion of the previously traced operating circuits for the various link relays, thereby to prevent useless operation of these relays in search of an idle link. At its contacts 964, the relay R960 opens a point in the previously traced operating circuit for the first link relay R1050. At its contacts 963, the relay R960 prepares a circuit for energizing the operating magnet 906 of the overflow meter. At its contacts 965, the relay R960 opens a point in the common portion of the previously traced locking circuits for the various link relays, whereby any operated one of these relays and the control relay R1030 are caused to restore. At its contacts 966, the relay R960 completes an obvious circuit for energizing the operating magnet 907 of the all-links-busy meter, thereby to register the all-busy condition of the links. The relay R1030, in releasing, closes its contacts 1031 to reprepare the initially traced operating circuit for the first link relay R1050. At its contacts 1032, the relay R1030 opens a point in the above-traced alternative operating circuit for the first link relay R1050. At its contacts 1033, the relay R1030 opens the previously traced operating and locking circuits for the control relay R970, thereby to prevent the operation of the latter relay so long as the all-links-busy condition exists.

If a call is initiated on the line 10, for example, at a time when all of the links are busy, the call is registered through operation of the overflow meter. In this case the start relay R1010, upon operating in response to the initiation of the call, completes the prepared circuit for energizing the operating magnet 906 of the overflow meter, this circuit extending from ground by way of the contacts 1041, 1076 and 1066, and the intervening chain-connected break contacts, the contacts 1056, 1043, 1012 and 963, and the winding of the magnet 906 to battery. This circuit is obviously opened at the contacts 1012 if the call is abandoned before a link is assigned to the calling line, or at the contacts 963 if a link becomes available for use before the call is abandoned.

Immediately one of the links, such, for example, as the illustrated link becomes idle, the all-links-busy circuit individual thereto is completed to cause the reoperation of the relay R960. This relay, upon reoperating, opens its contacts 963 to deenergize the operating magnet 906, if operated, and closes its contacts 964 to reprepare the initially traced operating circuit for the first link relay R1050. At its contacts 966, the relay R960 deenergizes the operating magnet 907 of the all-links-busy meter. At its contacts 965, the relay R960 reprepares the locking circuits for the various link relays. At its contacts 962, the relay R960 reprepares the previously traced operating circuit for the various link relays. In the event a call is awaiting the assignment of a link at the time the all-links-busy relay R960 reoperates, the start relay R1010 occupies its operated position so that the previously traced operating circuit for the first link relay R1050 is recompleted at the contacts 964 incident to the operation of the relay R960. In the case under consideration, wherein it is assumed that the illustrated link becomes idle to cause the reoperation of the relay R960, the link relay R1050 corresponding thereto operates and locks to ground through the winding of the distributor control relay R1030, so that the illustrated link is immediately seized for use in handling the call. On the other hand, if no call is awaiting the assignment of a link at the time the relay R960 reoperates, the reoperation of the first link relay R1050 is delayed until a call is initiated on one of the lines of the system to cause the operation of the start relay R1010. In the event one of the intermediate links or the last link is rendered idle to cause the reoperation of the all-links-busy relay R960, the above-described sequential operation of the link relays R1050, R1060, etc. proceeds in the exact manner described above, until the idle link is found. In this regard it will be understood that if two links are concurrently rendered idle, the link searching operation on the part of the link relays will be arrested immediately the first idle link is located thereby. Following the reoperation of the all-links-busy relay R960, the operation of the distributor may proceed in the exact manner explained above.

The purpose of providing a locking circuit for the relay R960, which is controlled by the relay R970, is to prevent the premature release of the relay R960 before a calling line is seized at a time when only one link is available for use. In this regard it will be understood that if none of the other links are released before the only available idle link functions to seize the calling line to which it is assigned, the distributor 21 again assumes its all-busy setting incident to the release of the control relay R970, following the seizure of the calling line.

*Finder failure*

In the event the finder 19 fails to seize the calling line 10 within the time interval measured by the operation of the timing relay R900, a second finder-connector link is automatically assigned to the use of the calling line and operation of the finder portion of the second assigned link to search for the calling line is initiated. In this regard it will be recalled that the timing relay R900 is deenergized to initiate the timing operation substantially coincident with the operation of the control relay R970. If the apparatus utilized in handling the call is operating in its normal manner, the calling line will be seized and the control relay R970 deenergized before the timing operation of the relay R900 is completed. In such case the distributor operates in the manner explained above. If, however, the finder 19 fails to seize the calling line, the relay R900, upon concluding its timing operation, opens the circuit for energizing the slow-acting relay R930. The latter relay now restores and opens its contacts 931 further to interrupt its locking circuit as traced above. At its contacts 932, the relay R930 opens a point in the previously traced circuit for energizing the upper winding of the vertical test relay R940 in parallel with the lower winding of the rotary test relay R950. At its contacts 933, the relay R930 completes the prepared circuit for energizing the two windings of the differentially wound relay R920, this circuit extending from ground by way of the contacts 975 and 914 to the contacts 933 where it divides, one branch extending through the lower winding of R920 to battery and the other branch extending by way of the upper winding of R920, the contacts 921, 915, 1043 and 1057, and the winding of the link relay R1060, for example, to battery. Since the relay R920 is differentially wound it does not operate when its two windings are concurrently energized. The relay R930, upon restoring, also opens its contacts 935 to deenergize the lower winding of the relay R910. At its contacts 934, the relay R930 opens one branch of the previously traced locking circuit for the control relay R970.

The second link relay R1060 operates when energized in series with the upper winding of the relay R920 over the above-traced circuit. In operating this relay locks to ground through its preliminary make contacts 1068 and the winding of the relay R1030, and opens its contacts 1069 to deenergize the first link relay R1050, causing the latter relay to restore. At its contacts 1068, the relay R1060 also completes a path for short-circuiting the upper winding of the relay R920, this path extending from ground by way of the contacts 965, the winding of R1030, the contacts 1079 and 1068, and the intervening chain-connected break contacts of the other link relays, the contacts 1057, 1043, 915 and 921, the upper winding of R920 and the contacts 933, 914 and 975, back to ground. When its upper winding is thus substantially deenergized, the relay R920 operates and opens its contacts 921 to interrupt the path short-circuiting its own upper winding as well as the circuit over which this winding was initially energized. At its contacts 922, the relay R920 interrupts the operating and locking circuits for the relay R970, causing the latter relay to restore.

From the above explanation it will be understood that the relays R930 and R920 cooperate to transmit a reset pulse to the link relay chain at the end of an uninterrupted timing operation of the timing relay R900. The duration of this pulse is limited by the operation of the relay R920 to that period required for operation of one of the link relays. Thus, in the case considered above, the relay R1060 upon closing its preliminary make contacts 1068 to complete its locking circuit, short-circuits the upper winding of the relay R920, and the latter relay operates to terminate the pulse before the relay R1060 completes its operation. The purpose of this arrangement is to prevent the link relays from racing. Thus, if the above-traced reset circuit were not opened prior to the complete operation of the relay R1060, one or more of the following link relays could be energized thereover regardless of the idle or busy condition of their respective associated links.

The relay R970, in releasing, opens its contacts 974 to deenergize the distributor control relay R910. At its contacts 971, 972, 973, 974 and 975, the relay R970 also opens all circuits over which the relays R1000, R950, R940, R900 and R930 may be energized as well as the operating circuits for the start and switch-through relays of the finders. At its contacts 975, the relay R970 opens the above-traced circuit for energizing the lower winding of the relay R920, causing the latter relay to restore. The two relays R910 and R920, upon restoring, recomplete at the contacts 916 and 922, the previously traced operating circuit for the control relay R970, whereby the latter relay is caused to reoperate. In reoperating, the control relay R970 initiates the operation of the second link to search for the calling line 10. Also upon reoperating, the relay R970 recompletes the operating circuit for the timing relay R900 whereby a second timing operation is started. In this regard it will be noted that when the relay R1050 restores it disconnects the control leads individual to the finder 19 from the common control leads of the distributor 21, whereby the distributor can exert no further control over this finder. Moreover, the second link relay R1060, upon closing its contacts 1061 to 1065, inclusive, connects the control leads individual to the finder of the second link to the common control leads of the distributor 21, so that operation of this finder to search for the calling line may be initiated. If the newly assigned second link also fails to find the calling line 10, a second link reassignment occurs so that a third link is appropriated for use in an attempt to seize the calling line. This substitution of links continues until a link is found which is successful in seizing the calling line.

Under certain circumstances a finder, although in proper working order, may fail to find a calling line for which it is searching. This type of finder failure may be due to an abnormal condition in the equipment, but is most frequently occasioned by the abandonment of the call on the line for which the finder is searching before the searching operation is well under way. In this regard it will be noted that the control relay R970 is locked in its operated position following the operation of the start relay R1010. Accordingly, the searching operation of the finder 19, for example, will continue even though the call is abandoned on the calling line 10, for example, to cause the sequential release of the line relay R100 and the start relay R1010.

Assuming that the marking potentials are removed from the test contact 861 and the test conductor 10*d* during the operation of the finder 19 to search for the line 10 in the manner explained above, the vertical movement of the wipers 831 to 835, inclusive, is continued until these wipers are positioned opposite the tenth level of contacts in the associated contact field. At this time a circuit including the permanently grounded test contact 863 is completed for energizing the vertical test relay R940. This relay, in operating, transfers the pulsing circuit from the vertical magnet 835′ to the rotary magnet 837 so that the wipers 831 to 835, inclusive, are rotated across the contacts forming the tenth level of the contact field. In the event a call awaiting link assignment is present on any one of the lines terminated in this level, this line will be seized during the rotary movement of the finder switch wipers. On the other hand, if none of the lines terminated in this level have calls awaiting link assignment present thereon, the rotary movement of the finder switch wipers will continue until these wipers are rotated to the eleventh off-normal positions thereof. Incident to the eleventh step of the rotary stepping mechanism, the cam springs 844 are closed to connect the guard conductor C278 to ground. When ground potential is impressed upon this conductor, operation of the distributor 21 is initiated to select another link. During the operation of the distributor to perform this function the distributor control relay R1030 releases in the manner explained above to cause the deenergization and release of the control relay R970. In the event the failure of the finder 19 to seize the calling line 10 is due to the abandonment of the call, the start relay R1010 is deenergized and, accordingly, operation of the distributor 21 is arrested after a new link has been selected thereby. In the event the failure of the finder 19 to find the calling line 10 is due to an abnormal condition in the finder, or the line circuit 14, the relay R1010 is held in its operated position during and following the operation of the distributor to select another link. Accordingly, after the link selection is completed, operation of the finder portion thereof to search for the calling line 10 is initiated.

Incident to the operation of the distributor 21 to select another link, and more particularly when the control relay R970 restores to disconnect the start conductor C852 from ground, the start relay R810 is deenergized and restores. Incident to the release of this relay the resistor 817 is disconnected from across the link line conductors C257 and C258 to cause the release of the operated relays in the connector portion of the link, in the manner pointed out hereinafter. In restoring, the start relay R810 also closes its contacts 814 to complete a circuit through the off-normal springs 842 and the contacts 807 for energizing the release magnet 839. When this magnet is energized the wiper carriage structure of the Strowger switching mechanism in the finder 19 is restored to normal in the usual manner. Thus, the illustrated link is fully released.

From the above explanation it will be apparent that when several calls are received concurrently and the finder 19 is assigned to search for one of the calling lines, the wipers of this finder will first be operated to a position opposite the lowest level of contacts in which a call is waiting, and will then be rotated over the contacts of the selected level until they engage the contacts terminating the first line of the group upon which a call is present. It will also be apparent that after the line having the lowest number assignment in the finder bank contacts is seized in this manner, a second finder will immediately be started in search of the calling line having the next higher number assignment. This arrangement permits a certain amount of call stealing, which may be obviated by using slip multiples between the banks of the several finders. For example, a line having a low number assignment in the bank contacts of one of the finders may be terminated at a different set of contacts having a higher number assignment in the second finder. If such an arrangement is used, corresponding changes must be made in the wiring of the start conductors to the vertical test contacts 860 in the various finders. A slip multiple arrangement of this character is desirable since it tends to equalize the wear on the various finders and to average out the selection times for all of the lines.

*Fuse alarm*

As previously indicated, the link fuse stud relay R820 is normally deenergized. This relay is only energized when the fuse 824, through which current is supplied to all of the relays and magnets of the link, is disrupted. In the event this fuse is blown, an obvious circuit is closed through the fuse stud 825 for energizing the relay R820. In operating, this relay opens its contacts 822 to interrupt the all-links-busy circuit individual to the illustrated link and thus open one of the parallel circuits for energizing the all-links-busy relay R900 of the distributor. At its contacts 821, the relay R820 connects the guard conductor C278 directly to ground, so that the illustrated link is marked as busy in the distributor 21 until the fuse 824 is replaced. At its contacts 823, the relay R820 connects the fuse alarm conductor C949 to ground. When this conductor is grounded the alarm sending relays forming a part of the equipment schematically illustrated in Fig. 24 function to transmit an alarm to a distant office in the manner explained in the above referred to co-pending application Serial No. 414,252, filed October 9, 1941, Bakker and Lomax. Also, the supervisory signaling circuits forming a part of this equipment are set to transmit a supervisory signal which indicates by the character thereof that the illustrated link is out of order. Obviously if the fault responsible for the blown fuse 824 is corrected and this fuse is replaced, the relay R820 is deenergized and restores to again render the illustrated link operative and to free the link for selection by the distributor 21.

*Call initiated on the line 6 of the ground return type*

The manner in which lines of the ground return type may be seized by the finder 19, for example, and the response of the distributor 21 to a call initiated at a line of this character, are exactly the same as described above with reference to the call originating at the substation A. The operation of a line circuit terminating a line of this character is, however, slightly different. Thus, if a call is initiated at the substation D served by the line 6, the line relay R150 is energized over a circuit which extends from ground through the switch springs of the hook or cradle switch provided at the substation D, by way of the negative side of the line 6, the contacts 162 and the winding of R150 to battery. In operating, this relay closes its contacts 151 to mark the test conductor 6d with negative battery potential, and closes its contacts 154 to impress ground potential upon the private conductor 6c of the line 6. At its contacts 152 and 153, the relay R150 connects the distributor start lead 177 to ground and impresses ground potential upon the test contact 864 of the vertical contact set 860. When the distributor start lead 177 is connected to ground, operation of the finder 19, for example, to search for the calling line 6 is initiated. Assuming that this line is seized in the manner previously explained, the cut-off relay R160 of the line circuit 7 is energized over the test lead 6d when ground potential is impressed upon the test wiper 833 in response to the operation of the switch-through relay R800. In operating, the relay R160 first locks to the grounded test conductor 6d through its preliminary make contacts 163, and then opens its contacts 164 to disconnect the distributor lead 177 from ground. At its contacts 163, 165 and 166, the relay R160 disconnects the private conductor 6c from ground in the line circuit 7, and connects this conductor to the grounded test conductor 6d. At its contacts 161, the relay R160 completes an obvious locking circuit for the relay R150. After this circuit is completed the relay R160 opens its contacts 162 to disconnect the winding of the line relay R150 from the negative side of the line 6. Incident to the operation of the cut-off relay R160, the mechanical interlock between the armature of this relay and the armature of the line relay R150 is operated to release the contact springs 151 and 153. At the contact springs 151 the above-traced circuit for energizing the upper winding of the relay R160 is opened. At the contact springs 153 another point is opened in the path over which the distributor start lead 177 was initially connected to ground.

*Seizing the connector*

When the calling loop circuit is extended to the connector through the finder 19 from the calling line 10 in the manner explained above, it includes the conductors C257, C258, C262 and C265, the repeating coil windings 346 and 347, the contacts 241, 243, 251, 252, 322 and 324, and the windings of the two relays R260 and R300 in series. When energized in this circuit the relay R260 closes its contacts 261 to prepare the operating circuit for the battery reversing relay R320. In this regard it will be noted that if the calling line 10 is of the ground return type, such that the positive line terminal thereof is connected to ground, the relay R260 will be short-circuited incident to the extension of the call to the connector 20 and, accordingly, will not operate to prepare the operating circuit for the battery reversing relay R320. It will be understood, therefore, that in no case can the control equipment of the connector function to reverse the battery connections to a calling line of the ground return type.

The line relay R300, upon operating, opens its contacts 303 to interrupt an incomplete priming circuit for itself. At its contacts 302, the relay R300 prepares a locking circuit for the slow-acting hold relay R370. At its contacts 301, the relay R300 completes a circuit through the contacts 366 for energizing the pulsing relay R310.

The relay R310, upon operating, locks to ground over a path including the contacts 301, the resistor 304, the contacts 311, C387 and the contacts 543. At its contacts 313, the relay R310 opens a point in the available but incomplete circuits for transmitting impulses to the relay R420 and the three magnets 673, 417 and 507. At its contacts 312, the relay R310 completes the operating circuit for the hold relay R370, this circuit extending from ground by way of the contacts 204 and 246, C296, the contacts 312 and the winding of R370 to battery.

The relay R370, upon operating, closes its contacts 371 to prepare the above-mentioned priming circuit for the line relay R300. At its contacts 373, the relay R370 connects the control conductor C270 to ground. At its contacts 374, the relay R370 completes an obvious circuit for energizing the hold slave relay R360. At its contacts 374, the relay R370 also completes a circuit for energizing the transfer relay R480, this circuit extending from ground by way of the contacts 374, C381, the off-normal springs 425 and the lower winding of R480 to battery.

The hold slave relay R360, upon operating, closes its contacts 361 to connect the release conductor C272 to ground and thus prepare several operating and locking circuits which are described with particularly hereinafter. When ground potential is impressed upon this conductor a locking circuit is prepared for the operated switch-through relay R800 of the finder 19 in the manner explained above. At its contacts 362, the relay R360 opens a point in the circuit individual to the illustrated finder-connector link over which the all-links-busy relay R960 is controlled. At its contacts 363, the relay R360 interrupts an incomplete path over which ground potential may be impressed upon the release alarm conductor C281. At its contacts 363′, the relay R360 completes an obvious path for impressing ground potential upon the start lead C389, thereby to initiate or sustain the operation of the service restricting network 40 in the manner explained hereinafter. At its contacts 364, the relay R360 prepares a locking circuit for itself. At its contacts 364′, the relay R360 opens a point in the operating circuit for the release magnet 257. At its contacts 365, the relay R360 prepares the operating circuit for the timing relay R200. At its contacts 365′, the relay R360 completes a path including the conductor C385 and the contacts 637 for impressing ground potential upon the tone start conductor C680, thereby to initiate the operation of the dial and busy tone generators included in the apparatus 50 schematically shown in Fig. 24 of the drawings. At its contacts 366, the relay R360 opens the initially completed operating circuit for the pulsing relay R310. At its contacts 366′, the relay R300 completes an obvious path for impressing ground potential upon the hold conductor C291, thereby to prepare certain operating and locking circuits described with particularity hereinafter. At its contacts 367, the relay R360 completes the above-mentioned locking circuit for the hold relay R370, this circuit extending from ground by way of the contacts 204 and 246, C296, the contacts 302 and 367, and the winding of R370 to battery. At its contacts 368, the relay R360 prepares the common portion of the above-mentioned circuits for transmitting current pulses to the relay R420 and the three magnets 673, 507 and 417. At its contacts 369, the relay R360 opens a point in one branch of the operating circuit for the release magnet 674 of the minor switch 670.

The transfer relay R480, upon operating, closes its contacts 482 to prepare a locking circuit for itself. At its contacts 481, the relay R480 opens a point in the operating circuit for the transfer relay R450. At its contacts 483, the relay R480 prepares a path for impressing ground potential upon the wiper 671 of the minor switch 670. At its contacts 484, the relay R480 opens a point in the operating circuit for the relay R540. At its contacts 485, the relay R480 completes a circuit for energizing the transfer relay R430, this circuit extending by way of the grounded release conductor C272, the contacts 535, C496, the contacts 485 and the lower winding of R480 to battery. At its contacts 486, the relay R480 prepares the operating circuits for the pulse transfer relay R500 and the trunk hunting relay R520. At its contacts 486′, the relay R480 opens a point in the operating circuit for the ring transfer relay R640. At its contacts 487, the relay R480 opens a point in one of the operating circuits for the release magnet 674. At its contacts 488, the relay R480 further prepares the circuit for transmitting current pulses to the operating magnet 673 of the minor switch 670. At its contacts 489, the relay R480 opens other incomplete circuits over which current pulses may be transmitted to the rotary magnet 507 and the operating magnet 673.

The transfer relay R430, upon operating, closes its contacts 433 to prepare a circuit for energizing its own upper winding in parallel with the upper winding of the relay R530. At its contacts 434, the relay R430 opens one of the circuits over which impulses may be transmitted to the vertical magnet 417. At its contacts 435, the relay R430 further prepares one of the circuits for transmitting impulses to the operating magnet 673 of the minor switch 670. At its contacts 431, the relay R430 completes a circuit for transmitting the usual dial tone signal over the established loop circuit to the calling substation A. This signaling circuit may partially be traced as extending from the high potential side of the dial tone generator by way of dial tone conductor C377, the contacts 431 and 471, the condenser 401, C426, the contacts 632, C427, and the contacts 451 to the negative link line conductor C268. From this point the dial tone signal current is transmitted through the repeating coil 345 and over the calling end of the connection to energize the receiver of the handset provided at the calling substation A. Following the operation of the transfer relay R430, the connector 20 is conditioned to respond to the impulses of the first digit dialed at the calling substation.

*Dialing the first digit*

Assuming that the directory number designating the desired substation B is "3453," the first digit dialed at the calling substation A will necessarily comprise three impulses. During the open circuit period of each impulse the two relays R260 and R300 both restore. These relays obviously reoperate at the end of each open circuit period and remain operated at the end of each digit. The response of the relay R260, if any, is of no effect. The line relay R300, upon restoring at the beginning of the first impulse, opens its contacts 301 to interrupt the locking circuit for the pulsing relay R310. At its contacts 302, the relay R300 opens the above-traced locking circuit for the hold relay R370. At its contacts 303, the relay R300 closes the above-mentioned priming circuit for itself, this circuit extending from ground by way of the contacts 204 and 246, C296, the contacts 303, the resistor 305, the contacts 371 and the winding of R300 to battery. The current traversing this circuit is insufficient to cause the reoperation of the relay R300, but serves to render this relay exceedingly fast to operate when the loop circuit is subsequently recompleted at the calling substation.

The relay R310, upon restoring in response to the release of the line relay R300, opens its contacts 311 further to interrupt its own locking circuit, and opens its contacts 312 to interrupt the operating circuit for the hold relay R370. At its contacts 313, the relay R310 completes the prepared operating circuit for the magnet 673, this circuit extending from ground by way of the contacts 204 and 246, C296, the contacts 313 and 368, C390, the contacts 547, C517, the contacts 488 and 435, C459, the contacts 504, C523, and the winding of the magnet 673 to battery. A parallel branch of this circuit extends from the conductor C517 through the lower winding of the pulse-controlled relay R420. When thus energized the relay R420 first closes its preliminary make contacts 424, thereby to short-circuit its upper winding and thus render itself slow to release. At its contacts 423, the relay R420 opens a point in the above-mentioned path for impressing ground potential upon the wiper 671 of the minor switch 670. At its contacts 422, the relay R420 completes the above-mentioned circuit for energizing the upper winding of the transfer relay R430 in parallel with the upper winding of the control relay R530, this circuit extending from ground by way of the contacts 366′, C291, the contacts 422, and the contacts 433 to the conductor C449 where it divides, one branch extending through the upper winding of the transfer relay R430 to battery and the other branch extending through the upper winding of the relay R530 to battery. At its contacts 421, the relay R420 completes a path for short-circuiting the winding of the relay R260, thereby to exclude this winding from the calling loop circuit. This path may be traced as extending from ground by way of the resistor 419, the contacts 421, C264, and the winding of R260 back to ground.

When its upper winding is energized in the manner just explained, the relay R530 operates and opens its contacts 535 to interrupt the operating circuit for the transfer relay R430. At its contacts 534, the relay R530 prepares the operating circuit for the trunk hunting relay R520. At its contacts 533, the relay R530 prepares one of the operating circuits for the rotary magnet 507. At its contacts 532, the relay R530 opens a point in the operating circuit for the idle test relay R620. At its contacts 531, the relay R530 completes the operating circuit for the transfer relay R470, this circuit extending from the grounded release conductor C272 by way of the contacts 531, C428, the contacts 453, and the upper winding of R470 to battery.

When thus energized the relay R470 closes its contacts 472 to prepare a locking circuit for itself and the relay R480, and opens its contacts 471 to interrupt the previously traced dial tone signalling circuit. At its contacts 473, the relay R470 prepares one of the several available circuits for energizing the pulsing relay R310. At its contacts 474, the relay R470 opens a point in one of the operating circuits for the rotary magnet 507. At its contacts 475, the relay R470 further prepares the operating circuit for the trunk hunting relay R520. At its contacts 475', the relay R470 opens a point in another circuit over which the trunk hunting relay R520 may be energized. At its contacts 476 the relay R470 completes a locking circuit for the control relay R530, this circuit extending by way of the grounded release conductor C272, the contacts 476, C493 and the lower winding of R530 to battery. At its contacts 476', the relay R470 opens a point in the circuit for energizing the lower winding of the control relay R530 in parallel with the rotary magnet 507. At its contacts 477, the relay R470 opens another point in the operating circuit for the relay R540. At its contacts 477', the relay R470 prepares one of the available operating circuits for the release magnet 674. At its contacts 478, the relay R470 prepares the circuit over which current pulses may be transmitted to the rotary magnet 507 under the control of the pulsing relay R310. At its contacts 479, the relay R470 opens a point in the available alternative circuit over which current pulses may be transmitted to the operating magnet 673 of the minor switch 670.

From the above explanation it will be understood that the relays R420, R530 and R470 are caused to operate when the pulsing relay R310 releases at the beginning of the open circuit period of the first impulse. At the end of this period the line relay R300 reoperates and closes its contacts 301 to reprepare the operating circuit for the pulsing relay R310. At its contacts 303, the relay R300 opens the above-traced priming circuit for itself. At its contacts 302, the relay R300 recompletes the locking circuit for the hold relay R370.

When its winding is energized over the above-traced pulsing circuit the magnet 673 attracts its associated armature and thus causes the two wipers 671 and 672 to be stepped one step from the illustrated normal positions thereof into engagement with their associated first contacts. Incident to the off-normal movement of these wipers the off-normal springs 675 are closed to energize the relay R580 over a circuit including the conductor C594. This relay, in operating, closes its contacts 581 to impress ground potential upon the link guard conductor C278 and thus maintain the busy marking of the illustrated link in the distributor 21. At its contacts 582, the relay R580 opens another point in the previously described all-links-busy circuit individual to the illustrated link. At its contacts 583, the relay R580 prepares a path for impressing ground potential upon the release alarm conductor C281. At its contacts 585, the relay R580 prepares the operating circuit for the relay R540. At its contacts 586, the relay R580 prepares the operating circuits for the release magnet 674 of the minor switch 670.

In operating, the magnet 673 also closes its contacts 676 to prepare or complete an alternative operating circuit for the pulsing relay R310, this circuit extending from ground by way of the contacts 548, C597, the contacts 676, C386, the contacts 301 and the winding of R310 to battery.

Assuming that the line relay R300 is reoperated before the rotary magnet 673 completes its operation, this circuit is completed at the contacts 676 incident to the operation of the magnet 673. On the other hand, if the magnet 673 completes its operation prior to the reoperation of the line relay R300, this circuit is first prepared at the contacts 676 and is completed at the contacts 301 incident to the reoperation of the relay R300. In reoperating, the relay R310 closes its contacts 311 to recomplete its locking circuit as traced above and opens its contacts 313 to interrupt the above-traced circuit for energizing the magnet 673 in parallel with the lower winding of the pulse-controlled relay R420. At its contacts 312, the relay R310 recompletes the operating circuit for the hold relay R370. Due to the slow-to-release characteristics thereof, the hold relay R370 does not restore during impulsing and the pulse-controlled relay R420 is maintained in its operated position throughout each series of impulses transmitted thereto. During each of the two succeeding impulses of the first digit the two relays R300 and R310 interact with the operating magnet 673 of the minor switch 670 in the exact manner explained above. Thus three current pulses are transmitted to the parallel-connected windings of the magnet 673 and the relay R420. It will be understood, therefore, that the wipers 671 and 672 are operated to engage their respective associated third contacts in response to the dialing of the first digit "3" at the calling substation A.

At the end of the digit and during the interdigit pause separating this digit from the second digit, the two relays R300 and R310 are held operated for a sufficient time interval to permit the release of the pulse-controlled relay R420. In releasing, this relay opens its contacts 424 to interrupt the path short-circuiting its upper winding. Thus the relay R420 is rendered fast to operate. At its contacts 421, the relay R420 opens the path short-circuiting the winding of the relay R260, permitting the latter relay to again be energized in series with the line relay R300 over the calling loop circuit. At its contacts 423, the relay R420 again prepares the path for impressing ground potential upon the wiper 671. At its contacts 422, the relay R420, in releasing, opens the above-traced circuit for energizing the respective upper windings of the two relays R430 and R530 in parallel. At this time the relay R430 is fully deenergized and restores. In releasing, the relay R430 opens its contacts 431 further to interrupt the above-traced dial tone signaling circuit, and closes its contacts 432 to prepare a locking circuit for the two transfer relays R470 and R480. At its contacts 433, the relay R430 further interrupts the circuit for energizing its upper winding in parallel with the upper winding of the relay R530. At its contacts 435, the relay R430 opens the circuit over which current pulses were transmitted to the operating magnet 673 during the dialing of the first digit. At its contacts 434, the relay 430 prepares a circuit for transmitting current pulses to the vertical magnet 417 during the dialing of the second digit.

*Dialing the second digit*

When the second digit "4" is dialed at the calling substation A, the two relays R300 and R310 cooperate to transmit four current pulses to the winding of the vertical magnet 417 and the lower winding of the pulse-controlled relay R420 in parallel. Thus when the pulsing relay R310 first restores the lower winding of the relay R420 is energized over its operating circuit as traced above. With the transfer relay R430 in its restored position, a branch of this circuit extends from the conductor C517 by way of the contacts 488 and 434 through the winding of the vertical magnet 417 to battery. Upon reoperating at the beginning of the second digit, the relay R420 recloses its contacts 421 to again exclude the winding of the relay R260 from the calling loop circuit. At its contacts 422, the relay R420 completes the above-mentioned locking circuit for the two transfer relays R470 and R480, this circuit extending by way of the grounded hold conductor C291, the contacts 422 and 432 to the contacts 472 where it divides, one branch extending through the lower winding of R470 to battery and the second branch extending through the contacts 482 and the upper winding of R480 to battery.

Each time the vertical magnet 417 is energized in response to the release of the pulsing relay R310, it cooperates with its associated ratchet and pawl mechanism to elevate the wipers 621, 622, 623 and 627 one step, and closes its contacts 418 to reprepare or recomplete the operating circuit for the pulsing relay R310, depending upon the position of the line relay R300. This circuit, which now extends from ground by way of the contacts 418, C386, the contacts 301 and the winding of R310 to battery, is obviously completed at the contacts 418 if the line relay R300 reoperates before the magnet 417 completes its operation. On the other hand this circuit is only prepared at the contacts 418 and is recompleted at the contacts 301 in the event the vertical magnet 417 fully operates before the line relay R300 reoperates.

Incident to the first vertical step of the wipers 621, 622, 623 and 627, the vertical off-normal springs 425 are disengaged to deenergize the lower winding of the transfer relay R480; the off-normal springs 259 are moved into engagement to prepare the operating circuit for the release magnet 257; the off-normal springs 225 are disengaged to open another point in the previously traced all-links-busy circuit individual to the illustrated link; and the off-normal springs 224 are engaged to complete an obvious multiple path for impressing ground potential upon the link guard conductor C278. It will be understodd that since four impulses are transmitted to the line relay R300 during the second digit, the wipers 621, 622, 623 and 627 are left standing in a position opposite the fourth level of contacts in the associated contact field at the end of the digit. During the inter-digit pause between the second and third digits the two relays R300 and R310 are held operated for an interval sufficient to cause the release of the pulse-controlled relay R420. This relay, in restoring, opens its contacts 422 to interrupt the above-traced locking circuits for the two transfer relays R470 and R480. When thus fully deenergized the relay R480 restores and closes its contacts 481 to prepare the operating circuit for the transfer relay R450. At its contacts 482, the relay R480 opens another point in its own locking circuit. At its contacts 483, the relay R480 opens the path for impressing ground potential on the minor switch wiper 671. At its contacts 484, the relay R480 prepares the operating circuit for the relay R540. At its contacts 485, the relay R480 opens another point in the operating circuit for the transfer relay R430. At its contacts 487, the relay R480 completes the prepared operating circuit for the release magnet 674, this circuit extending from ground by way of the contacts 477′ and 487, C518, the contacts 586, C519, and the winding of the magnet 674 to battery. When energized in this circuit the magnet 674 attracts its associated holding pawl to permit the wipers 671 and 672 to be returned to their illustrated normal positions. Incident to the release of the minor switch 670, the off-normal springs 675 thereof are disengaged to deenergize the relay R580. This relay, in restoring, opens its contacts 586 to interrupt the above-traced operating circuit for the release magnet 674. At its contacts 585, the relay R580 opens the incomplete operating circuit for the relay R540. At its contacts 581, the relay R580 interrupts the path initially completed in the connector 20 for impressing ground potential upon the guard conductor C278. At its contacts 582, the relay R580 reprepares the all-links-busy circuit individual to the illustrated link. At its contacts 583, the relay R580 opens another point in the prepared path for impressing ground potential upon the release alarm conductor C281.

The transfer relay R480, upon restoring, also opens its contacts 488 and closes its contacts 489, whereby the impulsing circuit controlled by the pulsing relay R310 is transferred from the vertical magnet 417 to the rotary magnet 507. Following the operations just described the connector 20 is conditioned to respond to the impulses of the third digit of the directory number designating the desired substation.

*Dialing the third digit*

During the dialing of the third digit "5" the two relays R300 and R310 cooperate to transmit five current pulses to the lower winding of the pulse-controlled relay R420 and the rotary magnet 507 in parallel. In this case the current pulses are transmitted to the rotary magnet 507 over a circuit which extends from ground by way of the contacts 204 and 246, C296, the contacts 313 and 368, C390, the contacts 547, C517, the contacts 489 and 478, C490 and the winding of the magnet 507 to battery. Upon reoperating at the beginning of the third digit, the relay R420 again closes its contacts 422 to recomplete the previously traced locking circuit for the transfer relay R470. At the contacts 422 a circuit is also completed for energizing the transfer relay R450, this circuit extending by way of the grounded hold conductor C291, the contacts 422, 432, 472 and 481, and the lower winding of R450 to battery. At its contacts 421, the relay R420 completes the previously traced path for short-circuiting the winding of the relay R260.

The transfer relay R450, upon operating, locks to the grounded release conductor C272 over a circuit which includes its upper winding, the contacts 454, C428, and the contacts 531. At its contacts 451, the relay R450 opens another point in the previously traced dial tone signaling circuit. At its contacts 453, the relay R450 opens the previously traced operating circuit for the transfer relay R470. At its contacts 455, the relay R450 opens another point in the operating circuit for the idle test relay R620. At its contacts 456, the relay R450 prepares a test circuit over which the busy test relay R440 may be operated in the event the called line is busy. At its contact 457, the relay R450 opens a point in the locking circuit for the busy test relay R440.

Each time the rotary magnet 507 is energized over the previously traced circuit, it functions to step the wipers 621, 622, 623, and 627 one step in the rotary direction, so that at the conclusion of the third digit these wipers are left standing in engagement with the contacts terminating the conductors of the called line 11. Each time the magnet 507 operates it also closes its contacts 508 to prepare or complete the operating circuit for the pulsing relay R310, in the exact manner previously described with reference to the operation of the vertical magnet 417 and the operating magnet 673 of the minor switch 670. In the present case, however, the rotary magnet 507 prepares or completes a slightly different circuit for energizing the pulsing relay R310, this circuit extending from the grounded release conductor C272 by way of the contacts 533, C448, the contacts 473, C458, the contacts 508, C386, the contacts 301, and the winding of R310 to battery.

Incident to the rotary movement of the wipers 621, 622, 623 and 627, over the contacts of the selected fourth level, the busy test relay R440 is operated each time the test wiper 623 encounters a contact terminating the private conductor of a busy line. The resulting operation and release of this relay, which occurs during the indicated movement of the enumerated wipers, is without effect.

*Busy test*

In the event the called line 11 is busy at the time it is selected in the manner just explained, the private conductor 11c thereof is marked with ground potential, so that the busy test relay R440 is energized in the above-mentioned test circuit incident to the operation of the wiper 623 into engagement with the contact terminating this conductor. This circuit may now be traced as extending from ground by way of the conductor 11c, the wiper 623, C273, the contacts 456, and the winding of R440 to battery. In operating, the relay R440 closes its contacts 443 to prepare a locking circuit for itself, and closes its contacts 442 to prepare a circuit for energizing the reverting call relay R250. At its contacts 441, the relay R440 prepares a circuit for transmitting busy tone signaling current over the calling end of the connection. At its contacts 444, the relay R440 prepares one of the available circuits for energizing the trunk hunting relay R520. At its contacts 446, the relay R440 opens a point in the operating circuits for the switch-through relay R240 and the idle test relay R620.

Shortly following the operation of the busy test relay R440 to perform the functions just described, the pulse-controlled relay R420 restores and opens its contacts 422 to deenergize the transfer relay R470. The latter relay, upon restoring, opens its contacts 476 to deenergize the slow-acting relay R530. At its contacts 478, the relay R470 opens another point in the above-traced circuit for transmitting current pulses to the rotary magnet 507. At its contacts 479, the relay R470 prepares the previously mentioned alternative circuit for transmitting current pulses to the operating magnet 673 of the minor switch 670 during the dialing of the fourth digit. At its contacts 471, the relay R470 reprepares the above-described dial tone signaling circuit. The relay R530, upon restoring, opens its contacts 531 to deenergize the transfer relay R450, and closes its contacts 532 to prepare the operating circuit for the idle test relay R620. At its contacts 535, the relay R530 reprepares the operating circuit for the transfer relay R430.

The transfer relay R450, upon restoring, closes its contacts 457 to complete the prepared locking circuit for the busy test relay R440, this circuit extending by way of the grounded release conductor C272, the contacts 443 and 457, and the winding of R440 to battery. After this circuit is completed the relay R450 opens its contacts 456 to interrupt the operating circuit for the busy test relay, and closes its contacts 455 to prepare the operating circuit for the idle test relay R620. At its contacts 454, the relay R450 opens another point in its own locking circuit. At its contacts 453, the relay R450 reprepares the operating circuit for the transfer relay R470. At its contacts 451, the relay R450 completes the above-mentioned busy tone signaling circuit. This circuit may partially be traced as extending from the high potential terminal of the busy tone generator, interrupter springs of the motor-driven interrupter included in the apparatus 50 shown in Fig. 24 of the drawings, C378, the contacts 441, the condenser 401, C426, the contacts 632, C427, and the contacts 451 to the negative link line conductor C268. From this point the interrupted busy tone current is transmitted through the windings of the repeating coil 345 and over the calling end of the connection to energize the receiver of the handset provided at the calling substation A. The resulting busy signal serves to inform the calling party that the desired connection cannot be obtained.

*Idle test*

In the event the called line 11 is idle at the time it is selected in the manner explained above, the private conductor 11c thereof is marked with negative battery potential so that the winding of the busy test relay R440 is short-circuited over the test circuit as traced above and does not operate. Shortly thereafter, and when the relays R420, R470, R530 and R450 sequentially restore in the order named and in the manner previously explained, the operating circuit for the idle test relay R620 is completed, this circuit extending from ground by way of the release conductor C272, the contacts 446 and 466, C524, the winding of R620, C587, the contacts 532, C429, the contacts 455, C273, the wiper 623, the private conductor 11c, and the cut-off winding of the cut-off relay provided in the line circuit 15, to battery. When energized in this circuit the relay R620 operates after a short interval and closes its contacts 621' to complete a circuit including the grounded hold conductor C291 for energizing the switching relay R630.

In operating, the relay R630 first locks to the grounded hold conductor C291 through its contacts 638. At its contacts 631 and 634, the relay R630 prepares a talking connection between the calling and called lines and prepares a circuit for transmitting ringing current over the called line 11. At its contacts 632, the relay R630 opens a point in the common portion of the previously traced dial and busy tone signaling circuits. At its contacts 633, the relay R630 prepares a circuit for transmitting ringing current over the calling end of the connection to produce the usual ring-back tone signal during the ringing operation. At its contacts 635, the relay R630 completes a circuit for short-circuiting the winding of the idle test relay R620, this path extending from ground by way of the contacts 254, C277, the contacts 635, C273, the contacts 455, C429, the contacts 532, C587, the winding of R620, C524, the contacts 466 and 446, and the release conductor C272 back to ground. At its contacts 635, the relay R630 also completes a path including the conductor C277, the contacts 254, and the wiper 623 for impressing ground potential directly upon the private conductor 11c in order to maintain the busy marking of the line 11. It will be noted from a consideration of the line circuit 14 that when ground potential is impressed upon the private conductor 11c, the cut-off and line relays of the line circuit 15 are energized and operate. The cut-off relay, in operating, functions to disconnect the windings of its associated line relay from the talking conductors of the line 11.

In operating, the switching relay R630 also closes its contacts 636 to prepare the operating circuit for the pickup relay R510. At its contacts 637, the relay R630 disconnects the tone start conductor C680 from ground in the conductor 20, whereby operation of the two signal generators is arrested in the event the start conductor C680 is disconnected from ground in all of the other connectors of the exchange. At its contacts 637', the relay R630 prepares an alternative circuit for energizing the release magnet 674 of the minor switch 670. At its contacts 639, the relay R630 opens a point in one of the available circuits for energizing the drain control relay R600. Following the operation of the switching relay R630 to perform the functions just described, the control equipment of the connector 20 is conditioned to respond to the fourth digit of the directory number designating the desired substation B.

*Dialing the fourth digit*

During the dialing of the fourth digit "3" designating the particular ringing code assigned to the substation B, the two relays R300 and R310 cooperate to transmit three current pulses to the lower winding of the pulse-controlled relay R420 and the operating magnet 673 in parallel. In this case the current pulses are transmitted to the magnet 673 over a circuit which extends from ground by way of the contacts 204 and 246, C296, the contacts 313 and 368, C390, the contacts 547, C517, the contacts 489 and 479, C523, and the winding of the magnet 673 to battery. The relay R420, upon operating at the beginning of the digit, recloses its contacts 421 to again short-circuit the winding of the relay R260. Each time the operating magnet 673 is energized over the above-traced circuit it steps the wipers 671 and 672 one step and closes its contacts 676 to prepare or complete the previously traced circuit for energizing the pulsing relay R310. It will be understood, therefore, that at the end of the digit the wipers 671 and 672 are left standing in engagement with their respective associated third contacts. Incident to the off-normal movement of these wipers the off-normal springs 675 are closed to again energize the relay R580. This relay, upon operating, closes its contacts 536 to reprepare the operating circuit for the release magnet 674 and closes its contacts 585 to reprepare the operating circuit for the relay R540.

Shortly following the end of the fourth digit, the relay R420 restores and opens its contacts 421 to remove the short circuit from the winding of the relay R260. At its contacts 423, the relay R420 completes the operating circuit for the relay R540, this circuit extending by way of the grounded hold conductor C291, the contacts 423, C492, the contacts 484 and 477, C495, the contacts 585 and the winding of R540 to battery. Upon operating, the relay R540 locks to ground over a path including its contacts 545, C495, the contacts 477 and 484, C492, the contacts 423, and the hold conductor C291. At its contacts 547, the relay R540 opens a point in the previously traced circuits for transmitting current pulses to the relay R420 and the three magnets 673, 507, and 417. At its contacts 546, the relay R540 prepares the previously mentioned circuit for energizing the reverting call relay R250. At its contacts 548, the relay R540 opens a point in the operating circuit for the ring transfer relay R640. At its contacts 549, the relay R540 prepares one of the operating circuits for the drain control relay R600. At its contacts 543, the relay R540 opens a point in the initially traced locking circuit for the pulsing relay R310. At its contacts 544, the relay R540 completes an alternative locking circuit for the relay R310, this circuit extending from ground by way of the contacts 544, C388, the resistor 304, the contacts 301, and the winding of R310 to battery. At its contacts 541, the relay R540 prepares the operating circuit for the relay R550. At its contacts 542, the relay R540 prepares the operating circuit for the pickup relay R510.

From the above explanation it will be understood that the pulse-controlled relay R420 is energized and remains operated throughout each digit of each directory number transmitted to the connector 20. This relay is arranged in the manner disclosed and claimed in copending application Serial No. 374,073, filed January 11, 1941, Clarence E. Lomax, to assist in the quick release of the line relay R300 each time the loop circuit extending to the connector 20 over a calling line is broken, and the fast operation of this line relay each time the calling loop circuit is recompleted. In this regard it may be pointed out that the three relays R300, R370 and R420 are of the horizontal type and are mounted close together on a suitable base above the Strowger switching mechanism with the line relay R300 disposed between the two relays R370 and R420. Although each relay has a separate heel piece, the magnetic circuits thereof are in such close proximity to each other that a certain amount of leakage flux from the core or magnetic circuit of one relay links the core or magnetic circuit of each adjacent relay. Moreover, since the line relay R300 is in the center, i. e., disposed between the other two relays, it is in a position to influence and be influenced to the greatest extent by the leakage flux produced by energization of each of the other two relays. This influence is greatly enhanced if the line relay R300 is provided with a brass heel piece in order substantially to increase the leakage flux. The three enumerated relays are mounted with their armature ends facing in the same direction and are wound in a manner such that if the armature end of the line relay R300 is a north magnetic pole, for example, the armature end of the hold relay R370 will also be a north pole, while the armature end of the relay R420 will be a south pole.

With the three relays R300, R370, and R420 arranged in the manner just described, it will be noted that each time the line relay is energized it causes a circuit to be closed for the hold relay R370. The leakage flux produced by the energization of the hold relay will oppose the flux traversing the core or magnetic circuit of the line relay. Accordingly, when the circuit of the line relay is broken it will be deenergized more quickly than it would in the absence of the leakage flux linking therewith. On the other hand, when the circuit of the line relay R300 is again closed after the first interruption, the energization of the release relay is at a minimum, but the change-over or pulse control relay R420 is fully energized and the polarity of the latter relay is such that the leakage flux produced thereby and linking with the magnetic circuit of the line relay assists in the magnetization of the latter relay. Thus, in electromagnetic priming action of the line relay R300 occurs at the end of the open circuit period of each impulse transmitted to the connector 20. Accordingly, the line relay is rendered fast to operate. It will be recalled from the preceding explanation that this priming action of the relay R420 as exerted on the line relay R300 is obtained during each of the four digits transmitted to the connector 20 in setting up a connection to a called subscriber line. Accordingly, the advantages achieved by arranging the three relays R300, R370 and R420 in the manner just described are retained throughout each of the four digits transmitted to the connector.

*Ringing the called substation*

Shortly following the operation of the relay R540 to perform the functions described above, the pickup springs of the interrupter included in the apparatus 50 schematically shown in Fig. 24 of the drawings are closed to transmit a ground pulse over the first pickup lead C576, thereby to energize the pickup relay R510. More specifically, the operating circuit for this relay extends from ground by way of C576, the contacts 571, C588, the contacts 636, C589, the contacts 542, 513 and 553, and the winding of R510 to battery. This pickup pulse occurs just prior to the beginning of each of the available ten ringing codes. When energized over the pickup circuit traced above, the relay R510 operates and locks to ground over a path which includes the contacts 553 and 512, the hold conductor C578, and a set of normally closed springs in the ringing interrupter. After this locking circuit is completed the relay R510 opens its contacts 513 to interrupt its operating circuit as traced above. At its contacts 515, the relay R510 prepares the operating circuit for the ringing relay R610. In this regard, it will be recalled that the wiper 672 of the minor switch 670 is left standing in engagement with the contact terminating the third code lead C692 at the end of the fourth digit dialed at the calling substation. Accordingly, the ringing relay R610 is controlled in accordance with the ground pulses transmitted over this lead by the ringing interrupter. Thus each time this lead is connected to ground, the ringing relay R610 is energized over a circuit which extends therefrom by way of the wiper 672, the winding of R610, C596, and the contacts 515 to battery. This circuit is obviously interrupted each time the lead C692 is disconnected from ground by the ringing interrupter.

Each time the ringing relay R610 operates, it closes its contacts 616 to complete an obvious circuit for energizing the slow-acting drain control relay R600. The latter relay, upon operating, closes its contacts 605 to complete an obvious multiple locking circuit for the switching relay R630. At its contacts 601 and 603, the relay R600 disconnects the line wipers 621 and 622 from the link line conductors C268 and C375. At its contacts 602 and 604, the relay R600 prepares a low resistance path through which the charge accumulated on the line 11 during each ringing interval may be dissipated before the line wipers are again connected to the link line conductors C268 and C375.

Upon operating, the ringing relay R610 also completes a circuit for transmitting ringing current over the called line 11. As will be pointed out more fully, the path traversed by this current depends upon the setting of the ring transfer relay R640 and the character of the called line. In the present case the relay R640 occupies its restored position and it may be assumed that the line 11 is of the full metallic type. Accordingly, the ringing current traverses a circuit which may be traced as extending from the output terminal of the ringing current generator by way of the ringing current conductor C618, the winding of R660, the contacts 641, 612 and 631, the wiper 621, the negative side of the line 11, the parallel-connected ringers bridged across the conductors of this line, the positive side of the line, the wiper 622, the contacts 634, 615 and 643, and the exchange battery to the opposite terminal of the ringing current generator. This circuit is obviously interrupted at the contacts 612 and 615 each time the ringing relay R610 restores at the end of a ringing period. Each time the relay R610 restores it also completes the above-mentioned low resistance path for draining the line 11 of accumulated charges thereon. Thus, it will be noted that, with the relay R600 operated and the relay R610 released, the exchange battery is bridged across the conductors of the line 11 in series with the two resistors 647 and 648 over a path which includes the contacts 602, 604, 611, 614, 631 and 634, and the line wipers 621 and 622. Each time the ringing relay R610 restores it also opens its contacts 616 to deenergize the relay R600. Accordingly, the latter relay restores shortly after each ringing interval to again connect the link line conductors C268 and C375 to the line wipers 621 and 622. The purpose of providing the above-described arrangement for draining the line 11 of accumulated static charges at the end of each ringing period is to prevent a transient current pulse from causing the premature operation of the back-bridge relay R340 before the call is answered at the called substation.

At the end of each ringing code cycle as determined by the operation of the ringing interrupter, the hold conductor C578 is disconnected from ground by the ringing interrupter to deenergize the ring pickup relay R510. Upon restoring, the relay R510 opens its contacts 512 further to interrupt its locking circuit, and closes its contacts 513 to reprepare its operating circuit. At its contacts 515, the relay R510 opens the previously traced circuit for energizing the ringing relay R610 in accordance with the coded ground pulses transmitted over the code conductor C692. After an appropriate spacing interval as determined by the operation of the interrupter, a ground pulse is again transmitted by the ringing interrupter over the first pickup lead C576 to cause the reoperation of the pickup relay R510. From this point on the manner in which the ringing equipment continues to operate to transmit the coded ringing current over the called line 11 is exactly the same as described above. The character of the transmitted code indicates to the subscribers at the various substations served by the line 11 that only the subscriber at the substation B is being called.

The manner in which the ringing control equipment functions to transmit ringing current coded in accordance with the coded ground pulses transmitted over any one of the first five code leads C690 to C694, inclusive, over the called line 11 is exactly the same as explained above. In the event one of the sixth to tenth codes is assigned to the desired substation B, a fourth or ringing digit comprising from six to ten impulses will necessarily be dialed at the calling substation during the dialing operation. Accordingly, the wipers 671 and 672 will be operated to one of the sixth to tenth off-normal positions thereof during the dialing of the ringing digit. Incident to the release of the operating magnet 673 at the end of the sixth current pulse transmitted to this magnet, a circuit is completed for energizing the ring transfer relay R640, this circuit extending from ground by way of the contacts 548, C597, the contacts 677, the wiper 671 and the engaged sixth contacts of the associated contact sets, C498, the contacts 486', C499, the contacts 563 and 574, C595, and the lower winding of R640 to battery. When energized over this circuit the relay R640 locks to the grounded hold conductor C291 through its preliminary make contacts 645. At its contacts 641 to 644, inclusive, the relay R640 rearranges the ringing current transmission circuit so that ringing current is projected over the positive side of the line and returned over the negative side of the line. More specifically, with the relay R640 occupying its operated position, the circuit traversed by the ringing current during each ringing interval extends from one terminal of the ringing current generator by way of the ringing conductor C618, the winding of R660, the contacts 642, 615 and 634, the wiper 622, the positive conductor of the line 11, the ringers bridged across the conductors of this line, the negative side of the line, the wiper 621, the contacts 631, 612 and 644, and the exchange battery to the opposite terminal of the ringing current generator.

In the event the called line 11 is arranged for divided ringing, as many as five of the ringers associated therewith may be connected between the negative side of the line and ground, and as many as five additional ringers may be connected between the positive side of the line and ground. In such case ringing codes corresponding to the first five off-normal positions of the minor switch 670 are assigned to the substations having ringers connected between the negative side of the line and ground, and the remaining five codes, i. e., those corresponding to the sixth to tenth off-normal positions of the minor switch 670, are assigned to the substations having ringers connected between the positive side of the line and ground. With the substation ringers arranged in this manner, if a substation is called having a ringer thereat which is connected between the negative side of the line and ground, the ring transfer relay R640 occupies its restored position during the ringing operation. Accordingly, the circuit traversed by the ringing current extends from the ringing current conductor by way of the winding of R660, the contacts 641, 612 and 631, the wiper 621, the negative side of the line, the ringers connected between this side of the line and ground, and the exchange battery to the ringing current generator. On the other hand, if a substation having a ringer connected between the positive side of the line and ground is called, the ring transfer relay R640 occupies its operated position during the ringing period. Accordingly, ringing current is, during each ringing interval, transmitted over a circuit which extends from the conductor C618 by way of the winding of R660, the contacts 642, 615 and 634, the wiper 622, the positive side of the line 11, the ringers connected between this side of the line and ground, and the exchange battery to the ringing current generator. In either case the one of the five available ringing codes which is selected determines the character of the signal produced by the energized ringers, thereby selectively to signal the subscribers as to which substation is being called.

Regardless of the circuit utilized for transmitting ringing current through the ringer provided at the called substation, a portion of the ringing current is transmitted over the calling end of the connection during each ringing interval to produce the usual ring-back tone signal at the calling substation. The path traversed by this portion of the ringing current may partially be traced as extending from the ringing current conductor C618 by way of the winding of the ring cut-off relay R660, the condenser 646, the contacts 613 and 633, C427, and the contacts 451 to the negative link line conductor C268. From this point the ringing current is transmitted through the windings of the repeating coil 345 and over the calling end of the connection to energize the receiver of the handset provided at the calling substation A, whereby the usual ring-back tone signal is produced at this substation. Obviously, this circuit is opened at the contacts 613 incident to the release of the ringing relay R610 at the end of each ringing period.

*The call is answered*

When the call is answered at the called substation B, a direct current bridge is established between the conductors of the line 11 to cause the energization and operation of the slow-acting ring cut-off relay R660. The circuit over which this relay is energized depends upon the setting of the ring transfer relay R640. In the event this relay occupies its restored position the ring cut-off relay R660 is energized over a circuit which extends from ground by way of the contacts 643, 615 and 634, the wiper 622, the positive side of the line 11, the direct current bridge across the conductors of this line, the negative side of the line, the wiper 621, the contacts 631, 612 and 641, the winding of R660 and the direct current path through the ringing current generator to the negative terminal of the exchange battery. On the other hand, if the ring transfer relay R640 occupies its operated position at the time the call is answered, the ring cut-off relay R660 is energized in a circuit which extends from ground by way of the contacts 644, 612 and 631, the wiper 621, the negative side of the line 11, the direct current bridge established between the conductors of this line at the substation B, the positive side of the line, the wiper 622, the contacts 634, 615 and 642, the winding of R660 and the direct current path through the ringing current generator to the negative terminal of the exchange battery.

When energized over either of the two circuits traced above, the relay R660 operates after an interval and closes its contacts 661 to complete the prepared operating circuit for the stop ringing relay R550, this circuit extending by way of the grounded release conductor C272, the contacts 661, C380, the contacts 541 and the winding of R550 to battery. When energized in this circuit the relay R550 locks to ground over a path including the contacts 541 and 551, and the release conductor C272. At its contacts 553, the relay R550 opens a point in the above-traced operating and locking circuits for the pickup relay R510, causing the latter relay to release, if operated. At its contacts 555, the relay R550 disconnects the ring start conductor C599 from ground, thereby to arrest the operation of the ringing apparatus in the event none of the other connectors of the exchange are in the ringing position. At its contacts 556, the relay R550 prepares an alternative locking circuit for the timing relay R200. At its contacts 557, the relay R550 opens the first prepared locking circuit for the indicated timing relay. At its contacts 554, the relay R550 completes the prepared alternative operating circuit for the release magnet 674, this circuit extending from ground by way of the contacts 365', C385, the contacts 637', C590, the contacts 554 and 586, C519, and the winding of the magnet 674 to battery. When thus energized the magnet 674 attracts its associated holding pawl to permit the release of the wipers 671 and 672. Incident to the return movement of these wipers the off-normal springs 675 are disengaged to deenergize the relay R580. In releasing, the relay R580 opens its contacts 586 to deenergize the release magnet 674, and opens its contacts 585 to interrupt the previously traced operating circuit for the relay R540.

Incident to the release of the relay R510, the contacts 515 are opened to deenergize the ringing relay R610, if operated. In restoring, the ringing relay opens its contacts 616 to deenergize the drain control relay R600, and closes its contacts 611 and 614 to complete the above-described low resistance discharge path. At its contacts 611 and 614, the relay R610 also prepares an answering loop circuit which extends from the called substation B to the repeating coil 345. At its contacts 612 and 615, the relay R610 opens two points in each of the several ringing current circuits traced above. At its contacts 613, the relay R610 opens the above-traced circuit for transmitting ringing current over the calling end of the connection, whereby the ring-back tone signal is terminated. Incident to the release of the ringing relay R610, two points are opened in either of the two above-traced circuits for energizing the ring cut-off relay R660. The latter relay, in restoring, opens its contacts 661 to interrupt the previously traced operating circuit for the stop ringing relay R550.

The drain control relay R600 restores shortly following the release of the ringing relay R610, and opens its contacts 602 and 604 to interrupt the low resistance discharge path. At its contacts 601 and 603, the relay R600 completes the answering loop circuit between the called substation B and the repeating coil 345. This circuit may be traced as extending from ground by way of the winding of the line balancing coil 350, the repeating coil winding 349, C375, the contacts 603, 614 and 634, the wiper 622, the positive side of the line 11, the bridge across the conductors of this line at the substation B, the negative side of the line, the wiper 621, the contacts 631, 611 and 601, C268, the repeating coil winding 348 and the winding of R340 to battery.

In operating, the back-bridge relay R340 closes its contacts 341 to complete a multiple holding circuit for the stop ringing relay R550, this circuit extending from the grounded release conductor C272 by way of the contacts 341, C380, the contacts 541 and the winding of R550 to battery. At its contacts 343, the relay R340 opens a point in one of the multiple operating circuits for the timing relay R200. At its contacts 342, the relay R340 prepares or completes the operating circuit for the battery reversing relay R320. In the present case, wherein the call originated on a subscriber line, the operating circuit for the battery reversing relay R320 is held open at the normal post springs 845 controlled by the Strowger switching mechanism of the finder 19 and through which the two conductors C274 and C275 may be connected together. Accordingly, the relay R320 does not operate and the direction of current flow over the calling line is not reversed incident to the operation of the back-bridge relay R340. Following the operation of this relay the desired conversational connection between the calling and called substations is fully completed. In this regard, it will be noted that talking battery is applied to the conductors of the calling line 10 through the windings of the relays R260 and R300 and the windings 346 and 347 of the repeating coil 345. Talking battery is applied to the conductors of the line 11 through the winding of the impedance element 350 and the winding of the back-bridge relay R340.

*Ringing over 20-party and grounded lines*

From the preceding explanation it will be recalled that all lines serving more than ten substations are included in the lines forming the first one hundred line group. In order to provide the code selecting facilities required for signaling over lines of this character, the first digit is utilized to effect a partial selection of the ringing code. More specifically, first digits of four and five impulses respectively designate different groups of ringing codes each including ten different codes. Thus, if a first digit of four impulses is dialed into the connector from a calling substation, the wipers 671 and 672 are positioned to engage their respective associated fourth contacts at the end of the digit. With the wiper 671 standing in this position, a circuit is completed for energizing the relay R560 incident to the release of the relay R420 at the end of the digit. This circuit extends by way of the grounded hold conductor C291, the contacts 423, C492, the contacts 483, C497, the wiper 671 and its associated engaged fourth contacts, C593, and the lower winding of R560 to battery. When energized in this circuit the relay R560 locks to the grounded hold conductor C291 through its preliminary make contacts 562, and opens its contacts 563 to prevent the ring transfer relay R640 from being energized during the dialing of the succeeding digit. At its contacts 561, the relay R560 opens a point in the circuit which is utilized to energize the trunk hunting relay R520 during a trunk hunting operation. It will be noted that with the relay R560 operated, any one of the available ten codes may be utilized to control the ringing relay R610, depending upon the position of the minor switch wipers 671 and 672 at the end of the fourth digit. It will also be apparent that the ring transfer relay R640 can not be energized during the dialing of the fourth digit. Accordingly, regardless of the code selected, ringing current is transmitted from the conductor C618 through the winding of the ring cut-off relay R660 and over the negative side of the called line to energize the ringers provided at the substations served by this line. If the line is of the ground return type, ground is utilized as the return path for the ringing current.

In the event a first digit comprising five impulses is dialed into the connector 20 from the calling substation, the wipers 671 and 672 are positioned to engage their respective associated fifth contacts at the end of the digit. In this case the relay R570 is energized in response to the release of the relay R420 at the end of the digit, the circuit for energizing the first-mentioned relay extending from the grounded hold conductor C291 by way of the contacts 423, C492, the contacts 483, C497, the wiper 671 and its engaged fifth contacts, C592, and the lower winding of R570 to battery. In operating, the relay R570 first locks to the grounded hold conductor C291 over a path including its preliminary make contacts 573, and then opens its contacts 574 to prevent the ring transfer relay R640 from being energized during the dialing of a subsequent code selecting digit comprising more than five impulses. Thus the transmission of ringing current over the negative side of the line to be selected is insured. At its contacts 571, the relay R570 opens a point in the previously traced operating circuit for the ring pickup relay R510. At its contacts 572, the relay R570 prepares an alternative circuit for energizing the ring pickup relay.

After the desired line has been selected and the ringing digit has been dialed into the minor switch 670 in the manner previously explained, the switching relay R630 is energized and operates further to prepare the operating circuit for the pickup relay R510. In this case the pickup relay is energized over a circuit which includes the second pickup conductor C577. More specifically, when the ringing interrupter functions to transmit a pickup pulse over the conductor C577, the relay R510 is energized in a circuit which includes the contacts 572, C588, the contacts 636, C589, the contacts 542, 513 and 553 and the winding of R510 to battery. Upon operating, the relay R510 locks to the grounded hold lead C578 and closes its contacts 515 to prepare the operating circuit for the ringing relay R610.

As explained in the previously cited copending application, Serial No. 414,252, Lomax and Bakker, the pickup pulse transmitted over the second pickup lead C577 occurs prior to a short preliminary ringing period which is common to the available ten codes. Thus a short ringing interval, which precedes the main portion of the selected code, is introduced into the code, thereby to produce a different code. For example, with the relay R570 operated and the minor switch 670 positioned to select the sixth ringing code, the ringing relay R610 is controlled in accordance with a code which comprises a short preliminary ringing period followed by the remaining ringing periods of the sixth ringing code. On the other hand, if the relay R570 occupies its restored position such that the pickup relay R510 is controlled in accordance with the pickup pulse transmitted over the first pickup lead C576 and the sixth ringing code is selected, the preliminary ringing period is not used.

As indicated above, when either of the two relays R560 and R570 operate, ringing current may only be transmitted over the negative side of a selected called line. This arrangement precludes the possibility of attempting to ring over the grounded side of a line of the ground return type. It will be noted that the arrangement of the ring cut-off relay R660 and the stop ringing relay R550 provides an additional safeguard against this possibility. Thus, if a line of the ground return type is selected by dialing the number "265," for example, and a code selecting digit comprising more than six impulses is then dialed, it is possible to condition the ringing equipment to transmit ringing current over the positive or grounded side of the selected line. In such case, when the ringing relay R610 operates to close the ringing current transmission circuit, the ring cut-off relay is immediately energized in a circuit which extends from the grounded line terminal engaged by the wiper 622, the contacts 634, 615 and 642, the winding of R360 and the direct current path through the ringing current generator to the negative terminal of the exchange battery. When thus energized the relay R660 operates to complete the prepared operating circuit for the stop ringing relay R550. The stop ringing relay, in turn, locks to ground through its contacts 551, and opens its contacts 553 to deenergize the pickup relay R510. The pickup relay, upon restoring, opens its contacts 515 to prevent further operation of the interrupter from producing any further response of the ringing relay R610. By virtue of the various safeguards against ringing over the ground return side of a grounded line, the ringing current generator is protected against short-circuits or heavy overloads.

*Release*

The release of the connection as set up between the substations A and B is entirely under the control of the calling subscriber at the substation A. Thus, if the connection is cleared out at the called substation B prior to its release at the substation A, the only resulting operation is the deenergization and release of the back-bridge relay R340, which relay, in restoring, closes its contacts 343 to reprepare one of the multiple operating circuits for the timing relay R200. When, however, the handset provided at the substation A is restored to its supporting hook or cradle, the calling loop circuit set up between this substation and the connector 20 is interrupted to cause the deenergization and release of the two relays R260 and R300. The relay R260, upon restoring, opens its contacts 261 further to interrupt the incomplete operating circuit for the battery reversing relay R320. The line relay R300, upon restoring, opens its contacts 301 to interrupt the operating and locking circuits for the pulsing relay R310. At its contacts 302, the relay R300 interrupts the locking circuit for the hold relay R370. The relay R310, upon restoring, opens its contacts 312 to interrupt the operating circuit for the hold relay R370. The latter relay, upon restoring, opens its contacts 373 to deenergize the cut-off relay R110. At its contacts 374, the relay R370 opens the operating circuit for the relay R360.

When its lower winding is deenergized in the manner just explained, the cut-off relay R110 restores. In releasing, this relay opens its contacts 112 to deenergize the upper winding of the line relay R100, and closes its contacts 111 and 113 to again connect the windings of the line relay to the conductors of the line 10. Following the release of the line relay R100, the line circuit 14 is fully restored to normal and the line 10 is marked as idle in the connectors having access thereto.

The hold slave relay R360, upon restoring, opens its contacts 361 to disconnect the release conductor C272 from ground and thus initiate the release of the finder 19 in the manner explained below. At its contacts 362, the relay R360 reprepares the all-links-busy circuit individual to the illustrated finder-connector link and extending to the distributor 21. At its contacts 363, the relay R360 reprepares one of the available circuits provided in the connector 20 for impressing ground potential upon the release alarm conductor C281. At its contacts 363', the relay R360 disconnects the restricted service start lead from ground in the connector 20. At its contacts 365, the relay R360 opens the prepared operating circuit for the timing relay R200. At its contacts 366, the relay R360 reprepares the operating circuit for the pulsing relay R310. At its contacts 366', the relay R360 disconnects the hold conductor C291 from ground. At its contacts 367, the relay R360 opens another point in the above-traced locking circuit for the hold relay R370. At its contacts 368, the relay R360 opens a point in the common portion of the previously traced circuits for transmitting current pulses to the pulse-controlled relay R420 and the three magnets 673, 417 and 507. At its contacts 369, the relay R360 prepares an alternative circuit for energizing the release magnet 674 of the minor switch 670. At its contacts 364', the relay R360 completes the prepared operating circuit for the release magnet 257, this circuit extending from ground by way of the contacts 461, C384, the contacts 364', C286, the off-normal springs 259, and the winding of the magnet 257 to battery. When thus energized the release magnet 257 closes its contacts 258 to impress ground potential upon the release alarm conductor C281 and attracts its associated holding pawl to permit the wiper carriage structure of the Strowger switching mechanism to be returned to rotary and vertical normal. Incident to the release of the Strowger switching mechanism, the off-normal springs 259 are disengaged to deenergize the release magnet 257, whereby the contacts 258 are opened to disconnect the release alarm conductor C281 from ground. Also incident to the release of the Strowger switching mechanism, the off-normal springs 225 are closed to recomplete the all-links-busy circuit individual to the illustrated finder-connector link and extending to the distributor 21; the off-normal springs 224 are opened to disconnect the guard conductor C278 from ground, whereby the illustrated link is marked as idle in the distributor 21; and the off-normal springs 425 are engaged to reprepare the operating circuit for the transfer relay R480.

When the hold slave relay R360 restores to disconnect the release conductor C272 from ground in the manner explained above, the busy test relay R440 or the stop-ringing relay R550, if operated, is deenergized and restores. In this regard it will be noted that the locking circuits for the transfer relays R450, R470, R480, R430 and R530 commonly extend to ground over the release conductor C272. Accordingly, if a call routed to the connector 20 is abandoned before the dialing operation is completed, the operated ones of the enumerated relays are all deenergized and restore when the release conductor C272 is disconnected from ground. If the minor switch 670 is off-normal at the time the call is abandoned, the release magnet 674 thereof is energized incident to the release of the relay R360. In this case the magnet 674 is energized over a circuit which extends from ground by way of the contacts 369, C519, the contacts 586, C519 and the winding of the magnet 674 to battery. Incident to the resulting release of the minor switch wipers, the relay R580 is deenergized and opens its contacts 586 to deenergize the magnet 674. When the hold conductor C291 is disconnected from ground the operated ones of the relays R540, R560, R570, R630 and R640 are all deenergized and restore. Thus, it will be apparent that when ground potential is removed from the two conductors C272 and C291, all of the operated relays in the connector are deenergized and restore. Followying the release of the Strowger switching mechanism and the operated relays, the connector 20 is fully restored to normal and may be allotted for use in handling another call.

When the hold conductor C272 is disconnected from ground by the hold relay R360, the relay R800 of the finder is deenergized and restores. In releasing, this relay closes its contacts 807 to complete the prepared operating circuit for the release magnet 839, this circuit extending from ground by way of the contacts 814, the off-normal springs 842, the contacts 807 and the winding of the magnet 839 to battery. In operating, the magnet 839 causes the Strowger switching mechanism of the finder to be released, and closes its contacts 840 to impress ground potential upon the release alarm conductor C281. Incident to the release of the Strowger switching mechanism, the off-normal springs 842 are disengaged to deenergize the release magnet 839; and the off-normal springs 843 are engaged to recomplete the all-links-busy circuit individual to the illustrated link. If operated, the cam springs 844 and the normal post springs 845 and 846 are also returned to normal incident to the release of the Strowger switching mechanism. The magnet 839, in releasing, opens its contacts 840 to disconnect the release alarm conductor C281 from ground. Following the release of the relay R800 and the Strowger switching mechanism, the finder 19 is fully restored to normal.

Private Branch Exchange Calls

The manner in which calls may be routed through the illustrated finder-connector link to the ring-down trunks extending to the private branch exchange 8, for example, is substantially similar to the mode of subscriber line selection as effected through this link in the manner explained above. In considering this type of service it may be assumed that the above-described call originating at the substation A and routed to the connector 20 is intended for a substation connected to a line which terminates at the switchboard of the private branch exchange 8. It may be assumed further that the group of four trunks extending to this branch exchange is designated by the directory number "2911."

When the two impulses of the first digit are dialed into the connector 20 from the substation A, the wipers 671 and 672 of the minor switch 670 are positioned to engage their respective associated second contacts in the manner explained above. At the end of the digit, and when the pulse-controlled relay R420 restores, the transfer relay R430 is deenergized and releases to transfer the pulsing circuit from the operating magnet 673 of the minor switch 670 to the vertical magnet 417 in the exact manner previously explained.

When the second digit of nine impulses is dialed into the connector 20, nine current pulses are transmitted to the parallel-connected windings of the relay R420 and the vertical magnet 417, whereby the wipers 621, 622, 623 and 627 are elevated to a position opposite the ninth level of contacts in the associated contact field, i. e., the level in which the conductors of the four trunks extending to the branch exchange 8 are terminated. Incident to the off-normal movement of the wiper carriage structure, the off-normal springs 224 are engaged; the off-normal springs 225 are disengaged; the off-normal springs 259 are moved into engagement and the off-normal springs 425 are disengaged to perform the functions previously described. Shortly following the end of the second digit the relay R420 restores to cause the deenergization and release of the transfer relay R480. This transfer relay, in restoring, closes its contacts 487 to complete the previously traced operating circuit for the release magnet 674, whereby the wipers of the minor switch 670 are restored to normal. Incident to the release of these wipers the off-normal springs 675 are disengaged to deenergize the relay R590, causing this relay to restore. In releasing, the transfer relay R480 also opens its contacts 488 to prevent further current pulses from being delivered to the vertical magnet 417, and closes its contacts 489 to prepare the previously traced circuit for transmitting current pulses to the rotary magnet 507.

When the third digit of one impulse is dialed into the connector 20 from the calling substation, a single current pulse is transmitted to the parallel-connected windings of the pulse-controlled relay R420 and the rotary magnet 507. When thus energized the relay R420 closes its contacts 422 to complete the previously traced locking circuit for the transfer relay R470 and the previously traced operating circuit for the transfer relay R450. The relay R450, upon operating, closes its contacts 456 to prepare the previously traced busy test circuit. The rotary magnet 507, upon operating, functions to rotate the wiper carriage structure so that the wipers 621, 622, 623 and 627 are moved into engagement with the contacts terminating the conductors of the first trunk 12 extending to the branch exchange 8. In the event this trunk is idle at the time it is thus selected, the private conductor and EC conductors thereof are marked with negative battery potential so that the prepared busy test circuit is not completed. Accordingly, the busy test relay R440 remains in its restored position.

Shortly following the end of the third digit of one impulse the relay R420 restores and opens its contacts 422 to cause the deenergization and release of the three relays R470, R450 and R530, in the manner previously explained. The two relays R450 and R530, upon restoring, complete the previously traced circuit for energizing the slow-to-operate idle test relay R620 in series with one winding of the cutoff relay embodied in the line circuit individual to the selected trunk extending to the branch exchange 8. When thus energized the relay R620 closes its contacts 621' to complete the operating circuit for the line switching relay R630. The latter relay, upon operating, locks to the grounded hold conductor C291 through its contacts 638, and prepares the ringing equipment for ringing current transmission in the manner previously explained.

When the fourth digit of one impulse is dialed into the connector 20, a single current pulse is transmitted to the parallel-connected windings of the relay R420 and the operating magnet 673, whereby the wipers 671 and 672 are positioned to engage their respective associated first contacts and the off-normal springs 675 are engaged to recomplete the operating circuit for the relay R580. From this point on, the manner in which ringing current is transmitted over the selected trunk to energize the drop or other signal device individual to this trunk and provided at the branch exchange switchboard, is exactly the same as described above with reference to the signaling of the called substation B served by the line 11.

Before considering the trunk hunting operation of the connector, it is noted that in the connector contact field, the private and test contacts which are individual to each trunk with the exception of those contacts which are individual to the last trunk of a group, are strapped together and connected to the test conductor of the associated line circuit. Thus, the EC and private contacts which are individual to the trunk 12, are connected together and terminate the test conductor of the line circuit 16. Accordingly, if this trunk is busy, both the private and EC contacts individual thereto are marked with ground potential. On the other hand, if the trunk is idle both contacts are marked with negative battery potential. The EC contact which is individual to the last trunk of the group is not wired, in order that the trunk hunting operation may be arrested after this trunk is selected.

In the event the first trunk is busy at the time it is selected in the manner explained above, the private and EC contacts engaged by the wipers 623 and 627 are marked with ground potential so that the busy test relay R440 is energized immediately the trunk is selected. In this case the relay R440, upon operating, closes its contacts 444 to prepare the operating circuit for the trunk hunting relay R520. During the interdigit pause between the third and fourth digits and shortly after the first trunk of the group is selected and the busy test relay R440 operates, the two relays R420 and R470 are caused sequentially to restore in the manner previously explained. In releasing, the relay R470 closes its contacts 475' to complete the prepared operating circuit for the trunk hunting relay R520, this circuit extending from ground by way of the EC contact individual to the trunk 12, the wiper 627, C591, the contacts 561, C469, the contacts 444 and 475', and C468, the contacts 534 and 509, and the winding of R520 to battery. In operating, the relay R520 locks to the grounded release conductor C272 through its contacts 522, and closes its contacts 521 to complete an alternative circuit for energizing the rotary magnet 507 and the slow-acting control relay R530 in parallel. This circuit extends by way of the grounded release conductor C272, the contacts 533, C448, the contacts 474, C447, and the contacts 521 to the conductor C490 where it divides, one branch extending through the winding of the magnet 507 to battery and the other branch extending by way of the contacts 475', C493, and the lower winding of R530 to battery. When thus energized the magnet 507 steps the wipers 621, 622, 623 and 627 into engagement with the contacts forming the second set of the selected level, thereby to select the second trunk of the group extending to the branch exchange 8. In operating, the magnet 507 also opens its contacts 509 to deenergize the trunk hunting relay R520. The relay R520 now restores and opens its contacts 522 to interrupt its locking circuit as traced above.

In the event the second trunk of the group is also busy, the private conductor thereof is marked with ground potential so that the busy test relay R440 is again energized. In reoperating, this relay again closes its contacts 444 to recomplete the operating circuit for the trunk hunting relay R520, the circuit in this case extending from the grounded EC contact individual to the second trunk to the wiper 627, and from this wiper through the winding of the relay R520. The relay R520, upon reoperating, again locks to the grounded conductor C272, and recloses the circuit for energizing the rotary magnet 507 and the control relay R530 in parallel. Thus the wipers 621, 622, 623 and 627 are again stepped to select the third trunk of the selected group.

The above-described operations are repeated until an idle trunk in the selected group is found, or until all of the trunks have been tested and found to be in a busy condition. During the trunk hunting operation the relay R530, due to its slow-to-release characteristic, remains operated to hold the transfer relay R450 energized. If any one of the tested trunks is found to be idle, the busy test relay R440 remains in its deenergized or restored position upon the selection of the idle trunk. Incident to the selection of an idle trunk, the trunk hunting operation is arrested and the call is extended over the idle trunk to the branch exchange 8 in the exact manner pointed out above.

From the above explanation, it will be understood that the starting of the trunk hunting operation occurs in response to the sequential release of the transfer relays R420 and R470 at the end of the third digit dialed into the connector. It will also be recalled that the two relays R450 and R530 are held operated during the trunk hunting operation. Following the release of the relay R470, the pulse-controlled relay R420 is rendered ineffective to control any of the transfer relays R450, R460, R470 and R480, or the control relay R530. Moreover, neither of the two operated relays R450 and R530, utilized in effecting the trunk hunting operation, are used to control the above-traced pulsing circuit over which the impulses of the fourth or code selecting digit are repeated to the operating magnet 673 or the minor switch 670. Accordingly, it will be understood that the fourth or code selecting digit may be dialed into the connector 20 to set the minor switch in the position corresponding to the desired ringing code, concurrently with the operation of the trunk hunting facilities to select an idle trunk in the selected trunk group.

In the arrangement illustrated, wherein it is assumed that four trunks to the branch exchange 8 are provided, the EC contact individual to the fourth trunk is not wired. Accordingly, after the wipers 621, 622, 623 and 627 have been operated four steps in the rotary direction, no further circuit is available for energizing the trunk hunting relay R520 and the trunk hunting operation is arrested. Assuming that the fourth trunk of the group is tested and found busy, the busy test relay is energized over a test circuit which includes the private conductor of this trunk. Shortly after the selection of the trunk is effected, the slow-acting control relay R530 and the transfer relay R450 are deenergized and restore in sequence. In releasing, the relay R450 completes the previously traced locking circuit for the busy test relay R440, and closes the previously described busy signaling circuit. Thus a busy signal is produced at the calling substation which informs the calling party that the desired connection cannot be obtained.

Automatic Trunk Selection

In considering the operation of the connector 20 automatically to select an inter-office trunk and to switch a calling loop circuit through to the repeater associated with the selected trunk, it may be assumed that the above-described call originating at the substation A is intended for a subscriber served by the manual office 25. It may be further assumed that the directory number "0" is assigned to the group of inter-office trunks connecting the illustrated community exchange with the automatic exchange 25. After the call is extended to the connector 20, and when the single digit "0" is dialed into the connector from the calling substation A, ten current pulses are transmitted to the pulse-controlled relay R420 under the control of the line and pulsing relays R300 and R310. The first six current pulses are also transmitted to the operating magnet 673 of the minor switch 670, so that during the sixth impulse of the digit the wipers 671 and 672 are stepped to engage their respective associated sixth contacts. Incident to this operation a circuit through the wiper 671 is prepared for energizing the first digit pulse transfer relay R500. Shortly thereafter, and when the magnet 673 restores at the end of the sixth current pulse transmitted thereto, it closes its contacts 677 to complete the prepared operating circuit for the relay R500. This circuit extends from ground by way of the contacts 548, C597, the contacts 677, the wiper 671 and its engaged sixth contacts, C498, the contacts 486, C494, and the lower winding of R500 to battery. A branch of this circuit extends through the contacts 475, C468, the contacts 534 and 509 and the winding of the trunk hunting relay R520 to battery. Thus the two relays R500 and R520 both operate at the end of the sixth impulse of the digit. In operating, the trunk hunting relay R520 locks to the grounded release conductor C272 through the contacts 509 and 522. At its contacts 521, the relay R520 prepares the previously described circuit over which the rotary magnet 507 is operated during a trunk hunting operation. The relay R500, upon operating, locks to the grounded hold conductor C291 through its preliminary make contacts 506, and opens its contacts 504 to prevent the remaining current pulses of the trunk selecting digit from being transmitted to the operating magnet 673 of the minor switch 670. At its contacts 503, the relay R500 prepares the operating circuit for the relay R460. At its contacts 502, the relay R500 completes an alternative locking circuit for the two transfer relays R470 and R480, this circuit extending from the grounded hold conductor C291 by way of the engaged contacts 422 of the operated pulse-controlled relay R420, C439, the contacts 502, C438, the contacts 472, and the parallel-connected windings of the two transfer relays R470 and R480 to battery. At its contacts 501 and 502, the relay R500 completes a circuit for energizing the transfer relay R450, this circuit extending from the grounded hold conductor C291 by way of the contacts 422, C439, the contacts 502, C438, the contacts 472, C436, the contacts 501, C437, and the lower winding of R450 to battery. The relay R450, upon operating, locks to the grounded release conductor C272 through the contacts 454 and 531; opens the operating circuit for the transfer relay R470; opens the incomplete operating circuit for the idle test relay R620; and closes its contacts 456 to prepare the operating circuit for the busy test relay R440. At its contacts 451, the relay R450 opens a point in the previously traced busy signaling circuit.

In operating, the relay R500 also closes its contacts 505 to complete a circuit over which the remaining four current pulses of the digit are repeated by the two relays R300 and R310 to the vertical magnet 417. More specifically, this circuit, which is completed at the contacts 313 each time the pulsing relay R310 restores, extends from ground by way of the contacts 204 and 246, C296, the contacts 313 and 368, C390, the contacts 547, C517, the contacts 488 and 435, C459, the contacts 505, C467, and the winding of the magnet 417 to battery. Each time the vertical magnet 417 is energized in this circuit it closes its contacts 418 to reprepare or recomplete the operating circuit for the pulsing relay R310 and steps the wiper carriage structure of the Strowger switching mechanism one step in the vertical direction. It will be understood, therefore, that after the remaining four impulses of the digit have been transmitted to this magnet, the wipers 621, 622, 623 and 627 are positioned opposite the fourth level of contacts in the associated contact field, i. e., the level in which the trunks extending to the manual office 25 are terminated. Incident to the off-normal movement of these wipers, the vertical off-normal springs 425 are disengaged to open the operating circuit for the transfer relay R480, and the other off-normal springs 224, 225 and 259 are operated to perform the functions previously described.

Shortly following the end of the digit the relay R420 restores and opens its contacts 422 to interrupt the locking circuits for the transfer relays R470 and R480. At these contacts the operating circuit for the transfer relay R450 is also opened but the latter relay is held energized over its locking circuit as traced above. In releasing, the relay R480 opens its contacts 486 to interrupt the above-traced circuit for energizing the relays R500 and R520 in parallel. At its contacts 486', the relay R480 completes a circuit for energizing the ring transfer relay R640, this circuit extending from ground by way of the contacts 548, C597, the contacts 677, the wiper 671 and its engaged sixth contacts, C498, the contacts 486', C499, the contacts 563 and 574, C595 and the lower winding of R640 to battery. In operating, the relay R640 locks to the grounded hold conductor C291. The remaining switching operations performed by this relay are without effect in the present instance. At its contacts 488, the relay R480 opens another point in the common portion of the previously traced circuits for transmitting current pulses to the vertical magnet 417 and the operating magnet 673. The remaining switching operations performed incident to the release of the transfer relay R450 are without effect at this time.

The relay R470, upon restoring, opens its contacts 472 further to interrupt the above-traced locking circuit for itself and the transfer relay R480 and the operating circuit for the transfer relay R450. At its contacts 475, the relay R470 opens another point in the operating circuit for the trunk hunting relay R520. At its contacts 475', the relay R470 prepares an alternative circuit for energizing the trunk hunting relay R520. At its contacts 476, the relay R470 opens the locking circuit for the slow-acting control relay R530. At its contacts 476', the relay R470 prepares a circuit for energizing the relay R530 in parallel with the rotary magnet 507 during the trunk hunting operation. At its contacts 477, the relay 470 completes the previously traced operating circuit for the relay R540. At its contacts 477', the relay R470 opens a point in one of the available operating circuits for the release magnet 674. The relay R540, upon operating, locks to the grounded hold conductor C291 through its contacts 545, and opens its contacts 547 further to interrupt the common portion of the pulsing circuits over which current pulses are delivered to the magnets 673, 507 and 417, and to the relay R420. At its contacts 546, the relay R540 prepares a path for impressing ground potential upon the test conductor C273. At its contacts 548, the relay R540 opens a point in the common portion of the above-traced operating circuits for the relays R520, R500 and R640. At its contacts 549, the relay R540 prepares an alternative operating circuit for the drain control relay R600. At its contacts 543 and 544, the relay R540 opens the initially established locking circuit for the relay R310, and completes an obvious alternative locking circuit for this relay. At its contacts 542, the relay R540 prepares the operating circuit for the pickup relay R510. At its contacts 541, the relay R540 prepares the operating circuit for the stop ringing relay R550.

At its contacts 474, the relay R470, in releasing, completes an automatic cut-in circuit over which the rotary magnet 507 is energized to rotate the wipers 621, 622, 623 and 627 into engagement with the contacts terminating the conductors of the first trunk in the selected trunk group. This circuit extends from the grounded release conductor C272 by way of the contacts 533, C448, the contacts 474, C447, the contacts 521 and the winding of the magnet 507 to battery. A branch of this circuit extends from the contacts 521 by way of C490, the contacts 476' and C493 to energize the lower winding of the control relay R530. It will be understood that a current pulse is transmitted over this branch circuit each time the rotary magnet 507 is energized. Due to its slow-to-release characteristic the relay R530 remains operated during the trunk hunting operation. A second branch of the automatic cut-in circuit extends from the conductor C447 by way of the contacts 503, C284 and the winding of R460 to battery. In operating, the relay R460 closes its contacts 463 to connect the release conductor C272 to the control conductor C270 and thus prepare a circuit for holding the cut-off relay R110 operated after the switching through operation to an idle repeater is effected. At its contacts 461, the relay R460 opens a point in the operating circuit for the release magnet 257. At its contacts 462, the relay R460 opens a point in the prepared path for impressing ground potential upon the test conductor C273. At its contacts 464, the relay R460 opens a point in one of the initially completed paths connecting the two conductors C270 and C272. At its contacts 466, the relay R460 opens a point in the incomplete operating circuit for the idle test relay R620. At its contacts 465, the relay R460 short-circuits the switch-through relay R240 and in so doing prepares a circuit for energizing its own winding in series with the winding of the switch-through relay R240.

As indicated above, when the rotary magnet 507 is energized in the above-traced automatic cut-in circuit, it functions to step the wipers 621, 622, 623 and 627 into engagement with the contacts terminating the conductors of the first trunk in the selected group. In operating, the magnet 507 also opens its contacts 509 to interrupt the locking circuit for the trunk hunting relay R520. The latter relay, upon restoring, opens its contacts 522 further to interrupt its locking circuit, and opens its contacts 521 to deenergize the parallel-connected windings of the magnet 507 and the control relay R530. The magnet 507 now restores and closes its contacts 509 to prepare the operating and locking circuits for the trunk hunting relay R520.

Further operation of the trunk hunting facilities depends upon whether or not the first trunk of the group, as selected in the manner just explained, is idle or busy. In this regard it is pointed out that the test and EC contacts indidual to each inter-office trunk repeater, with the exception of the repeater terminating the last trunk of the group, are strapped in the bank contacts of the various connector switches. Thus it will be noted that the test conductor 26c of the repeater 35 terminating the trunk 26 is connected to both the test contact 1605 and the EC contact 1606 of the contact bank in the illustrated connector switch 20. Accordingly, when this repeater is busy ground potential is impressed upon both of the contacts 1605 and 1606. In the event the trunk 26 is the first trunk of the group, the wipers 621, 622, 623 and 627 will engage the contacts 1603, 1604, 1605 and 1606, respectively, at the end of the first rotary step taken by these wipers. Moreover, if the repeater 35 is occupied with a call the contact 1605 is marked with ground potential so that the operating circuit for the busy test relay R440 is completed incident to the selection of the trunk. In operating, the relay R440 closes its contacts 444 to complete a circuit through the EC wiper 627 and the grounded EC contact 1606, for energizing the trunk hunting relay R520. More specifically, this circuit extends from the grounded contact 1606 by way of the wiper 627, C591, the contacts 561, C469, the contacts 444 and 475', C468, the contacts 534 and 509, and the winding of R520 to battery. At its contacts 446, the relay R440 opens the path short-circuiting the winding of the switch-through relay R240. At its contacts 445, the relay R440 prepares the above-mentioned path for impressing ground potential upon the test conductor C273.

In reoperating, the relay R520 recloses the circuit for energizing the parallel-connected windings of the magnet 507 and the relay R530. The magnet 507 now reoperates to step the wipers 621, 622, 623 and 627 into engagement with the contacts terminating the conductors of the repeater individual to the second trunk of the selected group. At its contacts 509, the magnet 507 deenergizes the trunk hunting relay R520. The relay R520, upon restoring, opens its contacts 521 to deenergize the rotary magnet 507.

If the second trunk of the selected group is also busy the busy test relay R440 is again energized and reoperates to recomplete the operating circuit for the trunk hunting relay R520, this circuit now extending to ground through the wiper 627 and the EC contact individual to the second trunk of the selected group. In reoperating, the trunk hunting relay R520 again closes the operating circuit for the rotary magnet 507, whereby the wipers 621, 622, 623 and 627 are again stepped to engage the contacts terminating the conductors of the repeater associated with the third trunk in the selected group. The trunk hunting operation of the connector 20 continues until all trunks of the selected group are tested and found to be busy, or until an idle trunk in the group is located.

Assuming that the trunk group includes four trunks, and further that all of these trunks are busy, the wipers 621, 622, 623 and 627 are operated to the fourth rotary off-normal position wherein they engage the contacts terminating the conductors of the repeater associated with the last trunk in the group. Since the EC contact in this contact set is not wired, the wiper 627 is disconnected from ground and, accordingly, no further circuit is available for energizing the trunk hunting relay R520. If the fourth trunk of the group is also busy, it will be understood that the busy test relay R440 reoperates upon the selection of this trunk, but since the trunk hunting relay R520 remains in its restored position upon the selection of the trunk, no further current pulses are transmitted to the control relay R530. The latter relay accordingly restores shortly after the last trunk of the group is selected. In releasing, the relay R530 opens its contacts 531 to deenergize the transfer relay R450. At its contacts 533, the relay R530 opens the operating circuit for the relay R460 and a point in the operating circuit for the rotary magnet 507. At its contacts 534, the relay R530 opens a point in the operating circuit for the trunk hunting relay R520. The remaining circuit switching operations performed incident to the release of the relay R530 are without effect at this time. The relay R460, upon restoring, closes its contacts 461 to reprepare the operating circuit for the release magnet 257. The remaining circuit switching operations performed incident to the release of the relay R460 are without effect at this time. The transfer relay R450, upon restoring, closes its contacts 457 to complete the locking circuit for the busy test relay R440 and closes its contacts 451 to complete the previously traced busy signaling circuit. When this circuit is completed, busy tone current is transmitted over the calling end of the connection to signal the calling subscriber that the desired connection cannot be obtained. After receiving the busy signal the calling subscriber may release the connection in a manner clearly apparent from the preceding explanation.

Assuming now that the trunk 26 is the first idle trunk in the selected group, the trunk hunting operation of the connector 20 is arrested when the wipers 621, 622, 623 and 627 are operated to engage the contacts 1603, 1604, 1605 and 1606, respectively. With the trunk 26 idle, the test and EC contacts 1605 and 1606 are marked with negative battery potential, so that the busy test relay is not reoperated. With the busy test relay in its restored position, the trunk hunting operation of the connector is arrested. When the relays R530 and R450 sequentially restore shortly after the trunk is selected, the path short-circuiting the winding of the switch-through relay R240 is opened at the contacts 533, permitting the two relays R240 and R460 to be energized in series over a circuit which extends from the grounded release conductor C272 by way of the contacts 446 and 465, C227, the winding of R240, C284, and the winding of R460 to battery. The current traversing this circuit is sufficient to maintain the relay R460 in its operated position and to cause the operation of the switch-through relay R240.

In operating, the relay R240 closes its contacts 245 to complete a path including the grounded release conductor C272, the test conductor C273, and the wiper 623 for impressing ground potential upon the conductor 26c, thereby to mark the selected trunk 26 as busy. At its contacts 245', the relay R 240 completes an obvious multiple path for impressing ground potential upon the start lead C389. At its contacts 246, the relay R240 opens the previously traced operating and locking circuits for the hold relay R370. At its contacts 242 and 244, the relay R240 switches the calling loop circuit through to the repeater 35. At its contacts 241 and 243, the relay R240 opens the loop circuit as initially extended to the connector 20, thereby to cause the deenergization and release of the three relays R300, R260 and R310.

When the calling loop circuit is extended over the conductors C263 and C266 to the repeater 35, certain of the relays embodied therein operate in the manner explained below to connect the test conductor 26c and the connected conductors C273 and C272 to ground, thereby to provide locking circuits for the relays R240 and R460. In operating, these relays of the repeater also condition the repeater to transmit a signal over the trunk 26 to the manual office 25, and close a path for impressing ground potential upon the control conductor C270 for the purpose of maintaining the cut-off relay R110 operated and the line 10 marked as busy in the bank contacts of the connectors after the hold slave relay R360 releases. This ground path may partially be traced as extending by way of the grounded test conductor 26c, the wiper 623, C273, the contacts 245, C272, the contacts 463, C299, and the contacts 223 to the control conductor C270.

Shortly following the operation of the repeater 35 to perform the functions just described, the hold relay R370 restores and opens its contacts 373 and 374 to deenergize the hold slave relay R360. The relay R360, upon restoring, opens its contacts 365 to interrupt the operating circuit for the timing relay R200 and thus render the timing facilities of the connector 20 inactive. At its contacts 361, the relay R360 opens the only remaining path in the connector 20 over which ground potential is impressed upon the release conductor C272 and the connected conductors C270 and C273. At its contacts 363, the relay R360 completes the previously described path for impressing ground potential upon the release alarm conductor C281. At its contacts 364', the relay R360 prepares the operating circuit for the release magnet 257. At its contacts 366', the relay R360 disconnects the hold conductor C291 from ground, thereby to cause the deenergization and release of any operated ones of the relays R200, R500, R540 and R640. At its contacts 369, the relay R360 recompletes one of the above-traced operating circuits for the release magnet 674, whereby the minor switch 670 is restored to normal. Incident to the release of this switch, the off-normal springs 675 are disengaged to deenergize the relay R580. In restoring, the relay R580 opens its contacts 583 to disconnect the release alarm conductor C281 from ground. Following the release of the last-mentioned relay, no further operation of the control equipment embodied in the connector 20 occurs until the connection is released. In this regard it will be noted that after the switch-through operation is effected, the calling loop circuit as extended to the repeater 35 is cleared of all impedances which might interfere with the transmission of supervisory signals to this repeater. It will also be noted that only the two relays R240 and R460 are operated in the connector 20 after the switch-through operation is completed. The manner in which the call is extended to the desired substation through the manual office 25 is explained hereinafter.

The circuit arrangement of the repeater 35 is such that the release of the connection as extended through the connector 20 and the repeater 35 to the manual office 25, is under the control of the operator handling the call in the manual office. With this arrangement, when the calling subscriber hangs up to interrupt the loop circuit extending to the repeater 35, an on-hook supervisory signal is transmitted to the operator handling the call in the manual office 25. When the operator clears out the connection, the operated control relays of the repeater 35 are deenergized and restore. Incident to the release of these relays, the connected conductors 26c, C273, C272 and C270 are disconnected from ground. When the conductor 36c is disconnected from ground, the line circuit 27 is released in a manner which will be clearly apparent from the following explanation. When the control conductor C270 is disconnected from ground, the line circuit 14 is also released in a manner clearly apparent from the preceding explanation. When the release conductor C272 is disconnected from ground the finder 19 is caused to release and the two operated relays R240 and R460 of the connector 20 are deenergized and restore. In releasing, the relay R460 closes its contacts 461 to complete the prepared operating circuit for the release magnet 257. This magnet, upon operating, closes its contacts 258 to impress ground potential upon the release alarm conductor C281 and attracts its associated holding pawl to cause the release of the wiper carriage structure embodied in the Strowger switching mechanism of the connector 20. When this structure is restored to its rotary and vertical normal position, the off-normal springs 425, 224, 225 and 259 are respectively operated to their normal positions. Incident to the disengagement of the off-normal springs 259, the release magnet 257 is deenergized. In releasing, this magnet opens its contacts 258 to disconnect the release alarm conductor C281 from ground. Following the release operations just described, all of the equipment utilized in handling the call is fully restored to normal and rendered available for further use.

The manner in which calls may be routed through the illustrated finder-connector link to the other inter-office trunks terminating in the bank contacts thereof, is exactly the same as just described with reference to the selection and seizure of an idle trunk in the group which includes the trunk 26. For example, the trunk 29 extending to the manual office 28 may be seized through the outlet contacts of the connector 20 and the repeater 45 when the appropriate digit is dialed into this connector, in the exact manner described above. The trunks of this group may, if desired, be terminated in the third level of bank contacts of the connector 20, in which case the directory number designating the group of trunks will comprise the single digit "9."

RESTRICTED SERVICE

As pointed out previously, provisions are made in the system for imposing different restrictions on the service rendered any particular subscriber line. In the system under consideration, wherein all connections between calling and called lines are set up through the finder-connector links, the service restricting facilities are provided directly in the links. In the system arrangement described below, however, wherein selectors are interposed between the finders and the connectors, and the inter-office trunk repeaters are seized directly through the outlet contacts of the selectors, the service restricting facilities are incorporated in the repeaters which terminate restricted trunks so that the restrictions are imposed on a per trunk basis. The illustrated trunk repeater 35 which terminates the restricted trunk 26 in the community exchange may be wired for use in either type of system. Thus, if this repeater is to be used in the system under consideration, wherein only finders and connectors are provided for line switching purposes, the service restricting relay R1600 is omitted therefrom, the "W" wiring is omitted, the "X" wiring is used, the "S" wiring is omitted, and the "C" wiring is used. On the other hand, if this repeater is to be used in an exchange employing finders, selectors, and connectors for line switching purposes, and is arranged for seizure directly through the outlet contacts of the selectors, the service restricting relay R1600 is provided therein, the "W" wiring is used, the "X" wiring is omitted, the "S" wiring is used, and the "C" wiring is omitted. The purpose of the two different wiring arrangements will be more readily apparent from the following detailed explanation of the manner in which inter-office calls involving the manual office 25 are handled.

Considering first the operation of the service restricting facilities provided in the illustrated link, it is noted that any subscriber line may be prevented from obtaining access to the trunks of three different trunk groups. These different trunk groups are identified by the settings of the normal post springs, 205, 206 and 217, 218, 219 at the end of the vertical movement of the connector wipers 621, 622, 623 and 627. For example, if a trunk selecting digit is dialed into the connector which designates the first group of restricted trunks, the normal post springs 205 are opened and the normal post springs 206 are closed. If a trunk selecting digit designating the second group of restricted trunks is dialed into the connector 20, the normal post springs 217 are closed; the normal post springs 219 are opened; and the normal post springs 218 are closed. Finally, if a trunk selecting digit designating the third group of restricted trunks is dialed into the connector, the normal post springs 205 are opened: the normal post springs 206 are closed; the springs 219 are opened and the springs 217 and 218 are respectively operated into engagement. Thus it will be understood that the setting of the indicated normal post springs after a trunk selecting digit has been dialed into the connector, serves to indicate the particular trunk group which has been selected. These springs serve directly to control the circuits over which the service restricting relay R210 may be energized from the network 40 illustrated in Figs 11 and 12 of the drawings.

The purpose of this network is to provide three different signals which respectively designate the different restrictions and line signals which designate the different lines upon which restrictions are to be imposed. In considering the operation of this network it may be assumed that the illustrated finder-connector link is seized over a calling line and that a connection is extended from this line to the connector 20 to cause the operation of the hold slave relay R360 in the manner previously explained. As previously noted, this relay, in operating, closes its contacts 363' to impress ground potential upon the start conductor C389 and thus energize the start relay R1100. In operating, the relay R1100 closes its contacts 1101 to prepare operating, release and locking circuits for the relays R1140, R1150, R1160 and R1170. At its contacts 1102, the relay R1100 completes an obvious circuit for energizing the slow-to-operate relay R1110. In operating, the relay R1110 opens its contacts 1111 to remove the short-circuit from the winding of the slow-to-operate relay R1120, permitting the latter relay to be energized in an obvious circuit. The relay R1120, upon operating, closes its contacts 1121 to energize the slow-acting relay R1130. The relay R1130 now operates and closes its contacts 1132 to short-circuit the relay R1110. The relay R1110 releases after an interval and closes its contacts 1111 to short-circuit the relay R1120. When the relay R1120 restores it opens its contacts 1121 to deenergize the relay R1130. The relay R1130 now restores and opens its contacts 1132 to interrupt the path short-circuiting the winding of the relay R1110. From this point on the three relays R1110, R1120 and R1130 continue to operate in a cyclic manner until ground potential is removed from the start conductor C389 to cause the deenergization and release of the start relay R1100. It will be understood from the foregoing explanation that the relay R1130 alternately operates and restores to open and close its contacts 1131 at spaced intervals.

Upon first operating to close its contacts 1131, the relay R1130 completes circuits commonly extending to ground through the contacts 1101 and respectively including the contacts 1142 and 1152 for energizing the lower winding of the relay R1140 and the two windings of the relay R1150 in parallel. As indicated by the legends appended thereto, the four relays R1140, R1150, R1160 and R1170 are all of the differentially wound type. Accordingly, the relay R1150 does not operate when its two windings are concurrently energized. The relay R1140, upon operating, first closes its contacts 1141 to complete an obvious alternative circuit for energizing its lower winding in parallel with the lower winding of the relay R1150. After this circuit is completed the relay R1140 opens its contacts 1142 to interrupt the initially completed circuit for energizing its lower winding and the lower winding of the relay R1150 in parallel.

When the relay R1130 first restores, it opens its contacts 1131 to deenergize the upper winding of the relay R1150, permitting the latter relay to operate due to the continued energization of its lower winding. In operating, the relay R1150 opens its contacts 1152 further to interrupt the circuit for energizing its upper winding, and closes its contacts 1153 to prepare the circuit for energizing the upper winding of the relay R1140. At its contacts 1151, the relay R1150 completes a circuit including the contacts 1162, 1171 and 1101 for energizing in parellel the lower winding of R1160 and the two windings of R1170. When this circuit is completed, only the relay R1160 operates. In operating, the relay R1160 closes its contacts 1161 to complete an obvious alternative circuit for energizing its lower winding in parallel with the lower winding of R1170. After this circuit is completed the relay R1160 opens its contacts 1162 to interrupt the initially completed circuit for energizing its lower winding in parallel with the lower winding of R1170.

The second time the relay R1130 operates to close its contacts 1131, it completes a circuit through the contacts 1153 for energizing the upper winding of the relay R1140. When its two windings are thus concurrently energized, the relay R1140 restores to again include the contacts 1131 in the circuit for energizing its own lower winding in parallel with the lower winding of R1150.

The second time the relay R1130 restores, it opens its contacts 1131 to deenergize the lower winding of the relay R1150. The relay R 1150 now restores and opens its contacts 1151 to interrupt the circuit for energizing the upper winding of R1170. At this time only the lower winding of the relay R1170 is energized. Accordingly, this relay operates and closes its contacts 1172 to prepare the circuit for energizing the upper winding of the relay R1160. At its contacts 1171, the relay R 1170 opens another point in the circuit for energizing its own upper winding.

The third time the relay R1130 operates to close its contacts 1131, the relay R1140 reoperates and both windings of the relay R1150 are again energized. The third time the relay R1130 restores to open its contacts 1131, the upper winding of the relay R1150 is deenergized and this relay reoperates. In reoperating, the relay R1150 closes its contacts 1151 to complete a circuit through the contacts 1172 for energizing the upper winding of the relay R1160. The relay R1160 now restores and closes a circuit through the contacts 1162, 1172 and 1151 for energizing its two windings in parallel with the lower winding of the relay R1170.

The fourth time the relay R1130 recloses its contacts 1131, it completes the circuit for energizing the upper winding of the relay R1140. The relay R1140 now restores to include the contacts 1131 in the circuit for energizing its two windings in parallel with the lower winding of the relay R1150. The fourth time the relay R1130 releases, it opens its contacts 1131 to deenergize the parallel-connected windings of the two relays R1140 and R1150. The relay R1150 now restores and opens its contacts 1151 to deenergize the parallel-connected windings of the relays R1160 and R1170, causing the relay R1170 to restore. From this point on the manner in which the four relays R1140, R1150, R1160 and R1170 continue to interact under the control of the pulsing relay R1130 is exactly the same as explained above. It will be understood from this explanation that these four relays follow a definite cycle in operating and releasing.

During the period of each operating cycle of the four differentially wound relays when the relay R1140 is alone operated, a circuit is completed for energizing the pulsing relays R1220 and R1230 in parallel, this circuit extending from ground by way of the contacts 1143, 1154 and 1174, C1177 and the parallel-connected windings of R1220 and R1230 to battery. During the period of each operating cycle of the four differentially wound relays when the two relays R1150 and R1160 are operated and the relays R1140 and R1170 are restored, a circuit is completed for energizing the pulsing relays R1240 and R1250 in parallel, this circuit extending from ground by way of the contacts 1144, 1155 and 1163, C1178 and the parallel-connected windings of R1240 and R1250 to battery. During the period of each operating cycle of the four differentially wound relays when the relays R1140, R1160 and R1170 are operated and the relay R1150 is restored, a circuit is completed for energizing the pulsing relays R1200 and R1210 in parallel, this circuit extending from ground by way of the contacts 1143, 1154 and 1173, C1176 and the parallel-connected windings of R1200 and R1210 to battery. From a careful consideration of the pattern of the operating cycle of the four differentially wound relays, it will be observed that the six relays R1220, R1230, R1240, R1250, R1200 and R1210 are sequentially operated in pairs at spaced and nonconcurrent intervals of equal duration, during each operating cycle of the four differentially wound relays. In this regard it is noted that the terminals 1281 to 1287 of the distributing frame 1260 are common to the links and lines, and respectively correspond to the different restrictions, singly and in different combinations. For example, the terminal 1281 is utilized in the wiring of the line circuits associated with those lines which are only to be restricted against the use of the trunks in the third restricted trunk group. The terminal 1287, on the other hand, is common to the circuit wiring of those line circuits which terminate lines that are to be restricted only against the use of trunks in the second restricted trunk group. The terminal 1285 is utilized in restricting any line against the use of trunks in the first restricted trunk group. More generally considered, the terminal 1282 is used in restricting lines against the use of trunks in the first and third groups, the terminal 1283 designates restrictions against the use of trunks in the second and third groups, the terminal 1284 designates restrictions against the use of trunks in all three of the restricted groups, and the terminal 1286 designates restrictions against the use of trunks in the first and second groups.

More specifically, the two relays R1220 and R1230, in operating, provide the line and service restricting signal pulses which are utilized for restricting certain of the lines of the system against the use of the trunks in the first restricted trunk group. Thus, each time the relay R1220 operates it closes its contacts 1221, 1222, 1223 and 1224 to impress ground potential upon the terminals 1282, 1284, 1285 and 1286, respectively, of the distributing frame 1260. Concurrently therewith the relay R1230 operates and closes its contacts 1231 and 1238 to impress negative battery potential upon the service restricting leads C1225 and C1288, respectively, which extend to the illustrated link and to the second link, respectively. This relay is equipped with additional make contacts, not shown, individual to the other links, not shown, through which negative battery potential is imposed upon the service restricting leads which extend to the other links and represent the first service restriction.

The two relays R1240 and R1250, in operating, provide the signal pulses for restricting certain of the lines against the use of the trunks in the second restricted trunk group. Thus the relay R1240, upon operating, closes its contacts 1241, 1242, 1243 and 1244 to impress ground potential upon the terminals 1283, 1284, 1286 and 1287, respectively. Concurrently therewith, the relay R1250 closes its contacts 1258 and 1251 to include the resistor 1259 in a path for impressing negative battery potential upon the service restricting leads C1226 and C1289 which commonly designate the second group of trunks and individually extend to the service restricting relays of the illustrated link and the service restricting relays of the second link. The relay R1250 is also provided with additional contacts, not shown, through which negative battery potential is impressed upon the service restricting leads designating the second restriction and individually extending to the other links of the exchange.

The two relays R1200 and R1210, in operating, provide the signal pulses for restricting certain of the lines against the use of the trunks in the third restricted trunk group. Thus the relay R1200, upon operating, closes its contacts 1201, 1202, 1203 and 1204 to impress ground potential upon the terminals 1281, 1282, 1283 and 1284. Concurrently therewith the relay R1210 closes its contacts 1218 and 1211 to include the resistor 1219 in a path for impressing negative battery potential upon the service restricting leads C1293 and C1227 which commonly designate a restriction against access to the trunks of the third restricted group and individually extend to the service restricting relays of the illustrated link and the corresponding relays of the second link. The relay R1210 is also equipped with additional contacts, not shown, through which negative battery potential is impressed upon the service restricting leads which are individual to the remaining links of the exchange and commonly designate restrictions against the use of trunks in the third trunk group.

With the wiring arrangement illustrated, the line 10 cannot obtain access to the trunks of the first and second restricted trunk groups, but can obtain access to the trunks of the third restricted group; whereas the line 6 is arranged to have access to the trunks of the second restricted group but is denied access to the trunks of the first and third restricted groups. Thus it will be noted that the EC conductor 10*e* individual to the line 10 is terminated in the frame 1260 at the terminal 1291 which is strapped to the common terminal 1286. The EC conductor 6*e* individual to the line 6 on the other hand, is connected at the frame 1260 to the terminal 1292 which is strapped to the common terminal 1282.

If, with the line circuit of the line 10 wired to the restricted service network 40 in the manner indicated a call intended for the first group of trunks is initiated on the line 10 and is routed through the illustrated finder-connector link to this group of trunks, the selection of the trunk group and of an idle trunk of this group proceeds in the exact manner explained above. During the vertical movement of the connector switch wipers to effect the selection of the trunk group, and more particularly when these wipers are positioned opposite the level of contacts in which the trunks of this group are terminated, the normal post springs 205 are opened and the normal post springs 206 are moved into engagement. Incident to the selection of the idle trunk the switch-through relay R240 functions in the manner previously explained to extend the calling loop circuit through to the repeater terminating this trunk in the community exchange, and initiates the release of all of the relays in the connector 20 with the exception of the relay R460. In operating, the switch-through relay R240 also closes its contacts 245′ to complete an obvious path for impressing ground potential upon the restricted service start conductor C389, thereby to maintain the operation of the cyclically operating relays illustrated in Fig. 11 of the drawings. At its contacts 244′, the relay R240 prepares a circuit for energizing the upper winding of the restricted service relay R210. Thereafter, and when the pulsing relays R1220 and R1230 operate in the manner explained above, the upper winding of the relay R210 in energized in a circuit which extends from ground by way of the contacts 1224, the strapped terminals 1286 and 1291, the EC lead 10*e* individual to the line 10, the wiper 834, the contacts 804, C269, the upper winding of R210, the contacts 244′, the normal post springs 206 and 219, C1225, the contacts 1231, and the resistor 1239 to battery. In operating, the relay R210 locks to the grounded release conductor C272 through its contacts 211, and closes its contacts 212 to complete an obvious path for short-circuiting the winding of the switch-through relay R240. When thus short-circuited the relay R240 releases after an interval and opens its contacts 245 to disconnect the hold conductor C272 from the grounded test wiper 623, whereby the lower winding of the relay R210 is deenergized, the relay R460 is deenergized and restores, and the switch-through relay R800 of the finder 19 is deenergized and restores. At its contacts 242 and 244, the relay R240 opens the loop circuit to the repeater associated with the seized trunk, permitting this repeater and its associated line circuit to release. At its contacts 244′, the relay R240 opens the above-traced circuit for energizing the upper winding of the restricted service relay R210, causing the latter relay to restore. The relay R800, upon restoring, initiates the release of the finder 19 in the manner previously explained, and opens its contacts 801 and 802 further to interrupt the loop circuit as initially extended to the connector 20. At its contacts 804, the relay R800 opens another point in the above-tracted circuit for energizing the upper winding of the restricted service relay R210. The relay R460, upon restoring, closes its contacts 461 to complete the previously traced operating circuit for the release magnet 257, whereby the Strowger switching mechanism of the connector 20 is restored to normal. Following the operations just described, the illustrated finder-connector link is fully restored to normal.

Incident to the release of the link in the manner just explained the line circuit 14 associated with the calling line is operated to its line lock-out setting. Thus, when ground potential is removed from the control conductor C270, the cut-off relay R110 of the line circuit 14 is deenergized and restores. In releasing, this relay first closes its contacts 111 and 113 to again bridge the windings of the line relay R100 across the conductors of the line 10, so that the latter relay is held energized over the loop circuit extending to the substation A. After the calling loop circuit is thus re-established, the relay R110 opens its contacts 112 to interrupt the locking circuit for the line relay R100, and closes its contacts 114 to complete a path through the contacts 101 for maintaining guarding ground potential upon the private conductor 10*c*. At its contacts 115 and 116, the relay R110 opens additional points in its operating and locking circuits as traced above. At its contacts 117, the relay R110 reprepares the path through the contacts 104 and 105 for impressing ground potential upon the start lead C121, this path now being open at the contacts 105 of the line relay R100. The line relay R100 is held in its operated position until the loop circuit extending to the substation A is broken at this substation. When the calling party at the substation A restores the handset provided at this substation to its supporting hook or cradle, the loop circuit is interrupted to cause the deenergization and release of the relay R100. At this time the line circuit 14 is fully restored to normal.

In the event a subscriber served by the line 10 attempts to obtain access to the trunks of the second restricted group and the illustrated finder-connector link is utilized in extending the connection to the repeater associated with an idle trunk of this group, the normal post springs 217 are closed, the normal post springs 219 are opened and the normal post springs 218 are engaged incident to the operation of the connector wipers 621, 622, 623 and 627 to a position opposite the level of contacts in which the trunks of the second group are terminated. In this case, the normal post springs 205 and 206 occupy their illustrated open circuit positions at the end of the trunk selecting operation. In operating at the end of the trunk selecting operation, the switch-through relay R240 closes its contacts 244′ to prepare a circuit for energizing the upper winding of the relay R210. Thereafter, and when the pulsing relays R1240 and R1250 operate, this circuit is completed at the contacts 1243 and 1251. More specifically, this circuit extends from ground by way of the contacts 1243, the strapped terminals 1286 and 1291, the EC lead 10e, the wiper 834, the contacts 804, C269, the upper winding of R210, the contacts 244′, the normal post springs 205 and 217, C1226, the contacts 1251 and the resistor 1259 to battery. When energized in this circuit the relay R210 first locks to the grounded hold conductor C272 through its contacts 211, and then closes its contacts 212 to short-circuit the switch-through relay R240. Upon restoring, the relay R240 initiates the release of the illustrated finder-connector link and the repeater associated with the seized trunk, in the exact manner described above.

If a subscriber served by the line 10 attempts to obtain access to the trunks of the third group, the call is allowed to proceed in the normal manner without interference due to the operation of the service restricting facilities. Assuming that the illustrated link is utilized in handling the call, the normal post springs 206, 217 and 218 are closed and the springs 205 and 219 are opened incident to the vertical movement of the wipers 621, 622, 623 and 627 to a position opposite the level of the contacts in which the trunks of the desired group are terminated. The operating circuit for the relay R210 is further prepared at the contacts 244′ when the switch-through relay R240 subsequently operates in response to the selection of an idle trunk in the desired group. It will be noted that, following the operation of the relay R240, pulses of negative battery potential are intermittently transmitted over the lead C1227 to the upper terminal of the upper winding of the relay R210 by the pulsing relay R1210. Moreover ground pulses are intermittently transmitted to the lower terminal of this winding by the pulsing relays R1220 and R1240. Since, however, the relay R1210 is never concurrently operated with either of the two relays R1220 and R1240, the ground and negative battery pulses do not match. Accordingly, the relay R210 remains in its restored position for the duration of the call and the call is permitted to proceed in the normal manner.

It will be understood from the above explanation that if the lead 10e is cross wired to the terminal 1281, for example, and a call from the line 10 through the illustrated link to a trunk in the third restricted group is attempted, the call will fail. In this case the two relays R1200 and R1210 complete the operating circuit for the relay R210 shortly after the switch-through relay R240 operates. This circuit extends from ground by way of the contacts 1201, the strapped terminals 1281 and 1291, the lead 10e, the wiper 834, the contacts 804, C269, the upper winding of R210, the contacts 244′, the normal post springs 206 and 218, C1227, the contacts 1211 and the resistor 1219 to battery. In operating, the relay R210 locks through its contacts 211 to the grounded release conductor C272 and closes its contacts 212 to short-circuit the switch-through relay R240. In releasing, the latter relay initiates the release of the illustrated link in exact manner explained above.

The manner in which service restrictions may selectively be imposed upon the other lines of the system will be clearly apparent from the above explanation. In this regard it is pointed out above that the line 6 is restricted against the selection of trunks in the first and third groups due to the strapping of the terminals 1282 and 1292 at the cross-connecting frame 1260. With this arrangement, if a call is initiated on the line 6, which is intended for a trunk of the third group and is routed through the illustrated finder-connector link to an idle trunk of this group, the normal post springs 206 and 218 are closed incident to the selection of the trunk group, in the manner pointed out above. Accordingly, the circuit for energizing the upper winding of the restricted relay R210 is prepared at the contacts 244′ and the indicated normal post springs immediately the repeater associated with an idle trunk in the third group is seized. Shortly thereafter, and when the pulsing relays R1200 and R1210 operate, the relay R210 is energized in a circuit which extends from ground by way of the contacts 1202, the strapped terminals 1282 and 1292, the lead 6e, the wiper 834, the contacts 804, C269, the upper winding of R210, the contacts 244′ the normal post springs 206 and 218, C1227, the contacts 1211, and the resistor 1219 to battery. In operating, the relay R210 initiates the release of the operated link and the repeater associated with the seized trunk, in the exact manner explained above.

Reverting Calls

The arrangement of the illustrated automatic switching equipment provided in the community exchange is such that reverting call connections, i. e., connections between substations served by the same line, are set up by the directory number dialing method. In considering this type of call it may be assumed that a call intended for the substation C is initiated at the substation B and that the illustrated finder-connector link is utilized in handling the call. After the connection is extended through the line circuit 15 and the finder 19 to the connector 20 and the dial tone signal is transmitted to the calling subscriber at the substation B, this subscriber may dial the directory number designating the desired substation C. The first three digits of this number correspond to the first three digits of the directory number designating the substation B, only the fourth or code selecting digits of the two numbers being different to distinguish between the two substations. At the end of the third digit the wipers 621, 622 and 623 of the connector are positioned to engage the contacts terminating the conductors of the line 11. Obviously, this line is marked as busy through the application of ground potential to the private conductor 11c thereof. Accordingly, the previously traced operating circuit for the busy test relay R440 is completed immediately the line is selected by the connector 20. Shortly after the third digit is completed, the transfer relay R450 restores to complete the locking circuit for the busy test relay R440 and to close the previously traced busy signaling circuit. Accordingly, after the dialing operation is completed, i. e., after the fourth digit is dialed into the minor switch 670 to select the ringing code assigned to the substation C, a busy signal is received by the calling subscriber. Upon receiving this signal the calling subscriber restores the receiver provided at the substation B to its supporting hook or cradle, whereby the hook or cradle switch springs are operated to interrupt the loop circuit extending through the finder 19 to the connector 20. When this loop circuit is broken, the three relays R260, R300 and R310 are deenergized and restore. When the two relays R300 and R310 restore the operating and locking circuits for the hold relay R370 are opened at the contacts 312 and 302, respectively. At its contacts 313, the relay R310 prepares the previously mentioned operating circuit for the reverting call relay R250 and completes a locking circuit for the operated cut-off relay in the line circuit 15. More specifically, the relay R310, upon closing its contacts 313, completes a path for impressing ground potential upon the connected conductors C273, 11c and C270. This path extends from ground by way of the contacts 204 and 246, C296, the contacts 313 and 368, C390, the contacts 546, C516, the contacts 462 and 445, C273, the test wiper 623, the private conductor 11c, the test wiper 833 of the finder 19 and the contacts 803 to the conductor C270. This ground path serves to maintain the line 11 marked as busy and to prevent the release of the operated line and cut-off relays in the line circuit 15. When ground potential is applied to the conductor C270 over the above-traced path, a locking circuit is established for the hold slave relay R360, this circuit extending from the grounded conductor C270 by way of the contacts 223, C299, the contacts 464, C226, the contacts 237, C226′, the contacts 364 and the winding of R360 to battery.

When the hold relay R370 restores it opens its contacts 374 to interrupt the operating circuit for the hold relay R360, and opens its contacts 373 to open one path over which ground potential is impressed upon the control conductor C270 in the connector 20. At its contacts 372, the relay R370 completes the prepared operating circuit for the reverting call relay R250, this circuit extending from the grounded control conductor C270 by way of the contacts 372, C379, the contacts 442, C271 and the winding of R250 to battery. In operating, the relay R250 opens its contacts 251 and 252 to disconnect the repeating coil windings 346 and 347 from the conductors of the line 11, and thus interrupt two additional points in the circuit for energizing the two relays R260 and R300 in series. At its contacts 253, the relay R250 prepares the operating circuit for the relay R230. At its contacts 253′, the relay R250 prepares an alternative path for connecting the test conductor C273 to ground.

At its contacts 254, the relay R250 opens a point in one of the previously traced paths for impressing ground potential upon the test conductor C273. At its contacts 256, the relay R250 completes the previously mentioned alternative operating circuit for the drain control relay R600, this circuit extending from ground by way of the contacts 366′, C291, the contacts 256, C228, the contacts 549, C598, the contacts 639, and the winding of R600 to battery.

In operating, the relay R600 closes its contacts 605 to complete a circuit including the grounded hold conductor C291 for energizing the switching relay R630. The relay R630, upon operating, locks through its contacts 638 to the grounded hold conductor C291, and opens its contacts 639 to deenergize the drain control relay R600. At its contacts 635, the relay R630 completes the above-mentioned alternative path for impressing ground potential upon the connected conductors C273, 11c and C270, thereby to provide locking circuits for the relays R250 and R360 and the operated cut-off relay of the line circuit 15. This path extends from ground by way of the contacts 204 and 253′, C277 and the contacts 635 to the conductor C273. At its contact 632, the relay R630 opens the previously traced busy signaling circuit to prevent the continued transmission of busy tone signaling current over the line 11. In operating, the relay R380 also closes its contacts 636, thereby to render the pickup relay R510 responsive to the pickup pulse next transmitted over the selected one of the two pickup leads C576 and C577. From this point on the manner in which ringing current of the selected code is transmitted over the line 11, to energize the ringer provided at the called substation C, is exactly the same as described above with reference to the call originating at the substation A and routed to the substation B.

When the answering loop circuit is completed, the ring cut-off relay R660 is energized thereover in the manner previously explained. In operating, this relay closes its contacts 661 to complete the prepared operating circuit for the stop ringing relay R550. The relay R550 now operates and locks to the grounded conductor C272 through its contacts 551. At its contacts 553, the relay R550 deenergizes the pickup relay R510, if operated. At its contacts 554, the relay R550 completes one of the previously traced operating circuits for the release magnet 674, whereby the minor switch 670 is restored to normal in the manner previously described. Incident to the release of this switch the off-normal springs 675 are disengaged to deenergize the relay R580 which now restores. The relay R510, upon restoring, opens its contacts 515 to deenergize the relay R610, if operated. The relay R610, in releasing, opens its contacts 616 to deenergize the drain control relay R600, if operated. When the relay operations just described are concluded, the transmission of ringing current over the line 11 is arrested. When both of the relays R600 and R610 are deenergized, the answering loop circuit is extended through the repeating coil windings 348 and 349 to include the winding of the back-bridge relay R340. The relay R340, upon operating, closes its contacts 341 to complete the previously traced locking circuit for the stop ringing relay R550, and opens its contacts 343 to interrupt the operating circuit for the timing relay R200. At its contacts 342, the relay R340 completes the prepared operating circuit for the relay R230, this circuit extending from the grounded conductor C270 by way of C229, the contacts 223, C299, the contacts 342, C276, the contacts 253, and the upper winding of R230 to battery. In operating, the relay R230 locks to the grounded control conductor C270 in a circuit which includes its lower winding, the contacts 234, C271, the contacts 442, C379, and the contacts 372. At its contacts 235', the relay R230 connects the ringing apparatus start conductor C599 to ground. At its contacts 236 and 237, the relay R230 excludes the contacts 464 from the circuit for energizing the hold slave relay R360. More specifically, the relay R360 is now energized over a circuit which extends from ground by way of the contacts 204 and 253', C277, the contacts 635, C273, the connected test wipers 623 and 833, the contacts 803, C270, C229, the contacts 223, C299, the contacts 342, C276, the contacts 236, C226', the contacts 364 and the winding of R360 to battery. At its contacts 235, the relay R230 prepares the operating circuit for the reverting call timing relay R220. At its contacts 231, the relay R230 completes a circuit for transmitting a distinctive signal tone current over the established connection to the answering substation. This current is derived from the ringing current generator and the circuit traversed thereby may be traced as extending from the generator lead C618 by way of springs controlled by the ringing interrupter, the reverting call tone lead C267, the condenser 223, and the contacts 231 to the negative link line conductor C268. From this point, the current is transmitted over the line 11 to energize the receiver provided at the answering substation. This current, as reproduced in the form of a distinctive interrupted signal, serves to inform the answering party that the answered call is of the revertive type. The purpose of transmitting this signal is to prevent the answering party from believing that the answered call has been abandoned. Assuming that the line 11 is arranged for bridged ringing, the ringer provided at this substation is energized concurrently with that provided at the substation C during the ringing interval. Accordingly, when the call is answered at the called substation, to terminate the ringing operation in the manner just explained, the calling subscriber is informed that the call has been answered. This subscriber may, by again lifting the receiver provided at the substation B from its supporting hook or cradle, establish the desired talking circuit between the two substations B and C. In the event the line 11 is arranged for divided ringing and the ringers at the calling and called substations are connected to different sides of the line 11, the calling subscriber at the substation B is expected to wait a reasonable time interval after hanging up to initiate the ringing operation, before again removing the receiver at this substation from its supporting hook or cradle. This permits a ringing period of reasonable length to elapse during which the called substation may be signaled before the ringing operation is arrested. In this regard it will be noted that, regardless of the substation at which the answering loop circuit including the line 11 is established, the ringing operation is automatically terminated when such a loop circuit is completed.

A short interval after the operation of the start timing relay R230 to perform the functions just described, the timing portion of the interrupter included in the apparatus 50 shown in Fig. 24 of the drawings, functions to transmit a ground pulse over the lead C289, thereby to energize the timing relay R220 in an obvious circuit. In operating, the relay R220 locks through its contacts 221 to the grounded hold conductor C291. At its contacts 222 and 223, the relay R220 transfers the holding circuit for the relay R360 from the grounded control conductor C270 to the grounded cut-off lead C298, the latter lead normally being connected to ground through contact springs controlled by the timing portion of the interrupter. A short time interval after the timing relay R220 operates, the interrupter disconnects the lead C298 from ground, thereby to deenergize the hold slave relay R360. The relay R360 now restores and opens its contacts 361 to disconnect the release conductor C272 from ground. At its contacts 364, the relay R360 further interrupts its own locking circuit. At its contacts 366', the relay R360 disconnects the hold conductor C291 from ground to cause the deenergization and release of the relays R220, R540 and R630, and any operated ones of the relays R560, R570 and R640. At its contacts 368, the relay R360 opens the previously traced path for impressing ground potential upon the connected conductors C273, 11c and C270. When ground potential is removed from the release conductor C272, the operated finder 19 is released in the manner previously described and the busy test relay R440 is deenergized and restores. When ground potential is removed from the conductor 11c, the operated cut-off relay of the line circuit 15 is deenergized and restores to reconnect the windings of its associated line relay across the conductors of the line 11. Thus the line circuit 15 is operated to its line lockout setting wherein the line relay thereof is operated and the cut-off relay thereof is released. With the circuit in this condition ground potential is restored to the private conductor 11c to maintain the line 11 marked as busy in the connectors having access thereto, and talking battery is supplied to the transmitters provided at the calling and called substations through the windings of the line relay.

When ground potential is removed from the control conductor C270, the two relays R250 and R230 are deenergized and restore. Incident to the release of the hold slave relay R360, the contacts 364' are closed to complete the prepared operating circuit for the release magnet 257, whereby the Strowger switching mechanism of the connector 20 is restored to normal in the manner previously described. Incident to the release of this mechanism, the off-normal springs 259 are disengaged to deenergize the release magnet 257. Following the deenergization of this magnet all of the equipment utilized in signalling the desired substation C, with the exception of the line circuit 15, is restored to normal in readiness for further use. When the calling and called parties at the substations B and C, respectively, both hang up to open the established loop circuit extending to the line circuit 15, the operated line relay of this line circuit is deenergized and restores. Thus the line circuit 15 is released.

Forced Release of the Link

As previously indicated, the relay R200 is controlled by the timing portion of the interrupter forcibly to release the illustrated link comprising the finder 19 and the connector 20 when this link is held over a line having a permanent calling condition thereon. The permanent condition of the line may be due to a fault on the line or to carelessness on the part of a party using the line. In considering the manner in which the forced release of the link is accomplished it may be assumed that the link is held over the line 10. In this regard it will be recalled from the preceding explanation that, when a loop circuit is extended from the line 10 to the connector 20, the hold slave relay R360 operates and closes its contacts 365 to prepare the operating circuit for the timing relay R200. A short time interval after this circuit is prepared the interrupter functions to transmit a ground pulse over the lead C290 and thus energize the upper winding of the timing relay R200, in a circuit which includes the contacts 202, C392, the contacts 365 and 343, and the conductor C287. In operating, this relay locks up in a circuit which includes its lower winding, the preliminary make contacts 203, C292, the contacts 557, C492, the contacts 423, and the grounded hold conductor C291. At its contacts 201 and 202, the relay prepares an alternative locking circuit for itself and then interrupts its operating circuit. At its contacts 203 and 204, the relay R200 extends the operating and locking circuits for the hold relay R370 to the normally grounded cut-off lead C288 and then opens these circuits as initially completed. Assuming that the call was initiated at the substation A, and that the dialing of the directory number designating the desired substation is performed at the calling substation within a reasonable time interval, the operation of the timing equipment forcibly to release the link is prevented. In this regard it will be noted that the locking circuit for the timing relay R200 is opened at the contacts 423 each time a digit is dialed into the connector 20 to cause the operation of the pulse-controlled relay R420. In the event the dialing operation is started but not completed the timing relay R200 will obviously be reoperated shortly after the dialing operation is discontinued. On the other hand, if no switch directing impulses are transmitted to the connector 20, the timing relay R200 will remain in its operated position after it is initially energized. Assuming that this relay is held operated, the interrupter functions to disconnect the cut-off lead C288 from ground at the end of a measured time interval, thereby to deenergize the hold relay R370.

The relay R370, upon restoring, opens its contacts 374 to deenergize the hold slave relay R360. The latter relay, upon restoring, disconnects the conductors C270, C272 and C291 from ground to deenergize the timing relay R200 and to initiate the release of the link in the manner previously explained. In releasing, the relay R200 opens its contacts 203 and closes its contacts 204 to transfer the operating and locking circuits for the hold relay R200 from the conductor C288 back to ground through the contacts 204. It is noted, however, that the relay R800 releases to cause the release of the line relay R300 before the timing relay R200 can restore and the hold relay R370 can reoperate. Accordingly, the release of the link can proceed in the exact manner explained above.

When ground potential is removed from the control conductor C270, the cut-off relay R110 is deenergized and restores. In releasing, this relay bridges the windings of the line relay R100 across the conductors of the line 10 to maintain the latter relay energized. Thus it will be noted that the line circuit 14 is operated to its line lockout setting incident to the removal of ground potential from the control conductor C270. This setting is maintained until the calling condition present on the line 10 is removed, at which time the line relay R100 is deenergized and restores.

In the event a timing operation is in progress at the time a call routed through the link is answered, the relay R200 is rendered inoperative forcibly to release the link. In this regard, it will be recalled that when a call routed through the link to a called substation is answered, the relays R550 and R340 sequentially operate. In operating, the relay R550 opens its contacts 557 to interrupt the initially completed locking circuit for the relay R200 and closes its contacts 556 to complete an alternative locking circuit therefor. The latter circuit extends from the grounded hold conductor C291 by way of the contacts 423, C492, the contacts 556, C293, the contacts 201, C392, the contacts 365 and 343, C287 and the upper winding of R200 to battery. Immediately after its completion, this locking circuit and the operating circuit for the relay R200 are opened at the contacts 343 by the back-bridge relay R340. When thus deenergized, the relay R200 restores to recomplete the initially traced operating and locking circuits for the hold relay R370 and to condition its associated circuits for another timing operation.

In the event a connection set up through the link is released at the called substation and the calling party neglects to release the connection, the relay R200 is again conditioned to release the link. Thus, it will be noted that when the called party hangs up to deenergize the back-bridge relay R340 the operating and last-traced locking circuits for the relay R200 are reprepared at the contacts 343. Accordingly, this relay is rendered operative to forcibly release the link in the exact manner explained above.

Calls From the Manual Office 25

In considering the operation of the automatic switching equipment provided in the community exchange to handle calls incoming from the manual office 25, it may be assumed that the trunk 26, the repeater 35, the line circuit 27 and the illustrated finder-connector link are utilized in setting up the desired connection. When the repeater 35 is seized over the trunk 26 from the operator switchboard in the distant manual office 25, a calling loop circuit is established which includes the two conductors of the trunk 26, the contacts 1911, 1913, 1902 and 1904, the repeating coil windings 1868 and 1869, and the windings of the line relay R1860. In operating, the relay R1860 closes its contacts 1861 to prepare a local loop circuit between the repeating coil 1865 and the line circuit 27. At its contacts 1863, the relay R1860 opens a point in the operating circuit for the digit relay R1830. At its contacts 1862, the relay R1860 completes a circuit for energizing the hold relay R1850, this circuit extending from ground by way of the contacts 1626 and 1862, and the winding of R1850 to battery.

The relay R1850, upon operating, closes its contacts 1852 to complete a circuit for energizing the switching relay R1800 in parallel with the polarizing winding of the back-bridge relay R1820. This circuit extends from ground by way of the contacts 1852 and 1746, and the parallel-connected windings of the two relays R1800 and R1820, to battery. At its contacts 1851, the relay R1850 prepares a path for impressing ground potential upon the control conductor 26f. At its contacts 1853, the relay R1850 opens a point in the locking circuit for the timing relay R1630. The electropolarized relay R1820 is of the well-known shunt field type and hence does not operate when its polarizing winding is energized over the circuit just traced.

The relay R1800, upon operating, closes its contacts 1802, 1803, 1805 and 1806 to complete the above-mentioned local loop circuit between the repeating coil 1865 and the line circuit 27. More specifically, this circuit extends from ground through one winding of the line relay in the line circuit 27 by way of the contacts 1803, the winding 1866, the contacts 1802, the operating winding of the back-bridge relay R1820, the winding of the supervisory relay R1810, the contacts 1805, the winding 1867, the contacts 1806, 1861 and 1742, and the other winding of the line relay in the line circuit 27, to battery. At its contacts 1801 and 1804, the relay R1800 opens the circuit for energizing the line relays R1760 and R1770 in series when the repeater 35 is seized through one of the finder-connector links on an outgoing call. At its contacts 1807, the relay R1800 further prepares the above-mentioned path for impressing ground potential upon the control conductor 26f. At its contacts 1803, the relay R1800 connects the test and EC contacts 1605 and 1606 to ground over a path including the contacts 1651, 1743' and the test conductor 26c, for the purpose of marking the repeater 35 as busy in the bank contacts of the connectors. At its contacts 1809, the relay R1800 prepares the operating circuit for the digit relay R1830. At its contacts 1809', the relay R1800 momentarily completes a circuit through the contacts 1811 for energizing the supervisory relay R1840. Before the latter relay can operate, however, the relay R1810, which is energized in the above-traced local loop circuit, operates and opens the contacts 1811.

When the line relay of the line circuit 27 is energized in the local loop circuit, it operates to mark the vertical and rotary positions of the trunk 26 in the finder banks and to energize the start relay R1910 of the distributor 21 in the exact manner previously explained with reference to the call initiated on the line 10. The manner in which the finder 19 operates to seize the repeater 35 through its outlet contacts, and to extend the local loop circuit to the connector 20, is also the same as explained above. Incident to the switch-through operation of the finder 19 the cut-off relay of the line circuit 27 operates to complete a locking circuit for the associated line relay and to disconnect the windings of the line relay from the talking conductors of the local loop circuit. During the vertical movement of the finder wipers 831 to 835, inclusive, the normal post springs 845 are closed to prepare the previously traced operating circuit for the battery reversing relay R320. After the local loop circuit has been extended to the connector 20 the dial tone signal is transmitted back over the calling end of the connection to inform the operator handling the call in the manual office 25 that the dialing operation may be started.

The line relay R1860 functions to repeat the impulses of the digit or digits designating the desired line as dialed at the position of the operator handling the call in the manual office 25. Thus during each digit dialed at this operator position the loop circuit extending by way of the trunk 26 to the repeating coil 1865 is opened one or more times. Each time this loop circuit is opened the relay R1860 opens its contacts 1862 to interrupt the operating circuit for the hold relay R1850, and closes its contacts 1863 to complete the prepared operating circuit for the digit relay R1830. In releasing, the relay R1860 also opens its contacts 1861 to interrupt the local loop circuit and thus repeat the impulse to the line relays R260 and R300 of the connector 20. The circuit for energizing the digit relay R1830 includes the contacts 1809, 1863 and 1626, and is completed at the beginning of the open-circuit period of each impulse. Accordingly, the relay R1830 is operated at the beginning of each digit and, due to its slow-to-release characteristic, remains operated until shortly after the digit is ended. In operating, this relay opens its contacts 1832 further to interrupt the path for impressing ground potential upon the control conductor 26f, and closes its contacts 1831 to exclude the winding of the supervisory relay R1810 and the operating winding of the back-bridge relay R1820 from the local loop circuit, by short-circuiting these windings through the resistor 1822. When thus deenergized the relay R1810 restores and closes its contacts 181 to energize the supervisory relay R1840. The operation of the latter relay is without effect during impulse repeating operations of the line relay R1860. As indicated above, the digit relay R1830 restores shortly following the end of each digit dialed into the repeater 35 from the distant manual office 25. In releasing, this relay opens its contacts 1031 to interrupt the path short-circuiting the series-connected windings of the two relays R1810 and R1820, and closes its contacts 1832 to impress ground potential upon the control conductor 26f. The latter operation is without effect at this time. When it is again energized the supervisory relay R1810 opens its contacts 1811 to deenergize the supervisory relay R1840. The resulting release of the latter relay is without effect.

The manner in which the call is routed through the connector 20 to the desired line in response to the impulses repeated thereto by the line relay R1860, is exactly the same as described previously with reference to the call originating at the substation A. In the event the called line is busy, busy tone current is returned over the calling end of the connection to signal the operator handling the call in the manual office 25 that the desired connection can not be obtained. In the event the called line is idle, ringing current of the selected code is transmitted thereover to signal the called subscriber in the usual manner.

When the call is answered at the called substation the battery reversing relay R320 is energized over a circuit which extends from ground by way of the contacts 373, C270, the contacts 223, C299, the contacts 342, C276, the contacts 261, C275, the normal post springs 845, C274 and the winding of R320 to battery. In operating, this relay locks up and reverses the direction of current flow in the local loop circuit extending from the connector 20 to the repeating coil 1865. When the direction of current flow through the operating winding of the back-bridge relay R1820 is thus reversed, this relay operates and closes its contacts 1821 to complete an obvious circuit for energizing the battery reversing relay R1900. In operating, the relay R1900 closes its contacts 1905 to prepare the operating circuit for the signaling relay R1920. At its contacts 1901 to 1904, inclusive, the relay R1900 reverses the direction of current flow over the loop extending from the repeating coil 1865 to the manual office 25, thereby to produce the usual answer or off-hook supervisory signal at the position of the operator handling the call in this office.

When the called subscriber disconnects, the battery reversing relay R320 of the link restores in the manner previously explained to again reverse the direction of current flow through the operating winding of the back-bridge relay R1820. The later relay, in restoring, opens its contacts 1821 to deenergize the battery reversing relay R1900. Upon restoring, the relay R1900 again reverses the direction of current flow over the trunk 26 to produce the usual on-hook supervisory signal at the position of the operator handling the call in the manual office 25. From the above explanation it will be understood that if the called subscriber flashes his switchhook to produce the repeated release and reoperation of the battery reversing relay R320, the two relays R1820 and R1980 follow the operation of the relay R320 repeatedly to reverse the direction of current flow over the trunk 26. Thus the usual flashing recall signal is produced at the position of the operator handling the call in the manual office 25, whereby this operator is informed that she is being recalled from the called substation.

The operator, upon receiving the on-hook or disconnect supervisory signal, may release the operated switching equipment by withdrawing the call plug from the jack terminating the trunk 26 in the manual office 25, thereby to open the established loop circuit over which the line relay R1860 is being held energized. This relay, upon restoring, opens its contacts 1861 to interrupt the local loop circuit extending from the repeating coil 1865 to the connector 20. At its contacts 1862, the relay R1860 opens the circuit for energizing the hold relay R1850. At its contacts 1863, the relay R1860 recompletes the operating circuit for the digit relay R1830. The resulting operation of the relay R1830, the release of the relay R1810 and the momentary reoperation of the relay R1840, are without effect. The relay R1850, upon restoring, opens its contacts 1852 to deenergize the switching relay R1800 and the polarizing winding of the back-bridge relay R1820. The relay R1800 now restores and opens its contacts 1809 to deenergize the digit relay R1830. At its contacts 1808, the relay R1800 disconnects the test conductor 26c from ground, whereby the repeater 35 is marked as idle in the bank contacts of the connectors. At its contacts 1809', the relay R1800 opens the circuit for energizing the supervisory relay R1840. At its contacts 1802, 1803, 1805 and 1806, the relay R1800 opens additional points in the local loop circuit as initially established between the repeating coil 1865 and the connector 20. Following the deenergization and release of the relays R1800, R1810, R1830, R1840 and R1850 in the manner just explained, the repeater 35 is fully restored to normal.

When the local loop circuit extending from the repeating coil 1805 to the connector 20 is opened by the line relay R1860, the connector 20 and the finder 19 are released in the exact manner previously explained. Incident to the release of this link the cut-off relay embodied in the line circuit 27 is deenergized and restores to open the locking circuit for its associated line relay, and to connect the windings of the line relay to the talking conductors which extend to the contacts of the switching relay R1800.

Calls to the Manual Office 25

In considering the manner in which calls are routed from the subscriber lines terminating at the community exchange to lines terminating in the manual office 25, it may be assumed that a connection is routed from the substation A through the illustrated finder-connector link to the repeater 35. The manner in which the connector 20 operates to select and seize this repeater will be clearly apparent from the preceding explanation. Incident to the selection of the repeater, the switch-through relay R240 operates to include the line relays R1760 and R1770 in the calling loop circuit. This circuit as extended to the repeater 35 includes the contacts 1612 and 1614, the repeating coil windings 1866 and 1867, the contacts 1801 and 1804, and the contacts 1733. In operating, the relay R1760 closes its contacts 1761 to prepare circuits for energizing the relays R1610, R1720 and R1730. The relay R1770, upon operating, closes its contacts 1771 to complete a circuit through the contacts 1626 for energizing the slow-acting hold relay R1750. At its contacts 1772, the relay R1770 prepares an alternative circuit for energizing the battery reversing relay R1900.

The relay R1750, upon operating, closes its contacts 1754 to complete an obvious circuit for energizing the hold slave relay R1740. At its contacts 1754, the relay R1750 also connects the hold conductor C1702 to ground to prepare certain operating and locking circuits described with particularity hereinafter. At its contacts 1755, the relay R1750 connects the start lead C389 to ground through the contacts 1643 and 1629, thereby to initiate or continue the operation of the service restricting network 40 in the manner previously explained. At its contacts 1752, the relay R1750 completes a path through the contacts 1714 for impressing ground potential upon the ringing apparatus start conductor C599. At its contacts 1751, the relay R1750 completes a circuit for transmitting a ring-back tone signal over the calling end of the connection to inform the calling subscriber that the operator in the distant manual office is being signaled. The circuit traversed by the signaling current may partially be traced as extending from the ringing lead C618 by way of the contacts 1711, the condenser 1727, and the contacts 1731, 1751 and 1612, to the negative side of the loop circuit extending to the calling substation.

The hold slave relay R1740, upon operating, opens its contacts 1742 further to interrupt the incomplete local loop circuit extending between the repeating coil 1865 and the line circuit 27. At its contacts 1741 and 1743, the relay R1740 prepares the above-mentioned circuits for energizing the relays R1610, R1720 and R1730. At its contacts 1746, the relay R1740 opens a point in the previously traced circuit for energizing the relay R1800 in parallel with the polarizing winding of the back-bridge relay R1820. At its contacts 1745, the relay R1740 prepares a locking circuit for itself and an alternative path for impressing ground potential upon the hold conductor C1702. At its contacts 1742' and 1744, the relay R1740 completes a path including the lower winding of the tone repeating relay R1700 for impressing ground potential upon the test conductor 26c, thereby to maintain the busy marking of the repeater 35 in the bank contacts of the connectors, and to provide locking circuits for the operated relays R460, R240, R800 and R110. It will be noted that after this path is completed the lower winding of the relay R1700 is energized in series with the parallel-connected windings of the relays R460, R240, R800 and R110. At its contacts 1743, the relay R1740 opens the previously traced path for impressing ground potential upon the test conductor 26c when the repeater 35 is occupied with a call incoming from the manual office 25. At its contacts 1744, the relay R1740 completes a circuit including the contacts 1772 for energizing the battery reversing relay R1900. At its contacts 1748, the relay R1740 prepares the operating circuit for the signal relay R1910 and a circuit for transmitting ringing current over the trunk 26. At its contacts 1749, the relay R1740 completes a path through the contacts 1725 for impressing ground potential upon the tone start lead C680. The relay R1700, upon operating, opens its contacts 1701 further to interrupt the incomplete operating circuits for the two control relays R1640 and R1660.

The relay R1900, upon operating, closes its contacts 1905 to complete a circuit including the grounded hold conductor C1702 and the contacts 1915 and 1933, for energizing the slow-to-operate signal relay R1920. At its contacts 1901 to 1903, inclusive, the relay R1900 reverses the connections of the conductors of the trunk 26 to ground and battery through the windings of the line relay R1860. The purpose of this operation is to prepare for the production of an off-hook supervisory signal at the answering operator position in the manual office 25 when the call is answered.

The relay R1920, upon operating, closes its contacts 1922 to energize the lower winding of the signal relay R1910 in a circuit which includes the ringing current conductor C618, the resistor 1726, the contacts 1748, 1937, 1922 and 1918, and the condenser 1919. At its contacts 1921, the relay R1920 opens a point in the operating circuit for the associated signal relay R1930.

When its lower winding is traversed by ringing current, the relay R1910 first closes its preliminary make contacts 1917 to complete a locking circuit for itself, this circuit extending by way of the grounded hole conductor C1702, the contacts 1935 and 1917, and the upper winding of R1910 to battery. After this locking circuit is completed the relay R1910 opens its contacts 1918 to interrupt its operating circuit as traced above. At its contacts 1915, the relay R1910 opens the above-traced operating circuit for the signal relay R1920. At its contacts 1916, the relay R1910 prepares the operating circuit for the slow-to-operate signal relay R1930. At its contacts 1911 and 1913, the relay R1910 disconnects the conductors of the trunk 26 from the repeating coil 1865. At its contacts 1912 and 1914, the relay R1910 completes a circuit for transmitting ringing current over the trunk 26 to energize the drop or other signal device associated with this trunk at the operator switchboard in the manual office 25. More specifically, the circuit traversed by the ringing current may be traced as extending from one terminal of the ringing current generator by way of the conductor C618, the resistor 1726, the contacts 1748, 1937 and 1912, the negative side of the trunk 26, the winding of the drop bridged across the conductors of the trunk 26 in the manual office 25, the positive side of the trunk 26, the contacts 1914 and 1931, and the exchange battery to the opposite terminal of the ringing current source.

The signal relay R1920 restores shortly following the operation of the relay R1910 and closes its contacts 1921 to complete the prepared operating circuit for the relay R1930, this circuit extending by way of the grounded hold conductor C1702, the contacts 1905, 1916 and 1921, and the winding of R1930 to battery. At its contacts 1922, the relay R1920 opens another point in the previously traced operating circuit for the relay R1910.

The relay R1930, upon operating, locks to ground over a path including its contacts 1934 and the hold conductor C1702. At its contacts 1933, the relay R1930 opens another point in the operating circuit for the relay R1920. At its contacts 1935, the relay R1930 opens the locking circuit for the relay R1910. At its contacts 1931 and 1937, the relay R1930 opens two points in the above-traced circuit for transmitting ringing current over the trunk 26. At its contacts 1932 and 1936, the relay R1930 bridges the exchange battery across the conductors of the trunk 26 in series with the resistors 1938 and 1939. The purpose of completing this bridging path is to drain the trunk 26 of charges accumulated thereon during the transmission of ringing current thereover.

The relay R1910 upon restoring, opens its contacts 1912 and 1914 to interrupt the above-described low resistance discharge path, and two additional points in the above-traced circuit traversed by the ringing current. At its contacts 1911 and 1913, the relay R1910 reconnects the conductors of the trunk 26 to the repeating coil 1865. At its contacts 1916, the relay R1910 opens another point in the operating circuit for the relay R1930. At its contacts 1915 the relay R1910 reprepares the operating circuit for the relay R1920. At its contacts 1917, the relay R1910 opens another point in its own locking circuit. At its contacts 1918, the relay R1910 reprepares its own operating circuit.

From the above explanation it will be understood that a splash of ringing current is transmitted over the trunk 26 to energize the drop or other signal device individual to this trunk and provided at the operator switchboard in the manual office 25. The signal thus produced serves to inform the operator or operators handling calls involving the trunk 26 that a call is present on this trunk which should be answered.

When the call is answered in the manual office 25, the previously traced loop circuit is completed for energizing the line relay R1860. In operating, this relay closes its contacts 1862 to complete the previously traced operating circuit for the hold relay R1850. At its contacts 1861, the relay R1860 closes the prepared operating circuit for the timing relay R1730, this circuit extending from ground by way of the contacts 1741, 1861, 1743 and 1722, and the winding of R1730 to battery. The relay R1850, upon operating, closes its contacts 1852 to complete a multiple path through the contacts 1745 for impressing ground potential upon the hold conductor C1702.

The timing relay R1730, upon operating, closes its contacts 1737 to complete a circuit including the resistor 1738 for energizing the line relay R1770 independently of the loop circuit extending to the calling substation. At its contacts 1733, the relay R1730 opens the loop circuit extending to the calling substation. In the present case the opening of this loop circuit is without effect. At its contacts 1731, the relay R1730 opens the previously traced ring-back tone signaling circuit, thereby to terminate this signal as produced at the calling substation. In operating, the relay R1730 also initiates vibration of the weighted armature 1736, whereby the contacts 1735 are only intermittently closed. Each time these contacts are closed an obvious circuit is completed for energizing the tone cut-off relay R1720. Due to its slow-to-operate characteristic, however, the last-mentioned relay does not operate until vibration of the armature 1736 is arrested.

At its contacts 1732 and 1734, the relay R1730 completes a circuit for transmitting a class of service signal to the receiver of the headset in use by the answering operator in the manual office 25. In this regard it is pointed out that if the calling line 10 is of the paystation type, the line circuit thereof is equipped with a circuit for transmitting a signal over the associated control conductor 10*d* when the cut-off relay R110 thereof is operated. For purposes of explanation it may be assumed that busy tone signaling current is utilized to identify paystation lines. In the present case, therefore, if the line 10 is of the paystation type, busy tone signaling current is transmitted through the lower winding of the tone repeating relay R1700 over a circuit which extends by way of the busy tone conductor C378, the condenser 109, the contacts 116, the conductor 10*d*, the wiper 833, the contacts 803, C270, the contacts 223, C299, the contacts 463, C272, the contacts 245, C273, the wiper 623, the test conductor 26*c*, the contacts 1742′, the lower winding of R1700 and the contacts 1744 to the grounded terminal of the busy tone generator. The alternating current traversing this circuit causes an induced voltage to be developed in the upper winding of the tone repeating relay R1700 which is impressed across the windings 1866 and 1867 of the repeating coil 1865 through the contacts 1732 and 1734. From the repeating coil 1865, the signaling current is transmitted over the trunk 26 to energize the receiver of the operator headset in use by way of the operator handling the call in the manual office 25. The signal thus reproduced serves to inform this operator that a line of the paystation type is calling and, accordingly, she may require the correct coin deposits before completing the desired connection.

When vibration of the weighted armature 1736 is arrested, the contacts 1735 remain in engagement to cause the operation of the slow-to-operate tone cut-off relay R1720. This relay, in operating, locks up in a circuit which includes the contacts 1721, 1743, 1861 and 1741. After completing this locking circuit, the relay R1720 opens its contacts 1722 to deenergize the relay R1730. At its contacts 1723, the relay R1720 completes an obvious circuit for energizing the relay R1710. At its contacts 1724 and 1725, the relay R1720 disconnects the tone start lead C680 from ground in the repeater 35, and prepares an alternative path for impressing ground potential upon this lead. The relay R1710, upon operating, opens its contacts 1711 further to interrupt the above-traced ring-back tone signaling circuit, and closes its contacts 1712 to prepare a warning tone signaling circuit. At its contacts 1713, the relay R1710 completes an obvious locking circuit for itself. At its contacts 1714, the relay R1710 disconnects the ringing apparatus start conductor C599 from ground in the repeater 35. At its contacts 1715, the relay R1710 prepares a locking circuit for the timing relay R1630. At its contacts 1716, the relay R1710 prepares an alternative holding circuit for the hold relays R1750 and R1850. The relay R1730, upon restoring, opens its contacts 1732 and 1734 to interrupt the above-traced circuit for transmitting the class of service signal over the trunk 26 to the manual office 25. At its contacts 1733, the relay R1730 recompletes the loop circuit extending to the calling substation. At its contacts 1737, the relay R1730 opens the holding circuit for the line relay R1770. At its contacts 1735, the relay R1730 opens the operating circuit for the tone cut-off relay R1720. When the loop circuit extending to the calling substation is recompleted at the contacts 1733, the line relay R1760 reoperates and closes its contacts 1761 to reprepare the operating and locking circuits for the battery reversing relay R1610. If the answering operator desires to recall the class of service tone, she may do so by momentarily opening the loop circuit extending between the manual office 25 and the repeater 35. In response to this operation the line relay R1860 restores and opens its contacts 1861 to deenergize the tone cut-off relay R1720. In releasing, the relay R1860 also opens its contacts 1862 to deenergize the hold relay R1850. The resulting release of the latter relay is without effect, however. When the tone cut-off relay R1720 restores, it opens its contacts 1721 further to interrupt its own locking circuit, and closes its contacts 1722 to reprepare the operating circuit for the timing relay R1730. At its contacts 1725, the relay R1720 again connects the tone start conductor C680 to ground in the repeater 35. At its contacts 1723, the relay R1720 opens the previously traced operating circuit for the relay R1710.

When the answering operator completes the tone recall operation by again completing the loop circuit extending to the repeater 35, the relays R1860 and R1850 are sequentially reoperated in an obvious manner. The relay R1860, upon reoperating, closes its contacts 1861 to recomplete the above-traced operating circuit for the timing relay R1730. The latter relay, upon reoperating, performs the various functions described above and starts a second timing operation which ultimately results in the operation of the tone cut-off relay R1720. Among these functions is that of opening the loop circuit extending to the calling substation, to cause the release of the line relay R1760, and that of closing the above-described class of service signaling circuit. When the tone cut-off relay R1720 subsequently operates at the end of the timing interval, it again locks to ground through its contacts 1721, and then opens its contacts 1722 to deenergize the timing relay R1730. The latter relay, in releasing, recompletes the loop circuit extending to the calling substation and interrupts the class of service signaling circuit. It will be understood from the above explanation that the answering operator in the manual office 28 may repeatedly recall the class of service tone if she so desires.

After the call is extended to the operator switchboard in the manual office 25, it may be routed from this switchboard to the desired substation in the manner conventionally followed in manual office practice. After the desired connection is set up between the calling line 10 and the desired called line, the operator may retire from the connection and rely upon the supervisory lamps of the cord circuit in use to indicate the status of the connection. In this regard it will be understood that when the calling subscriber disconnects, the loop circuit extending from the substation A to the repeating coil 1865 is broken to cause the deenergization and release of the two line relays R1760 and R1770. The relay R1760, upon restoring, opens its contacts 1761 to interrupt the prepared operating and locking circuits for the relay R1610. The relay R1770, upon restoring, opens its contacts 1771 and 1772 to deenergize the relays R1750 and R1900, respectively. The relay R1750 now restores and opens its contacts 1754 to interrupt one of the multiple paths over which ground potential is impressed upon the hold conductor C1702. The relay R1900, upon restoring, opens its contacts 1901 and 1903, and closes its contacts 1902 and 1904, thereby to reverse the direction of current flow over the loop circuit connecting the repeating coil 1865 with the cord circuit in use at the operator switchboard in the manual office 25. In response to this current reversal the usual on-hook supervisory signal is produced by the supervisory lamp associated with the calling end of the connection in the indicated cord circuit. It will be understood from the above explanation that if the calling subscriber flashes the switchhook provided at the calling substation intermittently to open and close the loop circuit extending from this substation to the repeater 35, the relays R1760, R1770, R1750 and R1900 follow the switchhook operation by operating each time the loop circuit is closed and releasing each time this circuit is opened. Each time the relay R1900 operates or restores it reverses the direction of current flow over the trunk 26. As a result, the supervisory lamp associated with the calling end of the connection at the operator switchboard in the manual office 25 is intermittently flashed to produce the well-known flashing recall signal. Upon observing this signal the operator handling the call may reenter the connection for the purpose of ascertaining the service desired by the calling subscriber.

As indicated above, when the calling subscriber disconnects, the battery reversing relay R1900 releases to produce a steady on-hook supervisory signal at the position of the operator handling the call in the manual office 25. Upon observing this signal the operator may take down the connection by withdrawing the answer plug of the cord circuit in use from the jack terminating the trunk 26 at the operator switchboard. In response to this operation, the line relay R1860 is deenergized and restores. In releasing, this relay opens its contacts 1862 to deenergize the hold relay R1850. At its contacts 1861, the relay R1860 opens the above-traced locking circuit for the tone cut-off relay R1720. The relay R1850, upon restoring, opens its contacts 1852 to disconnect the hold conductor C1702 from ground and thus deenergize the operated relays R1710, R1740 and R1930. The relay R1740, upon restoring, opens its contacts 1744 to deenergize the tone repeating relay R1700 and to disconnect the test conductor 26c from ground. When ground potential is removed from this conductor the illustrated finder-connector link and the line circuit 14 associated with the calling line 10 are released in the exact manner explained above. Following the release of the relays R1860, R1850, R1730, R1930, R1740, R1700 and R1710 in the manner just explained, the repeater 35 is fully restored to normal and is marked as idle in the bank contacts of the various connectors.

Forced Release and Conversation Timing in the Repeater 35

As previously indicated, provisions are made in the repeater 35 for forcibly releasing a connection including this repeater when the repeater is held over a subscriber line having a permanent calling condition thereon. These facilities also function to effect the forced release of a connection routed through the repeater after the connection has been set up for a predetermined time interval. In this regard it is pointed out above that the relay R1740, upon operating in response to the seizure of the repeater 35 through the illustrated finder-connector link, closes its contacts 1747 to prepare a circuit for energizing the timing relay R1630. At its contacts 1746', the relay R1740 also prepares one of the locking circuits for the timing relay R1630.

A predetermined time interval after the relay R1740 operates, the timing apparatus in the common equipment 50 functions to transmit a ground pulse over the pulsing lead C392 to energize the upper winding of the timing relay R1630 in a circuit which includes this lead and the contacts 1747, 1641 and 1621. In operating, the relay R1630 closes its contacts 1632 to complete a locking circuit for itself. The character of this locking circuit is different, depending upon whether the call routed through the repeater 35 and over the trunk 26 to the manual office 25 has been answered. In this regard it will be recalled that after the repeater 35 is seized and before the call routed therethrough is answered, the hold relay R1850 occupies its restored position. In such case, therefore, the locking circuit for the timing relay R1630 extends from ground by way of the contacts 1853, 1746', 1642, 1624 and 1632, and the lower winding of R1630 to battery. On the other hand if the call has been answered the relays R1850 and R1710 are both operated. Accordingly, the locking circuit for the timing relay R1630 extends from ground by way of the contacts 1715, 1642, 1624 and 1632, and the lower winding of R1630 to battery.

The operation of the timing relay R1630 marks the beginning of a timing interval. In this connection it will be apparent from the preceding explanation that when the call is answered at the operator switchboard in the manual office 25 the two relays R1860 and R1850 sequentially operate to initiate the timing operation of the relay R1730. Approximately three seconds thereafter, the relays R1720 and R1710, as controlled by the timing relay R1730, also operate. During the interval separating the operation of the hold relay R1850 from the operation of the relay R1710, the locking circuit for the timing relay R1630 is opened at the contacts 1853 and 1715. Accordingly, if the timing relay R1630 is operated at the time the call is answered, this relay is deenergized and restores so that a new timing period may be started when a ground pulse is subsequently transmitted over the pulsing lead C392.

*Forced release*

With the timing relay R1630 operated, alternative circuits for energizing the two hold relays R1750 and R1850 are prepared at the contacts 1633. At the contacts 1635 a point is opened in one of the alternative operating circuits for the supervisory relay R1840. At the contacts 1636, a point is opened in the previously mentioned alternative path for impressing ground potential upon the tone start lead C680. At the contacts 1631, the operating circuit for the timing relay R1620 is prepared.

Assuming that the call is not answered at the operator switchboard in the distant manual office 25 for a substantial time interval following the initial operation of the timing relay R1630, the timing apparatus of the common equipment 50 operates to transmit a ground pulse over the pulsing lead C290 and through the contacts 1631 to energize the timing relay R1620. This relay, in operating, locks up in a circuit which includes its lower winding, the contacts 1622, and the grounded hold conductor C1702. At its contacts 1623 and 1624, the relay R1620 transfers the locking circuit for the relay R1630 from ground at the contacts 1853 to the normally grounded conductor C288 which extends to the timing apparatus in the common equipment 50. At its contacts 1626, the relay R1620 interrupts the previously traced circuit for energizing the hold relay R1750. The relay R1750 now restores and opens its contacts 1754 to deenergize the relays R1740 and R1930, and the lower winding of the timing relay R1620. In releasing, the relay R1740 opens its contacts 1744 to disconnect the test conductor 26c from ground and to deenergize the tone repeating relay R1700. At its contacts 1746' and 1747, the relay R1740 opens the above-traced operating and initially completed locking circuits for the timing relay R1630. At its contacts 1744, the relay R1740 deenergizes the battery reversing relay R1900. When ground potential is removed from the conductor 26c, the operated finder 19 and connector 20 are released in the exact manner described above. Incident to the release of these switches the loop circuit extending from the calling line to the repeater 35 is opened, and the line circuit associated with the calling line is operated to its line lockout setting. When the loop circuit extending to the repeater 35 is opened the line relays R1760 and R1770 restore. The relay R1770, upon restoring, opens its contacts 1771 to interrupt the operating circuit for the relay R1750. Shortly following the release of the relay R1770, the timing apparatus of the common equipment 50 functions to disconnect the lead C290 from ground and thus deenergize the upper winding of the timing relay R1620. This relay, in restoring, opens its contacts 1623 to deenergize the associated timing relay R1630, causing the latter relay to restore. Following the release of the two timing relays R1620 and R1630, the repeater 35 is fully restored to normal and is marked as idle in the bank contacts of the various connectors.

*Conversation timing*

As indicated above when a call routed through the repeater 35 to the manual office 25 is answered, the relay R1630, if operated, is deenergized and restores to interrupt the timing operation in progress. Also incident to the answering of the call, the relay R1710 is operated and closes its contacts 1715 to prepare the above-traced alternative locking circuit for the timing relay R1630. When the latter relay is subsequently operated in response to a ground pulse transmitted over the pulsing lead C392, a new timing operation is initiated. Thereafter and when the second timing relay operates in response to a ground pulse transmitted over the pulsing lead C290, the above-mentioned alternative locking circuits for the hold relays R1750 and R1850 are completed, these circuits extending from ground by way of the contacts 1716 and 1633 to the contacts 1625, where they divide, one branch extending through the contacts 1771 and the winding of R1750 to battery, and the other branch extending through the contacts 1863 and the winding of R1850 to battery. It will be noted that with the timing relay R1620 operated, the locking circuit for the timing relay R1630 extends to the normally grounded cut-off lead C288. A predetermined time interval following the operation of the relay R1620, the timing apparatus of the common equipment 50 functions to disconnect the lead C288 from ground and thus deenergize the timing relay R1630. In restoring, this relay opens its contacts 1631 to interrupt the operating circuit for the timing relay R1620. At its contacts 1632, the relay R1630 opens another point in its own locking circuits. At its contacts 1633 and 1634, the relay R1630 transfers the holding circuit for the hold relays R1750 and R1850 from ground at the contacts 1716 to the lead C297 which is normally grounded in the timing apparatus of the common equipment 50. At its contacts 1635, the relay R1630 prepares the above-mentioned alternative circuit for energizing the supervisory relay R1840. At its contacts 1636, the relay R1630 completes a path through the contacts 1628 and 1724 for impressing ground potential upon the tone start lead C680.

A predetermined time interval following the release of the relay R1630 the timing apparatus of the common equipment 50 functions to transmit a relatively long ground pulse over the pulsing lead C283. When this lead is connected to ground the supervisory relay R1840 is energized thereover through the contacts 1627 and 1635. In operating, the relay R1840 closes its contacts 1842 to prepare the path for impressing ground potential upon the control conductor 26f. At its contacts 1841, the relay R1840 completes the previously mentioned warning tone signaling circuit. This circuit may partially be traced as extending from the ungrounded terminal of the dial tone generator by way of the lead C377, the contacts 1841 and 1712, the condenser 1727, and the contacts 1731 and 1751 to the negative side of the loop circuit extending to the calling substation. The current, as transmitted over the talking circuit connecting the calling and called substations is reproduced at these substations to signal the calling and called subscribers that the connection will shortly be forcibly released. In the event the connection as set up between the calling substation and the manual office 25 is cleared out in the manner previously explained, immediately the warning signal is transmitted thereover, the release of the operated switch train is effected in the manner explained above. In such case it will be noted that the timing relay R1620 is deenergized and restores when the hold relays R1750 and R1850 are released to disconnect the hold conductor C1702 from ground.

In the event the connection is not taken down within a predetermined time interval after the warning tone signal is transmitted thereover, the timing apparatus of the common equipment 50 operates to disconnect the lead C297 from ground, whereby the hold relays R1750 and R1850 are deenergized and restore. In releasing, these relays disconnect the hold conductor C1702 from ground, thereby to deenergize the relays R1620, R1740, R1710 and R1930. The relay R1740 immediately restores and opens its contacts 1744 to disconnect the test conductor 26c from ground and to deenergize the relay R1900. Immediately the test conductor 26c is disconnected from ground the operated link starts to release and opens the loop circuit extending from the calling substation to the repeater 35, thereby to cause the deenergization and release of the two line relays R1760 and R1770. These operations occur before the timing relay R1620 can restore to recomplete the initially traced operating circuits for the hold relays R1750 and R1850. From this point on, the manner in which the operated link is released and the line circuit associated with the calling line is operated to its line lock-out setting, is exactly the same as previously explained.

As indicated above, the relay R1620, upon restoring, closes its contacts 1626 to recomplete the operating circuit for the hold relay R1850, it being noted in this regard that the line relay R1860 is still energized over the loop circuit extending to the manual office 25. In operating, the relay R1850 initiates the seizure of one of the links in the community exchange in the exact manner described above with reference to the seizure of the repeater 35 on a call incoming from the manual office 25. During the relay operations just described the battery reversing relay R1900 is deenergized and reverses the direction of current flow over the loop extending to the manual office 25, whereby an on-hook supervisory signal is produced at the position of the operator handling the call in this office. Upon receiving this disconnect signal the operator may take down the connection by withdrawing the answer plug of her cord circuit from the jack terminating the trunk 26. In response to this operation the relays R1860, R1850, R1800, and R1810 are deenergized and restore to release the repeater 35. Incident to the release of the relay R1800 the local loop extending from the repeating coil 1865 to the connector of the link appropriated to the use of the trunk 26, is opened. Thus the release of the seized link is initiated.

*Calls from the manual office 28*

In considering calls incoming to the community exchange from the manual office 28, it may be assumed that the trunk 29, the repeater 45, the line circuit 30, and the illustrated finder-connector link are utilized in extending a connection from the operator switchboard in this manual office to the substation A, for example. When the operator handling the call in the manual office 28 inserts the call plug of a cord circuit in the jack terminating the trunk 29, a loop circuit is closed through the contacts 2021, 2022, 2032, and 2034 for energizing the two windings of the line relay R2040. This relay, in operating, closes its contacts 2041 to prepare a local loop circuit between the repeating coil 2065 and the line circuit 30. At its contacts 2043, the relay R2040 opens a point in the operating circuits for the supervisory relay R2060 and the digit relay R2100. At its contacts 2042, the relay R2040 completes an obvious circuit for energizing the slow-acting hold relay R2050.

In operating, the relay R2050 opens its contacts 2053 to interrupt an incomplete operating the two relays R2060 and R2100. At its contacts 2052, the relay R2050 completes a circuit through the contacts 2157 for energizing the switching relay R2130 in parallel with the polarizing winding of the back-bridge relay R2110. At its contacts 2051, the relay R2050 prepares a path for impressing ground potential upon the control conductor 29f.

The back-bridge relay R2110 does not operate when its polarizing winding is alone energized. The relay R2130, upon operating, closes its contacts 2138 to prepare the operating circuits for the two relays R2060 and R2100. At its contacts 2139, the relay R2130 completes an obvious path for impressing ground potential upon the test conductor 29c in order to mark the repeater 45 as busy in the bank contacts of the various connectors. At its contacts 2131 and 2133, the relay R2130 opens two points in the circuit over which the line relays R2140 and R2170 may be energized when the repeater 45 is utilized in handling a call outgoing from the community exchange. At its contacts 2132, 2134, 2135, and 2136, the relay R2130 completes the above-mentioned local loop circuit between the repeating coil 2065 and the line circuit 30. This circuit may be traced as extending from ground by way of the upper winding of R2310, the contacts 2322, the talking conductor 29b, the contacts 2136, the winding 2068, the contacts 2132, the operating winding of the back-bridge relay R2110, the winding of R2120, the contacts 2134, the winding 2069, the contacts 2135, the contacts 2041 and 2152, the talking conductor 29a, the contacts 2323, and the lower winding of R2310 to battery. At its contacts 2137, the relay R2130 completes a circuit through the contacts 2121 for energizing the upper winding of the supervisory relay R2060. This circuit is immediately opened at the contacts 2121, through operation of the supervisory relay R2120, when the above-traced local loop circuit is completed. Due to the slow-acting characteristic thereof, the relay R2060 does not operate during the short interval when its operating circuit may be closed. The polarity of the current traversing the operating winding of the back-bridge relay R2110 is such that this relay does not operate when the local loop circuit is completed.

When energized in the local loop circuit as traced above, the relay R2310 closes its contacts 2311 to prepare the operating circuit for the cut-off relay R2320 and to impress negative battery potential upon the test conductor 29d for the purpose of marking the rotary position of the trunk 29 in the bank contacts of the various finders. At its contacts 2314, the relay R2310 completes a path through the contacts 2326 for impressing ground potential upon the control conductor 29f. At its contacts 2312 and 2313, the relay R2310 completes an obvious path for impressing ground potential upon the distributor start lead 131. When this lead is grounded, operation of the finder 19 to seize the repeater 45 is initiated in the exact manner previously described. Incident to the seizure of this repeater, ground potential is returned over the control conductor C270 to energize the cut-off relay R2320, and the calling loop circuit is extended to the connector 20. In operating, the relay R2320 locks to the grounded lead 29d through its contacts 2324, and closes its contacts 2321 to complete an obvious locking circuit for the line relay R2310. After this locking circuit is completed the relay R2320 opens its contacts 2322 and 2323 to disconnect the windings of the line relay R2310 from the talking conductors of the local loop circuit extending between the repeating coil 2065 and the connector 20. At its contacts 2325, the relay R2320 disconnects the distributor start lead 131 from ground, whereby the distributor 21 is released to select another idle link and to handle other incoming calls. At its contacts 2326 and 2327, the relay R2320 disconnects the control conductor 29*f* from ground in the line circuit 30, and connects this lead to the test conductor 29*d*. This test conductor is now connected through the wiper 833 of the finder 19 and the contacts 803 to the control conductor C270 of the link. In operating, the relay R2320 also actuates the mechanical interlock between its armature and the armature of the line relay R2310, thereby to cause the disengagement of the contacts 2311 and 2313. These contacts cannot be reengaged until the cut-off relay R2320 and the line relay R2310 are both deenergized and the line relay is reoperated. At the contacts 2311, the above-traced marking path and the initially completed operating circuit for the relay R2320 are broken. At the contacts 2313 another point is opened in the path over which the distributor start lead 131 was initially connected to ground.

Following the seizure of the illustrated finder-connector link in the manner just explained, the line relay R2040 is conditioned to repeat switch directing impulses dialed at the position of the operator handling the call in the manual office 28, to the connector 20. In this regard it will be noted that each time the loop circuit extending from this office over the trunk 29 to the repeater 45 is opened, the line relay R2040 restores and opens its contacts 2041 to interrupt the local loop circuit between the repeater 45 and the connector 20. Conversely, each time the loop circuit extending to the manual office 28 is recompleted the line relay R2040 reoperates and closes its contacts 2041 to recomplete the local loop circuit between the repeater 45 and the connector 20.

Upon restoring at the beginning of the open-circuit period of each impulse, the relay R2040 closes its contacts 2043 to complete a circuit through the contacts 2138 for energizing the parallel-connected windings of the relays R2060 and R2100. Accordingly, the two relays R2060 and R2100 are operated at the beginning of each digit transmitted to the repeater 45. Due to the slow-to-release characteristics thereof, these two relays remain operated until shortly after each digit is ended. The relay R2060, upon operating at the beginning of each digit, closes its contacts 2061 to prepare a path for impressing ground potential upon the control conductor 29*f* and to prepare a locking circuit for itself. The relay R2100, upon operating at the beginning of each digit, opens its contacts 2102 to interrupt the incomplete path for impressing ground potential upon the control conductor 29*f* in the repeater 45. At its contacts 2103, the relay R2100 completes the prepared locking circuit for the relay R2060. At its contacts 2101, the digit relay R2100 closes a path including the resistor 2104 for excluding the winding of the relay R2120 and the operating winding of the back-bridge relay R2110 from the local loop circuit extending from the repeater 45 to the connector 20. When its winding is thus deenergized the relay R2120 releases and closes its contacts 2121 to complete a multiple holding circuit for the supervisory relay R2060, this circuit extending from ground by way of the contacts 2137 and 2121, and the upper winding of R2060 to battery.

During the inter-digit pause between successive digits transmitted to the repeater 45 from the distant manual office 28, and at the end of the last digit of the directory number designating the desired substation A, the line relay R2040 is held operated so that its contacts 2043 are opened to deenergize the digit relay R2100. Each time this relay restores it opens its contacts 2101 to again include the series-connected windings of the two relays R2110 and R2120 in the local loop circuit connecting the repeater 45 with the connector 20. At its contacts 2103, the relay R2100 opens the initially completed holding circuit for the relay R2060.

At its contacts 2102, the relay R2100 also completes a path for impressing ground potential directly upon the control conductor C270 of the link, this path extending from ground by way of the contacts 2102, 2061 and 2051, the control conductor 29*f*, the contacts 2327 and 2324, the test lead 29*d*, the wiper 833 and the contacts 803 to the control conductor C270. In the present system arrangement the direct application of ground potential to the control conductor of the link is of no utility in handling a call of the character under consideration. If, however, the repeater 45 is used in conjunction with a link of the character disclosed and claimed in copending application Serial No. 423,063 filed 12/15/41, Pier Bakker, the direct application of ground potential to the control conductor of the link, as effected under the control of the three relays R2060, R2100 and R2050, may be utilized for the purpose of short-circuiting a toll monitoring relay in the link to condition the toll monitoring facilities of the link for operation. Each time it is reenergized in the local loop circuit, the relay R2120 opens its contacts 2121 to deenergize the upper winding of the relay R2060, causing the latter relay to restore. The relay R2060, in restoring, opens its contacts 2061 to interrupt the path for impressing ground potential upon the control conductor C270 of the link.

The manner in which the connector 20 is controlled by the received switch-directing pulses to extend the connection to the called line 10 and to signal the called substation A is exactly the same as explained above. When the call is answered at this substation the relay R320 is operated in the connector 20 to reverse the direction of current flow over the loop extending from this connector to the repeater 45. In this regard it will be noted that on a trunk call of the character under consideration, the normal post springs 845 of the finder 19 are operated to prepare the operating circuit for the battery reversing relay R320 during the vertical movement of the finder wipers. When the direction of current flow over the local loop circuit is thus reversed, the back-bridge relay R2110 operates and closes its contacts 2111 to complete an obvious circuit for energizing the upper winding of the relay R2060. The resulting operation of this relay is without effect in a call of the character under consideration. At its contacts 2112, the relay R2110 completes an obvious circuit for energizing the battery reversing relay R2030. The latter relay, upon operating, closes its contacts 2031 and 2033, and opens its contacts 2032 and 2034, thereby to reverse the direction of current flow over the loop circuit extending from the repeater 45 to the manual office 28. In response to this operation an answer or off-hook supervisory signal is produced at the position of the operator handling the call in the manual office 28. Upon receiving this signal, the operator may retire from the connection and relay upon the supervisory signal lamps respectively associated with the calling and called ends of the connection to indicate the status thereof.

The release of the connection is under the control of the operator handling the call in the manual office 28. In this regard it will be apparent from the above explanation that when the called subscriber at the substation A disconnects, the three relays R320, R2110 and R2030 restore in sequence to reverse the direction of current flow over the loop circuit connecting the manual office 28 with the repeater 45. In response to this operation an on-hook supervisory signal is produced at the position of the operator handling the call. It will also be apparent that if the hook switch at the called substation A is flashed to cause the repeated release and reoperation of the battery reversing relay R320, the two relays R2110 and R2030 are similarly controlled repeatedly to reverse the direction of current flow over the loop extending to the manual office 28. Thus the usual flashing recall signal is produced at the position of the operator handling the call in this office. Upon observing this signal the operator may reenter the connection and converse with the called subscriber to ascertain the service desired.

When the connection is released at the called substation A, the three relays R320, R2110 and R2030 remain in their restored positions so that a steady on-hook supervisory signal is produced at the position of the operator handling the call in the manual office 28. When this signal is observed the operator may take down the connection by withdrawing the call plug of the cord circuit in use from the jack terminating the trunk 29, thereby to open the loop circuit extending to the repeater 45. In response to this operation, the line relay R2040 is deenergized and restores. In releasing, this relay opens its contacts 2041 to interrupt the local loop circuit between the repeater 45 and the connector 20, and thus initiate the release of the illustrated link and the line circuits 14 and 30 in the manner previously described. In releasing, the relay R2040 also opens its contacts 2042 to deenergize the hold relay R2050 and closes its contacts 2043 to energize the two relays R2060 and R2100. The resulting reoperation of the two last-mentioned relays is without effect.

The relay R2050, upon restoring, opens its contacts 2052 to deenergize the switching relay R2130. At its contacts 2051, the relay R2050 opens a point in the above-traced path for impressing ground potential upon the control conductor C270 of the link. At its contacts 2053, the relay R2050 reprepares the operating circuit for the timing relay R2250.

The relay R2130, upon restoring, opens its contacts 2132, 2134, 2135 and 2136 further to interrupt the local loop circuit between the repeater 45 and the connector 20. At its contacts 2137 and 2138, the relay R2130 opens the locking and operating circuits for the relays R2060 and R2100. At its contacts 2131 and 2133, the relay R2130 reprepares the operating circuit for the line relays R2140 and R2170. At its contacts 2139, the relay R2130 disconnects the test conductor 29c from ground, thereby to mark the repeater 45 and its associated trunk 29 as idle in the bank contacts of the various connectors. When the local loop circuit extending between the repeater 45 and the connector 20 is initially opened at the contacts 2041, the series-connected windings of the relays R2110 and R2120 are deenergized, whereby the latter relay is caused to restore. Following the release of the relays R2040, R2050, R2060, R2100, R2120 and R2130 in the manner just explained, the repeater 45 is fully restored to normal and may be seized for use in handling another call.

*Supervision between the offices 28 and 25*

The manner in which the repeaters 45 and 35 operate when utilized in a tandem connection routed from the manual office 28 through the community exchange to the manual office 25 is substantially similar to the mode of operation of these two switching units as described above. In this regard it will be recalled from the preceding explanation that when the trunk 29 is seized from the operator switchboard in the manual office 28 and impulses are transmitted thereover to direct the connector 20, for example, in the selection of the desired line, the relays R2040, R2050, R2120 and R2130 are operated in the repeater 45 at the end of the dialing operation. When the call is extended to the repeater 35 through the illustrated link of the community exchange, for example, a loop circuit is established between the two repeaters 45 and 35 which includes the operating winding of the polarized back-bridge relay R2110, the winding of the supervisory relay R2120, and the windings of the line relays R1760 and R1770. The direction of current flow over this loop circuit is such that the electro-polarized relay R2110 does not operate. Accordingly, an off-hook supervisory signal is not produced at the position of the operator handling the call in the manual office 28 incident to the extension of the connection to the repeater 45. It will be recalled that following the seizure of the repeater 35, and before the call is answered, the relays R1760, R1770, R1750, R1740, R1900, R1930 and R1700 are operated in this repeater. It will also be remembered that when the call is answered at the operator switchboard in the manual office 25, the relays R1860, R1850, and R1730 operate in sequence and in the order named. The timing relay R1730, in operating, measures a predetermined time interval and then closes the operating circuit for the tone cut-off relay R1720. This tone cut-off relay, upon operating, locks to ground through the contacts 1741, deenergizes the timing relay R1730, and closes the operating circuit for the relay R1710.

When the connection is extended to this repeater the two conductors **29*f* and 26*c*, individual to the calling and called repeaters, respectively, are connected together through the link over a path which extends from the conductor 29*f* by way of the contacts 2327 and 2324, the test lead 29*d*, the wiper 833, the contacts 803, C270, the contacts 223, C299, the contacts 463, C272, the contacts 245, C273, and the wiper 623 to the conductor 26*c*. It will be understood that so long as ground potential is maintained upon this path by relays in either of the two repeaters 35 and 45, the link inter-connecting the two repeaters is prevented from releasing. The connection between the conductors 29*f* and 26*c* permits inter-office supervisory signaling between the two offices 28 and 25** in either direction, without a release of the connection.

As indicated above, the timing relay R1730 operates in response to the answering of the call in the manual office 25. In operating, the relay R1730 opens the loop extending between the two repeaters 35 and 45, thereby to cause the deenergization and release of the supervisory relay R2120 and the line relay R1760. More specifically, this loop circuit is opened at the contacts 1733 only during the interval when the timing relay R1730 is operated to transmit a class of tone signal to the position of the answering operator. The relay R1760, upon restoring, opens its contacts 1761 to interrupt the available but incomplete operating circuit for the battery reversing relay R1610. In releasing, the relay R2120 closes its contacts 2121 to energize the upper winding of the supervisory relay R2060. This latter relay, in operating, closes its contacts 2061 to transmit a ground pulse to the test conductor 26c over the above-traced path. This path through the link is now extended to include the contacts 2102, 2051 and 1742', so that the lower winding of the tone repeating relay R1700 is short-circuited thereover. In releasing, the relay R1700 closes its contacts 1701 to prepare the operating circuit for the control relay R1660. Shortly thereafter, and when the tone cut-off relay R1720 operates, this circuit is completed through the contacts 1665, 1723 and 1754. In operating, the relay R1720 also closes the operating circuit for the relay R1710 and deenergizes the timing relay R1730.

The relay R1660, upon operating, locks to ground over a path which includes its preliminary make contacts 1663, the contacts 1723 and 1713 in parallel and the contacts 1754. After this locking circuit is completed the relay R1660 opens its contacts 1665 to interrupt its operating circuit, and closes its contacts 1664 to energize the control relay R1640 in a circuit which also includes the contacts 1701, 1713, 1723 and 1754. At its contacts 1662, the relay R1660 prepares the operating circuit for the battery reversing relay R1610. At its contacts 1661, the relay R1660 recompletes the loop circuit extending between the two repeaters 35 and 45, thereby to cause the reoperation of the line relay R1760 and the supervisory relay R2120.

The control relay R1640, upon operating, opens its contacts 1641 and 1642, thereby to interrupt the previously traced operating and locking circuits for the timing relay R1630. Thus the conversation timing facilities provided in the repeater 35 are rendered inactive in response to the answering of a call routed through this repeater over a connection set up between the manual offices 28 and 25. At its contacts 1643, the relay R1640 opens a point in the path for impressing ground potential upon the restricted service start conductor C389.

When the loop circuit extending between the two repeaters 35 and 45 is recompleted, the line relay R1760 is again energized and reoperates to complete the prepared operating circuit for the battery reversing relay R1610. This circuit extends from ground by way of the contacts 1741, 1861, 1743, 1761 and 1662, and the winding of R1610 to battery. Upon operating, the relay R1610 locks to ground over a path which includes the contacts 1615, 1743, 1861 and 1741. At its contacts 1611 to 1614, inclusive, the relay R1610 reverses the direction of current flow over the loop circuit extending between the two repeaters 35 and 45. In response to this operation, the back-bridge relay R2110 operates and closes its contacts 2112 to energize the battery reversing relay R2030, whereby the direction of current flow over the loop circuit connecting the repeater 45 with the manual office 28 is reversed. In response to the latter operation, an off-hook supervisory signal is produced at the position of the operator handling the call in the manual office 28. In operating, the relay R2110 also completes the previously traced circuit through its contacts 2111 for energizing the upper winding of the supervisory relay R2060, whereby the latter relay is held operated for the duration of the call. With this relay operated ground potential is maintained upon the connected conductors 29f and 26c over a path which includes the contacts 2102, 2061 and 2051. Thus the lower winding of the tone repeating relay R1700 is shortcircuited for the duration of the call and remains in its restored position to maintain the energization of the control relay R1640. As indicated above, with the latter relay operated, the timing facilities of the repeater 35 are rendered inactive. When the loop circuit connecting the repeaters 35 and 45 is recompleted at the contacts 1661 in the manner explained above, the supervisory relay R2120 also reoperates. At its contacts 2121 this relay opens the initially completed circuit for energizing the upper winding of the supervisory relay R2060.

After a connection including the two repeaters 45 and 35 is set up between the manual offices 28 and 25 in the manner explained above, the calling operator in the manual office 28 may signal the answering operator in the manual office 25 by momentarily opening the loop circuit extending from the manual office 28 to the repeater 45, thereby to cause the momentary release of the relay R2040. This relay, in restoring, opens its contacts 2041 to interrupt the loop circuit extending between the repeaters 45 and 35 and thus cause the release of the two line relays R1760 and R1770. The release of the relay R1760 is without effect. The relay R1770, upon restoring, opens its contacts 1771 to deenergize the hold relay R1750. At its contacts 1772, the relay R1770 opens the circuit for energizing the battery reversing relay R1900. The relay R1900 now restores and reverses the direction of current flow over the loop circuit extending from the repeater 35 to the manual office 25. Thus an on-hook supervisory signal is produced at the position of the operator handling the call in the manual office 25. The possible release of the hold relay R1750 to open its contacts 1754 is without effect, since at this time ground potential is maintained upon the hold conductor C1702 through the operated make contacts 1852 of the hold relay R1850. Thus the hold slave relay R1740 is prevented from releasing to disconnect the test conductor 26c from ground in the repeater 35.

The line relay R2040, in restoring, also opens its contacts 2042 to deenergize the hold relay R2050, and closes its contacts 2043 to energize the digit relay R2100. In releasing, the relay R2050 opens its contacts 2051 to interrupt the previously traced path short-circuiting the lower winding of the tone repeating relay R1700 in the repeater 35. At its contacts 2052, the relay R2050 deenergizes the switching relay R2130. The latter relay, upon restoring, opens its contacts 2137 to interrupt one of the circuits for energizing the supervisory relay R2060. At its contacts 2132, 2134, 2135 and 2136, the relay R2130 further interrupts the loop circuit connecting the two repeaters 45 and 35. The relay R2100, upon operating, opens its contacts 2102 further to interrupt the short-circuiting path just mentioned, and closes its contacts 2103 to complete an obvious holding circuit for the supervisory relay R2060.

When the loop circuit extending between the repeaters 45 and 35 is opened by the line relay R2040, the series-connected windings of the back-bridge relay R2110 and the supervisory relay R2120 are deenergized, causing both of these relays to restore. In releasing, the relay R2120 closes its contacts 2121 to prepare a multiple holding circuit for the relay R2060. The relay R2110, upon restoring, opens its contacts 2111 to interrupt one of the multiple holding circuits for the relay R2060, and opens its contacts 2112 to deenergize the battery reversing relay R2030.

When the path short-circuiting the lower winding of the tone repeating relay R1700 is opened in the repeater 35, this relay reoperates and opens its contacts 1701 to deenergize the control relay R1640. The latter relay, upon restoring, closes its contacts 1641 and 1642 to reprepare the operating and locking circuits for the timing relay R1630 and thus render the timing facilities of the repeater 35 operative forcibly to release the connection in the manner previously explained.

From the above explanation it will be understood that during the period when the loop circuit connecting the repeater 45 with the manual office 28 is opened to transmit a supervisory signal to the position of the operator handling the call in the manual office 25, all of the operated relays in the repeater 45 may be released. Since, however, the hold slave relay R1740 is held operated from the manual office 25, and in its operated position maintains ground potential upon the connected conductors 26c, C272, C270, 29d and 29f, the connection is prevented from releasing. Normally, however, the calling operator in the manual office 28 will not open the loop extending to the repeater 45 for an interval sufficient to permit the release of the relays R2050 and R2130.

When the operator handling the call in the manual office 28 recloses the loop to the repeater 45 to complete the supervisory signaling operation, the relays R2040, R2050, R2130, R2120, R2110, R2060 and R2030, or those thereof which have released, reoperate, in a manner clearly apparent from the above explanation. When the relay R2040 and the switching relay R2130 reoperate, the loop connecting the repeater 45 with the repeater 35 is recompleted. When the relays R2050 and R2060 reoperate, ground potential is again impressed upon the connected conductors 29f, 29d, C270, C272 and 26c in the repeater 45, to again short-circuit the lower winding of the tone repeating relay R1700.

When the loop circuit extending between the repeaters 35 and 45 is recompleted, the two line relays R1760 and R1770 reoperate. The latter relay, upon reoperating, closes its contacts 1771 to again energize the hold relay R1750, and recloses its contacts 1772 to recomplete the operating circuit for the battery reversing relay R1900. The latter relay, upon operating, again reverses the direction of current flow over the loop circuit extending from the repeater 35 to the manual office 25, whereby an on-hook supervisory signal is produced at the position of the operator handling the call in this office. When the lower winding of the tone repeating relay R1700 is again short-circuited, this relay restores and closes its contacts 1701 to again energize the control relay R1640. The latter relay, upon operating, opens its contacts 1641 and 1642 to again render the timing facilities of the repeater 35 inactive.

Each time the loop circuit connecting the manual office 28 with the repeater 45 is opened and reclosed at the position of the operator handling the call in this office, the supervisory signaling operatoins just described are repeated. In this regard it will be understood that if the calling operator in the manual office 28 is the first to disconnect, all of the relays in the repeater 45 are deenergized and restore. Incident to the release of these relays the loop circuit connecting the repeater 45 with the repeater 35 is opened, and the path short-circuiting the lower winding of the tone repeating relay R1700 is broken. When the loop circuit connecting the two repeaters is interrupted, the two line relays R1760 and R1770, the hold relay R1750, and the battery reversing relay R1900 are all deenergized and restore. The latter relay, in releasing, transmits an on-hook supervisory signal to the position of the operator handling the call in the manual office 25. In the present case a steady on-hook supervisory signal is produced to indicate that the connection has been cleared out in the manual office 28 and is ready to be released.

When the path short-circuiting the lower winding of the tone repeating relay R1700 is opened, this relay reoperates and opens its contacts 1701 to deenergize the control relay R1640. The latter relay, upon restoring, recloses its contacts 1641 and 1642 to again render the timing facilities of the repeater 35 active.

When the disconnect supervisory signal is received by the operator handling the call in the manual office 25, she may take down the connection by withdrawnig the answer plug of the cord circuit in use from the jack terminating the trunk 26, thereby to cause the deenergization and release of the line relay R1850. This relay, upon restoring, initiates the release of the repeater 35, the illustrated finder-connector link, and the line circuit 30, in a manner which will be clearly apparent from the above explanation with reference to the call routed through the illustrated link and the repeater 35 to the manual office 25 from the line 10.

After the above-described connection including the repeaters 45 and 35 is set up between the manual offices 28 and 25, the answering operator in the manual office 25 may resignal the calling operator in the manual office 28 by opening and then reclosing the loop circuit connecting the last-mentioned office with the repeater 35. When this loop circuit is opened the relay R1860 restores and opens its contacts 1861 to deenergize the operated relays R1610 and R1720. At its contacts 1862, the relay R1860 opens the operating circuit for the hold relay R1850. The latter relay, upon restoring, opens its contacts 1852 to interrupt one of the multiple paths for impressing ground potential upon the hold conductor C1702. This operation is without effect, however, since, under the conditions stated, the two line relays R1760 and R1770, the hold relay R1750 and the hold slave relay R1740 are held operated from the repeater 45.

The tone cut-off relay R1720, upon restoring, opens its contacts 1721 further to interrupt its locking circuit as traced above, and closes its contacts 1722 to reprepare the operating circuit for the timing relay R1730. At its contacts 1723, the relay R1720 opens the operating circuits for the relays R1640, R1660, and R1710. At this time, the relay R1710 is operated and, accordingly, this relay, the relay R1660 and the relay R1640 are held energized over holding circuits which commonly extend to ground through the contacts 1713 and 1754. The relay R1610, upon restoring in response to the release of the line relay R1860, opens its contacts 1615 further to interrupt its own locking circuit. At its contacts 1611 to 1614, inclusive, the relay R1610 reverses the direction of current flow over the loop circuit extending between the repeaters 35 and 45. In response to this operation the back-bridge relay R2110 restores and opens its contacts 2112 to deenergize the battery reversing relay R2030. At its contacts 2111, the relay R2110 deenergizes the upper winding of the supervisory relay R2060. The relay R2030, upon restoring, opens its contacts 2031 and 2033 and closes its contacts 2032 and 2034 to reverse the direction of current flow over the loop circuit extending between the repeater 45 and the manual office 28. In response to this operation a non-hook supervisory signal is produced at the position of the operator handling the call in the manual office 28.

The supervisory relay R2060, upon restoring, opens its contacts 2061 to disconnect the conductors 29*f* and 26*c* from ground in the repeater 45 and thus open the path short-circuiting the lower winding of the tone repeating relay R1700. In response to this operation the relay R1700 reoperates and opens its contacts 1701 to deenergize the control relay R1640. The latter relay, upon restoring, closes its contacts 1641 and 1642 to again render the timing facilities of the repeater 35 active.

When the operator handling the call in the manual office 25 recloses the loop circuit extending to the repeater 35 to complete the supervisory signaling operation, the relays R1860, R1610, R1730 and R1850 operate in sequence in a manner which will be clearly apparent from the above explanation. After a predetermined time interval, measured by the period of vibration of the armature 1736, the tone cut-off relay R1720 reoperates, locks to ground through the contacts 1743, 1741 and 1861, and deenergizes the timing relay R1730.

The relay R1610, in operating, again locks to ground through the contacts 1615, 1743, 1861 and 1741. At its contacts 1611 to 1614, inclusive, the relay R1610 again reverses the direction of current flow over the loop circuit connecting the two repeaters 35 and 45. In response to this operation the back-bridge relay R2110 reoperates and closes its contacts 2111 to again energize the upper winding of the supervisory relay R2060. At its contacts 2112, the relay R2110 again energizes the winding of the battery reversing relay R2030. The latter relay, in operating, again reverses the direction of current flow over the loop circuit connecting the repeater 45 with the manual office 28, so that an off-hook supervisory signal is again produced at the position of the operator handling the call in this office. The relay R2060, upon reoperating, closes its contacts 2061 to again short-circuit the lower winding of the tone repeating relay R1700. Upon restoring, the latter relay closes its contacts 1701 to again energize the control relay R1640. The latter relay now reoperates and opens its contacts 1641 and 1642 to render the timing facilities of the repeater 35 inactive.

Each time the loop circuit connecting the repeater 35 with the manual office 25 is opened and reclosed at the position of the operator handling the call in this office, the supervisory signaling operations just described are repeated. It will be apparent from the explanation pertaining to these operations that if the connection is taken down in the manual office 25 before it is cleared out in the manual office 28, the relays R1860, R1850, R1720, R1640 and R1610 of the repeater 35 are deenergized and restore incident to the release of the connection in the answering office 25. It will also be apparent that the relays R2110, R2060 and R2030 are deenergized in the repeater 45 incident to the release of the connection in the manual office 25. With the relay R2030 in its restored position a steady on-hook supervisory signal is produced at the position of the operator handling the call in the manual office 28 to inform this operator that the connection is ready to be released.

When the connection is taken down in the manual office 28, the loop circuit extending to the repeater 45 is broken to cause the deenergization and release of the operated relays in this repeater in the manner previously explained. Incident to the release of the line relay R2040 and the switching relay R2130, the loop circuit extending between the repeaters 45 and 35 is opened to cause the deenergization of the two line relays R1760 and R1770. These two line relays, in releasing, initiate the release of the repeater 35, the illustrated finder-connector link, and the line circuit 30, in a manner which will also be clearly apparent from the preceding explanation.

Calls to the Manual Office 28

In considering the operation of the repeater 45 to extend outgoing calls over the trunk 29 to the manual office 28, it may first be assumed that the illustrated finder-connector link is utilized to seize this repeater on a call originating at the substation A on the line 10, for example. Incident to the seizure of the repeater, the calling loop circuit is extended to the repeating coil 2065 and ground potential is impressed upon the test conductor 29*c* in the link to mark the repeater 45 as busy to the other connectors. More specifically, the calling loop circuit as extended to the repeater 45 includes the talking conductors 29*g* and 29*h*, the contacts 2262 and 2264, the windings 2068 and 2069, the contacts 2131, 2133 and 2204, and the series-connected windings of the two line relays R2140 and R2170. When energized in this circuit the relay R2170 closes its contacts 2171 to prepare the operating circuit for the battery reversing relay R2260.

The relay R2140, upon operating, closes its contacts 2141 to prepare a circuit for energizing the battery reversing relay R2030. At its contacts 2142, the relay R2140 completes a circuit through the contacts 2254 for energizing the slow-acting hold relay R2160. The relay R2160, in operating, closes its contacts 2163 to complete a path through the contacts 2222 for impressing ground potential upon the ringing apparatus start conductor C599. At its contacts 2162, the relay R2160 opens one of the available paths for impressing ground potential upon the test conductor 29*c*. At its contacts 2164, the relay R2160 completes an obvious path for impressing ground potential upon the hold conductor C2167, thereby to energize the hold slave relay R2150 and to prepare certain operating and locking circuits described with particularity hereinafter. At its contacts 2161, the relay R2160 completes a ring-back tone signaling circuit, whereby the usual ring-back tone signal is produced at the calling substation to indicate that the distant office is being signaled. The circuit traversed by the signaling current may partially be traced as extending from the high potential side of the ringing current generator by way of the ringing current conductor C618, the condenser 2216, the contacts 2221, 2201 and 2161 and the negative side of the loop circuit extending to the calling substation.

The hold slave relay R2150, upon operating, closes its contacts 2151 and 2153 to prepare operating circuits for the two relays R2200 and R2260. At its contacts 2154, the relay R2150 completes a path including the lower winding of the tone repeating relay R2230 for impressing ground potential upon the test conductor 29c, thereby to complete the previously described locking circuits for the operated relays in the line circuit 14, the finder 19, and the connector 20, and to maintain the repeater 45 marked as busy in the bank contacts of the other connectors. At its contacts 2156, the relay R2150 prepares a multiple path, controlled by the hold relay R2050, for impressing ground potential upon the hold conductor C2167. At its contacts 2157, the relay R2150 opens a point in the previously traced operating circuit for the switching relay R2130. At its contacts 2156', the relay R2150 completes the prepared operating circuit for the battery reversing relay R2030. At its contacts 2157', the relay R2150 prepares the operating circuit for the signal relay R2020 and a circuit for transmitting ringing current over the trunk 29. At its contacts 2158, the relay R2150 prepares the operating circuit for the timing relay R2250. At its contacts 2159, the relay R2150 completes a path through the contacts 2214 for impressing ground potential upon the tone start lead C680.

The relay R2030, upon operating, closes its contacts 2035 to complete a circuit including the grounded hold conductor C2167 and the contacts 2025 and 2003 for energizing the slow-to-operate signal relay R2010. At its contacts 2031 to 2034, the relay R2030 reverses the connections between the conductors of the trunk 29 and the exchange battery in preparation for the production of an off-hook supervisory signal at the position of the operator who answers the call in the manual office 28.

The relay R2010, upon operating, closes its contacts 2012 to complete a circuit for transmitting ringing current through the lower winding of the signal relay R2020. This circuit extends from one terminal of the ringing current generator by way of C618, the resistor 2165, the contacts 2157', 2007, 2012 and 2028, the lower winding of R2020, the condenser 2029, and the exchange battery to the opposite terminal of the ringing current generator. When its lower winding is thus energized the relay R2020 first closes its preliminary make contacts 2027 to complete a locking circuit for itself, this circuit extending by way of the grounded hold conductor C2167, the contacts 2005 and 2027, and the upper winding of R2020 to battery. After this locking circuit is completed the relay R2020 opens its contacts 2028 to deenergize its lower winding. At its contacts 2025, the relay R2020 opens the above-traced operating circuit for the relay R2010. At its contacts 2026, the relay R2020 prepares the operating circuit for the relay R2000. At its contacts 2021 and 2022, the relay R2020 disconnects the conductors of the trunk 29 from the repeating coil 2065. At its contacts 2023 and 2024, the relay R2020 completes a circuit for transmitting ringing current over the trunk 29 to energize the drop or other signal device associated with this trunk at the operator switchboard in the manual office 28. The circuit traversed by the ringing current may be traced as extending from one terminal of the ringing current generator by way of C618, the resistor 2165, the contacts 2157', 2007 and 2023, the positive side of the trunk 29, the drop bridged across the conductors of this trunk at the operator switchboard in the manual office 28, the negative side of the trunk 29, the contacts 2024 and 2001, and the exchange battery to the opposite terminal of the ringing current generator. When energized by the current traversing this circuit, the drop associated with the trunk 29 is actuated to indicate that a call is present upon this trunk which should be answered. Shortly following the operation of the relay R2020, the associated signal relay R2010 restores and closes its contacts 2011 to complete the prepared operating circuit for the relay R2000, this circuit extending by way of the grounded hold conductor C2167, the contacts 2035, 2026 and 2011, and the winding of R2000 to battery. At its contacts 2012, the relay R2010 further interrupts the above-traced operating circuit for the relay R2020.

The relay R2000 operates after an interval and locks to ground over a path which includes the contacts 2004 and the hold conductor C2167. At its contacts 2003, the relay R2000 further interrupts the operating circuit for the relay R2010. At its contacts 2001 and 2007, the relay R2000 opens two points in the above-traced circuit for transmitting ringing current over the trunk 29. At its contacts 2002 and 2006, the relay R2000 bridges the exchange battery across the conductors of the trunk 29 in series with the two resistors 2008 and 2009. The purpose of completing this low resistance path at the end of the ringing current transmission period is to drain the trunk 29 of charges accumulated thereon during the transmission of ringing current thereover. At its contacts 2005, the relay R2000 opens the above-traced locking circuit for the relay R2020.

The relay R2020 now restores and opens its contacts 2023 and 2024 to interrupt the low resistance discharge path. At its contacts 2021 and 2022, the relay R2020 reconnects the conductors of the trunk 29 to the repeating coil 2065. At its contacts 2025, the relay R2020 reprepares the above-traced operating circuit for the signal relay R2010. At its contacts 2026, the relay R2020 opens another point in the operating circuit for the relay R2000. At its contacts 2028, the relay R2020 reprepares its own operating circuit. From the above explanation it will be understood that the three relays R2020, R2010 and R2000 cooperate to transmit a splash of ringing current over the trunk 29, and that this splash of ringing current is utilized to energize the call signal device associated with this trunk in the manual office 28.

When the call is answered in the manual office 28 a loop circuit including the conductors of the trunk 29, the contacts 2021, 2022, 2031 and 2033 and the repeating coil windings 2066 and 2067 is completed for energizing the two windings of the line relay R2040 in series. In operating, this relay closes its contacts 2042 to energize the slow-acting hold relay R2050. The relay R2050, upon operating, closes its contacts 2052 to complete the above-mentioned multiple path through the contacts 2156 for impressing ground potential upon the hold conductor C2167. At its contacts 2053, the relay R2050 opens the prepared operating circuit for the timing relay R2250, thereby to render the latter relay inoperative to initiate the forcible release of the repeater 45. At its contacts 2051, the relay R2050 prepares the previously described path for impressing ground potential upon the control conductor 29f.

The line relay R2040, upon operating, also closes its contacts 2041 to complete the prepared operating circuit for the timing relay R2200, this circuit extending from ground by way of the contacts 2151, 2041, 2153 and 2212, and the winding of R2200 to battery. The relay R2200, upon operating, closes its contacts 2207 to complete a circuit including the resistor 2208 for maintaining the line relay R2140 energized independently of the calling loop circuit extending to the repeater 45. At its contacts 2204, the relay R2200 opens the established loop circuit extending to the calling substation, thereby to cause the release of the line relay R2170. At its contacts 2201, the relay R2200 opens a point in the previously traced ring-back tone signaling circuit. At its contacts 2202 and 2203, the relay R2200 completes a circuit for transmitting a class of service signal over the trunk 29 to the answering operator in the manual office 28. In this regard it will be understood from the preceding explanation that if the call has its origin at a substation of a special character, such, for example, as a paystation, signaling current identifying the character of the substation is transmitted from the line circuit associated therewith over the connected control conductors C270, C272 and 26c and through the lower winding of the tone repeating relay R2230. The resulting induced voltage in the upper winding of this relay is impressed across the repeating coil windings 2068 and 2069 over a path which includes the condenser 2215 and the contacts 2202 and 2203. From the repeating coil 2065 the signaling current is transmitted over the trunk 29 to energize the receiver of the operator headset in use by the operator handling the call in the manual office 28. The operator is thus informed as to the character of the calling substation.

When the timing relay R2200 is energized to attract its associated armature, vibration of the weighted contact spring 2206 is also initiated. During the vibration of this spring the contacts 2205 controlled thereby are only intermittently closed. Accordingly, the relay R2210, which is of the slow-to-operate type, does not operate so long as vibration of the weighted contact spring 2206 continues. After a predetermined time interval the vibration of this contact spring is arrested, the contacts 2205 remain closed, and the relay R2210 operates. Upon operating, the relay R2210 locks to ground over a path including the contacts 2211, 2153, 2041 and 2151. After the locking circuit is completed the relay R2210 opens its contacts 2212 to deenergize the timing relay R2200. At its contacts 2213, the relay R2210 completes a circuit including the grounded hold conductor C2167 for energizing the control relay R2220. At its contacts 2214, the relay 2210 disconnects the tone start conductor C680 from ground in the repeater 45.

The relay R2220, upon operating, opens its contacts 2221 further to interrupt the above-traced ring-back tone signaling circuit, and closes its contacts 2223 to complete an obvious locking circuit for itself. At its contacts 2222, the relay R2220 disconnects the ringing apparatus start conductor C599 from ground in the repeater 45.

The timing relay R2200, upon restoring, opens its contacts 2202 and 2203 to interrupt the above-traced class of service signaling circuit and thus terminate the signal, if any, which is transmitted to the answering operator in the manual office 28. At its contacts 2201, the relay R2200 reprepares the above-described ring-back tone signaling circuit. At its contacts 2204, the relay R2200 recompletes the loop circuit extending from the repeater 45 back to the calling substation. At its contacts 2205, the relay R2200 interrupts the above-traced operating circuit for the tone cut-off relay R2210. At its contacts 2207, the relay R2200 opens the above-described holding circuit for the line relay R2140.

From the above explanation it will be understood that during the interval measured by the timing relay R2200, and more particularly the interval required for vibration of the weighted contact spring 2206 to stop, a class of service signal is transmitted to the answering operator in the manual office 28. During this interval the loop circuit extending back to the calling substation is opened at the contacts 2204. This function of the timing relay R2200 is without effect on a call of the character under consideration. It will also be understood from the above explanation that the locking circuit for the tone cut-off relay R2210, as completed in response to the operation of this relay at the end of the signaling period, extends through the operated make contacts 2041 of the line relay R2040. Accordingly, if the answering operator desires to recall the class of service tone, she may do so by momentarily opening the loop circuit extending between the manual office 28 and the repeater 45. In response to this operation, the line relay R2040 restores and opens its contacts 2041 to deenergize the tone cut-off relay R2210. In releasing, the relay R2040 also opens its contacts 2042 to deenergize the hold relay R2050. The possible resulting release of the hold relay R2050 is, however, without effect. When the tone cut-off relay R2210 restores, it opens its contacts 2211 further to interrupt its own locking circuit, and closes its contacts 2212 to reprepare the operating circuit for the timing relay R2200. At its contacts 2214, the relay R2210 again connects the tone start conductor C680 to ground in the repeater 45. At its contacts 2213, the relay R2210 opens the operating circuit for the control relay R2220.

When the answering operator completes the tone recall operation by again completing the loop circuit extending to the repeater 45, the relays R2040 and R2050 are sequentially reoperated in an obvious manner. The relay R2040, upon reoperating, recompletes the above-traced operating circuit for the timing relay R2200. This relay, upon reoperating, performs the various functions described above and starts a timing operation which ultimately results in the operation of the tone cut-off relay R2210. Among these functions is that of opening the loop circuit extending to the calling substation to cause the release of the line relay R2140, and that of closing the above-described class of service signaling circuit. When the tone cut-off relay R2210 subsequently operates at the end of the timing interval, it again locks to ground through the contacts 2211, 2153, 2041 and 2151, and then opens its contacts 2212 to deenergize the timing relay R2200. The latter relay, in releasing, recompletes the loop circuit extending to the calling substation and interrupts the class of service signaling circuit. It will be understood from the above explanation that the answering operator in the manual office 28 may repeatedly recall the class of service tone if she so desires.

After a connection has been routed to the operator switchboard in the manual office 28 from the calling line 10 in the manner just explained, the answering operator may extend the call to the desired line terminating at this manual office in the usual manner. After extending the call to the desired substation the operator may retire from the connection and rely upon the supervisory lamps associated with the calling and called ends thereof to indicate the condition of the connection. In this regard it will be understood that when the calling subscriber hangs up, the loop circuit extending from the calling substation to the repeater 45 is broken to cause the deenergization and release of the line relays R2140 and R2170. The release of the relay R2170 is without effect. The relay R2140, upon restoring, opens its contacts 2142 to deenergize the hold relay R2160. At its contacts 2141, the relay R2140 opens the operating circuit for the battery reversing relay R2030. The release of the hold relay R2160 is without effect. The relay R2030, upon restoring, opens its contacts 2031 and 2033 and closes its contacts 2032 and 2034, thereby to reverse the direction of current flow over the loop circuit extending between the repeater 45 and the position of the operator handling the call in the manual office 28. In response to this operation, an on-hook supervisory signal is produced by the signal device individual to the trunk 29 and provided in the cord circuit in use by the operator handling the call. It will be understood that if the calling subscriber recompletes the calling loop circuit by again removing the receiver at the calling substation from its supporting hook or cradle, the two line relays R2140 and R2170 are reoperated to cause the reoperation of the hold relay R2160 and the battery reversing relay R2030. The latter relay, upon operating, functions to transmit an off-hook supervisory signal to the position of the operator handling the call in the manual office 28. Thus it will be apparent that the relays R2140 and R2030 are arranged to follow a switch-hook flashing operation performed at the calling substation in order to produce the well-known flashing recall supervisory signal at the answering operator position in the distant manual office 28. Upon observing this signal the operator may reenter the connection and converse with the calling subscriber to ascertain the service desired.

When the calling subscriber disconnects, the relays R2140, R2170, R2160 and R2030 are all deenergized and restore. With the relay R2030 in its restored position, a sustained on-hook supervisory signal is produced at the position of the answering operator in the manual office 28 to indicate that the connection may be released. To release the connection the operator withdraws the answer plug of the cord circuit in use from the jack terminating the trunk 29, thereby to cause the deenergization and release of the line relay R2040. Upon restoring, this relay opens its contacts 2041 to deenergize the tone cut-off relay R2210. At its contacts 2042, the relay R2040 opens the operating circuit for the hold relay R2050. The relay R2050 now restores and disconnects the hold conductor C2167 from ground to cause the deenergization and release of the relays R2000, R2150 and R2220. The relay R2150, upon restoring, opens its contacts 2154 to disconnect the test conductor 29c from ground through the lower winding of the tone repeating relay R2230. In response to this operation the relay R2330 restores. Following the release of this relay the repeater 45 is fully restored to normal and is marked as idle in the bank contacts of the various connectors. When the test conductor 29c is disconnected from ground, the connector 20, the finder 19, and the line circuit 14 are all released in a manner which will be clearly apparent from the preceding explanation.

*Supervision between the offices 28 and 25*

A call originating on a line served by the manual office 25 and intended for a substation served by the manual office 28 may be routed by way of the trunk 26, the repeater 35, the illustrated link, the repeater 45, and the trunk 29 to the operator switchboard in the manual office 28, and from this switchboard to the desired substation in a manner which will be clearly apparent from the above description. It will be noted that when the connection is extended through the illustrated link to the repeater 45, the control conductors 26f and 29c are connected together through the link. Following the seizure of the repeater 45 and before the call is answered in the manual office 28, the relays R2140, R2170, R2160, R2150, R2230 and R2200 are operated in the repeater 45. At this time the relays R1860, R1850, R1810 and R1800 are operated in the repeater 35.

When the call is answered at the operator switchboard in the manual office 28, the relay R2200 functions in the manner previously explained to open the loop circuit connecting the repeaters 45 and 35 for a short time interval. When this loop circuit is opened the supervisory relay R1810 in the repeater 35 is deenergized and restores. In releasing, this relay closes its contacts 1811 to complete a circuit through the contacts 1809' for energizing the supervisory relay R1840. In operating, the relay R1840 closes its contacts 1842 to complete a path through the contacts 1851, 1832 and 1807 for impressing ground potential upon the connected control conductors 26f and 29c. In response to this operation the lower winding of the tone repeating relay R2230 is short-circuited. In releasing, the relay R2230 closes its contacts 2231 to prepare the operating circuit for the control relay R2240.

At the end of the time interval measured by the timing relay R2200, the tone cut-off relay R2210 operates in the manner previously explained and locks to ground through the contacts 2211, 2153, 2041 and 2151. At its contacts 2212, the relay R2210 deenergizes the timing relay R2200. At its contacts 2213, the relay R2210 completes the previously traced operating circuit for the control relay R2220, and closes a circuit for energizing the control relay R2240. The latter circuit extends from ground by way of the hold conductor C2167, the contacts 2213 and 2231 and the winding of R2240 to battery.

The relay R2200, upon restoring, closes its contacts 2204 to recomplete the loop circuit connecting the repeaters 45 and 35, whereby the supervisory relay R1810 is again energized. In reoperating, this relay opens its contacts 1811 to deenergize the supervisory relay R1840. The relay R1840 now restores and opens its contacts 1842 to disconnect the two control conductors 26f and 29c from ground in the repeater 35.

The control relay R2240, upon operating in response to the operation of the tone cut-off relay R2210, locks to ground over a path which includes the contacts 2243 and 2223 and the hold conductor C2167. At its contacts 2241, the relay R2240 shunts the break contacts 2204 of the timing relay R2200. At the contacts 2242, the relay R2240 completes the prepared operating circuit for the battery reversing relay R2260, this circuit extending from ground by way of the contacts 2151, 2041, 2153, 2171 and 2242, and the winding of R2260 to battery. In operating, the relay R2260 locks to ground over a patch which includes the contacts 2265, 2153, 2041 and 2151. At its contacts 2261 to 2264, inclusive, the relay R2260 reverses the direction of current flow over the loop circuit connecting the two repeaters 45 and 35. In response to this operation the back-bridge relay R1820 operates and closes its contacts 1821 to energize the battery reversing relay R1900. Upon operating, the relay R1900 closes its contacts 1905 to prepare the operating circuit for the signal relay R1920. At its contacts 1901 to 1904, inclusive, the relay R1900 reverses the direction of current flow over the loop circuit connecting the repeater 35 with the manual office 25. In response to this operation the supervisory signal associated with the calling end of the connection at the operator switchboard in the manual office 25 is controlled to produce an off-hook supervisory signal indicating that the call has been answered.

If the answering operator in the manual office 28 desires to signal the calling operator in the manual office 25 after a connection is set up in the manner just explained, she may do so by opening and then reclosing the loop circuit extending from the manual office 28 to the repeater 35, thereby to cause the release and reoperation of the relay R2040. This relay, in restoring, opens its contacts 2041 to deenergize the relays R2210 and R2260. At its contacts 2042, the relay R2040 opens the operating circuit for the hold relay R2050. The relay R2050 may or may not restore during the interval when the line relay R2040 is deenergized. If this interval is sufficiently long the hold relay R2050 is deenergized and restores. Upon restoring, this relay opens its contacts 2052 to interrupt one of the multiple paths over which ground potential is impressed upon the hold conductor C2167. It is noted, however, that the hold relay R2160 and the hold slave relay R2150 are not deenergized during a supervisory signaling operation of the character under consideration. Accordingly, ground potential is maintained on the hold conductor C2167 through the contacts 2164, and the release of the relay R2050 only conditions the connection to be released from the operator switchboard in the manual office 25. In restoring, the relay R2050 also closes its contacts 2053 to prepare the operating circuit for the timing relay R2250 and thus condition this relay forcibly to release the repeater 45 and the preceding switch train.

The relay R2210, upon restoring, reprepares the operating circuit for the timing relay R2200. The relay R2260, upon restoring, opens its contacts 2265 further to interrupt its own locking circuit and, at its contacts 2261 to 2264, inclusive, reverses the direction of current flow over the loop circuit connecting the repeaters 45 and 35. In response to the latter operation the back-bridge relay R1820 restores and opens its contacts 1821 to deenergize the battery reversing relay R1900. The latter relay, upon restoring, reverses the direction of current flow over the loop circuit connecting the repeater 35 with the manual office 25, whereby an on-hook supervisory signal is produced at the position of the operator handling the call in this office.

When the line relay R2040 reoperates at the end of the supervisory signaling operation, it closes its contacts 2042 to again energize the hold relay R2050. At its contacts 2041, the relay R2040 recloses the operating circuits for the two relays R2200 and R2260. The resulting response of the relays R2200 and R2210 is of no effect in the supervisory signaling operation under consideration. The relay R2260, upon reoperating, again reverses the direction of current flow over the loop circuit connecting the two repeaters 45 and 35. In response to this operation the back-bridge relay R1820 and the battery reversing relay R1900 sequentially reoperate, whereby an off-hook supervisory signal is produced at the operator switchboard in the manual office 25.

Each time the loop circuit connecting the repeater 45 with the manual office 28 is opened and closed the relay operations just described are repeated. It will be understood, therefore, that the usual flashing recall supervisory signal is produced at the position of the operator handling the call in the manual office 25. Upon observing this signal the operator at this position may reenter the connection and converse with the answering operator in the manual office 28 to ascertain the service desired.

It will be understood from the preceding explanation that when the connection is taken down in the manual office 28, the relays R2040, R2050, R2210 and R2260 restore in the repeater 45. It will also be understood that the relays R1820 and R1900 restore in the repeater 35. Accordingly, a steady on-hook supervisory signal is produced at the operator switchboard in the manual office 25, which indicates that the connection is cleared out at the operator switchboard in the manual office 25. When the connection is taken down in the manual office 25, the relay R1860 restores and opens its contacts 1862 to cause the sequential deenergization and releases of the hold relay R1850 and the switching relay R1800. At its contacts 1861, the relay R1860 opens the loop circuit connecting the two repeaters 35 and 45, thereby to cause the deenergization and release of the relays R1810, R2140 and R2170. Following the release of these relays in the repeater 35, this repeater is fully restored to normal and is marked as idle in the bank contacts of the various connectors.

When the line relay R2140 restores, it opens its contacts 2141 to deenergize the relay R2030. At its contacts 2142, the relay R2140 opens the circuit for energizing the hold relay R2160. The latter relay now restores and opens its contacts 2164 to disconnect the hold conductor C2167 from ground and thus cause the deenergization and release of the relays R2000, R2150, R2220 and R2240. The relay R2150, upon restoring, opens its contacts 2154 to disconnect the test conductor 29c from ground through the winding of the tone repeating relay R2230. The relay R2230 now restores. Following the release of this relay, the repeater 45 is fully restored to normal and is marked as idle in the bank contacts of the various connectors. When the test conductor 29c is disconnected from ground the connector 20, the finder 19 and the line circuit 27 are released in a manner which will be clearly apparent from the above explanation.

If the calling operator in the manual office 25 desires to signal the answering operator in the manual office 28 after a connection is set up between these offices in the manner explained above, she may do so by opening and then reclosing the loop circuit extending from the manual office 25 to the repeater 35, thereby to cause the release and reoperation of the line relay R1860. Upon restoring, this relay opens its contacts 1861 to interrupt the loop circuit connecting the repeaters 35 and 45 and thus cause the deenergization and release of the relays R1810, R1820, R2140 and R2170. At its contacts 1862, the relay R1860 opens the operating circuit for the hold relay R1850. The relays R1850 and R1800 may or may not restore during the interval when the relay R1860 is deenergized. If this interval is sufficiently long, these two relays are deenergized and restore but the release thereof is without effect. The back-bridge relay R1820, upon restoring, opens its contacts 1821 to deenergize the battery reversing relay R1900. The battery relay, upon restoring, reverses the connections between the conductors of the trunk 26 and the exchange battery.

When the line relay R2140 restores it opens its contacts 2141 to deenergize the battery reversing relay R2030. At its contacts 2142, the relay R2140 opens the operating circuit for the hold relay R2160. If the latter relay restores during the open-circuit period of the supervisory signaling operation, it opens its contacts 2164 to interrupt one of the multiple paths over which ground potential is impressed upon the hold conductor C2167. Under the conditions assumed, however, the relays R2040, R2050 and R2150 are being held operated from the operator switchboard in the manual office 28, so that ground potential is maintained upon the hold conductor C2167 and upon the test conductor 29c to prevent the release of the connection.

The relay R2030, upon restoring, reverses the direction of current flow over the loop circuit connecting the repeater 45 with the operator switchboard in the manual office 28, whereby an on-hook supervisory signal is produced at the position of the operator handling the call in this office.

When the loop circuit connecting the operator switchboard in the manual office 25 with the repeater 35 is reclosed to complete the supervisory signaling operation, the relay R1860 reoperates to reclose the loop circuit connecting the two repeaters 35 and 45. Upon operating, the relay R1860 also causes the sequential reoperation of the relays R1850 and R1800, if released. When the loop circuit connecting the two repeaters 35 and 45 is recompleted, the relays R2140, R2170, R1810 and R1820 reoperate. The latter relay upon operating, recloses the operating circuit for the battery reversing relay R1900, whereby an off-hook supervisory signal is produced at the position of the operator handling the call in the manual office 25.

When the line relay 2140 reoperates in the manner just explained, it closes its contacts 2142 to again energize the hold relay R2160, and closes its contacts 2141 to recomplete the operating circuit for the battery reversing relay R2030. In response to the operation of the latter relay, an off-hook supervisory signal is produced at the position of the operator handling the call in the manual office 28.

Each time the loop circuit connecting the repeater 35 with the operator switchboard in the manual office 25 is opened and closed, the relay operations just described are repeated. It will be understood, therefore, that a supervisory signal of the well-known flashing recall type is produced at the position of the operator handling the call in the manual office 28. Upon observing this signal the answering operator may reenter the connection and ascertain the service desired by the calling operator in the manual office 25.

It will also be understood from the above explanation that when the connection is taken down in the manual office 25 the relays R1860, R1850, R1820, R1810 and R1800 are deenergized in the repeater 35. Following the release of these relays the repeater 35 is fully restored to normal. It will also be apparent that when the line relay R1860 restores to open the loop circuit connecting the repeaters 35 and 45, the relays R2140, R2170, R2160 and R2030 are deenergized in the repeater 45. Accordingly, a steady on-hook supervisory signal is produced at the position of the answering operator in the manual office 28. When this operator disconnects, the line relay R2040 restores and opens its contacts 2042 to deenergize the hold relay R2050. At its contacts 2041, the relay R2040 deenergizes the tone cut-off relay R2210 and the battery reversing relay R2260. The hold relay, upon restoring, opens its contacts 2052 to disconnect the hold conductor C2167 from ground and thus cause the deenergization and release of the relays R2000, R2150, R2220 and R2240. The relay R2150, upon restoring, opens its contacts 2154 to deenergize the lower winding of the tone repeating relay R2230 and to remove ground potential from the test conductor 29c. Following the release of the relay R2230 the repeater 45 is fully restored to normal and is marked as idle in the bank contacts of the various connectors. When ground potential is removed from the test conductor 29c, the conductor 20, the finder 19, and the line circuit 27 are released in a manner clearly apparent from the preceding explanation.

Forced Release of the Repeater 45

In the event a call is routed by way of the illustrated link, the repeater 45 and the trunk 29 to the operator switchboard in the manual office 28, and due to a defective condition of this trunk or for some other reason the call is not answered within a reasonable time interval, the timing relay R2250 functions forcibly to release the connection and to lock the calling line out of service. The forcible release of a connection under the control of the timing relay R2250 may also occur if the answering operator in the manual office 28 disconnects from a connection before the connection is cleared out at the calling substation and the calling subscriber fails to release the connection within a reasonable time interval thereafter.

In considering the operation of the timing relay R2250, it will be recalled from the preceding explanation that when the repeater 45 is seized through the illustrated link, on a call outgoing to the manual office 28, the relay R2150 is energized and closes its contacts 2158 to prepare the operating circuit for the timing relay R2250. So long as the repeater 45 occupies its call answered setting this circuit is held open at the contacts 2053 of the operated hold relay R2050. With the operating circuit for the timing relay R2250 prepared at the contacts 2053 and 2158, the timing apparatus of the common equipment 50, upon operating to transmit a ground pulse over the pulsing lead C290, energizes the lower winding of the timing relay R2250 in a circuit which includes this lead and the contacts 2256, 2158 and 2053. Upon operating, the relay R2250 locks to ground over a path which includes the contacts 2255, 2158 and 2053. After this locking circuit is completed the relay R2250 opens its contacts 2256 to interrupt its operating circuit. At its contacts 2253 and 2254, the relay R2250 transfers the operating circuit for the hold relay R2160 from ground through the contacts 2254 to the normally grounded cut-off lead C288. At its contacts 2252, the relay R2250 prepares an alternative path for impressing ground potential upon the test conductor 29c.

If, with the timing relay R2250 operated, a call is answered at the operator switchboard in the manual office 28, the two relays R2040 and R2050 sequentially operate and the latter relay opens its contacts 2053 to deenergize the timing relay R2250. Thus the timing operation in progress is terminated. Alternatively, if the connection is released from the calling substation during an interval when the timing relay R2250 is operated, this relay is deenergized incident to the release of the hold slave relay R2150. On the other hand if the timing relay R2250 is held in its operated position for a sustained time interval, the timing apparatus of the common equipment 50 functions in the manner previously explained to disconnect the time cut-off lead C288 from ground and thus deenergize the hold relay R2160. This relay, in restoring, opens its contacts 2164 to deenergize the operated relays R2000 and R2150, and the relays R2220 and R2240, if operated. The relay R2150, upon restoring, opens its contacts 2154 to deenergize the tone repeating relay R2230. At its contacts 2155, the relay R2150 connects the test conductor 29c to ground over a path which includes the contacts 2252 and 2162. At its contacts 2158, the relay R2150 deenergizes the timing relay R2250. The relay R2250 now restores and opens its contacts 2252 to disconnect the test conductor 29c from ground. When ground potential is removed from this conductor the operated relays in the illustrated link are immediately deenergized and restore to initiate the release of the link and to interrupt the loop circuit extending from the calling substation to the repeater 45. Incident to the latter operation the line relays R2140 and R2170 are deenergized and restore. The relay R2140, upon restoring, opens its contacts 2142 to prevent the reoperation of the hold relay R2160. In this regard it is noted that the timing relay R2250, upon restoring to initiate the release of the link, recloses its contacts 2254 to again complete the operating circuit for the hold relay R2160. The latter relay being slow-acting, however, does not operate before the line relays R2140 and R2170 are caused to release in the manner just explained. Following the relay operations just described the repeater 45 is fully released and is marked as idle in the bank contacts of the various connectors. Incident to the release of the illustrated link, and more specifically when ground potential is removed from the test conductor 29c, the line circuit associated with the calling line is operated to its line lockout setting in a manner which will be clearly apparent from the preceding explanation.

Operation of the Alarm Equipment

As indicated previously, the sustained application of ground potential to any one of the various alarm leads C912, C949, C929, and C281, indicates different types of faults in the switching equipment of the community exchange, which should be brought to the attention of the maintenance staff. More specifically, the application of ground potential to the conductor C281 indicates that the illustrated link has failed to release properly; the application of ground potential to the conductor C949 indicates that the link fuse 824 has blown; the sustained application of ground potential to the conductor C912 indicates that the distributor is being held in its call handling setting, and the application of ground potential to the conductor C929 indicates that one of the inter-office repeaters provided in the community exchange is locked out of service. In more specific reference to the last-mentioned type of fault, it will be noted from a consideration of the repeater 45 that when the fuse link 2244, through which current is supplied to the various relay windings of this repeater, is disrupted, a circuit through the fuse stud 2245 is completed for energizing the upper winding of the timing relay R2250. In operating, the relay R2250 closes its contacts 2252' to connect the alarm conductor C929 to ground. At its contacts 2252, the relay R2250 completes a path through the contacts 2161 and 2155 for impressing ground potential upon the test conductor 29c, whereby the repeater 45 and its associated trunk 29 are marked as busy in the bank contacts of the various connectors. The remaining circuit switching operations performed by the timing relay R2250 are without effect. It will be noted that this relay is held in its operated position until the defective fuse link 2244 is replaced and any trouble responsible for the failure of the fuse is cleared. In a similar manner, if the fuse link 1654, through which current is supplied to the windings of the relays in the repeater 35, is disrupted, a circuit is completed through the fuse stud 1655 for energizing the fuse relay R1650. With this relay operated ground potential is impressed upon the test conductor 26c over a path which includes the contacts 1743', 1652, and 1753, whereby the repeater 35 and its associated trunk 26 are marked as busy in the bank contacts of the various connectors. In operating the fuse relay R1650 also closes its contacts 1653 to connect the alarm conductor C929 to ground. Obviously the relay R1650 remains in its operated position until the defective fuse link 1654 is replaced.

In regard to the release alarm circuit referred to above, it will be recalled from the preceding explanation that when the Strowger switching mechanism of the connector 20 is conditioned for release, the release magnet 257 is operated to impress ground potential upon the release alarm conductor C281 through its contacts 258. Similarly, if the hold slave relay R360 of the connector is released to complete the operating circuit for the release magnet 674 of the minor switch 670, and this minor switch fails to release, the relay R580 remains in its operated position to hold ground potential upon the release alarm conductor C281 over a path which includes the contacts 363, C383, and the contacts 583. In a similar manner if the finder 19 is conditioned for release, the release alarm conductor C281 is connected to ground through the contacts 840. Normally the release operations, both in the finder and the connector, are effected in a short time interval. If, however, a release operation should not be performed within a reasonable time interval, the alarm sending relays operate to transmit an alarm signal to the distant central office and the supervisory signaling circuits are set to transmit a signal indicating the character of the trouble.

The alarm sending relays also function to transmit an alarm signal to one of the distant central offices when ground potential is impressed upon any one of the alarm conductors C929, C912, or C949. Also, the alarm relays which are energized over these leads are controlled to impart predetermined settings to the supervisory signaling circuits, which settings respectively indicate the faults designated by the grounding of the associated lead. The manner in which these functions are performed is fully described in the copending application Serial No. 414,252, filed October 9, 1941, Bakker and Lomax, referred to above.

The Selector System

As previously indicated, the repeaters 35 and 45 which terminate the trunks 26 and 29, respectively, may be used in a larger system having a capacity of one thousand lines, for example. A system of this character is illustrated in the drawings by a combination of Figs. 11, 12, 13, 14, 15, 16, 17, 18, 19, 20, 21, 22, 23 and 24 in the manner schematically illustrated in Fig. 26 of the drawings. In this system the line switching operations between the subscriber lines 71, 72, etc., and the various inter-office trunks, including the trunks 26 and 29, is accomplished through the provision of finder-selector links and a plurality of groups of connectors. One finder-selector link is illustrated as comprising the finder 51 and the selector 60. The various selectors each have access to the different groups of connectors, one of which includes the connector 70, and the various lines terminating in the exchange are rendered accessible to the finders and connectors through line circuits 73, 74, etc., individual thereto. The assignment of idle finder-selector links to the use of calling lines is under the control of distributors, such as the distributor 75, which are individual to different groups of the subscriber lines. Since the line circuits, the finders, the connectors and the link distributor may be of conventional arrangement, these switching units have been only schematically illustrated in Figs. 13 and 15 of the drawings. The selectors, on the other hand, are arranged in an improved manner and, accordingly, the details of the selector 60 which operates with the finder 51 have been illustrated in Fig. 14 of the drawings. Briefly considered, this selector comprises a Strowger switching mechanism having its contact field divided into ten levels of bank contacts which have the wipers 1475, 1476, 1477 and 1478 associated therewith. The mechanism further comprises the usual vertical and rotary magnets 1479 and 1481, which are respectively operative in conjunction with their associated ratchet and pawl mechanisms, not shown, to impart vertical and rotary movement to the wipers 1475 to 1478, inclusive. The mechanism is also equipped with a release magnet 1483 which, when energized, permits the wipers 1475 to 1478, inclusive, to be returned to rotary and vertical normal; vertical off-normal springs 1484, 1485 and 1486, which are respectively operated when the wipers 1475 to 1478, inclusive, are stepped to the first vertical off-normal positions thereof; and cam springs 1487, 1488, 1489 and 1490, which are respectively operated when the wipers are rotated to the eleventh rotary off-normal positions thereof. In addition to the Strowger switching mechanism just described, the selector 60 includes a line relay R1420, a slow-acting hold relay R1440, a slow-acting transfer relay R1460, a timing relay R1470, a pulsing relay R1430, a test relay R1410, a switch-through relay R1400 and a special relay R1450 which operates as a slave to the hold relay R1440 and also as a vertical off-normal relay.

Figure 11:
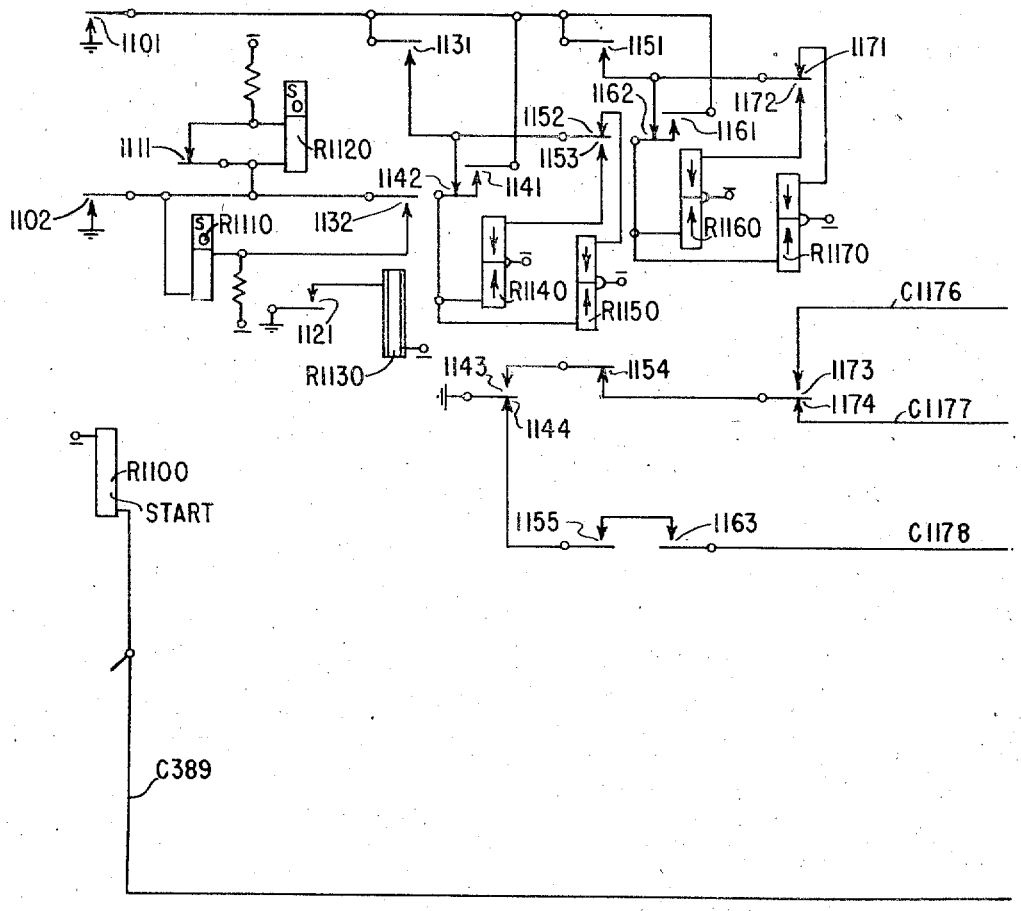
Figure 12:
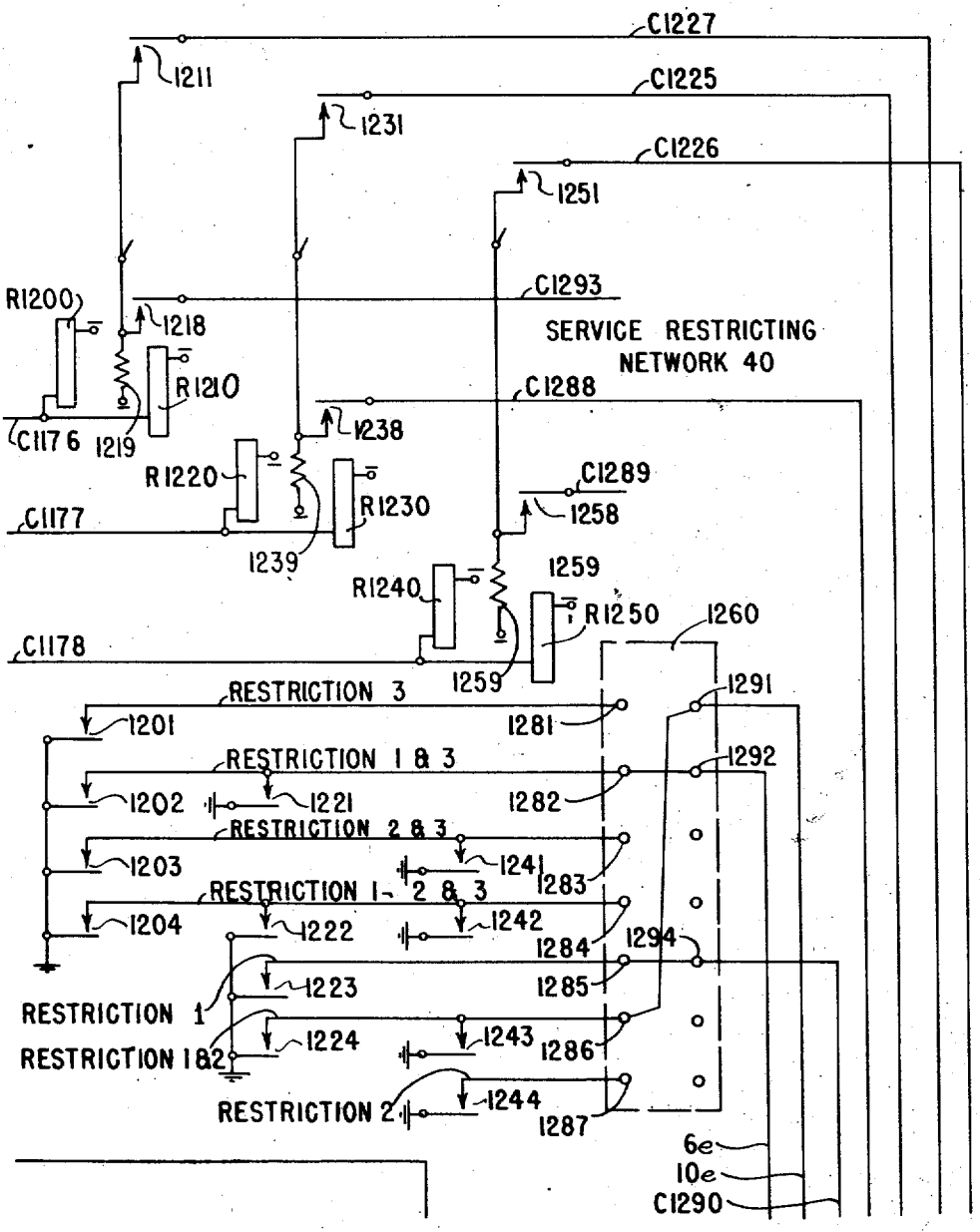
Figure 13:
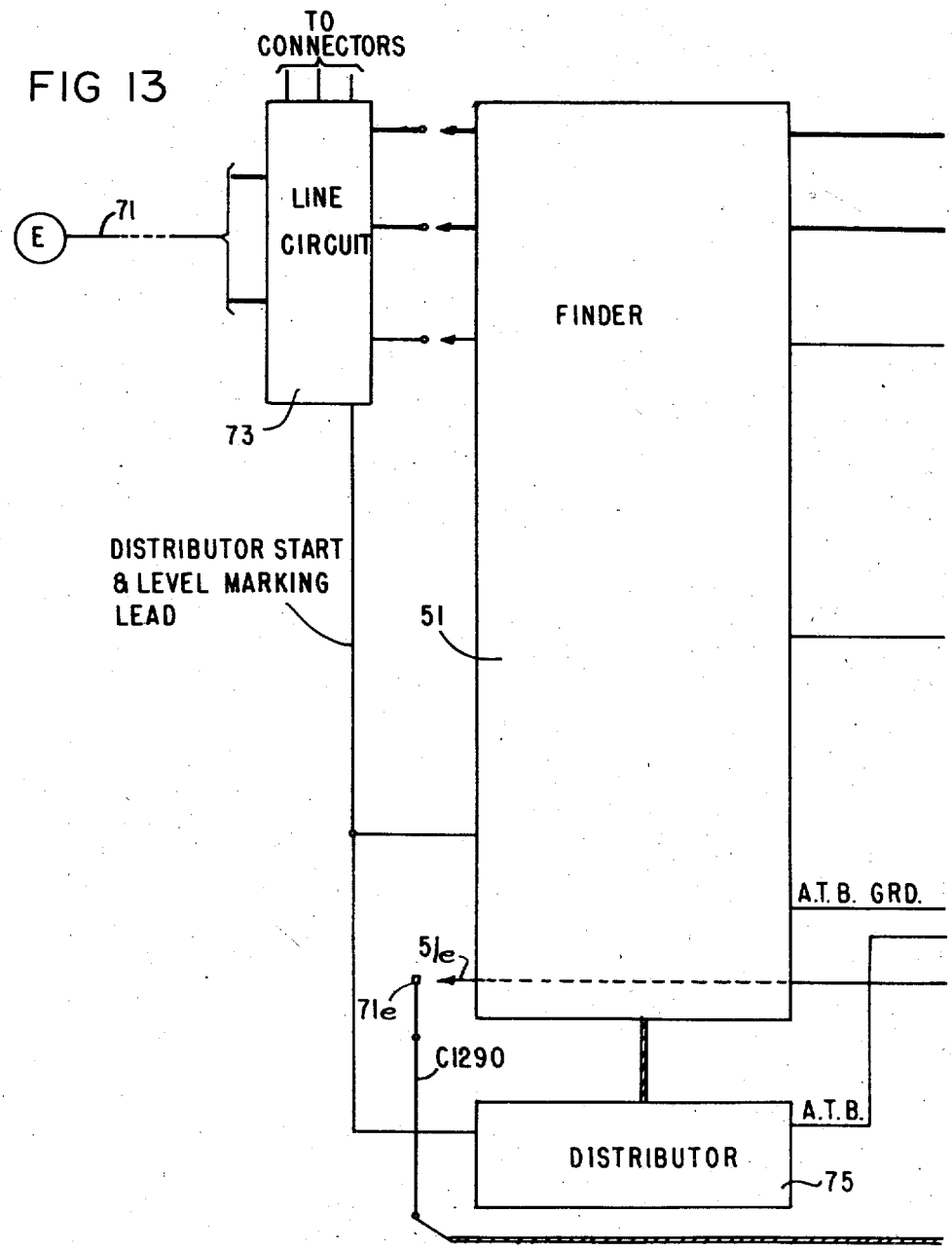
Figure 14:
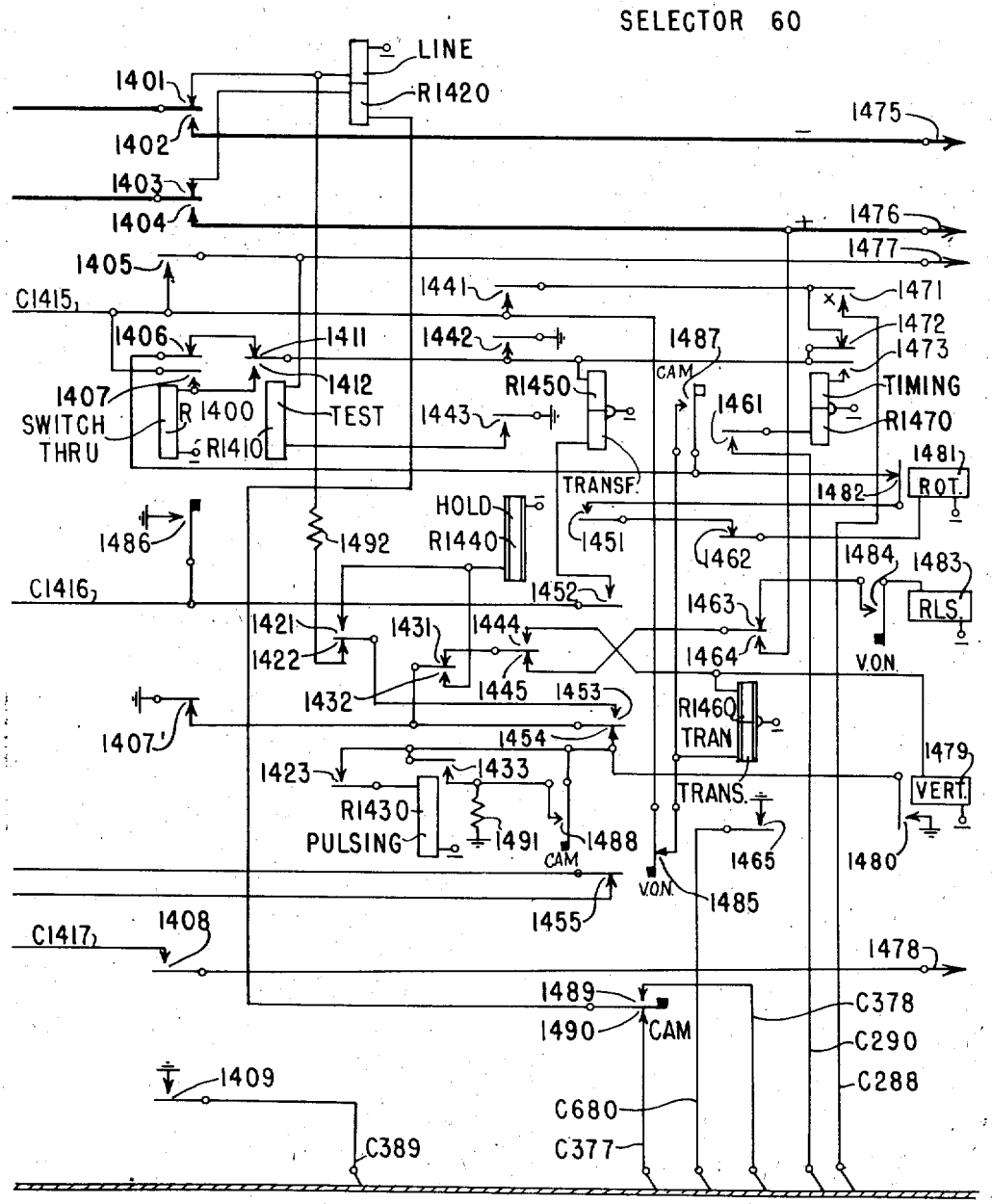
Figure 15:
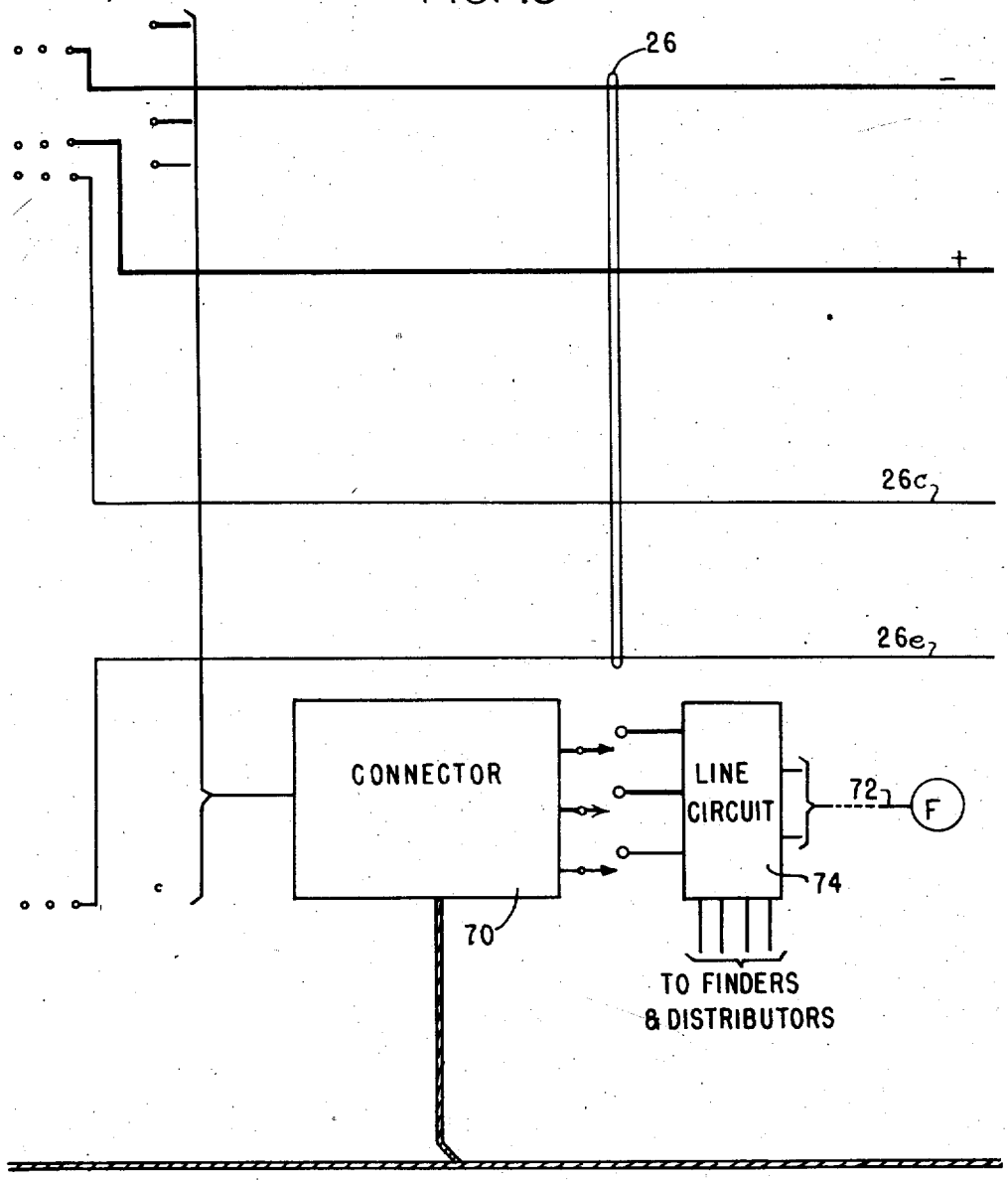
Figure 16:
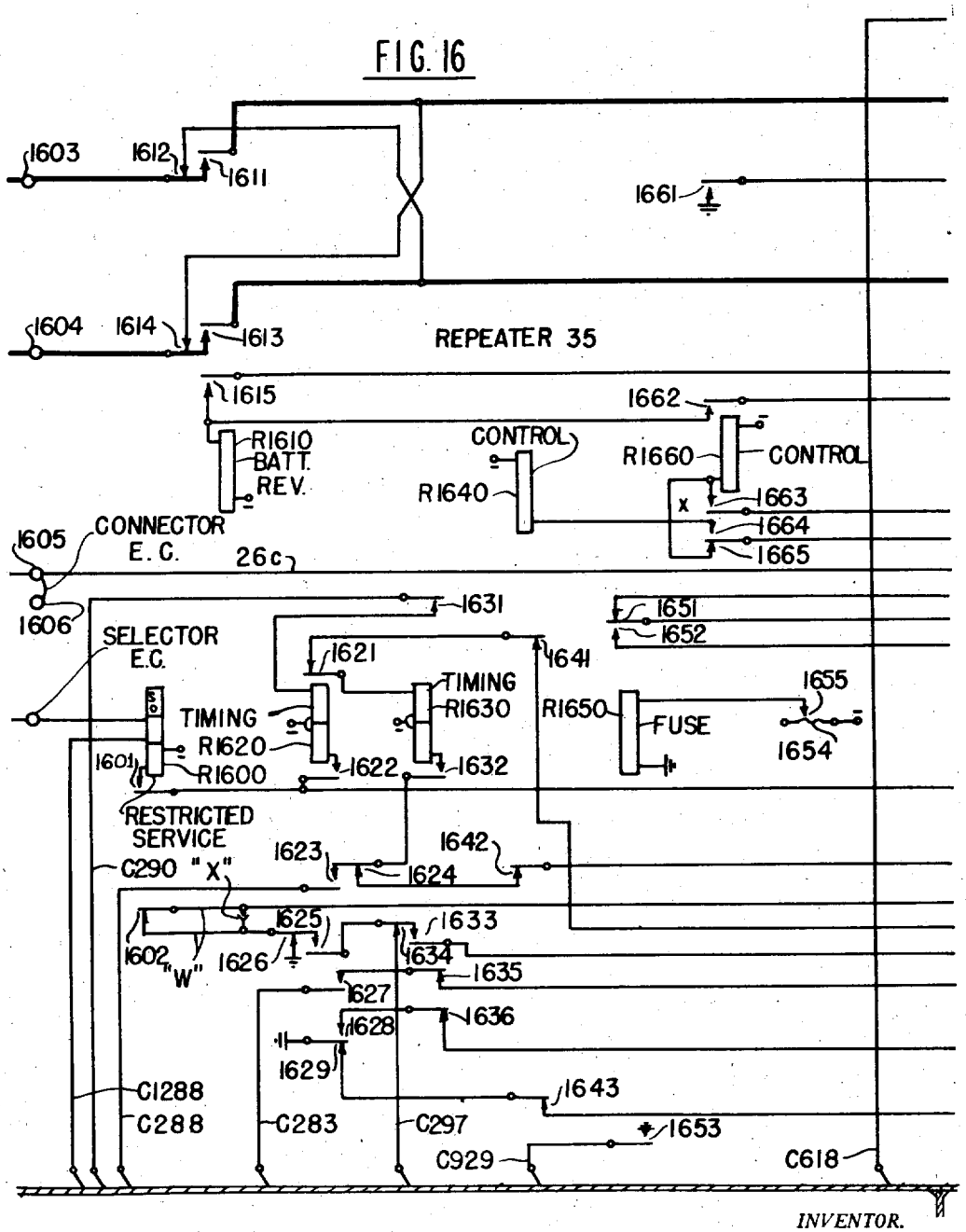
Figure 17:
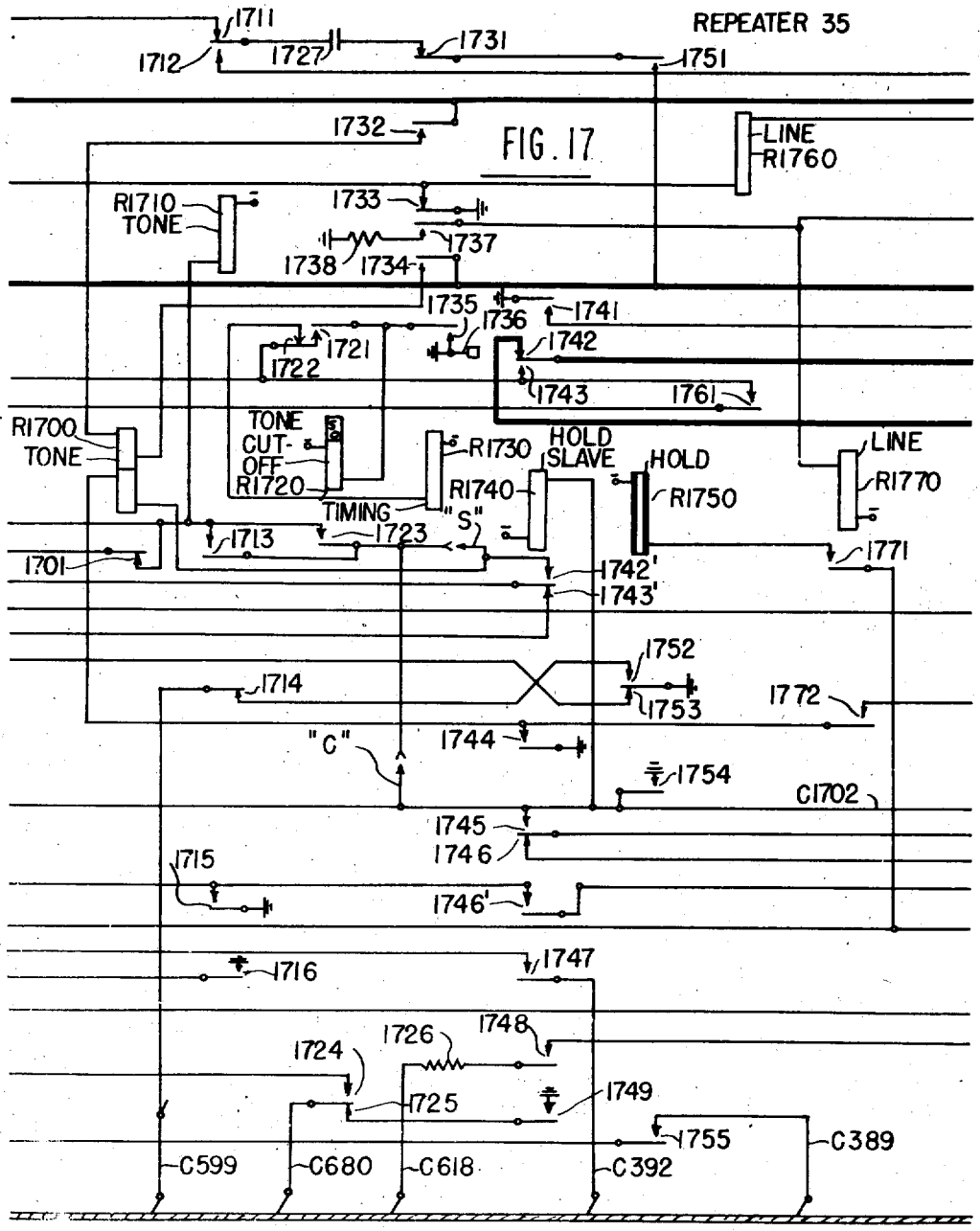
Figure 18:
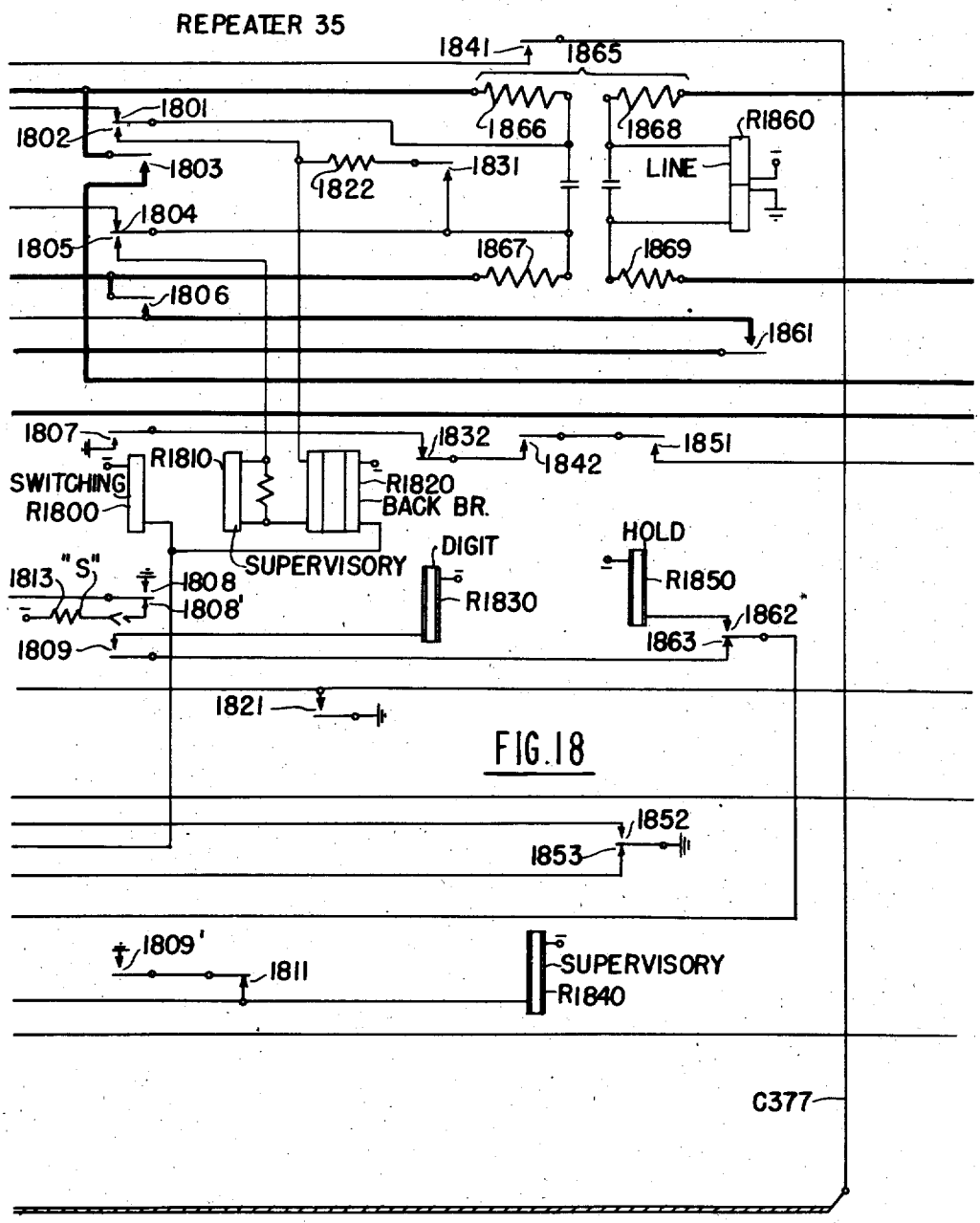
Figure 19:
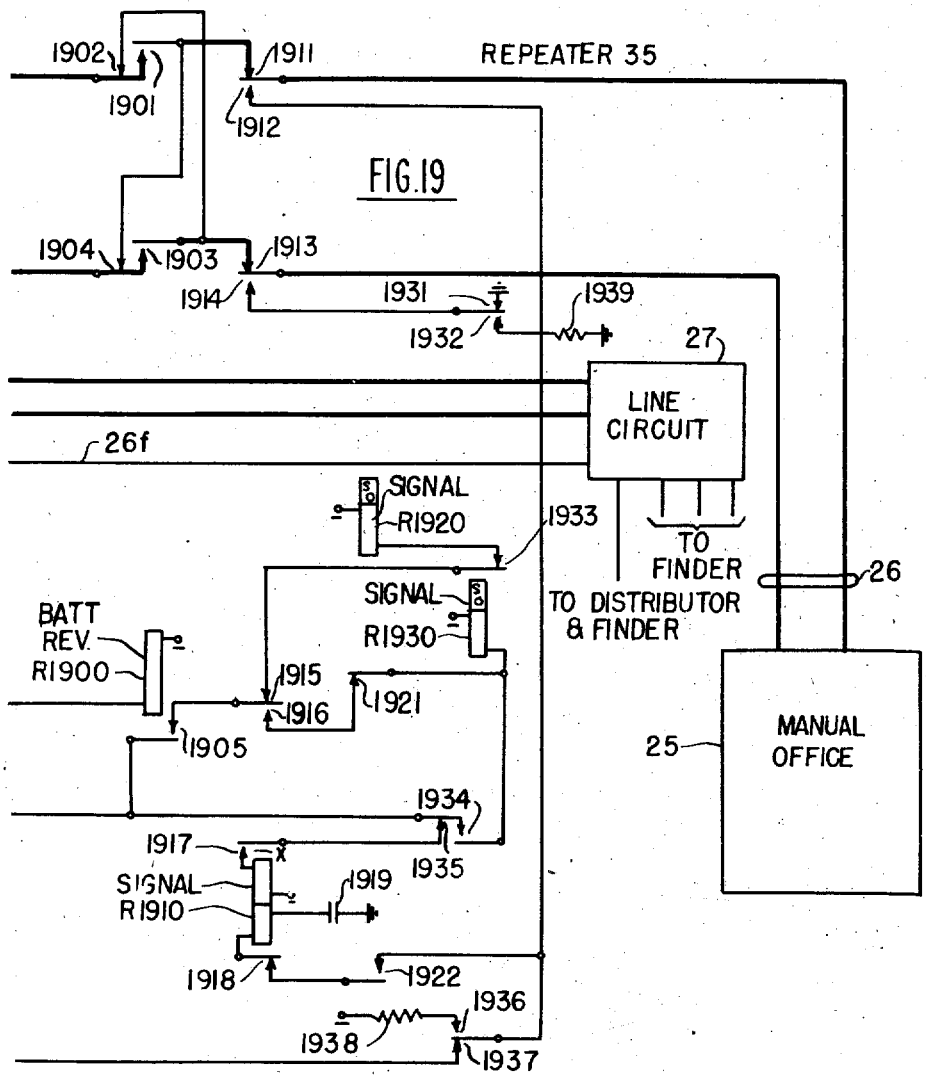

The general arrangement of the repeaters 35 and 45, the line circuit 30 associated with the repeater 45, and the restricted service network 40, shown in Figs. 11 and 12 of the drawings, is described above. It is noted that the various line switching units including the selector 60 may be controlled by common equipment of the character disclosed in the above-referred to copending application Serial No. 414,252, filed October 9, 1941, Lomax and Bakker. Accordingly, this selector as well as the other switching units of the modified system are shown in Fig. 26 of the drawings as being connected to the common equipment 50 by means of the cable which extends throughout the remaining figures of the drawings.

In a system of the character under consideration, wherein selectors are used at the first numerical switching stage, the inter-office trunk repeaters are terminated directly in the banks of the selectors, and the service restricting facilities, if required, are provided directly in the repeaters. Moreover, a different type of testing arrangement is utilized in a system of this character. Accordingly, the repeaters 35 and 45 are indicated in Fig. 26 of the drawings as being directly accessible to the selector 60. It is also pointed out that the repeater 35 as used in this system includes the "W" and "S" wiring, and the restricted relay R1600. It does not include the "X" and "C" wiring shown in Figs. 16 and 17 of the drawings, respectively.

In considering the operation of the system it may be assumed that the link comprising the finder 51 and the selector 60 is utilized in extending a call originating at the substation E served by the line 71. The manner in which the connection is extended through the finder 51 to the selector 60 when the calling loop circuit is established at the substation E, will be clearly apparent from the preceding explanation with reference to the operation of the finder 19. Incident to the switch-through operation of the finder 51, the calling loop circuit is extended through the contacts 1401 and 1403 to include the two windings of the line relay R1420 in series with the exchange battery. The loop circuit as extended to the selector 60 also serially includes the dial tone generator which is connected to the lower winding terminal of the line relay R1420 over a path which includes the dial tone lead C377 and the cam springs 1490. The resulting flow of dial tone signaling current over the calling loop circuit serves to signal the calling subscriber at the substation E that the dialing operation may be started. Incident to the switch-through operation of the finder 51 the control conductor C1415 is connected to ground in the finder 51 to complete a circuit through the vertical off-normal springs 1485 for energizing the lower winding of the transfer relay R1460.

In operating, the line relay R1420 opens its contacts 1422 to interrupt an incomplete priming circuit for itself, and closes its contacts 1421 to prepare a circuit for energizing the slow-acting hold relay R1440. At its contacts 1423, the relay R1420 completes a circuit through the contacts 1454 and 1407' for energizing the pulsing relay R1430. The relay R1460, upon operating, closes its contacts 1461 to prepare the operating circuit for the timing relay R1470. At its contacts 1462, the relay R1460 opens a point in the operating circuit for the rotary magnet 1481. At its contacts 1463, the relay R1460 opens a point in the operating circuit for the release magnet 1483. At its contacts 1464, the relay R1460 connects the positive wiper 1476 to ground over a path including the contacts 1464, 1445, 1431 and 1407'. This operation is without effect. At its contacts 1465, the relay R1460 connects the tone start lead C680 to ground.

The pulsing relay R1430, upon operating, locks to ground over a path including the contacts 1423 and 1433 and the resistor 1491. At its contacts 1431, the relay R1430 disconnects the positive wiper 1476 from ground. At its contacts 1432, the relay R1430 completes the prepared operating circuit for the hold relay R1440.

The relay R1440, upon operating, closes its contacts 1443 to prepare the operating circuit for the test relay R1410. At its contacts 1441 and 1442, the relay R1440 connects the control conductor C1415 to ground in the selector 60 over a path which also includes the contacts 1472. The completion of this path serves to prevent the release of the operated switch-through relay in the finder 51 and the operated line and cut-off relays in the line circuit 73. At its contacts 1441 and 1442, the relay R1440 also completes a holding circuit for the transfer relay R1460, this circuit extending from ground by way of the contacts 1442, 1472 and 1441, the off-normal springs 1485 and the lower winding of R1460 to battery. At its contacts 1442, the relay R1440 also completes an obvious circuit for energizing the upper winding of the relay R1450. At its contacts 1444, the relay R1440 prepares a circuit for transmitting current pulses to the transfer relay R1460 and the vertical magnet 1479. At its contacts 1445, the relay R1440 opens a point in the operating circuit for the release magnet 1483 and another point in the above-traced path for impressing ground potential upon the positive wiper 1476.

The relay R1450, upon operating, locks to the grounded guard lead C1416 over a path which includes its contacts 1452. At its contacts 1454, the relay R1450 opens the above-traced operating circuit for the pulsing relay R1430. At its contacts 1453, the relay R1450 further prepares the above-mentioned priming circuit for the line relay R1420. At its contacts 1453, the relay R1450 also completes a holding circuit for the relay R1440, this circuit extending from ground by way of the contacts 1407', 1453 and 1421, and the winding of R1440 to battery. At its contacts 1451, the relay R1450 prepares the operating circuit for the rotary magnet 1481. At its contacts 1455, the relay R1450 opens the all-links-busy path individual to the finder-selector link 51, 60.

In the event the dialing operation at the calling substation E is not started within a predetermined time interval after the selector 60 is seized, the timing relay R1470 as controlled by the timing apparatus of the common equipment 50 functions to release the selector 60 and the preceding finder 51. These timing facilities also function to release the link when the link is seized over a defective line having a permanent calling condition thereon. In considering the operation of this relay, it may be assumed that the dialing operation is not started at the substation E for a substantial time interval. During this interval the timing apparatus of the common equipment 50 functions to transmit a ground pulse over the pulsing lead C290, thereby to energize the lower winding of the timing relay R1470. In operating, this relay locks up in a circuit which includes its upper winding and the contacts 1473 and 1442. At its preliminary make contacts 1471, the relay R1470 connects the control conductor C1415 to the normally grounded cut-off lead C288. After this path is completed, the relay R1470 opens its contacts 1472 to disconnect the control conductor C1415 from ground in the selector 60.

After a delay of approximately two minutes the timing apparatus of the common equipment 50 functions to disconnect the cut-off lead C288 from ground in the manner previously explained. In response to this operation, ground potential is removed from the control conductor C1415 to initiate the release of the finder 51 and the cut-off relay of the line circuit 73. More specifically, the switch-through relay of the finder 51 restores to open the calling loop circuit as extended to the selector 60, when the control conductor C1415 is disconnected from ground. When thus deenergized the line relay R1420 opens its contacts 1421 to interrupt the holding circuit for the hold relay R1440, and opens its contacts 1423 to deenergize the pulsing relay R1430. The relay R1430, upon restoring, opens its contacts 1432 to deenergize the hold relay R1440. The relay R1440, upon restoring, opens its contacts 1442 to deenergize the relays R1460 and R1470, causing these two relays to restore. In releasing, the relay R1440 also closes its contacts 1445 to connect the positive wiper 1476 to ground over the path traced above. Incident to the release of the finder 51, the link guard conductor C1416 is disconnected from ground in this finder to deenergize the transfer relay R1450. Following the release of the relays R1450, R1460 and R 1470, the selector 60 is fully restored to normal and may be seized for further use. Incident to the release of the cut-off relay in the line circuit 73 this line circuit is operated to its line lockout setting, wherein the line 71 is marked as busy and no further outgoing calls may be originated thereon until the calling condition present on the line is terminated.

The selector 60 responds to the first digit of the directory number designating the desired substation, by operating to select an idle connector having access to the desired subscriber line, or an idle inter-office trunk, as the case may be. In this regard it may first be assumed that the substation F is being called from the substation E and that the first digit of the directory number designating the called substation comprises four impulses. During the open-circuit period of the first impulse, the relay R1420 restores and opens its contacts 1421 to interrupt the above-traced holding circuit for the hold relay R1440. At its contacts 1422, the relay R1420 completes the above-mentioned priming circuit for itself, this circuit extending from ground by way of the contacts 1407', 1453 and 1422, the resistor 1492 and the upper winding of R1420 to battery. The completion of this circuit does not cause the reoperation of the line relay R1420 but serves to render this relay exceedingly fast to operate when the calling loop circuit is recompleted at the end of the open-circuit period of the impulse. At its contacts 1423, the relay R1420 opens the above-traced operating and locking circuits for the pulsing relay R1430. In releasing, the latter relay opens its contacts 1432 to interrupt the operating circuit for the hold relay R1440, and opens its contacts 1433 further to interrupt its own locking circuit. At its contacts 1431, the relay R1430 completes the prepared circuit for energizing the upper winding of the transfer relay R1460 in parallel with the vertical magnet 1479, this circuit extending from ground by way of the contacts 1407', 1431 and 1444, and the parallel-connected windings of the relay R1460 and the magnet 1479 to battery.

In operating, the vertical magnet 1479 elevates the wipers 1475 to 1478, inclusive, one step wherein they are positioned opposite the first level of bank contacts in the associated contact field. This magnet, in operating, also closes its contacts 1480 to prepare or complete an alternative operating circuit for the pulsing relay R1430, this circuit extending from ground by way of the contacts 1480 and 1423, and the winding of R1430 to battery. Assuming that the line relay R1420 is reoperated before the vertical magnet 1479 completes its operation, this circuit is completed at the contacts 1480 incident to the operation of the magnet 1479. On the other hand, if the magnet 1479 completes its operation prior to the reoperation of the line relay R1420, this circuit is first prepared at the contacts 1480 and is completed at the contacts 1423 incident to the reoperation of the line relay R1420. In reoperating, the pulsing relay R1420 closes its contacts 1433 to recomplete its locking circuit as traced above and opens its contacts 1431 to interrupt the above-traced circuit for energizing the magnet 1479 in parallel with the upper winding of the transfer relay R1460. At its contacts 1432, the relay R1430 recompletes the operating circuit for the hold relay R1440. Due to the slow-to-release characteristics thereof, the hold relay R1440 and the transfer relay R1460 do not restore during the series of impulses transmitted to the selector 60. During each of the three succeeding impulses of the first digit dialed at the calling substation E, the two relays R1420 and R1430 interact with the vertical magnet 1479 in the exact manner explained above. Thus four current pulses are transmitted to the parallel-connected windings of the magnet 1479 and the relay R1460. It will be understood, therefore, that the wipers 1475 to 1478, inclusive, are operated to a position opposite the fourth level of bank contacts in the associated contact field in response to the dialing of the first digit "4" at the calling substation E.

Incident to the first vertical step of the wipers 1475 to 1478, inclusive, the vertical off-normal springs 1485 are opened to deenergize the lower winding of the transfer relay R. 1460. As indicated above this relay, due to its slow-to-release characteristic, remains operated until shortly after the first digit is ended. Also incident to the first vertical step of the selector wipers, the off-normal springs 1484 are closed to prepare the operating circuit for the release magnet 1483, and the off-normal springs 1486 are closed to complete an obvious multiple path for impressing ground potential upon the link guard conductor C1416, thereby to provide a holding circuit for the relay R1450.

At the end of the first digit, the line and pulsing relays R1420 and R1430 are held operated to cause the deenergization and release of the transfer relay R1460. This relay, in restoring, opens its contacts 1464 further to interrupt the above-traced path for impressing ground potential upon the positive wiper 1476, and closes its contacts 1463 to prepare the operating circuit for the release magnet 1483. At its contacts 1461, the relay R1460 opens the above-traced operating circuit for the timing relay R1470. At its contacts 1462, the relay R1460 completes the operating circuit for the rotary magnet 1481, this circuit extending from ground by way of the contacts 1442, 1411, 1406, 1482, 1451 and 1462, and the winding of the magnet 1481 to battery. When energized in this circuit the magnet 1481 operates to rotate the wipers 1475 to 1478, inclusive, into engagement with the contacts forming the first contact set of the selected fourth level. The succeeding operations depend upon the idle or busy condition of the first connector thus selected in the selected group of connectors. If this connector is busy, the test conductor thereof is marked with ground potential so that the winding of the test relay R1410 is short-circuited over a path which includes the test wiper 1477 and the contacts 1443. Accordingly, this relay is prevented from operating. On the other hand, if the first connector of the selected group is idle, the test conductor thereof is marked with negative battery potential to energize the test relay in a circuit which includes the test wiper 1477 and the contacts 1443. In such case the test relay R1410 immediately operates to arrest the trunk hunting operation in the manner explained below. In operating, the rotary magnet 1481 also opens its contacts 1482 to deenergize its own winding. Upon releasing, this magnet recloses its contacts 1482 to again complete its own operating circuit and, hence, reoperates to step the wipers 1475 to 1478, inclusive, into engagement with the contacts terminating the conductors of the trunk extending to the second connector of the selected group. If this connector also tests busy, the rotary magnet 1481 is again released and reoperated to advance the selector wipers a third step. The rotary step-by-step movement of these wipers continues until all of the connectors in the selected group have been tested and found to be busy or until an idle connector in the group is found. Assuming that all of the connectors of the selected group are busy, the wipers 1475 to 1478, inclusive, are operated to their eleventh rotary off-normal positions, at which time the cam springs 1487 are closed to complete an alternative circuit for energizing the transfer relay R1460, this circuit extending from ground by way of the contacts 1442, 1411, and 1406, the cam springs 1487, and the lower winding of R1460 to battery. Upon reoperating, the relay R1460 opens its contacts 1462 to interrupt the above-traced operating circuit for the rotary magnet 1481 and thus prevent further operation of this magnet. At its contacts 1461, the relay R1460 reprepares the operating circuit for the timing relay R1470. At its contacts 1463, the relay R1460 opens the prepared operating circuit for the release magnet 1483. At its contacts 1464, the relay R1460 reprepares the above-traced path for impressing ground potential upon the positive wiper 1476.

When the wipers 1475 to 1478, inclusive, are operated to the eleventh off-normal positions thereof, the cam springs 1490 are opened to interrupt the above-described dial tone signaling circuit and the cam springs 1489 are closed to serially include the busy tone generator and the busy tone lead C378 in the calling loop circuit. In response to this operation, busy tone signaling current is transmitted over the calling end of the connection to signal the calling subscriber that a connection to the desired line cannot be obtained.

Also incident to the eleventh rotary step of the selector wipers, the cam springs 1488 are closed to prepare an alternative operating circuit for the pulsing relay R1430. This circuit is only used as a vehicle for reoperating the pulsing relay R1430 in the event the calling subscriber fails to notice the busy signal and continues to dial the remaining digits of the directory number designating the desired line. It will be noted that in such case the impulses transmitted to the selector 60 are without effect. It will also be noted that at the end of the open-circuit period of each such impulse the pulsing relay R1430 is again energized in a circuit which includes the contacts 1423, the cam springs 1488 and the resistor 1491.

When the connection is released at the calling substation E the three relays R1420, R1430 and R1440 are deenergized and restore in the order named. The two relays R1430 and R1440 complete the previously traced path for impressing ground potential upon the positive wiper 1476. If desired, this path, as extended through the positive talking contact of the eleventh contact set in the selected level, may be utilized to control an overflow meter, not shown, thereby to register the all-busy condition of the selected group of connectors. In releasing, the hold relay R1440 also opens its contacts 1442 to disconnect the control conductor C1415 from ground and thus initiate the release of the finder 51 and the line circuit 73. Incident to the release of the finder 51, the link guard conductor C1416 is disconnected from ground therein. Upon restoring, the hold relay R1440 also opens its contacts 1442 to deenergize the transfer relay R1460. The latter relay, upon restoring, closes its contacts 1463 to complete the prepared operating circuit for the release magnet 1483, this circuit extending from ground by way of the contacts 1407', 1431, 1445 and 1463, the off-normal springs 1484 and the winding of the magnet 1483 to battery. When thus energized, the magnet 1483 attracts its associated holding pawl, permitting the wipers 1475 to 1478, inclusive, to be returned to rotary and vertical normal. Incident to the release of the selector switching mechanism, the off-normal springs 1484 are disengaged to deenergize the release magnet 1483; the off-normal springs 1486 are disengaged to deenergize the transfer relay R1450; the off-normal springs 1485 are closed to reprepare the operating circuit for the transfer relay R1460; the cam springs 1488 are opened further to interrupt the above-traced alternative circuit for energizing the pulsing relay R1430; the cam springs 1487 are opened further to interrupt the alternative operating circuit for the transfer relay R1460; the cam springs 1489 are opened; and the cam springs 1490 are closed. Following the release of the transfer relay R1450 and the release of the Strowger switching mechanism in the selector 60, this switch is fully restored to normal. When the guard conductor C1416 is disconnected from ground in the finder 51 and the selector 60, this finder-selector link is marked as idle in the distributor 75 and may be allotted for further use.

Assuming now that the connector 70 is the first idle connector of the selected group, the trunk hunting operation of the selector 60 is arrested when the wipers of this selector are positioned to engage the contacts terminating the conductors of the trunk extending to this connector. At this time the test relay R1410 is energized from the exchange battery as connected to the test wiper 1477 over the test lead of the trunk extending to the connector 70. In operating, this relay opens its contacts 1411 to interrupt the above-traced operating circuit for the rotary magnet 1481 and thus prevent further rotary movement of the wipers 1475 to 1478, inclusive. At its contacts 1412, the relay R1410 completes a circuit through the contacts 1442 for energizing the switch-through relay R1400.

The relay R1400, upon operating, closes its contacts 1405 to connect the control conductor C1415 through the test wiper 1477 to the test conductor of the trunk extending to the connector 70, whereby this connector is marked as busy in the bank contacts of the other selectors. At its contacts 1405, the relay R1400 also short-circuits the test relay R1410 over a path which includes the contacts 1443, 1442, 1412, 1407 and 1405. When thus short-circuited the relay R1410 is rendered slow to release. At its contacts 1407, the relay R1400 prepares a locking circuit for itself. At its contacts 1406, the relay R1400 further interrupts the above-traced operating circuit for the rotary magnet 1481. At its contacts 1407', the relay R1400 opens the previously traced operating and locking circuits for the two relays R1430 and R1440. At its contacts 1408, the relay R1400 completes a control path which extends from the finder EC wiper 51e by way of the EC lead C1417 and the indicated contacts to the EC wiper 1478 of the selector. At its contacts 1409, the relay R1400 completes an obvious path for impressing ground potential upon the restricted service start lead C389, whereby operation of the service restricting network 40 is initiated. At its contacts 1401 and 1403, the relay R1400 excludes the windings of the line relay R1420 and the dial tone generator from the calling loop circuit. Thus the dial tone signal is terminated. At its contacts 1402 and 1404, the relay R1400 extends the calling loop circuit to the seized connector 70. In response to the latter operation the line and hold relays conventionally embodied in the connector 70 operate to connect the test wiper 1477 to ground over a path which includes the test conductor of the trunk extending to this connector. Thus, locking circuits are provided for the switch-through relay R1400, the switch-through relay of the finder 51, and the cut-off relay of the line circuit 73. Shortly following the seizure of the connector in the manner just explained, the deenergized relays R1410, R1420, R1430 and R1440 all restore. The relay R1440, upon restoring, opens its contacts 1443 to interrupt the path short-circuiting the winding of the test relay R1410. At its contacts 1442, the relay R1440 deenergizes the upper winding of the relay R1450 and opens the previously traced locking circuit for the timing relay R1470. It will be understood, therefore, that if a timing operation is in progress at the time the relay R1440 restores, the timing relay R1470 is deenergized and releases. Thus the release of the relay R1440, incident to the switch-through operation of the selector 60, prevents the connection from being forcibly released by the timing relay R1470 as controlled by the timing apparatus of the common equipment 50. In restoring, the hold relay R1440 also closes its contacts 1445 further to prepare the operating circuit for the release magnet 1483. Following the relay operations just described, no further operation of the selector 60 occurs until the connection is released at the calling end thereof.

The manner in which the connection may be extended through the connector 70 to the desired line 72, and the desired talking circuit is set up between the calling and called substations when the call is answered, will be clearly apparent from the preceding explanation and, hence, need not be considered at this point. When the connection is cleared out at the calling end thereof the connector 70 is released. Incident to the release of this switch, the test wiper 1477 is disconnected from ground to deenergize the relay R1400, the switch-through relay of the finder 51 and the cut-off relay of the line circuit 73. Thus the release of the finder 51 and the line circuit 73 is initiated. Incident to the release of the finder 51, the guard conductor C1416 is disconnected from ground in this finder. The switch-through relay R1400, upon restoring, closes its contacts 1407' to complete the above-mentioned operating circuit for the release magnet 1483, this circuit extending from ground by way of the contacts 1407', 1431, 1445 and 1463, the off-normal springs 1484 and the winding of the magnet 1483 to battery. When thus energized, the magnet 1483 attracts its associated holding pawl, permitting the wipers 1475 to 1478, inclusive, to be returned to rotary and vertical normal. Incident to this operation the off-normal springs 1484 are disengaged to deenergize the release magnet 1483; the off-normal springs 1485 are engaged to reprepare the operating circuit for the transfer relay R1460; and the off-normal springs 1486 are disengaged to disconnect the guard conductor C1416 from ground and thus deenergize the relay R1450. Following the release of the latter relay the selector 60 is fully restored to normal.

If the above-described call originating on the line 71 is an inter-office trunk call intended for a line terminating at the manual office 25, the calling subscriber, after receiving the dial tone signal, dials the single digit designating the group of trunks including the trunk 26. At the end of the digit, the wipers of the selector 60 are positioned opposite the level of bank contacts in which the conductors of the repeater 35 are terminated. Shortly following the end of the digit, the transfer relay R1460 restores to initiate the trunk hunting operation of the selector in the manner previously explained. In this regard it is noted above that when utilized in a selector system of the character under consideration, the repeater 35 is provided with "S" wiring. Accordingly, each repeater in the group, when idle, is provided with a test conductor which is connected to the negative terminal of the exchange battery through a resistor. Thus, so long as the repeater 35 is idle, the test conductor 26c is connected to the negative terminal of the exchange battery through the contacts 1808' and the resistor 1813. On the other hand, when this repeater is busy the test conductor 26c is connected to ground through the operated make contacts 1808, or through the contacts 1742', the lower winding of the tone repeating relay R1700 and the contacts 1744. Assuming that the repeater 35 is seized by the selector 60 in forwarding the call under consideration, the switch-through operation of the selector 60 is effected in the exact manner explained above. The manner in which the repeater 35 transmits a splash of ringing current over the trunk 26 to the drop associated with this trunk in the manual office 25 and the relay operations which occur therein when the call is answered at the operator switchboard in the manual office, are exactly the same as described above with reference to the use of this repeater in a system utilizing the finder-connector link 19, 20. The only difference in the circuits involved relates to the operating and locking circuits for the three relays R1640, R1660 and R1710. In the system under consideration these relays are controlled over circuits which include the "S" wiring between the contacts 1723 and 1742' and, hence, are energized in circuits which include the lower winding of the tone repeating relay R1700 rather than the hold conductor C1702. It will be noted that after the repeater 35 is seized, the relays R1760, R1770, R1750 and R1740 are operated therein so that ground potential is impressed upon the test conductor 26c over a path which includes the contacts 1744, the lower winding of R1700, and the contacts 1742'. The completion of this path serves to maintain the repeater 35 marked as busy and to prevent the operated relays of the selector 60, the finder 51, and the line circuit 73 from releasing. The manner in which the connection may be supervised and released under the control of the answering operator in the manual office 25 is exactly the same as explained above with reference to the operation of the repeater 35 as used in the connector type of system. In this regard it will be noted that when the answering operator disconnects, the relays R1860, R1850 and R1740 restore in sequence and the last-mentioned thereof disconnects the test conductor 26c from ground to initiate the release of the selector 60, the finder 51 and the line circuit 73.

*Restricted service*

If the line 71 is to be restricted against making outgoing calls over the trunk 26 and the trunks of like character in the same group, the EC contact 71e individual thereto in the illustrated finder bank, and the corresponding contacts of the other finder banks, are strapped to the terminal 1285 of the cross-connecting frame 1260 included in the service restricting network 40. For purposes of explanation, the EC contact 71e is illustrated as being connected to the terminal 1285 over a path which includes the conductor C1290 and a strap connecting the two terminals 1285 and 1294. With this wiring arrangement, if the subscriber at the substation E attempts to obtain a connection to a trunk in the group including the trunk 26 through the illustrated finder-selector link, the call will fail. Thus it will be noted that when the switch-through relay R1400 of the selector 60 operates to switch a calling loop circuit through to the repeater 35 from the line 71, it closes its contacts 1408 to prepare the operating circuit for the restricted service relay R1600. Thereafter, and when the pulsing relays R1220 and R1230 operate in the manner previously explained, the upper winding of the restricted service relay R1600 is energized in a circuit which extends from ground by way of the contacts 1223, the strapped terminals 1285 and 1294, C1290, the wiper 51e and engaged contact 71e, the EC conductor C1417, the contacts 1408, the wiper 1478, the conductor 26e, the upper winding of R1600, C1288, the contacts 1238 and the resistor 1239 to battery. In operating, the relay R1600 locks to the grounded hold conductor C1702 through its contacts 1601. At its contacts 1602, the relay R1600 opens the previously traced circuits for energizing the hold relays R1750 and R1850. At this time only the relay R1750 is operated. Upon restoring, this relay opens its contacts 1754 to deenergize the hold slave relay R1740. The latter relay, upon restoring, opens its contacts 1744 and 1742' to disconnect the test conductor 26c from ground. When ground potential is removed from this conductor the selector 60 and the finder 51 are caused to release in a manner clearly apparent from the preceding explanation. Also, the line circuit 73 associated with the calling line 71 is operated to its line lockout setting when the test conductor 26c is disconnected from ground. Incident to the release of the finder 51 and the selector 60, the calling loop circuit as extended from the line 71 to the repeater 35 is broken to cause the deenergization and release of all operated relays in this repeater. In this regard it will be noted that the lower winding of the relay R1600 is deenergized in response to the release of the hold relay R1750. It will also be noted that the operating circuit for the restricted service relay R1600 is broken at the contacts 1408 incident to the release of the switch-through relay R1400 in the selector 60. Accordingly, the relay R1600 is caused to restore shortly following the release of the switch-through relay R1400. If the subscriber served by the line 71 is not restricted against the use of the trunks extending to the manual office 25, but is restricted against the use of the trunks designated by the operation of the two relays R1240 and R1250, for example, the contact 71e individual to the line 71 in the banks of the illustrated finder and the corresponding bank contacts of the other finders, will necessarily be wired to the terminal 1283 at the cross-connecting frame 1260. In such case the connection between the indicated finder bank contacts individual to the line 71 and the terminal 1285 of the cross-connecting frame 1260 is omitted. With the latter wiring arrangement, if a connection is set up between the line 71 and the repeater 35 through the illustrated finder-selector link, the completion of the service restricting path through the finder 51 and the selector 60 is not effective to cause the operation of the restricted service relay R1600. In this regard it will be noted that following the operation of the switch-through relay R1400, pulses of negative battery potential are intermittently transmitted by the relay R1230 over the lead C1288 to the lower terminal of the upper winding of the relay R1600. Moreover ground pulses are intermittently transmitted to the upper terminal of this winding by the relays R1200 and R1220. Since, however, the relay R1230 is never concurrently operated with either of the two relays R1209 and R1240, the ground and negative battery pulses applied to the two terminals of the upper winding of the relay R1600 are not matched. Accordingly, this relay remains in its restored position for the duration of the call and the call is permitted to proceed in the normal manner.

The manner in which the repeater 45 may be seized through the selector 60 on a call outgoing from the community exchange to the manual office 28 will be clearly apparent from the preceding explanation with reference to the operation of the selector 60 and the operation of the repeater 35. In this regard it will be noted that when the repeater 45 is utilized in a selector system of the character under consideration, the "S" wiring arrangement is used therein so that a circuit including the resistor 2139 and the contacts 2137' is provided for energizing the switch-through relays of the selectors when this repeater is selected and tested by one of the selectors on an outgoing call. Aside from these differences, calls routed through the illustrated finder-selector link and the repeater 45 to the manual office 28 are handled in the exact manner previously explained with reference to the operation of the system utilizing the finder-connector links only.

Incoming calls from the manual offices 25 and 28, as routed through the repeaters 35 and 45 respectively, may also be extended through the illustrated finder-selector link and any one of the connectors accessible thereto, in a manner which will be understood from the preceding explanation. Moreover, this link may be used in a tandem connection set up through the repeaters 45 and 35 in either direction between the manual offices 25 and 28 and such connections may be supervised and released in the exact manner described previously in reference to the system utilizing the finder-connector link 19, 20. In this regard it will be understood that after the selector 60 is operated to its switch-through position in handling a trunk to trunk call, an uninterrupted metallic loop circuit is set up therethrough between the repeaters respectively terminating the calling and called trunks in the community exchange. It will also be understood that the test wiper of the finder 51 is connected to the test wiper 1477 of the selector 60 following the switch-through operation, so that facilities are provided for preventing the release of the link during supervisory signaling operations.

While two embodiments have been disclosed, it will be understood that various modifications may be made therein which are within the true spirit and scope of the invention.

What is claimed is:

1. In a telephone system, first and second operator positions, means including two tandem related repeaters for setting up a connection between said operator positions, means responsive to a call answering operation performed at one of said operator positions for transmitting signals back and forth between said repeaters until one of said repeaters receives at least two signals, and means responsive to one of the signals transmitted to said one repeater for transmitting a supervisory signal to the other operator position.

2. In a telephone system, first and second operator positions, means including two tandem related repeaters for setting up a connection between said operator positions, means responsive to a call answering operation performed at one of said operator positions for transmitting signals back and forth between said repeaters until one of said repeaters receives at least two signals, means responsive to one of the signals transmitted to said one repeater for transmitting a supervisory signal to the other operator position, and means responsive to the first signal transmitted to the other of said repeaters for conditioning said other repeater to repeat subsequently received supervisory signals directly to said one repeater.

3. In a telephone system, a calling operator position, a called operator position, means including a calling repeater and a called repeater for extending a connection from said calling operator position to said called operator position, means responsive to the answering of the call at said called operator position for transmitting signals back and forth between said repeaters until said calling repeater has received a control signal and a following supervisory signal, and means responsive to said supervisory signal for transmitting an answer signal to said calling operator position.

4. In a telephone system, a calling operator position, a called operator position, means including a calling repeater and a called repeater for extending a connection from said calling operator position to said called operator position, means responsive to the answering of the call at said called operator position for transmitting signals back and forth between said repeaters until said calling repeater has received a control signal and a following supervisory signal, means responsive to said supervisory signal for transmitting an answer signal to said calling operator position, and means responsive to the first signal transmitted to the called repeater for rendering said called repeater directly controllable from said called operator position to transmit supervisory signals directly to said calling repeater.

5. In a telephone system, a calling operator position, a called operator position, means including a calling repeater and a called repeater for extending a connection from said calling operator position to said called operator position, means responsive to the answering of the call at said called operator position for transmitting signals of different character back and forth between said repeaters until said calling repeater receives at least two signals, and means responsive to the last signal transmitted to said calling repeater for transmitting an answer signal to the calling operator position.

6. In a telephone system, a calling operator position, a called operator position, means including a calling repeater and a called repeater for extending a connection from said calling operator position to said called operator position, means responsive to the answering of the call at said called operator position for transmitting signals of different character back and forth between said repeaters until said calling repeater receives at least two signals, means responsive to the last signal transmitted to said calling repeater for transmitting an answer signal to the calling operator position, and means responsive to the first signal transmitted to said called repeater for rendering said called repeater controllable from said called operator position to repeat supervisory signals directly to said calling repeater.

7. In a telephone system, a calling operator position, a called operator position, means including a calling repeater and a called repeater for extending a connection from said calling operator position to said called operator position, means responsive to the answering of the call at said called operator position for transmitting a first signal from the called repeater to the calling repeater, means responsive to said first signal for transmitting a second signal from the calling repeater to the called repeater, means responsive to said second signal for transmitting a third signal from the called repeater to the calling repeater, and means responsive to said third signal for transmitting an answer signal to the calling operator position.

8. In a telephone system, a calling operator position, a called operator position, means including a calling repeater and a called repeater for extending a connection from said calling operator position to said called operator position, means responsive to the answering of the call at said called operator position for transmitting a first signal from the called repeater to the calling repeater, means responsive to said first signal for transmitting a second signal from the calling repeater to the called repeater, means responsive to said second signal for transmitting a third signal from the called repeater to the calling repeater, means responsive to said third signal for transmitting an answer signal to the calling operator position, and means responsive to said second signal for rendering said called repeater controllable from said called operator position to transmit said third signal directly to said calling repeater.

9. In a telephone system, a calling operator position, a called operator position, means including a calling repeater and a called repeater for extending a connection from said calling operator position to said called operator position, said connection comprising an energized loop circuit connecting said repeaters, means responsive to the answering of the call at said called operator position for momentarily opening said loop circuit in said called repeater, means responsive to the interruption of said loop circuit for transmitting a signal from said calling repeater to said called repeater, means responsive to said signal for transmitting another signal from said called repeater to said calling repeater, and means responsive to said last-mentioned signal for transmitting an answer signal to said calling operator position.

10. In a telephone system, a calling operator position, a called operator position, means including a calling repeater and a called repeater for extending a connection from said calling operator position to said called operator position, said connection comprising an energized loop circuit connecting said repeaters and a control path extending between said repeaters, means responsive to the answering of the call at said called operator position for momentarily opening said loop circuit, means responsive to the interruption of said loop circuit for transmitting a control signal from said calling repeater over said control path to said called repeater, means responsive to said control signal for transmitting another signal from said called repeater back to said calling repeater, and means responsive to said last-mentioned signal for transmitting an answer signal to said calling operator position.

11. In a telephone system, a calling operator position, a called operator position, means including a calling repeater and a called repeater for extending a connection from said calling operator position to said called operator position, said connection comprising an energized loop circuit connecting said repeaters and a control path extending between said repeaters, means responsive to the answering of the call at said called operator position for momentarily opening said loop circuit, means responsive to the interruption of said loop circuit for transmitting a control signal from said calling repeater over said control path to said called repeater, means responsive to said control signal for reversing the direction of current flow over said energized loop circuit, and means responsive to the reversal of current flow over said loop circuit for transmitting an answer signal to said calling operator position.

12. In a telephone system, a calling operator position, a called operator position, means including a calling repeater and a called repeater for extending a connection from said calling operator position to said called operator position, said connection comprising an energized loop circuit connecting said repeaters and a control path extending between said repeaters, means responsive to the answering of the call at said called operator position for momentarily opening said loop circuit, means responsive to the interruption of said loop circuit for transmitting a control signal from said calling repeater over said control path to said called repeater, means responsive to said control signal for reversing the direction of current flow over said energized loop circuit, means also responsive to said control signal for rendering said last-named means directly controllable from said called operator position to reverse the direction of current flow over said loop circuit, and means responsive to each reversal in the direction of current flow over said loop circuit for transmitting a supervisory signal to said calling operator position.

13. In a telephone system, a calling operator position, a called operator position, means including a calling repeater and a called repeater for extending a connection from said calling operator position to said called operator position, said connection comprising an energized loop circuit connecting said repeaters and a control path extending between said repeaters, said called repeater comprising a signal repeating relay operative to repeat class of service signals to said called operator position and including a winding energized over said control path, means responsive to the answering of the call at said called operator position for momentarily opening said loop circuit, means responsive to the opening of said loop circuit for short-circuiting said winding over said path, means responsive to the resulting release of said relay for reversing the direction of current flow over said loop circuit, and means responsive to the reversal in the direction of current flow over said loop circuit for transmitting an answer signal to said calling operator position.

14. In a telephone system, a calling operator position, a called operator position, means including a calling repeater and a called repeater for extending a connection from said calling operator position to said called operator position, said connection comprising an energized loop circuit connecting said repeaters and a control path extending between said repeaters, said called repeater comprising a signal repeating relay operative to repeat class of service signals to said called operator position and including a winding energized over said control path, means responsive to the answering of the call at said called operator position for momentarily opening said loop circuit, means responsive to the opening of said loop circuit for short-circuiting said winding over said path, means responsive to the resulting release of said relay for reversing the direction of current flow over said loop circuit, means also responsive to the release of said relay for rendering said last-named means directly controllable from said called operator position to reverse the direction of current flow over said loop circuit, and means responsive to each reversal in the direction of current flow over said loop circuit for transmitting a supervisory signal to said calling operator position.

15. In a telephone system, an operator position, automatic switching apparatus controllable over a calling line of the system to extend connections to said operator position and including conversation timing facilities normally operative automatically to release each connection a predetermined time interval after the connection is established, and means responsive to the answering of a call routed to said operator position from a particular line of the system for rendering said timing facilities inactive.

16. In a telephone system, an operator position, automatic switching apparatus controllable over a calling line of the system to extend connections to said operator position and including conversation timing facilities normally operative automatically to release each connection a predetermined time interval after the connection is established, a trunk, and means responsive to the answering of a call routed from said trunk through said automatic switching apparatus to said operator position for rendering said timing facilities inactive.

17. In a telephone system, an operator position, a repeater including conversation timing facilities normally operative automatically to release a connection set up through said repeater a predetermined time interval after the connection is established, means including said repeater for extending a connection to said operator position, and means responsive to the answering of the call for rendering said timing facilities inactive.

18. In a telephone system, an operator position, a calling trunk, a repeater including conversation timing facilities normally operative automatically to release a connection set up through said repeater from a calling subscriber line a predetermined time interval after the connection is established, means including said repeater for extending a connection from said calling trunk to said operator position, and means responsive to the answering of the call for rendering said timing facilities inactive.

19. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, means responsive to the answering of the call at said called operator position for transmitting signals back and forth between said repeaters, and means responsive to a signal transmitted from said calling repeater to said called repeater for rendering said timing facilities inactive.

20. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, means responsive to the answering of the call at said called operator position for transmitting a signal from said called repeater to said calling repeater, means responsive to said signal for transmitting a signal from said calling repeater to said called repeater, and means responsive to said last-mentioned signal for rendering said timing facilities inactive.

21. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, said connection comprising a loop circuit connecting said repeaters, means responsive to the answering of the call at said called operator position for momentarily opening said loop circuit in said called repeater, means responsive to the opening of said loop circuit for transmitting a signal from said calling repeater to said called repeater, and means responsive to said signal for rendering said timing facilities inactive.

22. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, said connection comprising a loop circuit connecting said repeaters and a control path extending between said repeaters means responsive to the answering of the call at said called operator position for momentarily opening said loop circuit in said called repeater, means responsive to the opening of said loop circuit for transmitting a control signal over said path from said calling repeater to said called repeater, and means responsive to said control signal for rendering said timing facilities inactive.

23. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, said connection comprising a loop circuit connecting said repeaters and a control path extending between said repeaters, said called repeater including a signal repeating relay operative to repeat class of service signals to said called operator position and including a winding energized over said control path, means responsive to the answering of the call at said called operator position for momentarily opening said loop circuit in said called repeater, means responsive to the opening of said loop circuit for short-circuiting said winding over said control path, and means responsive to the resulting release of said signal repeating relay for rendering said timing facilities inactive.

24. In a telephone system which includes lines arranged for different classes of service, an operator position, means including a repeater for extending connections from calling ones of said lines to said operator position, said repeater including a relay network controllable from said operator position to transmit class of service signals to said operator position which identify the different calling lines and timing facilities normally operative to release each connection set up through said repeater a predetermined time interval after the connection is established, and means controlled by said network for rendering said timing facilities inactive.

25. In a telephone system which includes lines arranged for different classes of service, an operator position, means including a repeater for extending connections from calling ones of said lines to said operator position, said repeater including a relay network controllable from said operator position to transmit class of service signals to said operator position which identify the different calling lines and timing facilities normally operative to release each connection set up through said repeater a predetermined time interval after the connection is established, a trunk, and means responsive to the operation of said network at a time when said repeater is occupied with a call originating on said trunk for rendering said timing facilities inactive.

26. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, means responsive to the answering of the call at said called operator position for transmitting signals back and forth between said repeaters, means responsive to one of the signals transmitted to said calling repeater for transmitting an answer signal to said calling operator position, and means responsive to a signal transmitted from the calling repeater back to the called repeater for rendering said timing facilities inactive.

27. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, means responsive to the answering of the call at said called operator position for transmitting a signal from said called repeater to said calling repeater, means responsive to said signal for transmitting a control signal from said calling repeater back to said called repeater, means responsive to said control signal for rendering said timing facilities inactive, means also responsive to said control signal for transmitting a second signal from said called repeater to said calling repeater, and means responsive to said second signal for transmitting an answer signal to said calling operator position.

28. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, said connection comprising a loop circuit connecting said repeaters, means responsive to the answering of the call at said called operator position for momentarily opening said loop circuit in said called repeater, means responsive to the opening of said loop circuit for transmitting a signal from said calling repeater to said called repeater, means responsive to said signal for rendering said timing facilities inactive, means also responsive to said signal for reversing the direction of current flow over said loop circuit, and means responsive to the reversal of current over said loop circuit for transmitting an answer signal to said calling operator position.

29. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, said connection comprising a loop circuit connecting said repeaters and a control path extending between said repeaters, means responsive to the answering of the call at said called operator position for momentarily opening said loop circuit in said called repeater, means responsive to the opening of said loop circuit for transmitting a control signal over said control path from said calling repeater to said called repeater, means responsive to said control signal for rendering said timing facilities inactive, means also responsive to said control signal for reversing the direction of current flow over said loop circuit, and means responsive to the reversal of current over said loop circuit for transmitting an answer signal to said calling operator position.

30. In a telephone system, a calling operator position, a called operator position, a calling repeater, a called repeater including conversation timing facilities normally operative to release a connection extended through said called repeater to said called operator position a predetermined time interval after the connection is established, means including said calling and called repeaters connected in tandem in the order named for extending a connection from said calling operator position to said called operator position, said connection comprising a loop circuit connecting said repeaters and a control path extending between said repeaters, said called repeater including a signal repeating relay operative to repeat class of service signals to said called operator position and including a winding energized over said control path, means responsive to the answering of the call at said called operator position for momentarily opening said loop circuit in said called repeater, means responsive to the opening of said loop circuit for short-circuiting said winding over said control path, means responsive to the resulting release of said signal repeating relay for rendering said timing facilities inactive, means also responsive to the release of said relay for reversing the direction of current flow over said loop circuit, and means responsive to the reversal of current flow over said loop circuit for transmitting an answer signal to said calling operator position.

31. In a telephone exchange which includes repeaters terminating different interoffice trunks and which terminates a line that is to be restricted against the use of one of said trunks, service restricting means for generating non-interfering signals which respectively designate said different trunks and for generating a control signal which is individual to said line and matches the service restricting signal designating said one trunk, and call blocking means in the repeater terminating said one trunk and actuated by said control signal and the matching service restricting signal.

32. In a telephone exchange which includes repeaters terminating different interoffice trunks and which terminates a line that is to be restricted against the use of one or more of said trunks, service restricting means for generating non-interfering signals which respectively designate said different trunks and for generating control signals which are individual to said line and may match any combination of said service restricting signals, call blocking devices individual to said repeaters and each actuated by the matching of the respective corresponding service restricting signal with one of said control signals, and means for selectively matching said control signals with said service restricting signals so that said line may be denied access to any one or any combination of said trunks.

33. In a telephone exchange which includes a repeater terminating an interoffice trunk and which terminates a line that is to be restricted against the use of said trunk, a pair of paths one of which is individual to said line and the other of which is individual to said trunk, service restricting means for transmitting matched signals over said paths, and means in said repeater controlled over said paths by said matched signals for preventing a connection from being extended over said trunk from said line.

34. In a telephone exchange which includes repeaters terminating different interoffice trunks and which terminates lines that are to be restricted against the use of one or more of said trunks, service restricting means for generating non-interfering service restricting signals individually designating said trunks and for generating line signals individual to said lines which may match said service restricting signals in different combinations, and call blocking devices individual to said repeaters and each actuated by matching line and service restricting signals transmitted thereto from said service restricting means.

35. In a telephone exchange which includes repeaters terminating different interoffice trunks and which terminates lines that are to be restricted against the use of one or more of said trunks, service restricting means for generating non-interfering service restricting signals individually designating said trunks and for generating line signals individual to said lines, means whereby the line signals individual to any one of said lines may be matched with any one or more of said service restricting signals, and call blocking devices individual to said repeaters and each actuated by matching line and service restricting signals transmitted thereto from said service restricting means.

36. In a telephone exchange which includes repeaters terminating different interoffice trunks and which terminates lines that are to be restricted against the use of one or more of said trunks, service restricting signal paths individual to said trunks, line signal paths individual to said lines, service restricting means for transmitting non-interfering service restricting signals over said service restricting paths and for transmitting line signals individual to said lines over said line signal paths which may match said service restricting signals in different combinations, and call blocking devices individual to said repeaters and each actuated by the matching of a line signal transmitted over any one of said line signal paths with the service restricting signal transmitted over the respective corresponding service restricting path.

37. In a telephone exchange which includes repeaters terminating different interoffice trunks and which terminates lines that are to be restricted against the use of one or more of said trunks, service restricting signal paths individual to said trunks, line signal paths individual to said lines, service restricting means for transmitting non-interfering service restricting signals over said servce restricting paths and for transmitting line signals individual to said lines over said line signal paths which may match said service restricting signals in different combinations, call blocking devices individual to said repeaters and each actuated by the matching of a line signal transmitted over any one of said line signal paths with the service restricting signal transmitted over the respective corresponding service restricting path, and means for selectively arranging said line signal paths so that any one of said lines may be restricted against the use of any one of said trunks or any combination of said trunks.

38. In a telephone exchange which includes repeaters terminating different interoffice trunks and which terminates lines that are to be restricted against the use of one or more of said trunks, service restricting signal paths individual to said trunks, line signal paths individual to said lines, service restricting means for transmitting non-interfering service restricting signals over said service restricting paths and for transmitting line signals individual to said lines over said line signal paths which may match said service restricting signals in different combinations, a finder-selector link controllable over any calling one of said lines to extend a connection from the calling line to one of said repeaters and to extend the line signal path individual to the calling line to said one repeater, and a call blocking device in said one repeater, said call blocking device being operative to prevent the further extension of the connection only in the event the line signal transmitted over the extended line signal path matches the service restricting signal transmitted over the service restricting path which is individual to said one repeater.

39. In a telephone exchange which includes repeaters terminating different interoffice trunks and which terminates lines that are to be restricted against the use of one or more of said trunks, service restricting signal paths individual to said trunks, line signal paths individual to said lines, service restricting means for transmitting non-interfering service restricting signals over said service restricting paths and for transmitting line signals individual to said lines over said line signal paths which may match said service restricting signals in different combinations, a finder-selector link controllable over any calling one of said lines to extend a connection from the calling line to one of said repeaters and to extend the line signal path individual to the calling line to said one repeater, said one repeater including a call blocking device which is operative only in the event that line signal transmitted over the extended line signal path matches the service restricting signal transmitted over the service restricting path individual to said one repeater, and means responsive to the operation of said call blocking device for releasing said link.

40. In a telephone exchange which includes repeaters terminating different interoffice trunks and which terminates lines that are to be restricted against the use of one or more of said trunks, service restricting signal paths individual to said trunks, line signal paths individual to said lines, service restricting means for transmitting non-interfering service restricting signals over said service restricting paths and for transmitting line signals individual to said lines over said line signal paths which may match said service restricting signals in different combinations, a finder-selector link controllable over any calling one of said lines to extend a connection from the calling line to one of said repeaters and to extend the line signal path individual to the calling line to said one repeater, said one repeater including a call blocking device which is operative only in the event the line signal transmitted over the extended line signal path matches the service restricting signal transmitted over the service restricting path individual to said one repeater, and means responsive to the operation of said call blocking device for locking the calling line out of service.

41. In a telephone system which includes a plurality of finders each operative, when assigned for use, to seize a calling line of the system, electromagnetically controlled means for assigning said finders for use one at a time, and means including a differential relay having a winding adapted to be energized in circuit with an operating winding of said first-named means for assigning a second finder to the use of a calling line in the event a first assigned finder fails to find said last-named calling line.

42. In a telephone system which includes a plurality of finders each operative, when assigned for use, to seize a calling line of the system, relays individual to said finders and each operative to assign the associated finder for use, and means comprising a differential relay having a winding adapted to be energized in series with one of said relays for assigning a second finder to the use of a calling line in the event a first assigned finder fails to find said last-named calling line.

43. In a telephone system which includes first and second finders each operative, when assigned for use, to seize a calling line of the system, first and second relays individual to said finders and each operative to assign the respective associated first and second finders for use, a differential relay, a circuit for energizing one winding of said differential relay in series with said second relay, means for operating said first relay, said first relay being operative to prepare said circuit, timing means for completing said circuit and for concurrently energizing the other winding of said differential relay a predetermined time interval after operation of said first finder to seize a calling line is initiated, means responsive to the operation of said second relay for shunting one winding of said differential relay, and means responsive to the operation of said differential relay for conditioning said timing means to measure a second time interval.

44. In a telephone system which includes a plurality of finders each operative, when assigned for use, to seize a calling line of the system and which also includes equipment common to said finders for controlling the operation of each finder to seize a calling line, assign relays individual to said finders and operative in sequence to test said finders until an idle finder is found each time a previously assigned finder is seized through said common equipment, a differential relay, a circuit for energizing one winding of said differential relay, said assign relays each being operative to extend said circuit through the winding of the next succeeding relay, means for completing said circuit and for concurrently energizing the other winding of said differential relay a predetermined time interval after operation of said common equipment to control a first assigned finder is initiated, means responsive to the resulting operation of the assign relay through which said circuit extends for shunting one winding of said differential relay, and means responsive to the operation of said differential relay for releasing said common equipment.

45. In a telephone system which includes a plurality of finders each operative, when assigned for use, to seize a calling line of the system and which also includes equipment common to said finders for controlling the operation of each finder to seize a calling line, assign relays individual to said finders and operative in sequence to test said finders until an idle finder is found each time a previously assigned finder is seized through said common equipment, a differential relay, a circuit for energizing one winding of said differential relay, said assign relays each being operative to extend said circuit through the winding of the next succeeding relay, means for completing said circuit and for concurrently energizing the other winding of said differential relay a predetermined time interval after operation of said common equipment to control a first assigned finder is initiated, means responsive to the resulting operation of the assign relay through which said circuit extends for shunting one winding of said differential relay, means responsive to the operation of said differential relay for releasing said common equipment, and means for preventing the operation of said differential relay in the event said first assigned finder seizes a calling line during said predetermined time interval.

46. In a selecting system, a plurality of selecting devices, relays individual to said devices and each operative to select the associated device for operation, and means comprising a differential relay having a winding adapted to be energized in series with one of said relays for selecting a second device for operation in the event a first selected device fails to complete an assigned selecting operation within a predetermined time interval.

47. In a selecting system, a plurality of selecting devices, electromagnetically controlled means for selecting said devices for operation one at a time, and means including a differential relay having a winding adapted to be energized in circuit with an operating winding of said first-named means for selecting a second device for operation in the event a first selected device fails to complete an assigned selecting operation within a predetermined time interval.

48. In a link distribtor, link assign relays sequentially operative to effect the selection of an idle link, equipment for controlling the operation of a selected idle link, a differential relay for resetting said common equipment, means for energizing one winding of said differential relay in series with the assign relay next succeeding that corresponding to a selected idle link and for concurrently energizing the other winding of said differential relay, and means responsive to the operation of the energized assign relay for shunting one winding of said differential relay.

49. In a link distributor which includes link assign relays individual to a plurality of associated links, an operating circuit for said relays which includes two branches, said relays being controlled over one branch of said circuit sequentially to test said links until an idle link is found each time one of said links performs an assigned operation, means including the other branch of said circuit for transmitting a start testing pulse to said assign relays in the event a first selected link fails to perform its assigned operation within a predetermined time interval, and means comprising a differential relay having one winding included in said other branch circuit for preventing said start testing pulse from causing the operation of more than one of said assign relays.

50. In a link distributor which includes link assign relays individual to a plurality of associated links, an operating circuit for said relays which includes two branches, said relays being controlled over one branch of said circuit sequentially to test said links until an idle link is found each time one of said links performs an assigned operation, means including the other branch of said circuit for transmitting a start testing pulse to said assign relays, thereby to cause the operation of one of said assign relays, in the event a first selected link fails to perform its assigned operation within a predetermined time interval, and means comprising a differential relay having one winding included in said other branch circuit and operative in response to the operation of said one assign relay for terminating said pulse.

51. In a selector which includes a two-motion switching mechanism having primary and secondary operating magnets, a hold relay operative in response to seizure of said selector, a second relay, means including said hold relay for energizing said second relay when said selector is seized, means controlled by said switching mechanism for maintaining said second relay operated until all other parts of said selector are released, and means including said second relay for controlling the energization of at least one of said magnets.

52. In a selector which includes a two-motion switching mechanism having primary and secondary operating magnets, operating circuits for said magnets, a hold relay operative in response to seizure of said selector, a second relay having make contacts included in at least one of said operating circuits, means including said hold relay for energizing said second relay when said selector is seized, and means controlled by said switching mechanism for maintaining said second relay operated until all other parts of said selector are released.

53. In a selector which includes a two-motion switching mechanism having primary and secondary operating magnets, operating circuits for said magnets, a hold relay operative in response to seizure of said selector, a pulse repeating relay having an operating circuit, an additional relay having make contacts included in at least one of the operating circuits for said magnets and break contacts included in the operating circuit for said pulse repeating relay, means including said hold relay for energizing said additional relay when said selector is seized, and means controlled by said switching mechanism for maintaining said additional relay operated until all other parts of said selector are released.

54. In a selector which is adapted to be assigned for use by an associated distributor and includes a two-motion switching mechanism having primary and secondary operating magnets, operating circuits for said magnets, a path for marking said selector as busy in said distributor, contacts controlled by said switching mechanism and operative to complete said path when said switching mechanism is operated to an off-normal setting, a hold relay operative in response to seizure of said selector, a second relay, means including said hold relay for energizing said second relay when said selector is seized, means including said contacts for maintaining said second relay operated until all other parts of said selector are released, and means including said second relay for controlling the energization of at least one of said operating circuits.

55. In a selector which is adapted to be assigned for use by an associated distributor and includes a two-motion switching mechanism having primary and secondary operating magnets, operating circuits for said magnets, a path for marking said selector as busy in said distributor, contacts controlled by said switching mechanism and operative to complete said path when said switching mechanism is operated to an off-normal setting, a hold relay operative in response to seizure of said selector, a second relay having make contacts included in at least one of said operating circuits, means including said hold relay for energizing said second relay when said selector is seized, and means including the contacts controlled by said switching mechanism for maintaining said second relay operated until all other parts of said selector are released.

56. In a step-by-step selector which is adapted to be assigned for use by an associated distributor and includes a two-motion switching mechanism having primary and secondary stepping magnets, pulsing circuits for said magnets, a path for marking said selector as busy in said distributor, contacts controlled by said switching mechanism and operative to complete said path when said switching mechanism is operated to an off-normal position, a hold relay operative in response to seizure of said selector, a pulse repeating relay having an operating circuit and operative to control said pulsing circuits, an additional relay having make contacts included in at least one of said pulsing circuits and break contacts included in said operating circuit, means including said hold relay for energizing said additional relay when said selector is seized, and means including the contacts controlled by said switching mechanism for maintaining said additional relay energized until all other parts of said selector are released.

57. In a selector which is adapted to be assigned for use by an associated distributor and includes a two-motion switching mechanism having primary and secondary operating magnets, operating circuits for said magnets, a path for marking said selector as busy in said distributor, contacts controlled by said switching mechanism and operative to complete said path when said switching mechanism is operated to an off-normal setting, a hold relay operative in response to seizure of said selector, a second relay including two windings, means including said hold relay for energizing one of said windings when said selector is seized, means including said contacts for energizing the other of said windings when said switching mechanism is operated to an off-normal setting, and means including said second relay for controlling the energization of at least one of said circuits.

58. In a selector which is adapted to be assigned for use by an associated distributor and includes a two-motion switching mechanism having primary and secondary operating magnets, operating circuits for said magnets, a path for marking said selector as busy in said distributor, contacts controlled by said switching mechanism and operative to complete said path when said switching mechanism is operated to an off-normal setting, a hold relay operative in response to seizure of said selector, a second relay including two windings and having make contacts included in at least one of said operating circuits, means including said hold relay for energizing one of said windings when said selector is seized, and means including the contacts controlled by said switching mechanism for energizing the other of said windings when said switching mechanism is operated to an off-normal setting.

59. In a step-by-step selector which is adapted to be assigned for use by an associated distributor and includes a two-motion switching mechanism having primary and secondary stepping magnets, pulsing circuits for said magnets, a path for marking said selector as busy in said distributor, contacts controlled by said switching mechanism and operative to complete said path when said switching mechanism is operated to an off-normal position, a hold relay operative in response to seizure of said selector, a pulse repeating relay having an operating circuit and operative to control said pulsing circuits, an additional relay including two windings, said additional relay having make contacts in at least one of said pulsing circuits and break contacts included in said operating circuit, means including said hold relay for energizing one of said windings when said selector is seized, and means including the contacts controlled by said switching mechanism for energizing the other of said windings when said switching mechanism is operated to an off-normal setting.

60. In a telephone system, a pair of lines, means including two tandem related repeaters for setting up a connection between said lines, means for transmitting control signals back and forth between said repeaters until one of said repeaters receives at least two signals, and means responsive to one of the signals transmitted to said one repeater for effecting a predetermined control operation in said one repeater.

61. In a selector which includes a two-motion switching mechanism having primary and secondary operating magnets, a hold relay operative in response to seizure of said selector, a second relay, means including said hold relay for energizing said second relay when said selector is seized, means controlled by said switching mechanism for maintaining said second relay operated until all other parts of said selector are released, and means including said hold relay for controlling the operation of each of said magnets.

62. In a selector which includes a two-motion switching mechanism having primary and secondary operating magnets, controlling circuits for said magnets, a pulse repeating relay having break contacts included in the control circuit for one of said magnets and having an operating circuit which is completed in response to seizure of said selector, a hold relay having make contacts included in the control circuits for each of said magnets, means controlled by said pulse repeating relay for energizing said hold relay when said selector is seized, an additional relay having break contacts included in the operating circuit for said pulse repeating relay, means including said hold relay for energizing said additional relay, and means controlled by said switching mechanism for maintaining said additional relay operated until all other parts of said selector are released.

PIER BAKKER.